United States Patent
Chow et al.

(10) Patent No.: US 6,961,559 B1
(45) Date of Patent: Nov. 1, 2005

(54) DISTRIBUTED NETWORK VOICE MESSAGING FOR WIRELESS CENTREX TELEPHONY

(75) Inventors: Albert Chow, Caldwell, NJ (US); Jinman Kim, Chatham, NJ (US); Spencer C. Wang, Parsippany, NJ (US)

(73) Assignee: AT&T Corp., New York, NY (US)

( * ) Notice: Subject to any disclaimer, the term of this patent is extended or adjusted under 35 U.S.C. 154(b) by 1008 days.

(21) Appl. No.: 09/630,941

(22) Filed: Aug. 2, 2000

Related U.S. Application Data

(63) Continuation-in-part of application No. 09/458,831, filed on Dec. 13, 1999, which is a continuation-in-part of application No. 09/224,272, filed on Dec. 31, 1998, now abandoned, and a continuation-in-part of application No. 09/223,567, filed on Dec. 31, 1998.

(51) Int. Cl.[7] .............................................. H04M 3/42
(52) U.S. Cl. ..................... 455/414.1; 455/555; 455/417
(58) Field of Search ............................ 455/417, 414.1, 455/450, 461, 554.1, 555, 567; 370/522, 524; 379/229, 230, 207.02, 207.04, 207.05, 207.06, 207.08

(56) References Cited

U.S. PATENT DOCUMENTS

| | | | | |
|---|---|---|---|---|
| 4,388,717 A | * | 6/1983 | Burke | ......................... 370/261 |
| 4,456,793 A | | 6/1984 | Baker et al. | |
| 4,723,273 A | * | 2/1988 | Diesel et al. | .......... 379/211.02 |

(Continued)

OTHER PUBLICATIONS

Brochure entitled "Extreme Centrex DMS–100 Integrated Wireless Centrex Solution," Northern Telecom, Sep. 1998.
Brochure entitled "Say Goodbye to Phone Tag", AG Communication Systems Roameo PocketPBX.
Brochure entitled "TDMA", AG Communication Systems Roameo, 3/98.
Brochure entitled "SHOWCASE applications Public Carrier Networks DMS–100 Wireless–New Markets, New Opportunities", Published by Northern Telecom, Jun. 1998.
Brochure entitled "Aireach Office Direct Communications Access for an Increasingly Mobile Workforce" by Hughes Network Systems, Jun. 98–1K.
Booklet entitled Nortel Companion the Wireless Telephone System for Business *Keeping Business Moving,* 1995 Northern Telecom Limited, Ordering No.: P0809841 Issue Mar. 02, 1996.
"AT&T Digital PCS" by Communications Plus, wireless centers taken from www.comm–plus. Net/ATTWS/tech.html, pp. 1–5, pp. 1–3, printed May 1999.
"IS–136: Evolutionary Advances in D–AMPS" by ISOTEL Corporation taken from www.isotel.com/is136.html, printed May 1999.
Newspaper article entitled "Cutting the Cord to Battle the Bells" by John McDonnell, Washington Post, Oct. 27, 1998.
"TIA/EIA Interim Standard" Addendum No. 1 to TIA/EIA/IS–136.1–A, by Global Engineering Documents with the permission of EIA, pp. 14, 266, 332–332–40.

*Primary Examiner*—Sonny Trinh

(57) ABSTRACT

A method and system for distributing voice prompts and messaging closer to the calling or called party via the Voice Access Port (VAP) of a wireless centrex system comprises the steps of transmitting a message request to the VAP from a network server platform, retrieving a selected message and forwarding the message, for example, to the calling party, for example, when the called party is not available or during conference call set-up, call hold or call screening. In accordance with a further embodiment, the voice prompt or message may be personalized with the calling/called party's name, address or other personalized information as appropriate.

28 Claims, 59 Drawing Sheets

U.S. PATENT DOCUMENTS

| | | | |
|---|---|---|---|
| 4,755,985 A | * | 7/1988 | Jayapalan et al. .......... 370/384 |
| 4,771,448 A | | 9/1988 | Koohgoli et al. |
| 4,864,559 A | | 9/1989 | Perlman |
| 5,007,076 A | * | 4/1991 | Blakley .................. 379/88.21 |
| 5,235,632 A | | 8/1993 | Raith |
| 5,280,472 A | | 1/1994 | Gilhousen et al. |
| 5,285,469 A | | 2/1994 | Vanderpool |
| 5,327,486 A | * | 7/1994 | Wolff et al. .............. 379/93.23 |
| 5,345,499 A | | 9/1994 | Benveniste |
| 5,353,331 A | | 10/1994 | Emery et al. |
| 5,390,233 A | | 2/1995 | Jensen et al. |
| 5,404,574 A | | 4/1995 | Benveniste |
| 5,457,736 A | | 10/1995 | Cain et al. |
| 5,469,496 A | | 11/1995 | Emery et al. |
| 5,479,595 A | | 12/1995 | Israelsson |
| 5,497,424 A | | 3/1996 | Vanderpool |
| 5,504,803 A | | 4/1996 | Yamada et al. |
| 5,506,887 A | | 4/1996 | Emery et al. |
| 5,513,379 A | | 4/1996 | Benveniste et al. |
| 5,530,945 A | | 6/1996 | Chavez, Jr. et al. |
| 5,548,636 A | | 8/1996 | Bannister et al. |
| 5,579,379 A | | 11/1996 | D'Amico et al. |
| 5,581,604 A | * | 12/1996 | Robinson et al. ........ 379/88.13 |
| 5,592,541 A | | 1/1997 | Fleischer, III et al. |
| 5,598,412 A | | 1/1997 | Griffith et al. |
| 5,603,080 A | | 2/1997 | Kallander et al. |
| 5,610,972 A | | 3/1997 | Emery et al. |
| 5,634,193 A | | 5/1997 | Ghisler |
| 5,657,375 A | * | 8/1997 | Connolly et al. ........... 455/436 |
| 5,664,005 A | | 9/1997 | Emery et al. |
| 5,666,399 A | | 9/1997 | Bales et al. |
| 5,673,307 A | | 9/1997 | Holland et al. |
| 5,740,536 A | | 4/1998 | Benveniste |
| 5,745,484 A | | 4/1998 | Scott |
| 5,752,185 A | | 5/1998 | Ahuja |
| 5,754,627 A | | 5/1998 | Butler et al. |
| 5,758,281 A | | 5/1998 | Emery et al. |
| 5,787,162 A | | 7/1998 | Javitt |
| 5,787,352 A | | 7/1998 | Benveniste |
| 5,809,128 A | | 9/1998 | McMullin |
| 5,809,423 A | | 9/1998 | Benveniste |
| 5,825,759 A | | 10/1998 | Liu |
| 5,857,017 A | * | 1/1999 | Ohi et al. .................... 379/157 |
| 5,864,614 A | | 1/1999 | Farris et al. |
| 5,905,950 A | | 5/1999 | Anell |
| 5,915,225 A | | 6/1999 | Mills |
| 5,917,897 A | | 6/1999 | Johnson et al. |
| 5,960,064 A | | 9/1999 | Foladare et al. |
| 6,434,121 B1 | * | 8/2002 | Davidson et al. ........... 370/270 |
| 6,546,442 B1 | * | 4/2003 | Davis et al. ................ 710/106 |

* cited by examiner

DISTRIBUTED NETWORK VOICE MESSAGING FOR WIRELESS CENTREX TELEPHONY

This application is a continuation-in-part of U.S. patent application Ser. No. 09/458,831, filed Dec. 13, 1999, which is a continuation-in-part of U.S. application Ser. Nos. 09/224,272 filed Dec. 31, 1998 now abandoned and 09/223,567 filed Dec. 31, 1998 now abandoned.

FIELD OF THE INVENTION

The instant invention relates generally to the field of communication, and more particularly, to the field of personal wireless communications. The present invention includes methods and systems for distributing voice messaging and announcement responsibilities in a wireless centrex telecommunications network architecture. Voice messaging and announcements are provided from a point closer to the called wireless party, referred to herein as the voice access port (VAP), rather than from the Network Server Platform (NSP).

BACKGROUND

The challenges of an increasing mobile workforce have resulted in businesses migrating towards a more flexible and decentralized working environment These newly evolved environments have created a need for communication systems that must be capable of facilitating untethered communication at any time and any place. Consequently, there is vast growth in emerging technologies that facilitate communication anywhere and anytime. Such technologies are employed in end user devices such as pagers, cellular telephones, and mail systems such as voice mail and e-mail systems.

There presently exists both wireline telephone network systems for home and office use and cellular telephone systems for wireless mobile calls anywhere wireless services are offered (i.e., anywhere a user subscribed cellular base station reception can reach), which are interconnected to each other through the Public Switched Telephone Network (PSTN). As such, a user has a choice of contacting other telephone users or being contacted by other telephone users by using either the wireline telephone system or the cellular phone system, each having their own respective detriments.

Wireline business telephone service is typically more economical than cellular phone service. However, if a user decides to use a wireline telephone as their only business telephone they cannot be immediately contacted if they are not in their own office where their business telephone is physically located. Nor can the user easily make telephone calls while not in his own office or on travel. On the other hand, if a user decides to have a cellular phone as their only business telephone, they can be contacted at anywhere at anytime but will likely incur higher costs, e.g., airtime charges, which in total can be higher than using wireline telephone services. In the aggregate, the cost of cellular telephone service to all employees of a company is generally cost prohibitive. In addition, a cellular telephone does not typically provide the feature/function of a wireline telephone service (e.g., Integrated Services Digital Network (ISDN) and centrex feature/function).

Furthermore, if a user decides to have both a wireline telephone and a cellular phone for their business use, they incur cost for using both systems and experience the inconvenience of having two separate telephones and thus two separate voice mail systems to check for messages. A caller is also inconvenienced by having to call both the user's wireline telephone number and the user's cellular telephone to reach the user.

Wireline telephone network systems (including ISDN and centrex capabilities) and cellular telephone systems each have various feature/functions available to the user. Therefore, a need exists to provide a wireless centrex system (WCS) having features and functions presently available in existing wireline service and cellular services, as well as offering new feature/functions, while offering low cost telephone service for the working environment.

Our prior applications have disclosed a wireless centrex architecture including a Network Server Platform (NSP) and a Voice Access Port (VAP). Voice messaging and announcement services are provided from the NSP or the VAP. The Network Server Platform may serve as many as tens of thousands of subscribers while the VAP reaches in the hundreds and is physically closer to the user.

SUMMARY OF THE INVENTION

Accordingly, there is an opportunity to personalize messages and announcements, for example, provided to calling parties trying to reach wireless called parties served by a particular VAP. In our previous application, we discussed instances in which it may be preferable to terminate a calling party's efforts to reach a called party without any announcement at all. The instant invention addresses this need for providing announcements and messages and discloses a flexible voice access port, communicating with a network server platform, for providing personal announcements and messages. Thus there is provided an untethered communication systems created by the paradigm shift towards a more flexible and decentralized working environment. The material described in the instant invention discloses a wireless communication platform and access port to a subscriber that provide a solution to the challenge of mobility management by merging and expanding the capabilities of wired and wireless networks. Messaging and announcements are distributed and personal to the user at the user's choice or selection.

WCS with Wireless Voice and Data

Yet another feature of the present invention includes wireless data capability with the WCS. In this case, laptop computers equipped with a transceiver interface with Data Access Ports (DAP) connected to an Integrated Wireless Communication Controller to provide a wireless data system integrated with the WCS Voice Access Ports (VAP) and a LAN. It is a principle of the present invention that messages or announcements may be personalized and implemented in a data environment as well as a voice environment from a VAP.

BRIEF DESCRIPTION OF THE DRAWINGS

For a more complete understanding of the present invention, reference is now made to the following descriptions taken in conjunction with the accompanying drawings in which like designations represent like parts, and in which:

FIG. 3 illustrates an exemplary signal flow diagram which demonstrates the registration process which occurs when the mobile station is powered on.

FIG. 47A illustrates steps during call establishment/activation; FIG. 47B illustrates steps for one embodiment implementing the NSP procedure. FIG. 47C illustrates steps for one embodiment implementing the VAP procedure.

DETAILED DESCRIPTION OF PREFERRED EMBODIMENTS

I. Acronyms and Short Hand Notations

Figure 1A:
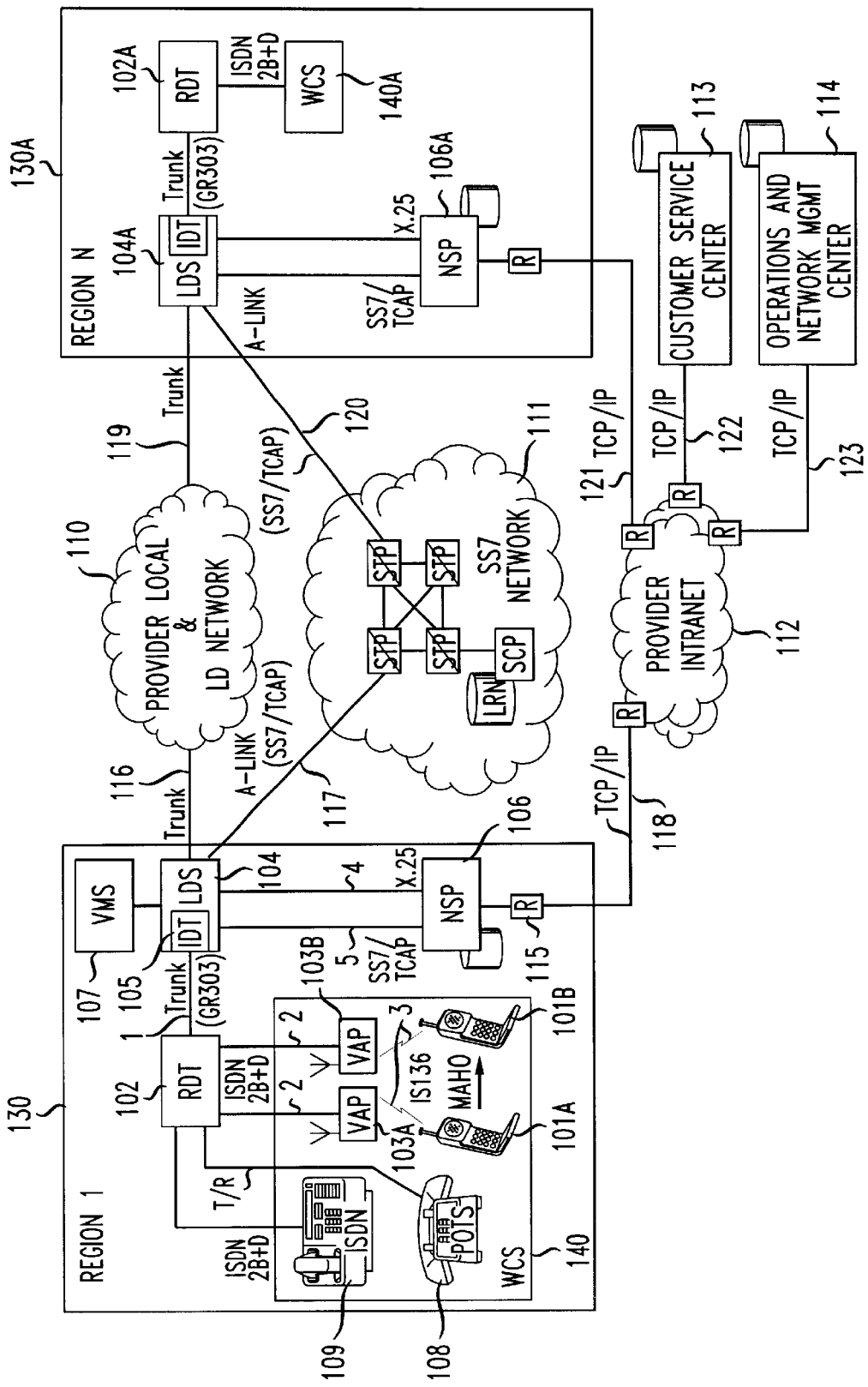
FIGS. 1A–C illustrates an exemplary wireless centrex system platform architecture.

Throughout the disclosure of the instant invention, several acronyms and short hand notations are used to aid in the understanding of certain concepts pertaining to the associated system and services. These acronyms and shorthand notations are intended solely for the purpose of providing an easy methodology of communicating the ideas expressed herein, and are in no way meant to limit the scope of the present invention. The following is a list of these acronyms:

| | |
|---|---|
| AIN | Advanced Intelligent Network |
| ALS | AT&T Local Services |
| B-Channel | Bearer Channel |
| ATM | Asynchronous Transfer Mode |
| BER | Bit Error Rate |
| BRI | Basic Rate Interface |
| BS | Base Station |
| CB | Communication Bus |
| CSC | Customer Service Center |
| CLASS | Custom Local Area Signaling Services |
| DCCH | Digital Control Channel |
| DAP | Data Access Port |
| D-Channel | Data Channel |
| DN | Directory Number |
| DPU | Directed Call Pickup with Barge-in |
| DS1 | Digital Service Level 1 |
| DS3 | Digital Service Level 3 |
| DSP | Digital Signal Processor |
| DTC | Digital Traffic Channel |
| DTMF | Dual Tone Multi-Frequency |
| DVCC | Digital Verification Color Code |
| EIA | Electronic Industries Alliance |
| FAC | Feature Activation Code |
| FACCH | Fast Associated Control Channel |
| FDC | Feature Deactivation Code |
| FDN | Forward Directory Number |
| GR 303 | Generic Requirement 303 |
| IDT | Integrated Digital Terminal/Switch |
| IP | Internet Protocol or Intelligent Peripheral |
| IS-136 | Interim Standard 136 |
| ISDN | Integrated Services Digital Network |
| ISP | Internet Service Provider |
| ISUP | ISDN User Part |
| ISUP IAM | ISDN User Part Initial Address Message |
| ISUP ACM | ISDN User Part Address Complete Message |
| ISUP ANM | ISDN User Part Answer Message |
| IWC | Intelligent Wireless Controller |
| LAN | Local Access Network |
| LDS | Local Digital Switch |

-continued

| | |
|---|---|
| MAHO | Mobile Assisted Handoff |
| MIN | Mobile Identification Number |
| MS | Mobile Station |
| MSID | Mobile Station Identification |
| MSC | Mobile Switching Center |
| NEL | Next Event List |
| NSP | Network Server Platform |
| OAM&P | Operations, Administration, Maintenance, and Provisioning |
| OC3 | Optical Carrier Level 3 |
| OC12 | Optical Carrier Level 12 |
| PAD | Packet Assembler/Disassembler |
| PBX | Private Branch Exchange |
| PCH | Paging Channel |
| PCS | Personal Communications Service |
| POTS | Plain Old Telephone Service |
| PRI | Primary Rate Interface |
| PSID | Private System Identification |
| PSTN | Public Switched Telephone Network |
| Q.931 | Signaling Protocol Message Structure |
| RDATA | Relay data (Subfield of IS-136 message) |
| RDT | Remote Digital Terminal |
| RSSI | Received Signal Strength Indicator |
| SC | Self Configuration |
| SCP | Service Control Point |
| SM | Short Message |
| SMDPP | Short Message Delivery Point = To Point |
| SMS | Short Message Service |
| SMS | Service Management System |
| SMSCH | Short Message Service Channel |
| SNMP | Signaling Network Management Protocol |
| SONET | Synchronous Optical Network |
| SPACH | SMS Point-to-point Messaging, Paging, and Access Channel |
| SS7 | Signaling System 7 |
| SSP | Service Switching Point |
| STP | Signal Transfer Point |
| STP | Shielded Twisted Pair |
| TAT | Termination Attempt Trigger |
| TCP/IP | Transmission Control Protocol/Internet Protocol |
| TCAP | Transactional Capabilities Application Part |
| TDMA | Time Division Multiple Access |
| TIA | Telecommunications Industry Association |
| UPCH | User Proactive Call Handling |
| VAP | Voice Access Port |
| VMS | Voice Message System |
| VPU | Voice Processing Unit |
| WCS | Wireless Centrex System |
| WCSD | Wireless Centrex System Database |
| X.25 | Cross.25 (Data Packets) |

Further, various telecom technical terms are used throughout this disclosure. A definition of such terms can be found in; H. Newton, Newton's Telecom Dictionary, 16$^{th}$ Expanded Edition (2000). These definitions are intended for providing a clearer understanding of the ideas disclosed herein and are in no way intended to limit the scope of the present invention and thus should be interpreted broadly and liberally to the extent allowed by the art and the ordinary meaning of the words.

II. General Overview of Wireless Centrex System Services

An illustrative methodology for implementing an intelligent wireless communications system according to the present invention will now be described below. While the systems and methods described below relate to a traditional cellular phone system or a wireless centrex system, it is to be understood that the present invention can be applied to all types of wireless communications systems including, but not limited to, satellite systems, micro cellular systems, personal communications services, and other mobile communication systems. Also, other types of personal communications devices can be implemented in these systems including, but not restricted to, a portable television, a wireless videophone, and a pager. Also, it is to be understood that the present invention can be applied to any type of wireless network, and that the description below is an illustrative embodiment for a system employing the IS-136 EIA/TIA Interim Standard.

Figure 1B:
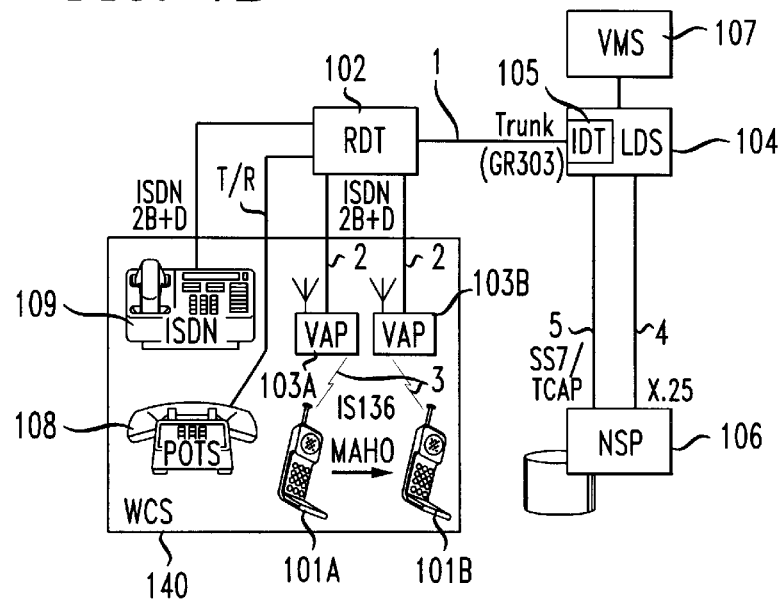
Figure 1C:
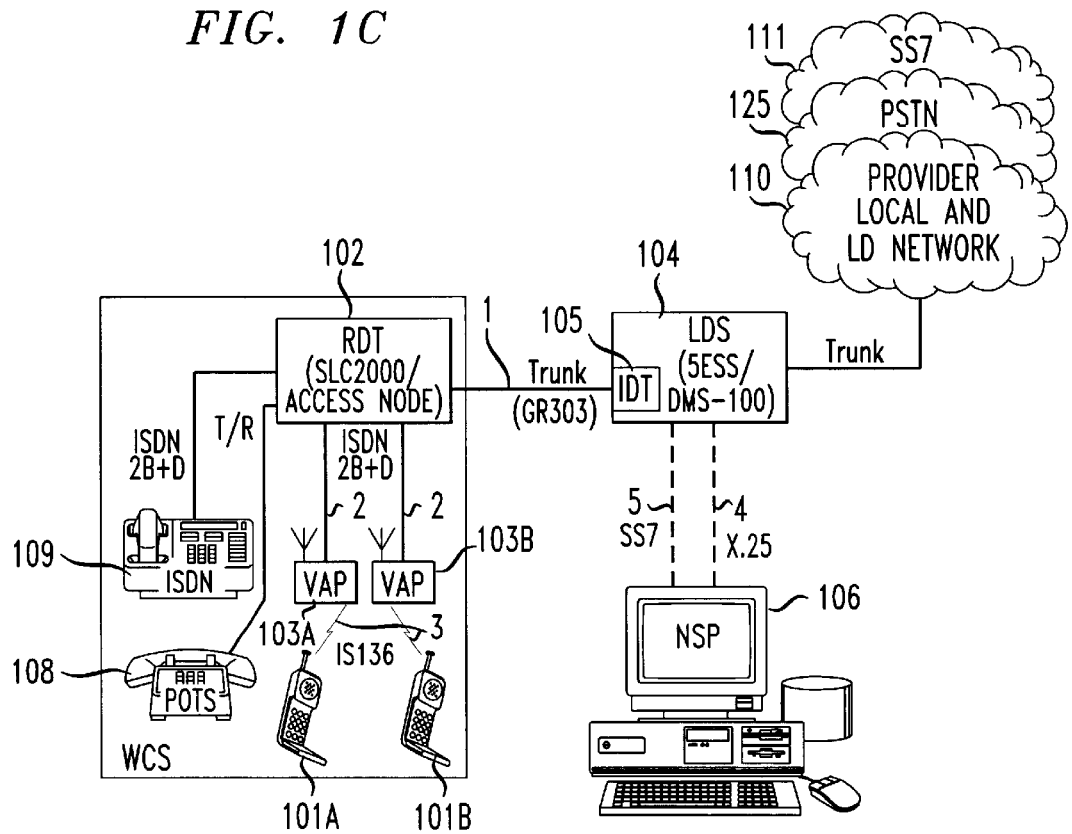

In one exemplary embodiment, the wireless centrex system is deployed in an in-building environment with various communication interfaces strategically located throughout the building to provide service within the building. In such an in-building environment, the mobile station (MS) assumes the characteristics of a desktop phone with all the Centrex capabilities being available to the mobile user, plus the added advantage of mobility. A network of picocells served by Voice Access Ports (VAPs) 103 are located within the building and provides the cellular IS-136 air interface. The VAPs are intelligent base stations having ISDN BRI connectivity to a local digital switch (e.g., Lucent 5ESS, Nortel DMS-100). FIGS. 1A, 1B, and 1C each show an exemplary VAP 103A connected to a Remote Digital Terminal (RDT) 102 via an ISDN BRI interface 2. A typical VAP is more particularly shown in FIG. 2B. Hereinafter, references to FIGS. 1A through 1C will be referred to as FIG. 1, and have a common numbering scheme illustrating the various exemplary elements.

In fact, the same numbering will be used throughout the figures for like elements. The Network Server Platform (NSP) 106 is an adjunct and can be co-located with a switch (LDS 104) to manage the VAPs 103 and call processing control of the MS and provide the cellular (IS-136) operations for the VAPs. In one embodiment, when a call arrives for a subscriber to their POTS desktop phone 108 and it is not answered, the LDS 104 working in conjunction with the NSP 106 and, for example, the VAP 103A will forward the call to the subscriber's mobile station 101A over the VAP's ISDN B-channel 2 and the IS-136 air interface 3. The WCS system, therefore, offers the capability of a WCS subscriber being reached anytime anywhere within the cell area of the WCS picocells. Further, if a WCS subscriber also subscribes to a macro cellular system, the call will be handed off to the macro cellular system local Base Station (BS) when the subscriber leaves the WCS picocell areas.

The ISDN BRI lines 2 connecting the VAPs 103A and 103B to the switch carry the signaling traffic on the D-channel (data channel) and the voice traffic on the B-channel (bearer channel). The D-channel utilizes the Q.931 protocol to establish a voice call on the B-channel with the LDS 104. The D-channel also carries signaling messages (X.25 packets) between the VAPs 103A and 103B and the NSP 106 and message requests (announcement requests) when announcements and messages are played from the VAP 103, according to the present invention. An X.25 packet connection is used to interconnect LDS 104 to NSP 106 and carry packets routed by the LDS 104 between the VAPs 103A and 103B and the NSP 106. The connection to the LDS 104 is not limited to a X.25 data packet connection, but may be any connection supported by the LDS 104, and having an interworking function with the X.25 protocol. These packets contain messages pertaining to call processing of the IS-136 interface as well as OA&M messages on the VAPs 103.

In one exemplary operation of the WCS, when a call arrives at the subscriber's desktop phone 109, if the user does not answer, the switch will use AIN triggers to request additional routing instructions from the NSP 106. The NSP 106 will locate the subscriber's MS 101 and direct the LDS 104 to forward the call to the VAP 103 servicing the subscriber's MS 101. The NSP 106 will also inform the VAP 103 of the incoming call via messaging on the D-channel and direct the VAP 103 to establish the IS-136 air link to the MS 101 in order to alert the user. When the user answers on their MS 101, the call is completed over the VAP's 103 ISDN B-channel and the IS-136 air interface.

Whenever a subscriber originates a call, the NSP will work in conjunction with the LDS 104 and the VAP to establish the RF link and the ISDN B-channel connectivity to the switch. The switch will then route the call to the proper destination. When a subscriber moves from picocell (e.g., VAP 103A service area) to picocell (e.g., VAP 103B service area), the NSP 106 will inter-work with the switch and the VAPs and use the ISDN Directed Call Pickup with Barge-In to enable the seamless handoff. For example, when the MS 101A is on an active call served by VAP 103A, and is moving into the region served by VAP 103B, the NSP 106 will direct VAP 103B to barge-in on the call on VAP 103A. This temporarily establishes a 3-way call and the NSP 106 will then direct VAP 103A to disconnect from the call, thereby leaving the active call to be served by VAP 103B and completing the handoff. This is advantageous since the procedure ensures that there is no noticeable interruption of the call on the network side.

An exemplary network platform architecture of a wireless centrex system (WCS) is illustrated in FIG. 1. The wireless centrex system disclosed therein, functions as a private wireless system which is not interconnected to a public macro cellular system. However, the WCS system could also be interconnected to a public macro cellular system. The wireless access platform provides a cordless-like, anywhere, anytime communications for indoor, business or campus-type environments. System elements of the WCS platform architecture are the Local Digital Switch (LDS) 104, the Remote Digital Terminal (RDT) 102, the Network Server Platform (NSP) 106, and a wireless interface including one or more of a plurality of Voice Access Ports (VAP) 103A and 103B and one or more of a plurality of IS-136 Digital TDMA Cellular/PCS Mobile Stations 101A and 101B. Although FIG. 1 illustrates the VAPs 103A and 103B being connected to the RDT 102, the VAPs 103A and 103B may also be connected via ISDN BRI lines directly to the LDS 104, bypassing the RDT 102.

The WCS system of this embodiment may have, for example, the following design attributes. There is one NSP 106 per LDS 104, although there could be more than one LDS 104 per NSP 106. The NSPs, (e.g., NSP 106 and NSP 106A), are interconnected for inter-signaling using TCP/IP across an intranet, e.g., AT&T intranet 112. An NSP 106 may serve thousands of wireless users. Centrex services and features are provided via the LDSs, (e.g., LDS 104 and LDS 104A) and an SS7 network 111. A single RDT 102 can provide interconnection of VAPs 103 for the WCS in a single large WCS office or multiple smaller offices as long as an ISDN BRI connection can be made to the VAPs 103. Further, the WCS system of this embodiment provides smooth handoffs between VAPs 103 using the ISDN Direct Call Pickup with Barge-In (DPU) function. A VAP 103 may serve hundreds of wireless users. Finally, the WCS system can provide a secure wireless network by only recognizing pre-approved subscribers MS 101 for registration within the picocell area covered by each of its VAPs 103; all other cellular phones within the picocell are prohibited from reception/transmission with the VAP's 103.

The LDS 104 is a TR-08 and/or a GR-303 compatible LDS 104 which employs distributed intelligence, process-oriented software, and coordinated autonomous computing elements to provide a flexible, modular, reliable and robust digital switching system. LDS 104 has generic ISDN switching functions with embedded AIN capabilities and provides network synchronization. The Lucent 5ESS and the Nothern Telecom DMS-100 are exemplary Local Digital Switch (LDSs). The LDS 104 provides a single platform for advanced services including ISDN, Centrex, CLASS, Custom Calling, Advanced Intelligent Network (AIN), and basic bearer Channel (B Channel) call feature applications capabilities. It supports both X.25 packet switched data communication and circuit switched data using, for example, an X.25 Packet Assembler Disassembler (PAD) for signaling between NSP 106 and subtending VAPs (e.g., VAP 103A and VAP 103B). The LDS 104 provides the switching fabric, administration, message switching, and call switching functions. The AIN capabilities on the LDS 104 provides AIN software that enables the network provider to create, deploy, and change services to meet customers' requests. The AIN software allows the LDS 104 to act as an AIN Service Switching Point (SSP) to communicate with Service Control Points (SCP) (i.e. NSP 106 in the WCS configuration), and Intelligent Peripherals. This gives the NSP 106 the flexibility to manage call processing on the LDS 104. The events which activate the AIN triggers must be provisioned so that they occur at specified points in a call where call processing may be interrupted, in order to interact with the NSP 106. Additionally, the LDS 104 provides a gateway to a PSTN 125.

The Remote Digital Terminal (RDT 102) is a digital loop carrier terminal which supports POTS, ISDN, high-speed transport, and all special services—including private lines and PBX trunks. RDT 102 provides voice, data, and signaling transport and multiplexing of business premise telephony equipment such as the ISDN phone 109, POTS phone 108, and VAPs 103A and 103B. The Lucent SLC-2000 (pronounced "Slick" 2000) and the Nortel Access Node are exemplary RDTs. The RDT 102 interfaces digitally with the central office (CO), using, for example a TR-08 or GR-303 trunk configuration, connected with the LDS 104 such as a Lucent 5ESS or a Nortel DMS-1000. The RDT 102 provides the distribution of service interfaces between the LDS 104 and the customer premises, thereby extending the digital access network.

The exemplary NSP 106 provides control functionality for VAP 103A and 103B, which includes mobile station and mobility management, call control such as handoff, wired and wireless interworking such as DN and MIN mapping, signaling processing interface and management, AIN for call processing, service creation and management and feature applications, along with related OAM&P functions. The NSP 106 is also responsible for Network Intelligence and resource management including RF management (e.g., SC), validation or authentication, registration, and Message Center operation and control. An illustrative NSP is described in U.S. patent application Ser. No. 09/100,360, filed Dec. 31, 1997, entitled "Hybrid Fiber Twisted Pair Local Loop Network Service Architecture" by Gerszberg et al., which is herein incorporated by reference. While the NSP described by Gerszberg et al. is not for a wireless centrex system, it can be modified to work in the WCS of the present invention. In the WCS environment, the NSP 106 may include NSP specific software operating on a high performance, general purpose computer, for example, a SUN SPARC Enterprise server E3500.

Figure 2A:
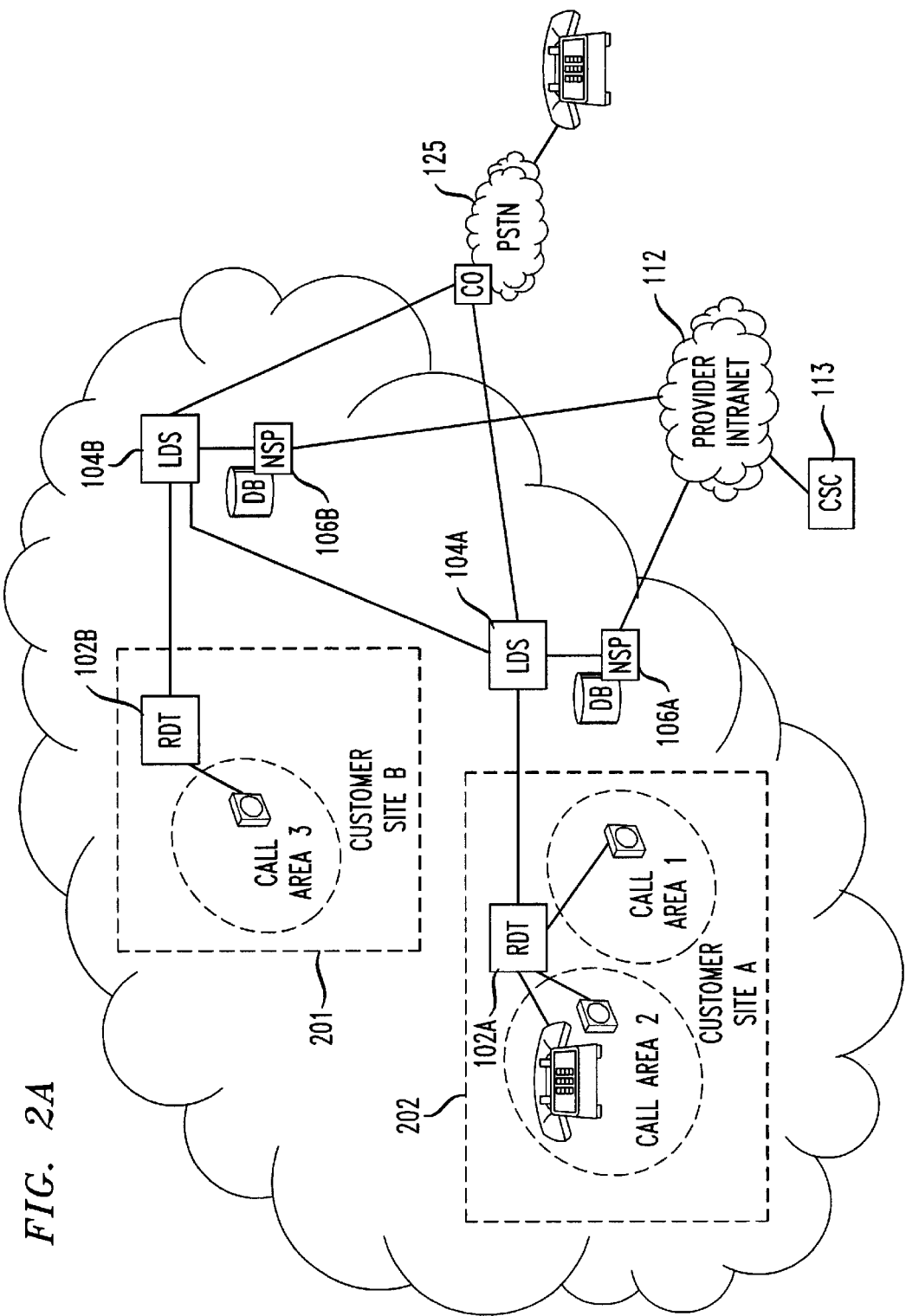
FIG. 2A illustrates an exemplary wireless centrex network architecture.
Figure 2B:
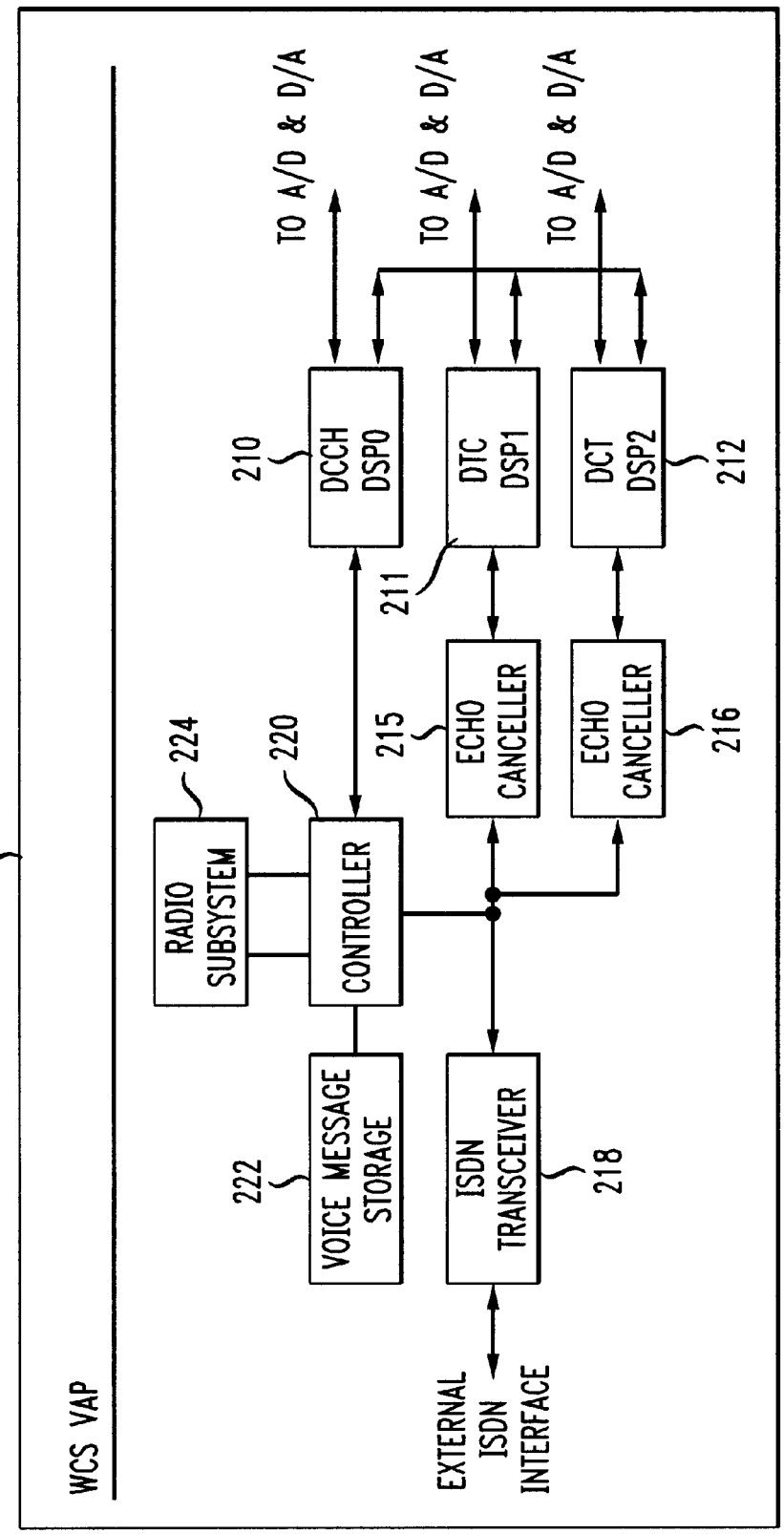
FIG. 2B provides a block schematic diagram of a voice access port 103 of FIGS. 1A–1C.

The exemplary Voice Access Ports (VAPs) 103A and 103B, more particularly shown in FIG. 2B, are pico-cellular intelligent base stations or radio transceiver ports that support, for example, the IS-136 air interface with IS-136 mobile stations such as digital TDMA cellular/PCS communications units 101*a*, 101*b*. IS-136 is the EIA/TIA Interim Standard that addresses digital cellular and PCS (personal communications services) systems employing time division multiple access (TDMA). IS-136 specifies a DCCH (Digital Control Channel) to support new features controlled by a signaling and control channel between a cell site (e.g., radio base station) and terminal equipment (e.g., mobile station). The IS-136 air interface between the VAPs 103*a*, 103*b* and mobile stations MS 101*a*, MS 101*b* can support voice and messaging applications. The mobile stations MS 101*a*, MS 101*b*, etc., may be, but are not limited to, a terminal or a typical cellular/mobile phone having a keypad, display screen, and an alarm generator for generating a ringing or tone sound.

The VAPs support plug-and-play operations by connecting to RDT 102 via standard open interfaces, such as ISDN BRI. In one embodiment, the VAPs 103A and 103B use advanced digital software radio technology for superior RF performance. Additionally, VAPs 103A and 103B may employ self configuration algorithms for "stacked spectrum" operations. U.S. Pat. Nos. 5,809,423, 5,787,352, 5,740,536, 5,404,574, and 5,345,499 describe exemplary algorithms and related methodologies that may be utilized in self configuration for "stacked spectrum" applications. The VAPs 103 also administer resource management and, per the present invention, provide personalized and distributed messaging and announcement services.

The mobile stations (MS) 101A and 101B provide the WCS subscriber with cordless-like services feature/function, thereby permitting user mobility within the WCS service coverage area. The IS-136 digital TDMA cellular/PCS mobile stations 101A and 101B, may include, for example the Nokia 2160 and the Ericsson DH368 TDMA digital telephones. One significant advantage of the instant invention is that a base station may be interconnected to a switch via an open standard interface, such as ISDN BRI, so that traditional wireline services, such as centrex type services features/functions like call hold, call forward, call waiting, call transfer, speed calling, caller ID, three party (conference) calling, etc., may be offered to MS 101.

In one exemplary embodiment of the WCS, there are five major interfaces as illustrated in FIG. 1. With reference to FIG. 1, interface 1, connects the LDS 104 to the RDT 102 using, for example, the Bellcore standard GR303 interface. The GR303 standard defines digital transmission facility interfaces such as DS1 and SONET, concentration options between the integrated digital terminal/switch (IDT) 105 and the RDT 102, signaling options, and call processing and operations data links. The transport media for this interface can be, for example, metallic or fiber-optic. Exemplary metallic media include T1, ISDN/PRI and DS3, while exemplary fiber-optic media include SONET OC3 and OC12links. Interface 1 carries the voice traffic of a telephone call, as well as the signaling traffic for the LDS 104 and the NSP 106.

Interface 2, connects the VAPs 103A and 103B to the RDT 102 with, for example, ISDN/BRI lines (2B+D channels), using the Q.931 signaling protocol on the D-channel to setup the voice connection on the B-channel. In this case, the RDT acts only as a transport for the signaling and data message to the LDS 104. WCS call processing messages for call setup, call teardown, feature applications on the RF (IS-136), message and announcement request messages and OAM&P messages are carried over X.25 packet, interface 4, on the D-channel between the NSP 106 and the VAPs 103A and 103B, via the LDS 104 and the RDT 102. Return messages are sent by the VAPs to the LDS 104, which routes them to the NSP 106. Voice connections between the VAPs 103A and 103B and the LDS 104 are carried on the B-channel via the RDT 102. Additionally, software downloads from the NSP 106 are also carried on the D-channel or B-channel to the VAPs 103A and 103B via the LDS 104 and the RDT 102. In one exemplary embodiment, the RDT 102 acts as a concentrator and its operation is transparent to the operation of the WCS.

Interface 3, may be, for example, an IS-136 air interface between the VAPs 103A and 103B and the MSs 101A and 101B supporting voice and messaging applications. Interface 4 is, for example, an X.25 protocol link between the NSP 106 and the LDS 104. Call control, message request and OAM&P messages between the NSP 106 and the VAPs 103A and 103*b* are carried on the D-channel of interface 2 through interface 1, through the LDS 104, and over this X.25 link.

Interface 5 may be, for example, an SS7 link connecting the NSP 106 and the LDS 104. This exemplary interface carries AIN messages which are generated by the LDS 104, sent to the NSP 106 for processing, and sent back to the LDS 104 to instruct the LDS 104 how to route the call properly. Interface 5 carries AIN messages from the LDS 104 which notify the NSP 106 of AIN trigger events. It also carries responses from the NSP 106 to the LDS 104 which instructs the LDS 104 how to properly route calls to the WCS subscribers.

When the IS-136 cellular/PCS mobile stations 101A and 101B are located within the WCS system coverage area, MIN-based calls to the public cellular network destined for mobile stations 101A and 101B may not be delivered in the WCS service area. Instead, the IS-136 phones can be associated with the DN of a stationary phone (e.g., POTS 108 or ISDN 109) within the WCS services area so that the LDS 104 delivers the call to either the subscriber's MS 101 or the subscriber's stationary phone using the DN. On the other hand, when the subscriber's mobile station MS 101 is located outside the WCS service area, calls are delivered to the mobile stations through the MIN provided in the public cellular system.

After a simple registration process, the WCS subscribers use their IS-136 digital TDMA cellular/PCS phone 101A or 101B as a cordless-like telephone within the wireless centrex service area without incurring air-time charges. Typically, when an incoming call destined for a WCS subscriber's DN reaches the LDS 104, and the DN was previously provisioned for AIN treatment, an AIN trigger occurs in the LDS and an AIN query message is sent to the NSP 106. In one embodiment, each WCS subscriber has a reachable desktop DN and each DN will be programmed for the AIN trigger in the LDS 104 for call routing purposes. The NSP 106 provides appropriate routing instructions to the LDS 104 for delivery of the incoming call. The NSP 106 can locate and alert the subscriber's mobile station and direct the LDS 104 to route the incoming call to the mobile station (MS 101). If the subscriber does not answer, the NSP 106 may direct the LDS 104 to route the incoming call to a Voice Message System (VMS) 107, which ultimately answers the call. An exemplary VMS is the Lucent Conversant Model MAP/100C (MultiAccess Platform). Calls initiated from a stationary phone such as POTS 108 or ISDN 109, or mobile station 101 within the WCS service area are sent to the LDS 104 that can handle the call or route the call to the PSTN 125.

The WCS is a self-configurable indoor wireless system that applies the "stacked spectrum" concept. It can detect (sniff) and designate unused and interference-free DTC/DCCH (Digital Traffic Channel/Digital Control Channel) from the overlayed (e.g., macro or micro) cellular system, for its own use, based on the unique WCS private systems number (PSID). The DTC is defined in IS-136 as the portion of the air interface which carries the actual data transmitted (e.g., the voice channel). It operates over frequencies separate from the DCCH, which are used for signaling and control purposes. Since the WCS coexists with public macro or micro cellular networks, it monitors the RF channel activities, detect unused and interference-free channels, and makes channel selections and adjustments in real time for interference-free operation.

Another exemplary network architecture of the WCS is illustrated in FIG. 2A. The WCS system may be installed at the satellite site (e.g., Customer Site B) 201 as well as the main site (e.g., Customer Site A) 202. When a subscriber is provisioned for service, the Customer Service Center (CSC) 113 downloads the subscriber's profile to all NSPs 106 (e.g., 106A and 106B). The subscriber is allowed to roam between the customer sites 201 and 202. In one exemplary embodiment, the NSPs 106A and 106B are interconnected through the provider Intranet 112, for example, AT&T Intranet. However, the NSP's 106A and 106B may be interconnected through any secure virtual network from any provider.

Figure 5:
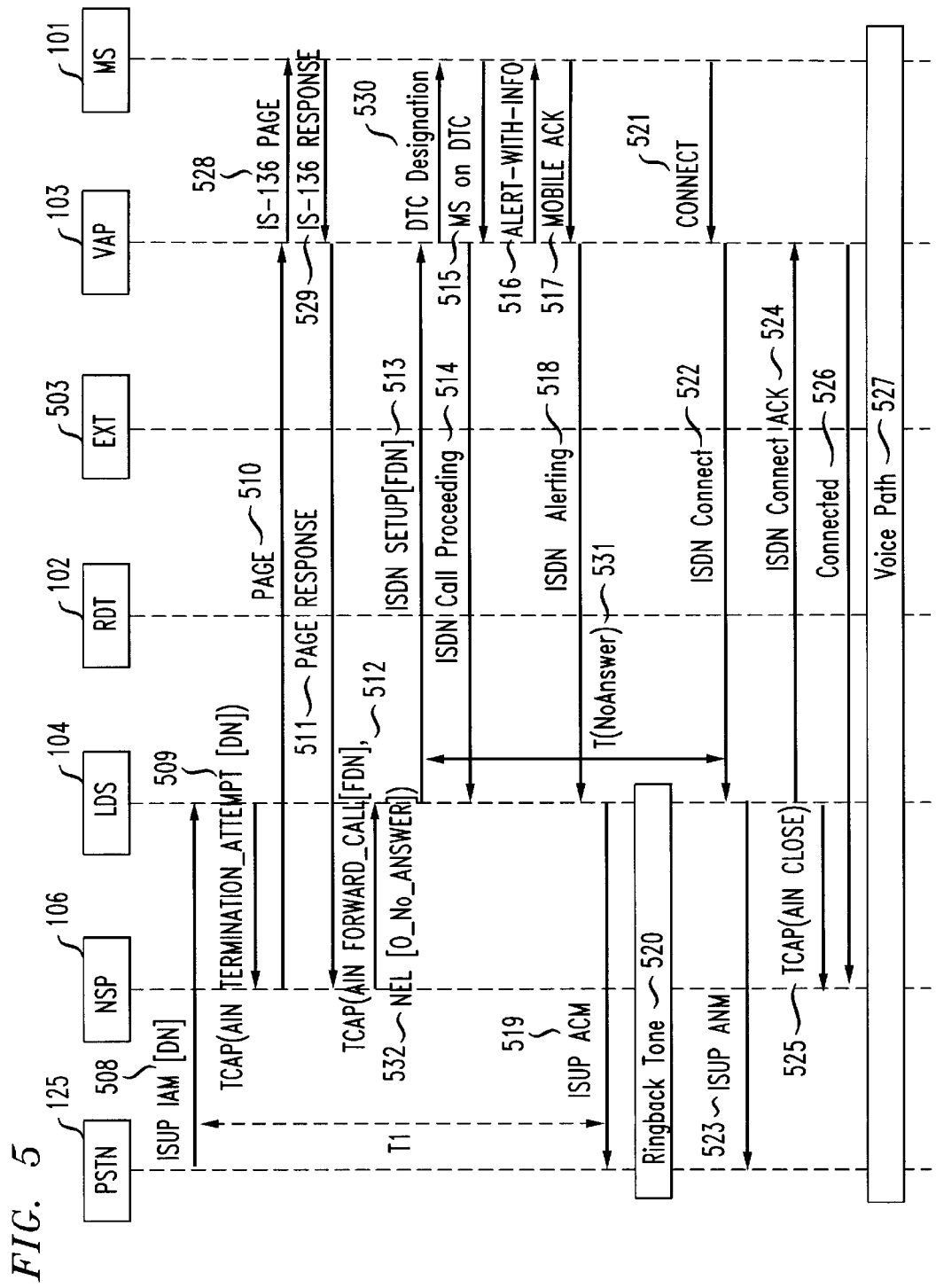
FIG. 5 illustrates an exemplary signal flow diagram which demonstrates termination of a call by a mobile station that answers the call.
Figure 6:
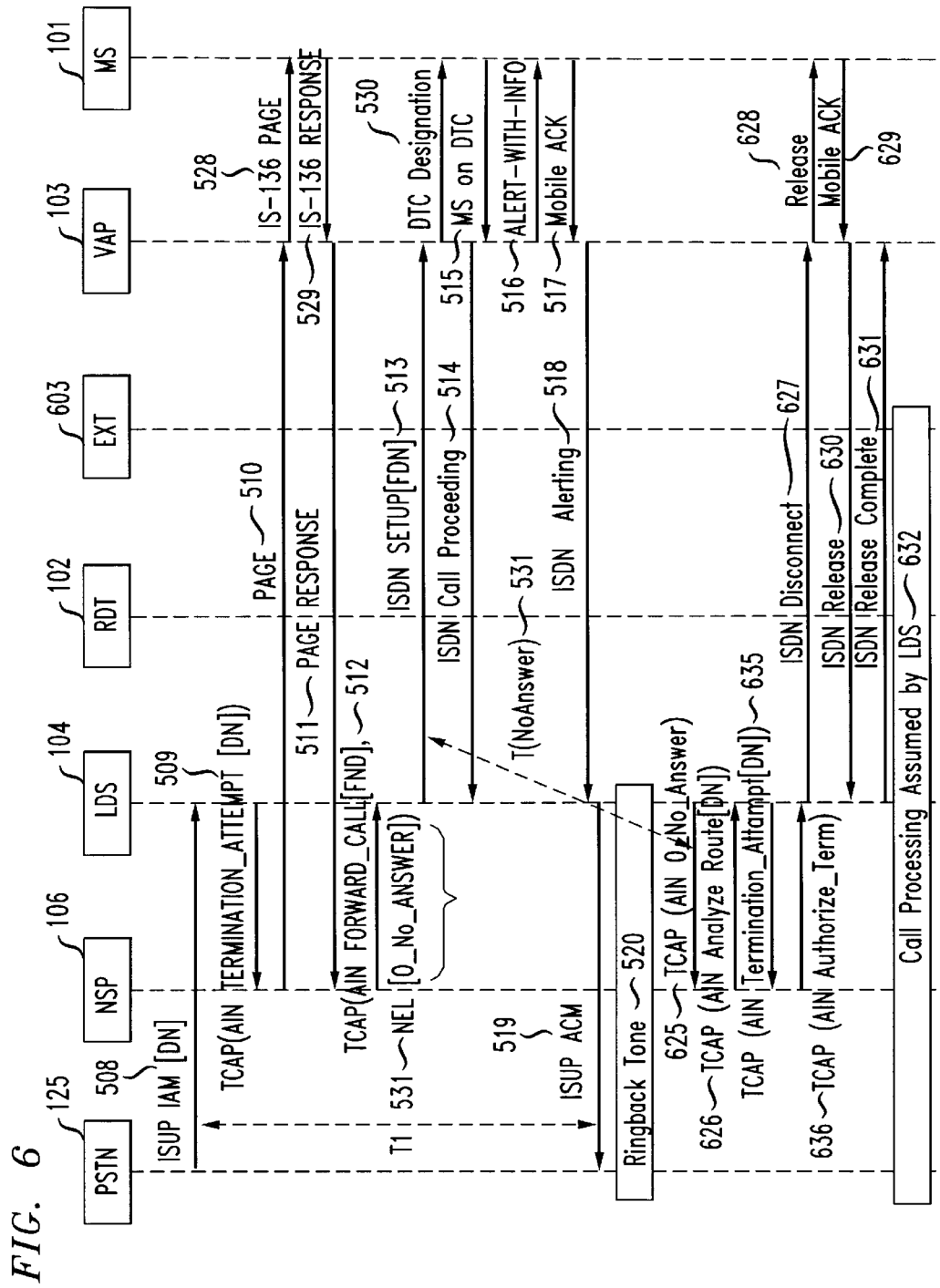
FIG. 6 illustrates an exemplary signal flow diagram which demonstrates termination of a call by a mobile station that went unanswered.
Figure 7:
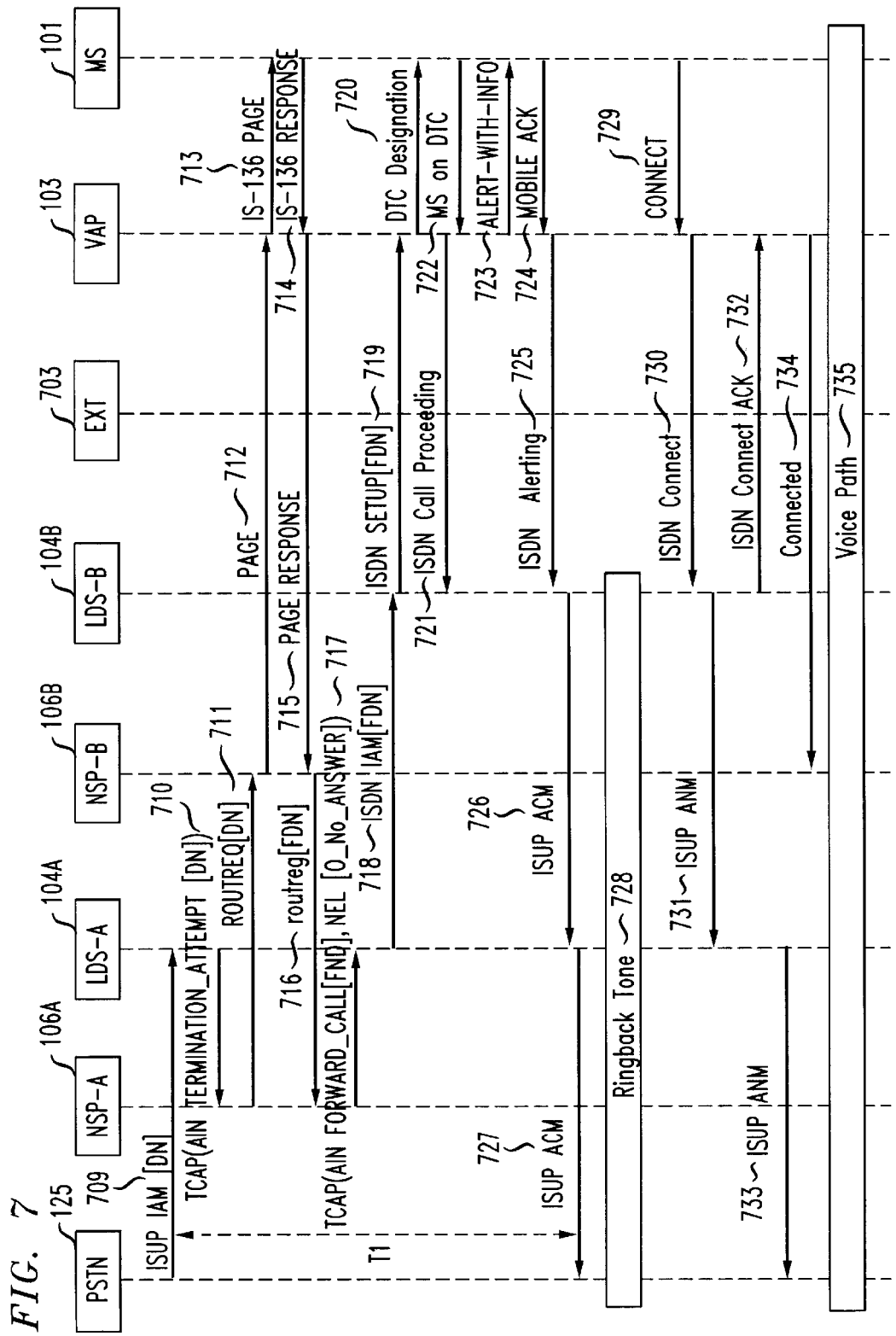
FIG. 7 illustrates an exemplary signal flow diagram which demonstrates call termination to a roaming subscriber.

In the WCS, a call is delivered by the Local Digital Switch 104A or 104B using the DN. Unlike normal wireline phone services, however, the location of the WCS subscriber changes continuously with movement of the MS 101 within the service area. Therefore, a special intelligent delivery mechanism using Advanced Intelligent Network (AIN) has been developed for the WCS call delivery. In the AIN architecture, the Service Switching Point (SSP), here the LDS 104A and 104B has the capability of determining which calls require AIN services based on the dialed DN. The process of identifying calls that require AIN processing is known as "triggering," since a particular characteristic of the call "triggers" the switch into providing AIN call treatment. So, when the DNs of ISDN telephone 109 or POTS telephone 108 are provisioned as WCS DNs, an incoming call to these DNs will prompt an AIN trigger. Once an event causing a trigger occurs, a query message is sent to the Service Control Point (SCP) as illustrated in FIGS. 5, 6 and 7. The SCP is, for example, NSP 106. Based on the information contained in the query message, the SCP (NSP 106A or 106B) determines which service is being requested and provides appropriate information to the LDSs 104A or 104B. In the exemplary WCS architecture, all the routing information is stored in the NSPs 106A and 106B. Therefore, the LDSs 104A and 104B in the WCS sends the query message to the NSPs 106A and 106B, and the NSPs 106A and 106B directs the LDS 104A and 104B to deliver the call to its appropriate destination.

FIG. 2B show a functional schematic block diagram of a typical VAP 103. VAP 103 comprises a plurality of digital signal processors (DSP's). By way of example, DSP0 210 may be a digital signal processor for serving a DCCH of the TDMA base station, while DSP1 211 and DSP2 212 comprise digital signal processors for serving DTCs of the TDMA base station. Echo cancellers 215 and 216 are provided on traffic (voice) channel links toward ISDN transceiver 218 coupled to an external ISDN interface. Controller 220 controls the overall VAP operation and handles data and interfaces with message/announcement storage 222 and radio subsystem 224.

In operation, informational voice messages, prompts and announcements and the like are recorded and digitized in a format such as linear PCM by using an A/D converter. Examples of informational voice messages (which may be recorded in the voice of the user) include, for example, personal greeting messages, screening messages, call disposition messages, time-of-day messages and combinations thereof, for example, using time-of-day to determine a message selected for play. The voice message files are preferably stored in Linear PCM in VAP memory 222 for convenience of playing but may be stored in ACELP or VSELP coding in alternative embodiments.

When the NSP 106 determined that there is a need to playback or play a given informational message to a calling or called party, the NSP 106 sends a message request over an ISDN-D channel to the VAP 103. The VAP receives in the command sent over the ISDN-D channel sufficient information to identify the given message in memory. In a preferred embodiment, the VAP may recover personal information to supplement the given message with personal information, for example, so that the system may address a calling party and identify a called party personally by their name—"It is now 4:30 PM. Mr. Kim is presently unavailable to take your call, please leave your message at the sound of the tone or try again to reach Mr. Kim later." The time-of-day, as described above may be used within the message, to select a message or to assist in gathering personal information about Mr. Kim for supplementing the message—for example, Mr. Kim may have already identified that at 4:30 PM, he is typically still at work and not at home.

Examples of messages may be called party not available, ring, no answer after five rings or called party not available, busy. In these situations, there may be different ways of personalizing the message—for example, in the busy situation, emphasis may be placed on trying again later rather than taking a message.

The message format must provide additional information capacity for class of message (at least four types or two bits) and the identity of the called party (to identify the called party's wireless station and any personal information stored at the VAP for supplementing the voice message requested). If the VAP is equipped with a real time clock, a message may include a time-of-day indicator for the purposes indicated above.

On receipt of the message request from the NSP 106, the VAP 103 will play the requested informational message. In particular, since the message request will identify the message, the VAP controller may identify personal data about the called party to the subscriber to whom the message is to be sent and the appropriate location in memory for the voice message file is located, supplementing the message with personal information. Once the voice file is retrieved and assembled, the controller will use the appropriate decoding algorithm as necessary to convert the voice file to linear PCM format, if it has not already done so.

A detailed description of mobile station registration in the WCS follows.

III. Mobile Station Registration

Figure 3:
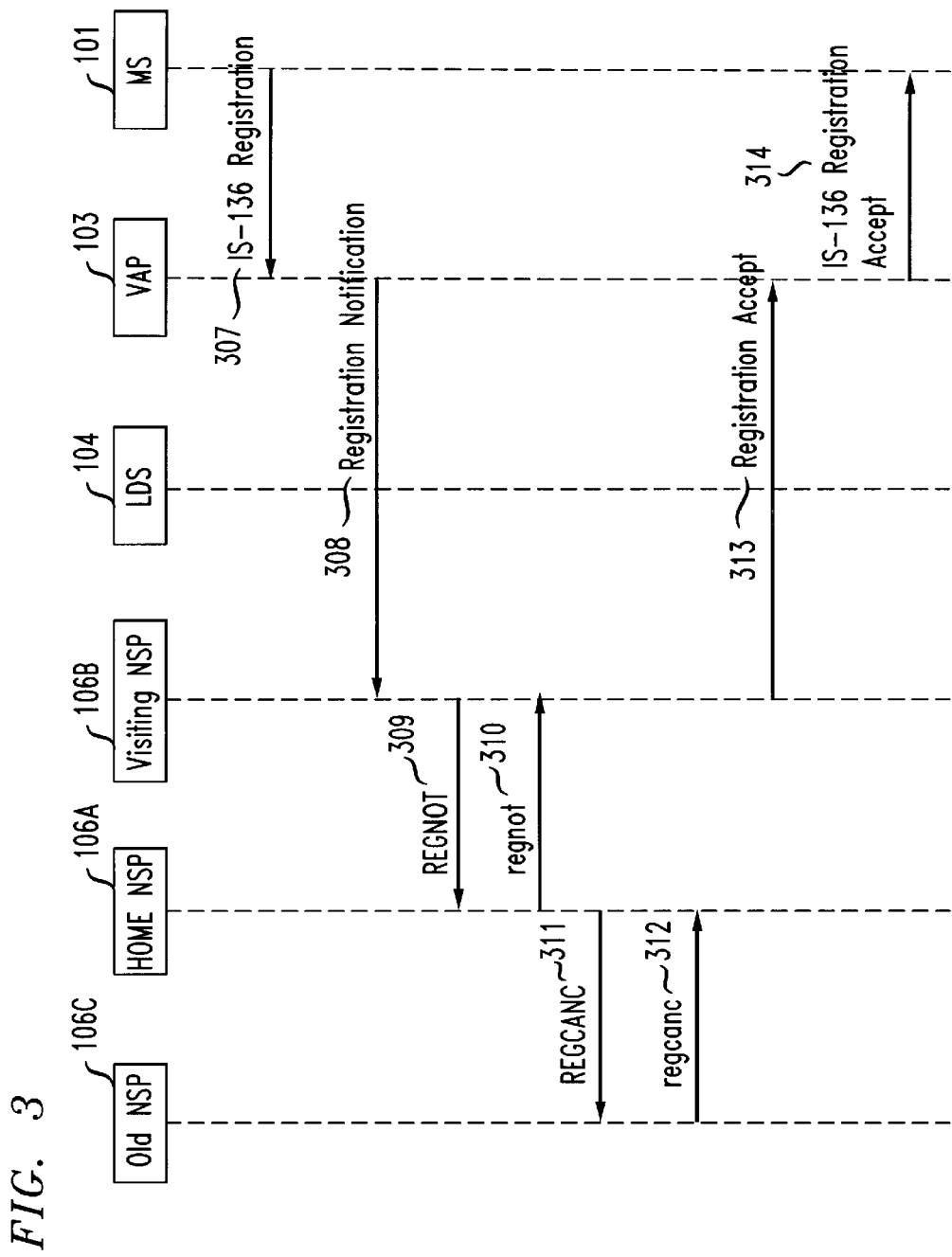

FIG. 3 shows an exemplary embodiment of a registration process used to register a MS 101 when the MS 101 enters a WCS service region (e.g., customer site B 201). Upon entering the WCS system service area, the MS 101 automatically registers with the NSP 106 serving that customer site. The NSPs 106A and 106B contain the subscriber profiles distributed by the Customer Service Center 113 (CSC). The NSP (204A or 204B) handling the call then validates the MS 101 by examining the subscriber profile for that MS 101. If the subscriber is roaming to another Customer Site, the Serving NSP 106B notifies the Home NSP 106A that the subscriber is registered in its (Serving NSP's 106B) service area.

In particular, when the MS 101 is powered on, an IS-136 Registration message 307 is sent to the VAP 103. The VAP 103 then forwards the registration notification message 308 to the serving NSP 106B. The serving NSP 106B validates the subscriber by looking up the subscriber information stored locally and previously downloaded from the customer service center (CSC) 113. If the NSP 106 was not the subscriber's Home NSP 106A, then a registration notice message REGNOT 309 would be sent to the Home NSP 106A for the MS 101 indicating that MS 101 was registered now in serving NSP 106B's area. The Home NSP 106A would then store the roaming information of the MS 101, and send regnot message 310 to the Serving NSP 106B for acknowledgment. However, with the assumption that the Home NSP 106A was indeed the actual Home NSP of the MS 101, then the Home NSP 106A sends a regnot message 310 to Serving NSP 106B. If the Home NSP 106A found that the MS 101 had been registered at another NSP, e.g., Old NSP 106C, and had left without proper de-registration, then the Home NSP 106A would send a registration cancellation message REGCANC, 311, to cancel the previous registration at the Old NSP 106C for confirmation. The Old NSP 106C would then remove the records for the MS 101 from its memory, and send a registration cancellation response message, regcanc, 312, back to the Home NSP 106A. However, assuming that Home NSP 106A had sent the regnot 310 message to Serving NSP 106B, then Serving NSP 106B would send a registration acceptance message, Registration Accept, 313, to VAP 103. The VAP 103 then informs MS 101 that the registration is completed, by sending IS-136 registration acceptance message, Registration Accept 314, to MS 101. This completes the registration process for MS 101. Registration in the MS 101 Home NSP 106A is simpler requiring only steps a and d illustrated in FIG. 3.

IV. Call Origination from a Mobile Station

Figure 4:
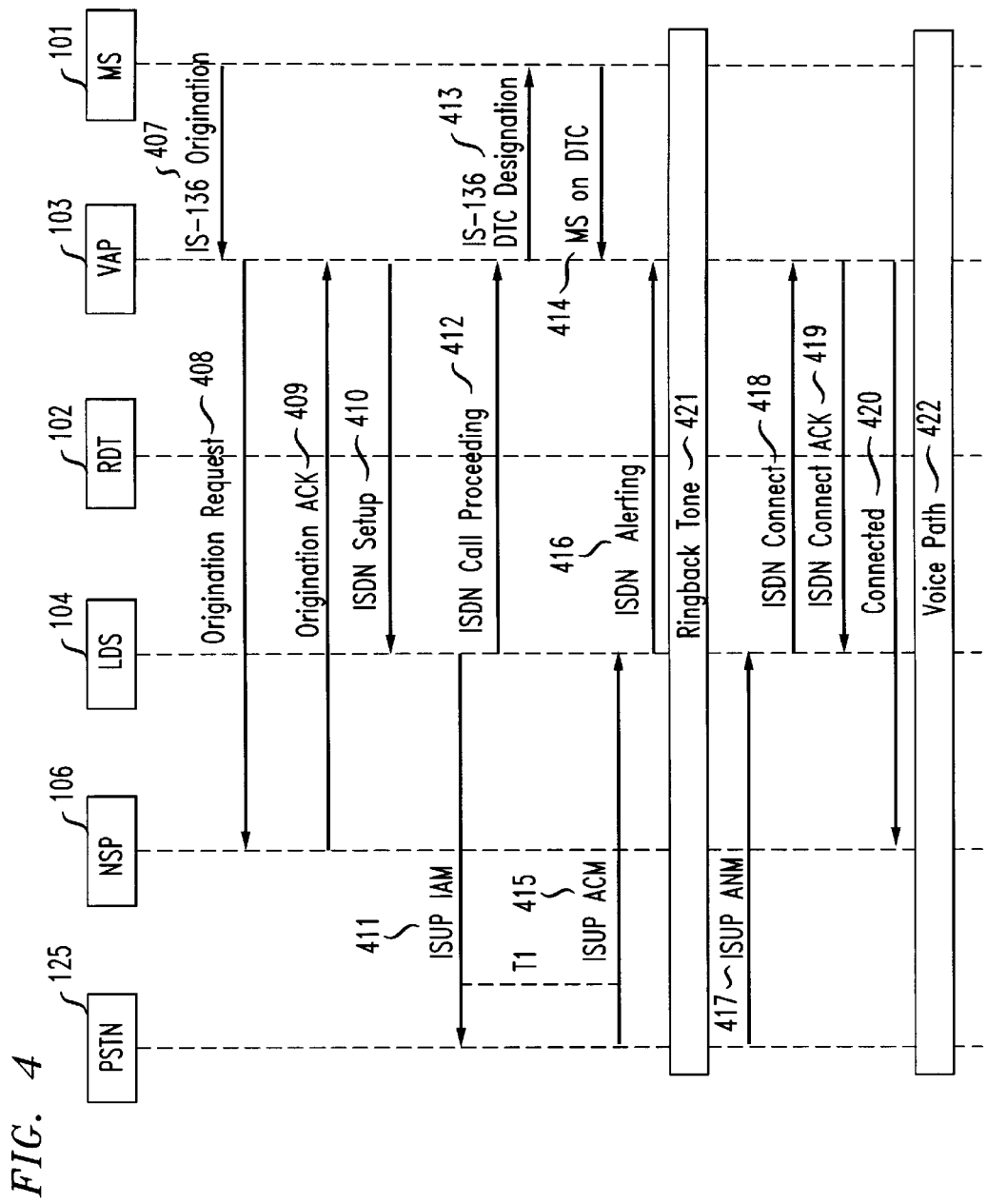
FIG. 4 illustrates an exemplary signal flow diagram which demonstrates call origination.

FIG. 4 shows an exemplary call origination from a MS 101 directed to a PSTN 125 DN. When the subscriber MS 101 places a call via an origination message, IS-136 Origination 407, the VAP 103 first checks the validity of the MS 101 with NSP 106 via Origination Request 408. The NSP 106 then provides the VAP 103 with an Origination ACK 409 message indicating that the MS 101 is recognized and the VAP 103 may go forward with the call origination. After that, the VAP 106 sets up an ISDN connection, ISDN Set up 410, to LDS 104. The LDS 104 performs the dialed digit analysis and proceeds with the call delivery procedures concluding in a connected call to the PSTN 125 DN.

More specifically, the MS 101 dials a DN number and sends an IS-136 Origination 407 message to VAP 103. VAP 103 then sends an Origination Request 408 message to NSP 106. After checking the appropriate databases to determine if the MS 101 is a valid registered subscriber, NSP 106 returns an Origination ACK 409 message to YAP 103. The VAP 103 then reserves a RF DTC channel and sends an ISDN Q.931 Setup 410 message to the LDS 104. The LDS 104 then performs a dialed digit analysis and sends an ISUP IAM 411 message to a far end switch in the PSTN 125 for end-to-end connectivity. The LDS 104 also sends an ISDN (Q.931) Call Proceeding 412 message to the VAP 103. The VAP 103 then sends an IS-136 Digital Traffic Channel (DTC) Designation 413 message to the MS 101 so that MS 101 may then tune to the designated traffic channel. MS 101 indicates to VAP 103 that it is using the designated DTC by responding with an MS on DTC 414 message. The VAP 103 then detecting that the MS 101 is tuned to the designated traffic channel, cuts through the voice path between RF DTC channel and ISDN B channel.

After receiving the ISUP ACM 415 message from the destination switch in the PSTN 125, the LDS 104 sends an ISDN Alerting 416 message to VAP 103. Next, the Ringback Tone 421 is delivered to the MS 101 from the destination switch. When receiving ISUP ANM 417 message from the PSTN 125, the LDS 104 sends an ISDN Connect 418 message to VAP 103, removes the ringback tone, and cuts through voice path 422. The VAP 103 then sends an ISDN Connect ACK 419 message back to the LDS 104. After connection of the voice path 422, the VAP 103 sends a Connected 420 message to the NSP 106 for billing and other OAM&P purposes.

V. Incoming Call Termination

Exemplary call flow diagrams illustrating various call termination (incoming call connection) scenarios for the WCS system are illustrated in FIGS. 5 through 7. When provisioning the necessary parameters for the subscriber, the WCS subscriber's DN is provisioned for the AIN Termination Attempt Trigger (TAT) so that the subscriber's mobile station is the first destination determined for incoming call termination. Consequently, when a call to the subscriber's DN is received, it triggers the LDS 104 to send a call treatment query message to the NSP 106. The TAT call treatment procedure in the NSP 106 will direct the LDS 104 to deliver the call to its appropriate destination. The DN in the VAP 103 that is used to deliver the call to the MS 101 is referred to as the Forward Directory Number (FDN).

Depending on the first call delivery destination, there may be two different call termination scenarios. The first scenario involves delivering the call first to a tip ring (T/R) desktop phone 108 (POTs) or an ISDN phone 109, while the second involves delivering a call first to a mobile station 101. In each scenario, a different AIN trigger is utilized, and the call termination may be implemented using one of the two scenarios. The latter scenario of delivering the call to a mobile station will be utilized to exemplify the procedure.

The TAT call treatment procedure in the NSP 106 will direct the LDS 104 to deliver the call to the subscriber MS's current location. If there is no answer from the MS 101 phone, the call is delivered to the subscriber's desktop phone (e.g., POTs 108 or ISDN 109). In one exemplary embodiment, once the call is forwarded to the MS 101 DN (FDN), the call follows the Originating Call Model (OCM) rather than the Terminating Call Model (TCM), and an O_No_Answer trigger can be used rather than a T_No_Answer trigger. In yet another embodiment, the T_No_Answer trigger could be used to deliver the call to the desk top phone first, and if the call goes unanswered, the trigger can be used to request additional routing information from the NSP 106. The NSP 106 would then locate the MS 101 and instruct the LDS 104 how to deliver the call.

An exemplary call flow of a termination wherein the incoming call is routed from the PSTN 125 to MS 101 is illustrated in FIG. 5. As previously illustrated in FIG. 4, if the call is originated from the MS 101 or desktop phone (e.g., 108 or 109) inside a region handled by the same LDS 104, the resulting call flow would be similar, except that there will be appropriate ISDN Q.931 messages to and from the LDS 104 instead of the ISUP messages between the PSTN 125 and the LDS 104. The following illustration shows an incoming call to a MS 101 that answers the call.

The PSTN 125 user first dials the DN of a WCS subscriber. The LDS 104 then receives an ISUP IAM 508 message from the PSTN 125. The LDS 104 recognizes that the DN is provisioned for AIN Termination Attempt Trigger (TAT). The LDS 104 then suspends the delivery of the call and sends an AIN query message, TCAP (AIN termination attempt [DN]) 509, to the NSP 106 for an appropriate routing instruction. The NSP 106 recognizes that the subscriber's MS 101 is active in its serving area, and sends a page message, Page 510, to the VAP 103 serving MS 101. The VAP 103 in turn sends an IS-136 Page 528 message to the MS 101. The MS 101 responds to the IS-136 Page 528 via a IS-136 Page Response 529 message destined to VAP 103. VAP 103 then sends a Page Response 511 message to the NSP 106. The NSP 106 then directs LDS 104 to forward the call to the Forward Directory Number (FDN), TCAP (AIN Forward_Call [FDN], NEL [O_No_Answer]) 512 of the VAP 103 serving the MS 101 (in a TCAP Conversation package). The NSP 106 also indicates its interest in event (O_No_Answer for FDN by sending next event list NEL [O_No_Answer]) 532 information to the LDS 104 in a Request component that accompanies the Routing component, in a conversation package. The LDS 104 then starts a No Answer Timer (T(NoAnswer)) 531 for FDN and sends an ISDN (Q.931) Setup 513 message to the VAP 103. The VAP 103 then sends a Digital Traffic Channel (DTC) Designation 530 message to the MS 101 along with an ISDN (Q.931) Call Proceeding 514 message to the LDS 104. The MS 101 then tunes to the traffic channel and responds to the VAP 103 with MS 101 on DTC 515. The VAP 103 detects that tie MS 101 is on the appropriate traffic channel. The VAP 103 then alerts MS 101 with an Alert-with-info 516 message and MS 101 acknowledges with a Mobile ACK 517 message. The VAP 103 then sends an ISDN Alerting 518 message to LDS 104.

Upon receiving ISDN (Q.931) Alerting 518 message, the LDS 104 then sends an ISUP ACM message 519 to the switch in PSTN 125. In the meantime, the LDS 104 is sending a ringback tone 520 to the PSTN 125 caller. When the MS 101 answers (before T(NoAnswer) 531 expires), the VAP 103 sends an ISDN Connect message 522 to the LDS 104 in response to the Connect 521 message from MS 101. The LDS 104 then cancels T(NoAnswer) 531, and sends ISUP ANM 523 message to the PSTN 125 switch and cuts through the voice path 527. After the LDS 104 sends an ISDN (Q.931) Connect ACK 524 message to the VAP 103, it then sends TCAP (AIN Close) 525 message to the NSP 106 (using TCAP Response) to complete the TCAP transaction. After receiving the ISDN (Q.931) Connect ACK message 534 from the LDS 104, the VAP 103 sends Connected 526 message to the NSP 106 for billing and other OAM&P purposes. At this point, voice path 527 has been established and the call proceeds between the PSTN 125 caller and the MS 101 subscriber until it is ended and disconnected (e.g., hang up).

In accordance with the instant invention, FIG. 6 shows a process wherein an incoming call goes unanswered by the mobile station, e.g., MS 101, and the No Answer Timer 531 expires. Whenever, a call destined for a MS 101 goes unanswered and the No Answer Timer 531 expires, the NSP 106 will direct the call to the DN (telephone or VMS) which is associated with that MS 101.

The PSTN 125 user first dials the DN of a WCS subscriber. The LDS 104 receives ISUP IAM 508 message from the PSTN 125. The LDS 104 will recognize that the DN is associated with MS 101 and is provisioned for AIN Termination Attempt Trigger (TAT). The LDS 104 then suspends the delivery of the call and sends an AIN query message, TCAP (AIN Termination Attempt [DN] 509), to NSP 106 for an appropriate routing instruction. The NSP 106 will recognize that the subscriber's MS 101 is active in its serving area, and will send Page 510 message to the VAP 103 serving MS 101. The VAP. 103 in turn sends IS-136 Page 528 message to MS 101. The MS 101 will respond to the IS-136 Page 528 message via Page Response 529 message destined to VAP 103. The VAP 103 then sends Page Response 511 message to the NSP 106. The NSP 106 then directs the LDS 104 to forward the call to the Forward Directory Number (FDN) of the VAP 103 serving the MS 101 (in a TCAP Conversation package) by sending the TCAP (AIN Forward Call [FDN], NEL [O_No_Answer]) 512 message to the LDS 104. The NSP 106 also indicates its interest in event O_No_Answer for FDN by sending next event list (NEL) information to the LDS 104 in a Request component accompanying the Routing component of a conversation package message 512. The LDS 104 then starts a No Answer Timer (T(NoAnswer)) 531 for FDN and sends ISDN (Q.931) Setup 513 message to the VAP 103. The VAP 103 then sends Digital Traffic Channel (DTC) Designation 530 message to MS 101 and sends a ISDN (Q.931) Call Proceeding 514 message to the LDS 104. The MS 101 then tunes to the designated traffic channel and sends the MS 101 on DTC 515 message to VAP 103. The VAP 103 then detects the MS 101 on the traffic channel and alerts the MS 101 with an IS-136 Alert-with-info 516 message the MS 101 responds by acknowledging with a Mobile ACK 517 message. The VAP 103 then sends ISDN Alerting 518 message to the LDS 104. Upon receiving the ISDN (Q.931) Alerting 518 message, the LDS 104 then sends an ISUP ACM 519 message to the switch in PSTN 125. In the meantime, the LDS 104 is sending a ringback tone 520 to the caller.

In this case, the MS 101 does not answer the call and the No Answer Timer T (No Answer) 531 expires. The LDS 104 then sends AIN O_No_Answer 625 message to the NSP 106 in a conversation package. The NSP 106 sends a TCAP (AIN Analyze_Route [DN]) 626 message to the LDS 104. Then the LDS 104 sends a TCAP (AIN Termination_Attempt [DN]) 635 message back to the NSP 106, which authorizes the call termination to the DN by sending an TCAP (AIN Authorize_Term) 636 message to the LDS 104. The LDS 104 then sends an ISDN (Q.931) Disconnect 627 message to the VAP 103. The VAP 103 then sends a Release 628 command to the MS 101 and the MS 101 stops ringing (buzzing or alert the user). The MS 101 then sends Mobile ACK 629 back to the VAP 103. The VAP 103 now sends ISDN (Q.931) Release 630 message to LDS 104 to notify the LDS that MS 101 is no longer being alerted of the incoming call. The LDS 104 then sends ISDN (Q.931) Release Complete 631 message to the VAP 103 allowing MS 101 to be used for other calls or messages. When the NSP 106 instructs the LDS 104 to forward the call to the DN 626, the call processing is assumed by the LDS 104 as a normal call delivery in step 632. If the user subscribes to VMS 107, then after a certain number of rings, the LDS 104 will transfer the call to the VMS 107 or alternatively, according to the embodiment of FIG. 2B and as previously described, the VAP 103 may deliver a ring no answer message to the calling subscriber. The incoming call will thus be forwarded to the telephone (ISDN 109 or POTS 108) associated with the DN being called.

In accordance with the instant invention, an exemplary methodology of terminating an incoming call to a roaming subscriber located in another LDS area is illustrated in FIG. 7. The WCS subscriber's DN is provisioned for the AIN Termination Attempt Trigger (TAT) so as to seek out the subscriber's MS first. In general, when a call to the subscriber's DN arrives at the LDS 104, the call triggers the LDS 104 to send a call treatment query message to NSP 106. The NSP 106 will recognize that the MS 101 is currently registered in another Customer Site (different LDS area) and will request a Forward Directory Number (FDN) from the visited area, Serving NSP 106B. The Serving NSP 106B then checks the current location of the MS 101 and the availability of circuits to handle the call and returns an FDN to the Home NSP 106A. After receiving the FDN, the TAT call treatment procedure in the Home NSP 106A directs the LDS 104A to deliver the call to the FDN. After sending the ISUP IAM to the FDN, the Serving LDS 104B delivers the call to the VAP 103 presently serving the MS 101.

More particularly, a call termination occurs as follows when a MS 101 is roaming to another Customer Site, e.g., Site B 201, when the MS 101 has a home location within Customer Site A 202. The PSTN 125 user dials a WCS subscriber's DN associated with a subscriber in Customer Site A. The Home LDS 104A (LDS-A) receives an ISUP IAM 709 message from the PSTN 125. The LDS-A 104A finds that the DN is provisioned for AIN Termination Attempt Trigger (TAT) and suspends the delivery of the call, sending AIN Termination_Attempt Query 710 message to the NSP-A 106A for an appropriate routing instruction. The NSP-A 106A will recognize that the subscriber is not presently registered in its serving area but is now registered in Customer Site B 201. The NSP-A 106A will send ROUTREQ 711 message to the Serving NSP (NSP-B) 106B. After receiving the ROUTREQ 711 message, the NSP-B 106B sends Page 712 message to the VAP 103 presently serving the MS 101. The VAP 103 will then send an IS-136 Page 713 message to the MS 101 and the MS 101 will respond with an IS-136 Page Response 714 message destined for the VAP 103. The VAP 103 will then send the Page Response 715 message to the NSP-B 106B. The NSP-B 106B will confirm the current location of the MS 101, and return the Forward Directory Number (FDN), in the routreq 716 message to the NSP-A 106A. The NSP-A 106A will then direct the LDS-A 104A to forward the call to FDN in Customer Site B via a TCAP (AIN Forward_Call [FDN], NEL[O_No Answer]) 717 message. The LDS-A 106A then forwards an ISUP IAM [FDN] 718 message to the LDS-B 104B. After receiving the ISUP IAM [FDN] 718 message, LDS-B 104B then sends an ISDN (Q.931) Setup 719 message to the VAP 103 serving the FDN. VAP 103 sends the DTC Designation 720 message to the MS 101, and then sends an ISDN (Q.931) Call Proceeding 721 message to the LDS-B 104B. When the MS 101 tunes to the DTC it sends an MS on DTC 722 message to VAP 103 and VAP 103 responds with an Alert-with-info 723 message. The MS 101 will then send a Mobile ACK 724 message to the VAP 103 and the VAP 103 will then send an ISDN (Q.931) Alerting 725 message to the LDS-B 104B. The LDS-B 104B will then send an ISUP ACM 726 message to the LDS-A 104A, which will in turn forward a ISUP ACM 727 message to the switch in PSTN 125. The LDS-B 104B provides the Ringback Tone 728 to the caller.

When the MS 101 answers, the MS 101 will send Connect 729 message to the VAP 103. The VAP 103 will then send an ISDN (Q.931) Connect 730 message to the LDS-B 104B. The LDS-B 104B will then send an ISUP ANM 731 message to the LDS-A 104A, which then forwards ISUP ANM 733 to the switch in PSTN 125, and an ISDN Connect ACK 732 message to VAP 103. After receiving an ISDN (Q.931) Connect ACK 732 message from LDS-B 104B, the VAP 103 will send a Connected 734 message to the NSP-B 106B for billing and other OAM&P purposes.

If the MS does not answer, the call is delivered to the desktop phone or to the VMS 107 if the MS 101 subscriber has voice mail capabilities, by the same mechanism using the NEL [O_No_Answer], as in the non-roaming case (see FIG. 6). Otherwise, at this point, voice path 735 is established.

VI. Intra-LDS Mobile Station Assisted Handoff

Figure 8:
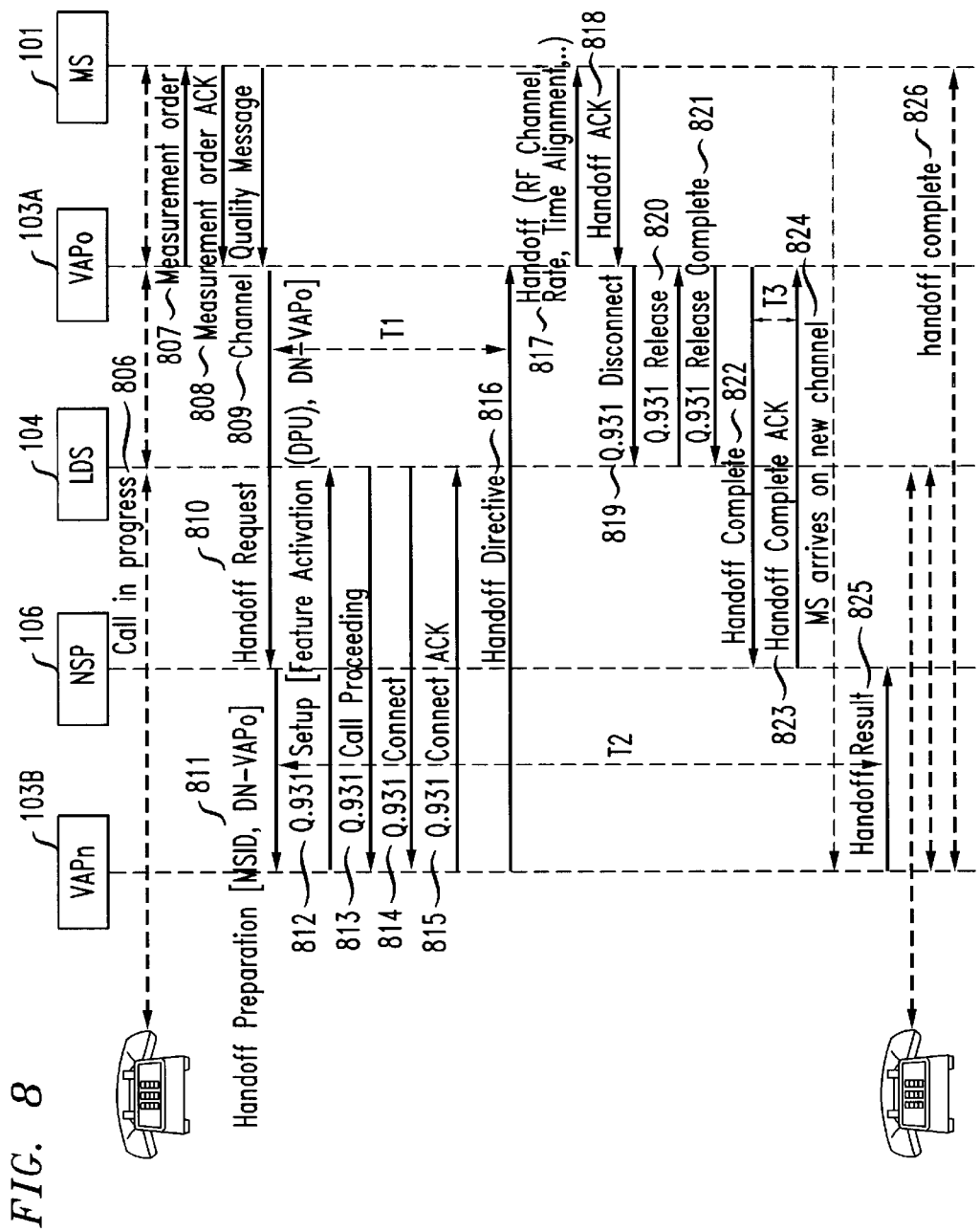
FIG. 8 illustrates an exemplary signal flow, diagram which demonstrates intra-local digital switch assisted hand-off.

In accordance with the invention, an exemplary embodiment of an intra-LDS mobile assisted handoff (MAHO) process is illustrated in FIG. 8. The signaling flow in FIG. 8 discloses the handoff of a call between the VAPs (e.g., VAPo 103A and VAPn 103B) served by the same LDS 104. The smooth/lossless handoff is accomplished by using the Directed Call Pickup with Barge-in (DPU) feature supported by many switches. A discussion of the process follows.

While a call 806 involving the served MS 101 is in progress, the VAPo 103A detects a handoff condition based on the measured channel qualities and their threshold value. The VAPo 103A initiates a Measurement order 807 destined for MS 101. The MS 101 then responds to the Measurement order 807 with a Measurement order ACK 808 and a Channel Quality Message 809 destined for VAPo 103A. When VAPo 103A detects a handoff condition, it then sends a Handoff Request 810 to the NSP 106 with a list of candidate channels. The NSP 106 then selects the best candidate channel, identifies VAPn 103B as serving the channel, and sends a Handoff Preparation [MSID, DN-VAPo] 811 message to VAPn 103B.

Upon receiving the order from NSP 106, VAPn 103B reserves a B-channel and a RF channel for the MS 101, and establishes a 3-way call using the DPU feature. VAPn 103B then sends ISDN (Q.931) Setup [Feature Activation (DPU), DN-VAPo] 812 message to LDS 104. LDS 104 then returns an ISDN (Q.931) Call Proceeding 813 message to the VAPn 103B, followed by an ISDN (Q.931) Connect 814 message. The VAPn 103B then responds to the LDS 104 with an ISDN (Q.931) Connect ACK 815 message. The VAPn 103B then sends a Handoff Directive 816 message to VAPo 103A. The VAPo 103A then sends the Handoff order 817 to the MS 101 requesting MS 101 to retune to the new RF channel of VAPn 103B, and disconnects its ISDN connection to the LDS 104 as shown in steps 818–823. The MS 101 is then placed on the new channel with VAPn 103B per step 824. The VAPn 103B sends a message Handoff Result 825, to the NSP 106, which indicates that the MS 101 has successfully been handed off to the new channel, indicated as handoff complete.

In yet another embodiment of the invention, a user on a wireline telephone call can have the capability of transferring that call to his/her cellular/PCS MS. In accordance with this feature, a user on a wireline telephone with an active call may enter a special feature code, such as *99, in order to activate the feature.

The following is a more detailed description of an exemplary intra-LDS mobile assisted handoff as previously described and as depicted in FIG. 8. Initially, there is an existing call involving the served MS 101 in progress. The VAPo 103A sends a Measurement order 807 over the FACCH to the MS 101 to measure the BER (bit error rate) and RSSI (received signal/strength indicator) of the current channel and the RSSIs of other RF channels. The MS 101 acknowledges the Measurement order 807 by sending a Measurement order ACK 808 over the FACCH. The MS 101 then performs the channel quality measurements in response to the Measurement order 807 and sends a Channel Quality message 809 to the VAPo 103A.

Next, the VAPo 103A detects a handoff condition based on the received Channel Quality Message 809 and the associated threshold values. The VAPo 103A then sends a Handoff Request 810 message to NSP 106 with a list of candidate channels, and immediately starts its handoff request timer (T1). Upon receiving the Handoff Request 810 from the VAPo 103A, the NSP 106 selects the candidate with the strongest RSSI. The NSP 106 then checks if the resources (ISDN B-channel and RF channel) are available for the candidate channel, and identifies VAPn 103B as the new VAP which will serve the MS 101. The NSP 106 then sends a Handoff Preparation 811 message, including the serving MSID and DN-VAPo (the DN of VAPo 103A, i.e., the phone number to be barged in on) to VAPn 103B and immediately starts its handoff preparation timer (T2). In response to the Handoff Preparation 811 message, VAPn 103B then reserves a B-channel and a RF channel for the MS 101 and starts to establish a 3-way call using a DPU process in the following manner.

The VAPn 103B sends a ISDN (Q.931) Setup 812 message to LDS 104, which includes a Feature Activation code for DPU and DN-VAPo. The LDS 104 then sends the ISDN (Q.931) Call Proceeding 813 message back to the VAPn 103B followed by an ISDN (Q.931) Connect 814 message when the call is connected to DN-VAPo. The VAPn 103B then sends the ISDN (Q.931) Connect ACK 815 message to LDS 104. The VAPn 103B then sends a Handoff Directive message 816 to the VAPo 103A. The VAPo 103A cancels the T1 timer, and sends the Handoff order 817 to the served MS 101 over the FACCH, requesting the MS 101 to retune to the new RF channel (along with other channel assignment information). The MS 101 then acknowledges the Handoff order with a Handoff ACK 818 to VAPo 103A. Upon receiving the Handoff ACK 818, the VAPo 103A then disconnects the B channel connection by sending an ISDN (Q.931) Disconnect 819 message to LDS 104. LDS 104 then sends an ISDN (Q.931) Release 820 message to the VAPo 103A, and the VAPo 103A acknowledges the Release Message 820 and disconnection of the previous call by sending the ISDN (Q.931) Release Complete message 821 to the LDS 104.

The VAPo 103A tears down the voice path connection that it had established for the MS 101. The VAPo 103A sends the Handoff Complete 822 message to the NSP 106, which includes the time information of the serving MS 101 for billing and other OA&M purposes. The LDS 104 then starts its handoff complete timer (T3). The NSP 106 responds by sending a Handoff Complete ACK 823 to VAPo 103A, and VAPo 103A cancels T3. The MS 101 then retunes to the new channel of the VAPn 103B. After confirming that the MS 101 has been retuned to the new channel, the VAPn 103B then sends a Handoff Result 825 message to the NSP 106, which indicates that the MS 101 has been successfully handed off to a new channel and timer T2 is cancelled. The NSP 106 acknowledges the handoff complete to both the LDS 104 and the VAPn 103A, using handoff complete 826 message.

VII. WCS as a Wireless PBX System

In yet another embodiment of the instant invention, there exists a wireless centrex service platform which is a Wireless PBX system (WPS) offering a wireless access system with customer site wireline ISDN capable PBX to provide integrated wire and wireless voice access. In one application of the system, a WPS as disclosed could be used to enhance the PrimeXpress service offered Teleport Communications Group (TCG, now owned by AT&T). This system could advantageously provide a cordless-like, anywhere, anytime communication in any indoor, business and campus environment using subscriber's macrocellular/PCS mobile station (MS 101). In accordance with the invention, the WPS system includes an Intelligent Wireless Controller (IWC) system 902, its subtending Voice Access Ports (VAPs) 103 and the customer site ISDN capable PBX 901.

Additionally, the WPS also functions as an integrated wireline and wireless system without being connected to any public macro cellular system. Therefore, it does not support mobility management and roaming between WPS and the public macro cellular and PCS networks. In another embodiment, the WCS can connect the NSP 106 to a macrocellular SS7 network to support integrated mobility functions including terminal handoff and personal roaming features.

Further, the WPS provides location and mobility management for the WPS subscriber's mobile station (MS 101) inside the WPS serving area.

After a simple registration process, the WPS subscribers use their IS-136 digital TDMA cellular/PCS phone 101 as a cordless-like phone in the WPS service area without incurring air-time charges. The dual ring feature of the MS 101 allows the user to receive calls anywhere inside the WPS service area. As a result, whenever a user is called at his/her stationary phone 108 attached to the customer premises PBX 901, the WPS system simultaneously locates and alerts the user's IS-136 phone 101. If the user does not answer MS 101, the Voice Message System 109 associated with the customer premises PBX 901 will answer the call. In this embodiment, calls from the stationary phone 108 or the IS-136 phone 101 are directed to the customer site PBX and processed by the TCG PrimeXpress Services. Essentially, the PrimeXpress service is an outbound trunk to a switch 904, such as the Lucent 4ESS, that bypasses the local switch. In the exemplary WPS system, call features include, but are not limited to, Short Message Services (SMS) and/or paging (IS-136 feature); PBX interworking, including premises dialing plan, closed-user-group, and dual ringing of stationary and MS phones; wireline call features, such as three way calling, call forwarding, call transfer, caller ID, call waiting, messaging and voice mail services; support for voice privacy; and cordless-like service without air time charges.

Figure 9:
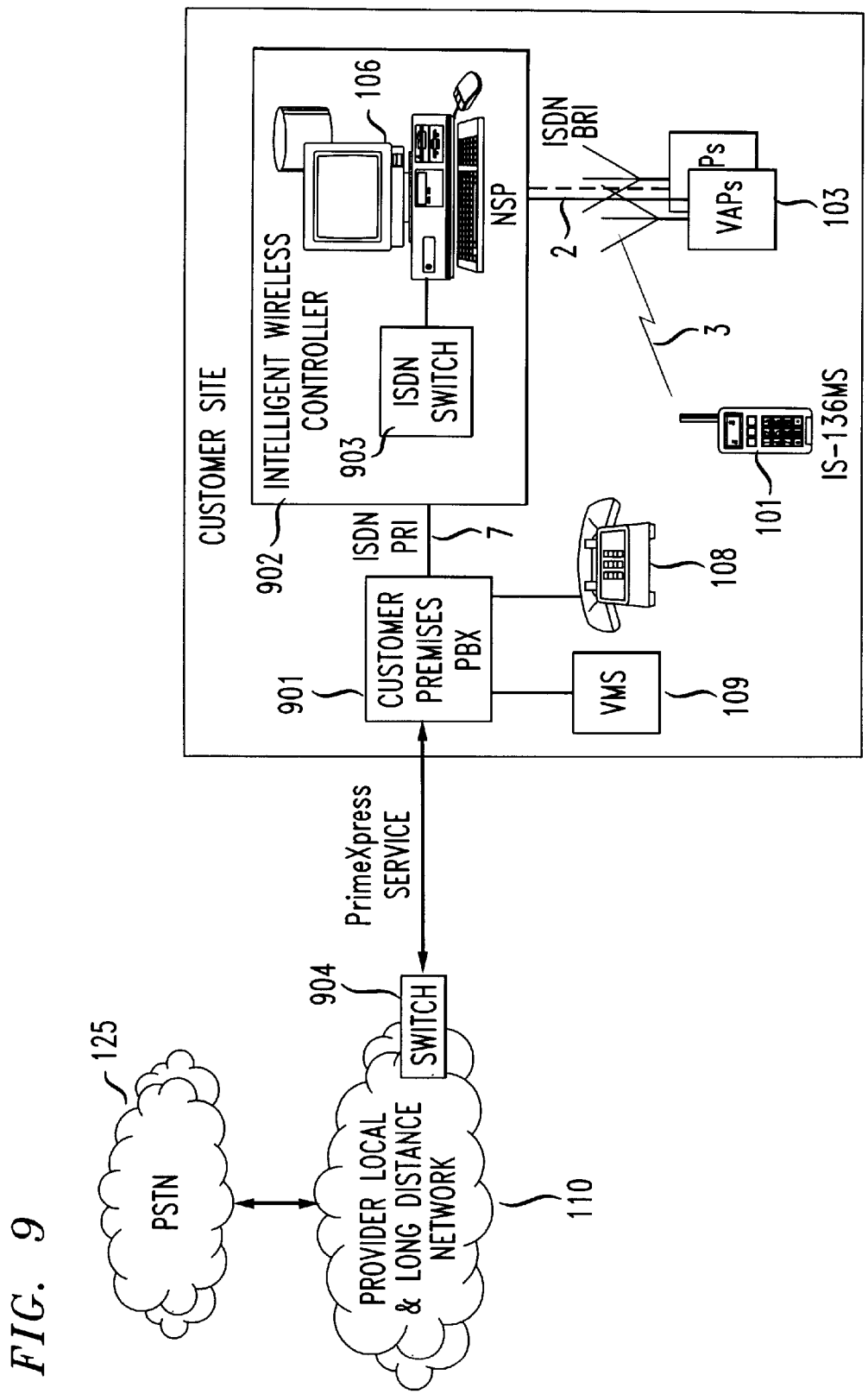
FIG. 9 illustrates a communications network for a wireless centrex system executed using a PBX system according an embodiment of the present invention.
Figure 10:
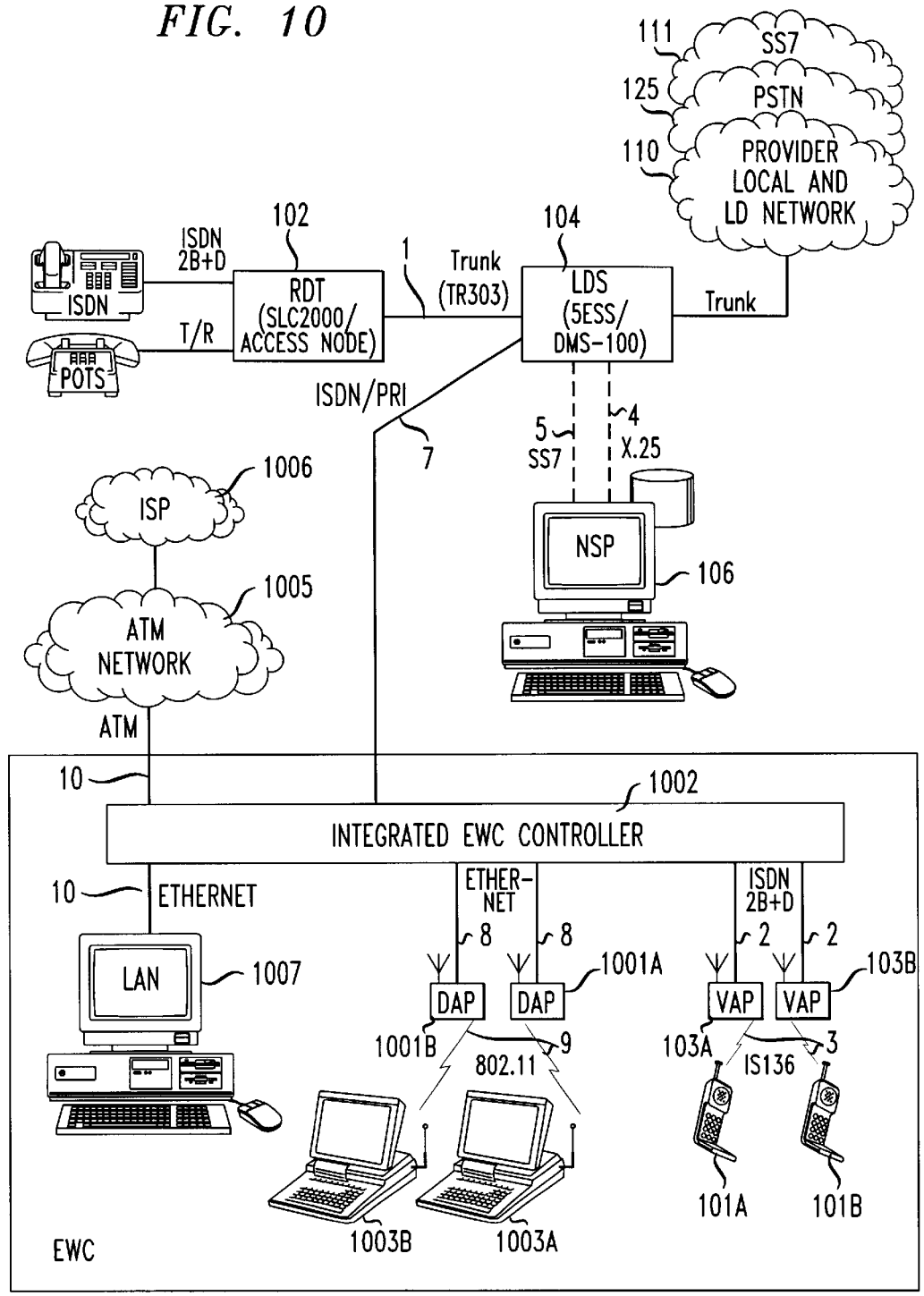
FIG. 10 illustrates still another communications network for wireless centrex system capability having a wireless voice and wireless data wireless centrex system according to another embodiment of the present invention.

In the embodiment of the invention illustrated in FIG. 9, there exists an ISDN PRI interface 7, an IS-136 air interface 3, and an ISDN BRI interface 2. The ISDN BRI 2 interconnects VAP 103 and the Intelligent Wireless Controller 902. Call processing messages for call setup, call teardown, feature applications and OAM&P messages are carried on the data D-channel in X.25 packets. In addition to carrying call processing messages, the D-channel also carries ISDN (Q.931) signaling for call setup and teardown of the voice connection on the bearer B-channel. The IS-136 air interface 3, provides communication between the VAP 103 and the MS 101. The ISDN PRI interface 7 interconnects the IWC 902 and the customer premise PBX 901 and utilizes Q.931 signaling. The wireless communications controller's call processing messages for call setup, call teardown, feature applications and OAM&P messages are carried in the D-channel to the NSP 106. The D-channel also carries the Q.931 messages for the voice connections on the B-channels between the VAP 103 and the IWC 902. In one embodiment of the Intelligent Wireless Controller (IWC), there exists an ISDN switch 903 and a controller circuit.

VIII. Wireless Voice and Data WCS

In yet another embodiment of the instant invention, there is a Wireless Communication Service Platform that offers an economical and high performance wireless access network, for satisfying the need for an in-building integrated voice and data system providing mobility. While the exemplary platforms previously disclosed are focused on providing voice capabilities, this embodiment discloses a platform for providing data support integrated with voice capability. There exist at least one Data Access Port (DAP) (e.g., DAP 1001A or DAP 1001 B), which is a micro-cellular base station that uses the CelluLAN™ Common Air Interface (IEEE802.11) for high density and seamless in-door coverage providing 4 to 10 Mbps data rate for data applications.

The architecture of the DAP is similar to that previously disclosed for the VAP, and uses digital software radio technology which provides superior RF performance, along with RF based self configuration algorithms for "stacked spectrum" operation. A 10BaseT or 100BaseT Local Area Network (LAN) 1007 connects the DAPs, as well as other LAN devices such as servers, and or local printers, to the Integrated Wireless Communication Controller 1002 (e.g., Integrated Enterprise Wireless Communication (EWC) Controller). In one exemplary embodiment of the Integrated Wireless Communication Controller, the wireless voice and data services are integrated by bundling the PSTN/voice traffic on a trunk 7 to the LDS 104, e.g., 5ESS, and switching the data traffic to an ATM network 1005 for internet/intranet access (ISP 1006). The data and voice could be switched by any suitable means commonly known in the art such as packet switching or circuit switching. A laptop 1003A or 1003B with a PCMCIA card that supports CelluLAN™ CAI, can access the LAN 1007 anywhere inside the building. After the laptop 1003A or 1003B has registered with the LAN 1007, the user can access other PCs, laptops, and or other servers on the LAN, the intranet, and the internet. The user can access this LAN in his office, meeting rooms, the cafeteria, or any area of the building covered by DAPs. Once implemented, the instant invention would provide the advantage of eliminating the need to wire an individual office for data and/or voice connectivity. The wireless communication service platform would potentially improve overall productivity by giving the users access to their desktop anywhere, anytime. In other words, the instant invention would provide a "desktop to go" environment that would support "moment of value communications" at the time needed when information is most critical.

In accordance with the invention, there exists a Data Access Ports (DAPs) 1001A and 1001B interconnected to an Integrated Wireless Controller 1002, via interface 8. Interface 8 is a standard 10/100BaseT Ethernet connection. This is advantageous in that it provides a flexible interface so that data can be routed via the ethernet interface to a wired LAN or through an ATM network interface 10 to an ATM network 1005 interconnected to an Internet Service Provider (ISP) 1006. The IEEE 802.11 air interface 9 provides a wireless access to the DAPs 1001A and 1001B. The Data Access Port has exemplary capabilities such as, a high speed LAN access from 4–10 Mbps data rate using the CelluLAN™ CAI; an IP address assignment during registration; seamless mobility management including roaming and intra/inter LAN handoffs; data privacy functions to support standard security algorithms; communication support between DAPs and YAPs for SMS, email, paging, and data; and SNMP for OA&M.

The exemplary Integrated Wireless Communications Controller 1002 is a single platform controller with Premises Interfaces providing ISDN BRI interfaces 2 and Ethernet interfaces 8 for the VAP and DAP, respectively, and Network Interfaces providing ISDN PRI 7 and ATM for PSTN and ATM network access 10, respectively. The exemplary ATM network interface 10 is data only, and the Ethernet interface can also be used to connect to a wired Local Area Network (LAN). In accordance with the invention, there exist an ISDN PRI interface 7, interconnecting the Integrated Wireless Communications Controller 1002 with a LDS 104. In accordance with the invention, the LDS 104 interconnects to a RDT 102, a NSP 106 and to trunks connected to networks such as the AT&T Local and Long Distance Network 110, the PSTN 125, and the SS7 network 111.

IX. Feature Activation/Deactivation

The present invention includes means for feature/function activation/deactivation which is controlled by user input. The NSP 106 contains a dynamic user profile database stored in a memory (see FIG. 12, memory 1240) used to, for example, determine whether a mobile station is authorized to use a particular WCS feature/function and whether the feature/function, if available, is active.

Figure 11:
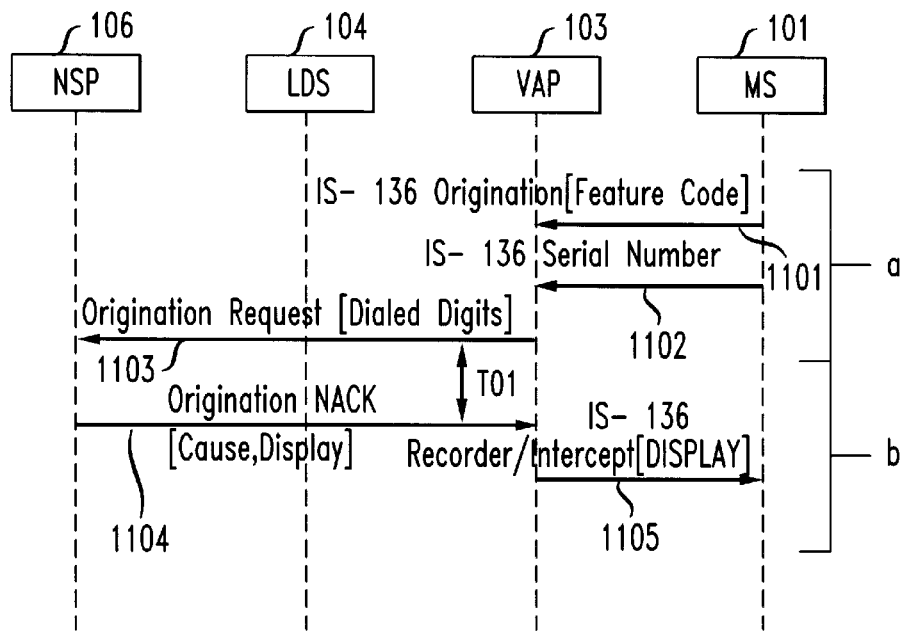
FIG. 11 illustrates an exemplary signal flow diagram which demonstrate feature activation/deactivation.

FIG. 11 illustrates a general signaling flow applicable for both feature activation and feature deactivation for the features/functions of the present invention that require activation/deactivation when MS 101 is idle (MS 101 camping on DCCH). Although FIG. 11 does not illustrate an RDT 102, it is understood that an RDT 102 may be included in one embodiment and located between the VAP 103 and the LDS 104. While an MS 101 registered with an NSP 106 is idle, the MS 101 user may dial the feature activation/deactivation code (e.g., *66, representing an activation code for an automatic callback feature/function) and press, for example, the "send" button on MS 101. In response, an IS-136 Origination [Feature Code] 1101 message (where the entered number feature activation/deactivation code is entered rather than a called party number) is sent to VAP 103 via the DCCH (over-R-DCCH). An IS-136 Serial Number message 1102 also is sent to VAP 103. After receiving the message, the VAP 103 sends an Origination Request [Dialed Digit] 1103 message to NSP 106 and starts the TO1 timer. Alternatively, feature activation can be achieved when the MS 101 is active. For example, during an active call the MS 101 user may merely enter the feature code and the feature will be activated.

Figure 12:
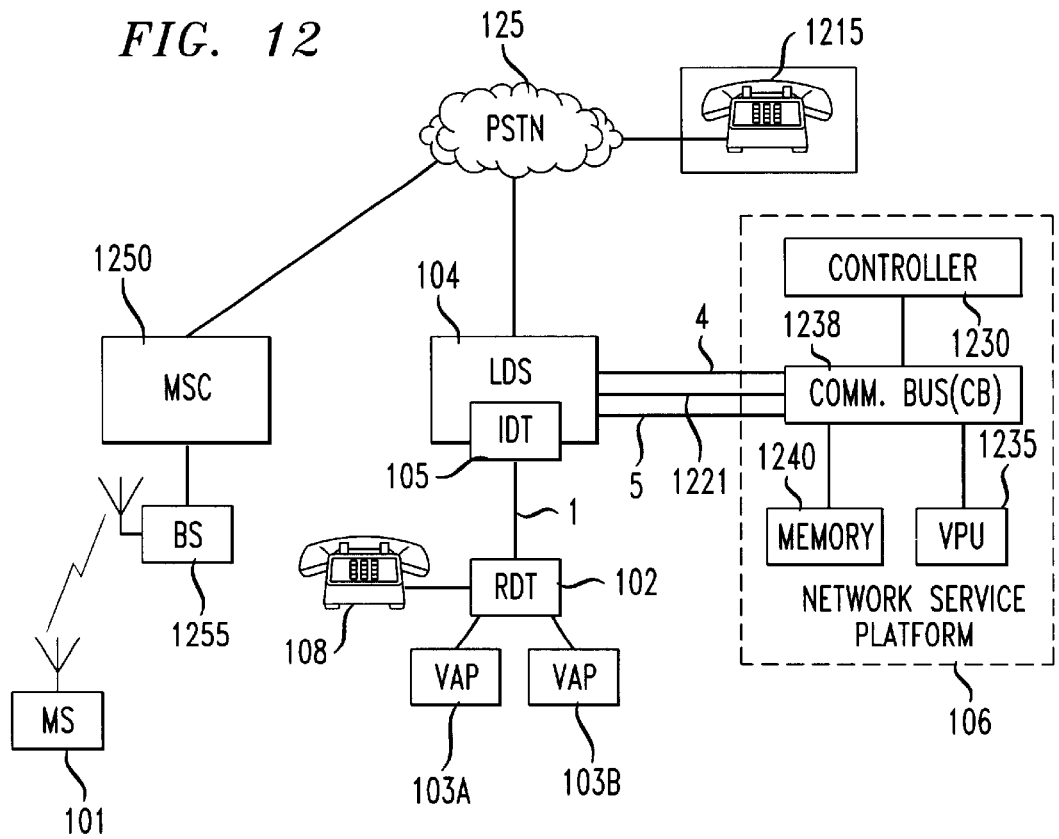
FIG. 12 shows a block diagram of illustrative communications network according to yet another embodiment of the present invention.

After receiving the Origination Request [Dialed Digit] 1103 message, the NSP 106 analyzes the dialed digits using, for example, controller 1230 (see FIG. 12). If the dialed digits includes a feature activation code, the NSP 106 checks the Wireless Centrex System Database (WCSD) (for example a user mobile station service profile database stored in memory 1240 (see FIG. 12)), using the Mobile Station Identification (MSID) to determine if MS 101 is authorized for the particular feature requested. If the MS 101 is authorized for the feature requested, feature validation is successful and the NSP 106 activates the feature for the subscriber and stores any associated feature information into the user profile database. The NSP 106 then sends an Origination NACK [Cause, Display] 1104 message with the Cause equal to Feature Activation and the Display information indicating successful feature activation, back to the VAP 103 (e.g., Origination NACK [Feature Activation Successful, Call forwarded to FwdDN]).

On the other hand, if the dialed digits are a feature deactivation code, the NSP 106 checks the WCSD to see if that particular feature is active. If the feature is active, the NSP 106 deactivates the feature and removes any associated feature information from the WCSD. The NSP 106 then sends an Origination NACK [Cause, Display] 1104 message with the Cause equals to Feature Deactivation and the Display information indicating a successful feature deactivation, back to the VAP 103. The NSP 106 generates an Origination NACK message rather than an Origination ACK message because the feature activation request is provided to the NSP 106 in a message (Origination Request 1103) that is generally intended for use in originating a telephone call and when a feature activation/deactivation is requested when the MS 101 is idle, no call will be complete since no DN was entered, thus, the response by the NSP-106 with a none acknowledgement message, Origination NACK 1104. However, the Origination NACK 1104 message does contain information in its Cause and Display fields that is needed to inform the MS 101 user that a feature has been activated or deactivated correctly.

In either feature/function activation or feature/function deactivation, the VAP 106 then cancels the TO1 timer and issues an IS-136 Reorder/Intercept [Display] 1105 message with the Display information over the Paging Channel (PCH) to the MS 101. The IS-136 Reorder/Intercept [Display] 1105 message is similar to the Origination NACK 1104 message in that it is generally an indication message that a call origination request has been unsuccessful and is used in this case as a vehicle for providing the MS 101 user information regarding the status of their feature activation/deactivation. After receiving the message, MS 101 displays the text message from the Display information field on MS 101 (e.g., Call forwarded to FwdDN) and resumes the DCCH idle (camping) state. A more detailed description of the feature/function activation/deactivation processing that goes on in the NSP 106 and VAP 103 using the call forward feature/function as an example follows.

After the NSP 106 receives the Origination Request [Dialed Digit] 1103 message with the Dialed Digit equal to the Call Forward feature Activation/Deactivation code, the NSP 106 first performs an analysis of the dialed digits to determine if it is a valid feature activation/deactivation code. Next, the NSP checks the user service profile in the WCSD, using the MSID of the originating MS 101, to determine if the originating MS 101 is authorized for the requested Call Forward feature. The NSP 106 also verifies that the parameters for the feature code are valid. If this validation process is successful, the NSP 106 updates its memory pertaining to feature activation/deactivation for the particular MSID and sends an Origination NACK [Cause, Display] 1104 message to the VAP 103 with the Cause field equal to Call Forward Feature Activation/Deactivation Successful and the Display field information equal to Call forwarded to FwdDN (the forwarding DN dialed with feature code), indicating that feature activation/deactivation is successful.

The NSP 106 will take the following actions in response to the MS 101 user entering various codes and different phone numbers to forward a call. As a first alternative, when the feature/function Call Forwarding—Unconditional is entered on MS 101 by the WCS subscriber the NSP 106 checks to see if there is a Call Forwarding feature/function already active for the particular mobile station MS 101. If a Call Forwarding feature/function is already active then the NSP 106 will update the previous feature/function active code entry and update, for example, the information with a new call forwarding number. Otherwise the NSP 106 will simply create a new feature/function active code entry and the call forwarding number for the mobile station MS 101.

As a second alternative, if the mobile station MS 101 user enters the feature/function code for the Call Forwarding—Programmable Ring feature and the number of rings is specified, the NSP 106 will verify that the number is within a range of acceptable values (i.e., valid). If the number of rings is not a valid number, the NSP 106 will use a default value for the number of rings to use. Next, the NSP 106 will translate the number of rings into an associated number of seconds it will take to execute the desired number of rings and create or modify as necessary the feature entry for the mobile station MS 101 to provide the desired number of seconds for ringing. Thus, this entry will contain the MSID, call forwarding number and the number of seconds ringing is to continue.

As a third alternative, if the mobile station MS 101 user enters the feature/function code for the Call Forwarding—Time of Day feature/function, the NSP 106 will verify that the begin time and end time parameters are present and valid. If the time parameters are valid, the NSP 106 will create/modify the feature entry for the mobile station MS 101. The entry will contain MSID, call forwarding number, begin time and end time.

As a fourth alternative, if the mobile station MS 101 user enters the feature/function code for the Call Forwarding—Busy feature/function, the NSP 106 will modify or create the feature entry for the mobile station and store the call forwarding number to be used if an incoming call occurs when the mobile station MS 101 user is, for example, on another call. The entry will contain the MSID, the call forwarding number, and a flag indicating that the call is to be forwarded when the MS 101 line is busy.

Furthermore, the MS 101 user may activate a feature, such as call forward, for a particular DN without entering the DN. First, as previously noted, the MS 101 could enter the feature code while on an active call and the feature would be provisioned relative to the DN of the other party involved in the call. Second, feature activation provisioning may be achieved without entering a DN by entering the feature activation code immediately after a call has been disconnected.

However, if the mobile station MS 101 user enters the feature/function code for Call Forwarding Feature Deactivation, the NSP 106 will verify that the feature corresponding to the deactivation code is currently active for the mobile station MS 101. The NSP 106 will then deactivate the feature/function and delete the associated feature information from the subscriber profile.

In any case, the NSP 106 will subsequently send out the Origination NACK [Cause, Display] 1104 message to the VAP 103. The Cause field will containing information such as; Feature Activation Successful, Feature Activation Failed, Invalid MS, Out of Resource, Input Unknown, Feature Deactivation Successful, Feature Deactivation Failed. The Display field will contain information such as Call forwarded to FwdDN.

Some examples of possible feature activation and deactivation codes are provided in the tables below for various WCS feature/functions. The activation and deactivation codes for the WCS features/functions, which need to be activated/deactivated when the MS is idle (MS 101 on DCCH), are tabulated below.

TABLE 1

| Feature Application | Activation Code | Deactivation Code |
|---|---|---|
| Automatic Callback | *66 | *660 or MS power down/de-registered |
| Call Forwarding-Unconditional | *90#DN | *900 |
| Call Forwarding-Programmable Ring | *91*x#DN, *91#DN | *910 |
| Call Forwarding-Time of Day | *92*hhmm*hhmm#DN | *920 |
| Call Forwarding-Busy | *93#DN | *930 |
| Call Return | *69 | *690 |
| Call Screen | *60#DN or *60#n#DN | *600#DN |
| Distinctive Ringing | *70#DN or *70#n#DN | *700#DN |
| Speed Calling | *75*(1–30)#DN | |

In the Table 1 above, the DN denotes a directory number (telephone number), the x denotes the number of rings and the hh denotes the hour of day in the format of 00 to 23, mm denotes the minute in the format of 00 to 59.

The feature codes of WCS features/functions, which can be initiated when the call is in progress (MS 101 on DTC), are tabulated below in Table 2.

TABLE 2

| Feature Application | Feature Code |
|---|---|
| Call Transfer | *77#TransferDN |
| Three-way call | *33#ThreeWayDN |

One skilled in the art will recognize that the feature/function activation and deactivation codes provided above are purely exemplary and may be different without changing the basic concept of the present invention.

Furthermore, as examples of feature/function activation/deactivation, the NSP 106 will take the following actions for various different feature/function codes input by the MS 101. (1) Call Forwarding—Unconditional: If there is a Call Forwarding feature already active for the particular mobile, the NSP 106 will update the feature entry with the new call forwarding telephone number. Otherwise, the NSP 106 will create a new feature entry for the mobile. (2) Call Forwarding—Programmable Ring: If the number of rings is specified, the NSP 106 will verify that the number is within the range, or it will use the default value. The NSP 106 will translate the number of rings into number of seconds and create/modify the feature entry for the MS 101. The entry will contain the MSID, call forwarding number and the number of seconds. (3) Call Forwarding—Time of Day: The NSP 106 will verify that the begin time and end time parameters are present and valid. If the time parameters are valid, the NSP 106 will create/modify the feature entry for the MS 101. The entry will contain MSID, call forwarding number, begin time and end time. (4) Call Forwarding—Busy: The NSP 106 will modify/create the feature entry for the MS 101 and store the call forwarding number. (5) Speed Dialing: NSP 106 will verify the data that is sent by the MS 101 for provisioning. The unique code specified may be, for example, a valid number in the range 1–30, and the DN may be, for example, a number consisting of 1 to 17 digits (a single digit number can be the smallest number that a WCS subscriber can dial to make a successful call, e.g., dial 0 to reach the operator. Seventeen digits may be required to accommodate a call screen for international calls. To make an international call—dial 9 to get out, then 3 number code to make an international call, 2/3 number code for the country, 2/3 number code for the region/area and 7 digit phone number, makes a possible total of 17 digits). The NSP 106 then updates the speed-dialing code list for the MS 101 with the new data provided. In case an entry for the requested unique code already exists, then the current DN will overwrite the existing entry. (6) Call Screen: NSP 106 will verify the data that is sent by the MS 101 for provisioning. The CallScreenDN specified must be a valid number, e.g., it may consist of 4 to 10 digits, and the code signifying the type of treatment may be, for example, from 1 to 3. The NSP 106 then updates the CallScreenDN list for that MS 101 with the new data provided. (7) Distinctive Ringing: If the user sends *70#n#DN, where n is a number from 1 to 5 and DN is a phone number and presses the send button, NSP 106 will verify the data that is sent by the MS 101 for provisioning. The DistinctiveRingingDN specified may be, for example, a valid number consisting of 4 to 15 digits, and the code signifying the type of ring signal may be, for example, between 1 and 5. The NSP 106 then updates the DistinctiveRingingDN list for that MS 101 with the new data provided. (8) Feature Deactivations: The NSP 106 will verify that the feature corresponding to the deactivation code is currently active for the MS 101. It will then delete the associated feature information from the subscriber profile.

In any case, if the validation is unsuccessful because the feature code is invalid or the parameters are missing, a Cause value equal to the Feature Activation/Deactivation Failed and the appropriate Display information regarding the specifics of the failure will be included in the Origination NACK [Cause, Display] 1104 message.

When VAP 103 receives the Origination NACK [Cause, Display] 1104 message, the VAP 103 cancels the timer TO1, extracts the Display information from the message, and inserts the Display information into the Display field of IS-136 Reorder/Intercept [Display] 1105 message. Next, the VAP 103 send the IS-136 Reorder/Intercept [Display] 1105 message to MS 101 and instructs the MS 101 to return to the idle (camping) state. Similar feature/function activation/deactivation signal flows will be used in the various feature/functions for the WCS as described in more detail below.

Although the feature/function activation/deactivation signal flows have been explained using call origination signaling, the signaling and MS 101 user notification may also be achieved using Short Message Services (SMS) signaling with text messages or audio messages over a voice channel. The audio notification can be accomplished by establishing a voice channel between the VAP 103 and the MS 101 and playing a recorded or voice synthesized message, e.g., Call forwarded to FwdDN to the MS 101.

X. Call Hold

Often, a telephone user, particularly a mobile phone user, is preoccupied when an incoming call is received or is interrupted with something of a higher priority during an active call. For example, a mobile telephone user may be in a meeting where the receipt of an incoming call would be a disruption. Thus, there is a need to allow a user to avoid disruption at particular times. However, the mobile telephone user may wish for the call to be temporarily on hold because they will be available in a short period of time.

In existing wireless telephone handsets, a user can preset her wireless phone so that an action is automatically taken when a call is received. For example, a user can preset a wireless telephone so that an incoming call is forwarded to voice mail. While such systems allow a user to avoid disruption, they do not allow a user that may be available in the immediate future, e.g., in a few seconds, to subsequently connect with the call that has been directed to voicemail, i.e., to delay receipt of the call until the user is available. In the alternative, existing wireless telephone systems allow a user to place a call on hold during an active call, for example, after answering an incoming call. However, answering the call immediately only to place the call on hold is also disruptive.

The call hold feature of the present invention enables existing wireless handsets to provide a user with the ability to interactively place an incoming call on hold in real time without first answering the call. A user, who does not wish to be interrupted or needs to carry on a private conversation off-line can either postpone answering an incoming call without first becoming involved in an active phone call conversation or by placing a presently active call on hold. According to one such embodiment, the calling party can be coupled to, for example, a voice processing unit (VPU) to receive a message that indicates the call is on hold and the called party (WCS subscriber) will be with them shortly. The WCS call hold feature allows the MS 101 user to reroute an incoming call to the VPU without answering the incoming call even though the incoming call is in the process of being automatically routed to the voice mail system (VMS). Thus, the WCS of the present invention provides a user with the ability to instantaneously place an incoming call on hold in real time or interrupt an incoming call routed to a VMS without first answering the call, have the caller automatically instructed that the call is on hold, and to pickup the call sometime in the near future. Therefore, the present invention allows a mobile phone subscriber to place an incoming call on hold without first having to answer the call as well as allowing a mobile phone user to place an active call on hold. A detail discussion of the WCS call hold feature/function follows.

FIG. 12 shows an illustrative communications system in which the call hold feature of the present invention can be implemented. A public switched telephone network (PSTN) 125 is connected to a plurality of communication networks, including one having a telephone 1215. The PSTN 125 can be coupled to a plurality of local digital switches, such as (LDS) 104. As previously noted, the LDS 104 may be a TR-08 and/or GR-303 compatible switch which employs distributed intelligence, process-oriented software, and coordinated autonomous computing elements to provide a flexible, modular, reliable and robust digital switching system. Exemplary, but not limiting, LDSs include the 5ESS manufactured by Lucent Technologies and the DMS-100/500 manufactured by Nortel. The LDS 104 can provide a single platform for advanced services including ISDN, Centrex, Custom Calling, and Advanced Intelligent Network (AIN) capabilities. The LDS 104 provides the switching fabric, administration, message switching and call switching functions.

The LDS 104 may be coupled to network server platform (NSP) 106 by an X.25 link 4 (packet switched data network link) and an SS7 link 5 (signaling system for call setup and database transactions). The X.25 link 4 carries call control messages on the D-channel between the NSP 106 and LDS 104 that are destined for VAPs 103A and 103B. The SS7 link 5 between the NSP 106 and LDS 104 carries the AIN (Advanced Intelligent Network) messages that directs the LDS 104 for proper routing of a call to a user who is a WCS subscriber.

NSP 106 may include, among other elements, a controller 1230, a voice processing unit (VPU) 1235, memory 1240, and communications bus (CB) 1238. The NSP 106 provides voice access ports (VAPs) 103A, 103B of the wireless centrex system with control and related operations, administration, maintenance, and provisioning (OAM&P) functions. Control functions include, but are not restricted to, mobile station and mobility management, call control, and feature applications. The NSP 106 is responsible for, among other functions, network intelligence for the VAP 103, validation, registration, and mobility management.

The LDS 104 may, for example, be connected to a RDT 102 by a Bellcore standard GR-303 interface 1. The GR-303 standard defines digital transmission facility interfaces such as DS 1 and SONET, concentration options between the LDS 104/IDT 105 and the RDT 102, signaling options, and call processing and operations data links. The GR-303 interface 1 can be transported across metallic (e.g., T1, ISDN: PR2 or DS3) or fiber-optic (e.g., SONET OC3 or OC12) links. The GR-303 interface 1 carries the voice traffic and the signal traffic for the LDS 104 and the NSP 106.

The PSTN 125 may also be coupled to a mobile switching center (MSC) 1250. The MSC 1250 generally has functionality similar to the combination of LDS 104 and NSP 106, and operates to control a cellular telephone network. Mobile switching center architectures are known in the art, and it will be appreciated that any known MSC may be adapted for use with the present invention. Plural base stations are controlled by the MSC 1250, such as base station (BS) 1255. Mobile Stations (MS) can travel throughout the cellular network and within the WCS network. Depending on a number of factors, calls involving a mobile station are handled by a base station that provides coverage for the area in which the mobile station is located. Handoff of calls involving the mobile station from one base station to another is controlled by the MSC 1250 in a known manner. A mobile station (MS) 101 is wirelessly coupled to BS 1250 as shown.

On the other hand, when MS 1260 enters the picocell area of a VAP in the WCS system, handsoff does not occur unless MS 101 has previous authorization to operate within the WCS system. In fact, if the WCS is constructed with security features/functions for restrictive access, the VAP 103 will deny registration and disconnect MS 101 from all macro and micro cell base stations.

A more detailed representation of the elements of an illustrative WCS are depicted in FIGS. 1A–1C, and include, among other elements, the VAPn 103A and 103B and two mobile communications units, e.g., IS-136 digital TDMA cellular/PCS phones, MS 101A and 101B. Also shown are plain old telephone service (POTS) 108 and integrated services digital network (ISDN) 109.

Illustrative implementations of the functions for the call hold/unhold feature of the present invention will now be described in connection with a wireless centrex system. However, it should be understood that the call hold/unhold feature service could also be supported in existing macro cellular systems including an MSC and BS, if properly designed. In such a system, the MSC 1250 and BS 1255 would be programmed to be the functional equivalent of the WCS system including NSP 106 LDS 104, RDT 102 and VAP 103 combined. However, it is noteworthy that the macro cellular system can not support ISDN and POTS wireline telephones but the WCS system can because it is integrated into such existing systems.

Figure 13:
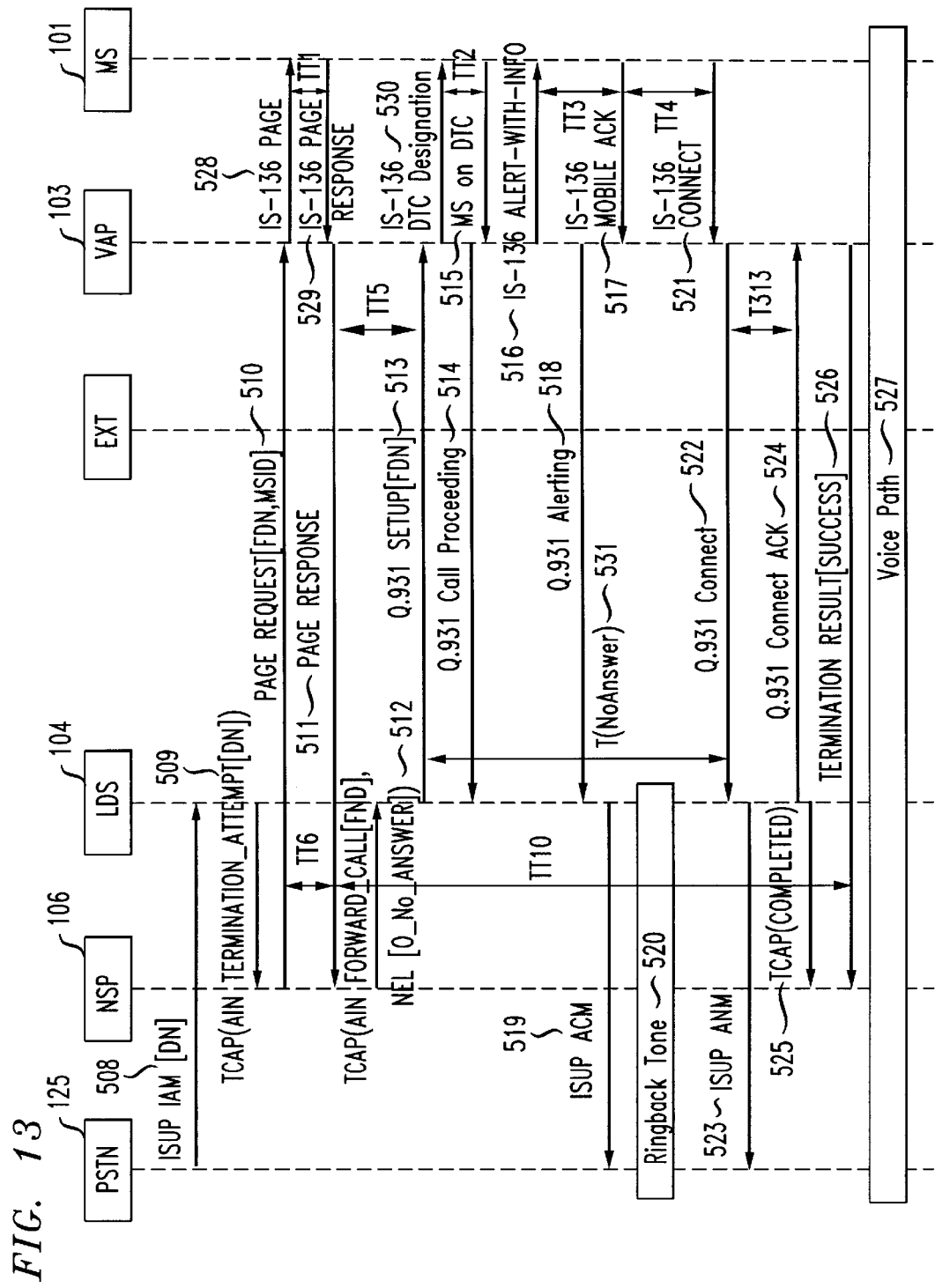
FIG. 13 shows an exemplary signal flow for setting up an incoming call used for call hold/unhold feature, in accordance with an illustrative embodiment of the present invention.

FIG. 13 shows the call flow for setting up an incoming call (i.e., call termination) similar to the call flow for setting up an incoming call illustrated in FIG. 5. For purposes of this discussion, it will be assumed that a calling party (e.g., telephone 1215) coupled to the PSTN 125 (or connected to the same LDS) dials the phone number (DN) of the mobile unit 101 and MS 101 is geographically within the WCS transmission picocell area.

The call with the DN arrives at the LDS 104 from the PSTN 125. The LDS 104 receives the ISUP (integrated services digital network user part) IAM (initial address message) 508 message from the PSTN 125 (or a Q.931 setup message). The LDS 104 determines whether the DN is provisioned for AIN termination attempt trigger (TAT), i.e., whether the DN is associated with a WCS authorized MS. If so, the LDS 104 suspends delivery of the call and sends an AIN query message TCAP (AIN Termination_Attempt [DN]) 509 to the NSP 106. The NSP 106 determines whether the subscriber's mobile unit MS 101 is active and idle in its serving area If so, the NSP 106 pages the mobile unit MS 101 by sending a Page Request [FDN, MSID] 510 message through the VAP 103 using IS-136 established paging procedures, and starts the TT6-paging response timer. As part of the Page Request 510 message, the NSP 106 sends the VAP's ISDN forward directory number (FDN) and mobile station identification number (MSID) that the VAP 103 uses to complete the incoming call setup procedure.

The mobile unit MS 101 responds to the page by sending an IS-136 Page Response 529 message to the VAP 103. The VAP 103 forwards the Page Response message using Page Response 511, to the NSP 106 and starts event timer TT5 to prevent permanent holding of RF and ISDN B-channel resources. When the NSP 106 receives the Page Response 511 message, it cancels the TT6 timer and knows that MS 101 is available to receive the incoming call and that the VAP 103 has the resources to support the incoming call. At the direction of the NSP 106, the LDS 104 forwards the call to the FDN of the VAP 103 (e.g., in a TCAP conversation package) serving the mobile unit MS 101. The NSP 106 also indicates its interest in the event (O_No_Answer for FDN) by sending next event list (NEL) information to LDS 104 in a request component that accompanies the routing component in a conversation package (i.e., TCAP (AIN Forward Call [FDN], NEL [O No Answer]) 512 message).

The LDS 104 starts a no answer timer (T(NoAnswer )531)) for the FDN and sends an ISDN Q.931 Setup [FDN] 513 message to the VAP 103. Upon receipt of the ISDN Q.931 Setup [FDN] 513 message, the VAP 103 cancels the TT5 timer, invokes B-channel call processing, initiates an IS-136 digital traffic channel (DTC) designation to the mobile unit MS 101, starts the TT2 timer, and sends a ISDN Q.931 Call Proceeding 514 message to the LDS 104.

The mobile unit MS 101 tunes to the designated DTC and sends an indication message, MS on DTC 515, to the VAP 103. When the VAP 103 detects that the mobile unit MS 101 is on the requested traffic channel through a Digital Verification Color Code (DVCC; a layer 2 signal from the MS) status change, it cuts through the ISDN/B-channel and initiates the alerting procedures for each call leg, that is upstream to the LDS 104 and downstream to the mobile unit MS 101. In particular, the VAP 103 sends an IS-136 Alert-with-info 516 message to the mobile unit MS 101, starts the Alert timer (TT3), and sends an ISDN Q.931 Alerting 518 message to the LDS 104. When the mobile unit MS 101 receives the Alert-with-info 516 message, it notifies the user through, for example, ringing (or an audible noise, vibrating, indicator lights, or a visual message display) that there is an incoming call (i.e., someone is calling them). When the LDS 104 receives the ISDN Q.931 Alerting 518 message, it sends an ISUP ACM (address complete message) 519 message to indicate that the Mobile Station MS 101 is available and communicating with the VAP and switches in the PSTN 125, and generates a ringback tone 520 that is heard by the calling party.

The mobile unit MS 101 returns an alerting acknowledge, IS-136 Mobil ACK 517, message to the VAP 103 so that the VAP 103 knows that MS 101 is alerting the user that there is an incoming call. Responsive to the alerting acknowledge message, the VAP 103 cancels the TT3 timer, starts a TT4 timer, and enters the wait-for-answer call processing state. If the MS 101 user answers (accepts) the call by, for example, pushing a send (or talk) key on the mobile station, the mobile station MS 101 sends an IS-136 Connect 521 message on the FACCH to the VAP 103. In response, the VAP 103 cancels the TT4 timer and sends an ISDN Q.931 Connect 522 message to LDS 104. After receiving the Connect message, the LDS 104 cancels the T(NoAnswer) 531 timer, and sends ISUP ANM (answer message) 523 message to the switch in the PSTN 125 and cuts through the voice path. Next, the LDS 104 sends an ISDN Q.931 Connect ACK 524 acknowledge message to the VAP 103 and then sends a TCAP Completed 525 message to the NSP 106 (using TCAP response) to complete the TCAP transaction. After receiving the ISDN Q.931 connect ACK 524 acknowledge message, the VAP 103 sends a Termination Result [Success] 526 message (i.e., call connected) to the NSP 106 to indicate that the incoming call has been successfully connected to the mobile station MS 101 and to trigger billing (air interface usage) and other OAM&P activities. A voice path 527 is then established between the calling party and the mobile unit MS 101. Once the call has been connected and a voice path established the mobile station MS 101 user can place the active call on hold as described below.

If the MS 101 user does not answer the incoming call the T(NoAnswer) timer will expire and the incoming call will be handled according to the mobile station MS 101 user's preprogrammed default designation. For example, the call could be forwarded to the VMS 107, the call could be forwarded to the MS 101 associated desk top phone 108, or the incoming call may be allowed to continue alerting the mobile station (MS) indefinitely until the caller hangs up the telephone.

Figure 14A:
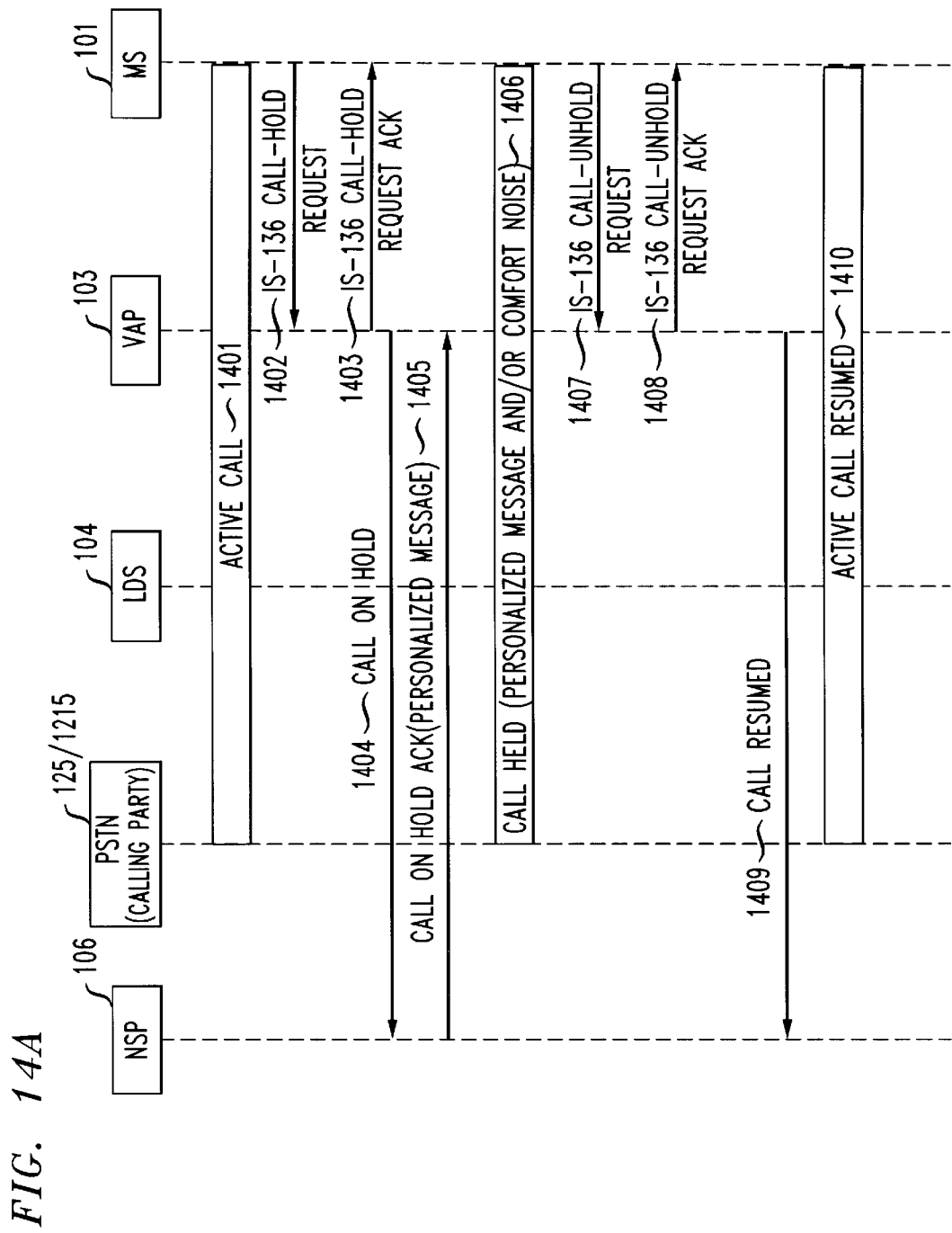
FIG. 14A shows a first exemplary call flow for the feature of call hold/unhold during an active call in accordance with an illustrative embodiment of the present invention.

FIG. 14A shows the call flow for a first preferred embodiment illustrating implementation of the call hold/unhold feature performed on an active call. For purposes of this discussion, it will be assumed that there exists an active call between a mobile station MS 101 in a WCS and a calling party (e.g., using POTS telephone 1215) coupled to the PSTN 125 and the call has been established either by a caller using POTS 1215 initiating a call to MS 101 (i.e., as just described with reference to FIG. 13), or vice versa. In any case, an Active Call 1401 is in progress and the mobile station MA 101 user decides to place the active call on hold.

When the mobile user generates a bold command by, for example, pressing a hold button on their MS 101, an IS-136 call-hold request message 1402 is sent over the FACCH (fast associated control channel) from the MS 101 to the VAP 103 (with which the MS 101 is registered). The VAP 103 interprets the request message, stops processing voice traffic frames, and notifies the NSP 106 that there is a call on hold 1404. Also, in response to the request message, the VAP 103 sends an IS-136 Call-Hold Request Ack 1403 acknowledge message to the MS 101. The VAP 103 continues to monitor the FACCH and also informs the NSP 106 that the call is on hold (Call on hold 1404). In response the NSP 106 will send a Call on hold Ack 1405 message. If a personalized message has been pre-recorded by the MS 101 user, the Call on hold Ack 1405 message will contain the personalized message, i.e., the Call on hold Ack (personalized message) 1405 message will be provided from the NSP 106 to the VAP 103.

When the VAP 103 places the call on hold, it may direct, for example, its own DSP (digital signal processor) to send a message and/or white noise (comfort noise such as music)

1406 to the calling party and/or the MS 101. The message and or white noise can be used to let the parties know that the call is still active and on hold. During the period that white noise is sent to the MS 101, the MS 101 can continue to transmit traffic frames, but the VAP 103 will ignore the frames. Further, the VAP 103 may also ignore voice traffic transmitted from the calling party.

When the MS 101 user generates an unhold command by, for example, pressing the hold button again, the MS 101 transmits an IS-136 Call-Unhold Request 1407 message on the FACCH to VAP 103. Upon receipt of the request message, the VAP 103 performs several actions. The VAP 103 informs the NSP 106 that an active call has been resumed 1409 and also instructs its DSP to stop generating white noise, if provided. The VAP 103 again begins to process traffic frames (e.g., voice traffic) received from the MS 101 and sends the frames to the calling party and again process voice traffic 1408 from the calling party directed to the MS 101. The VAP 103 also transmits a IS-136 Call-Unhold Request Ack 1408 acknowledge message to the MS 101 to indicate that the call is resumed.

Figure 14B:
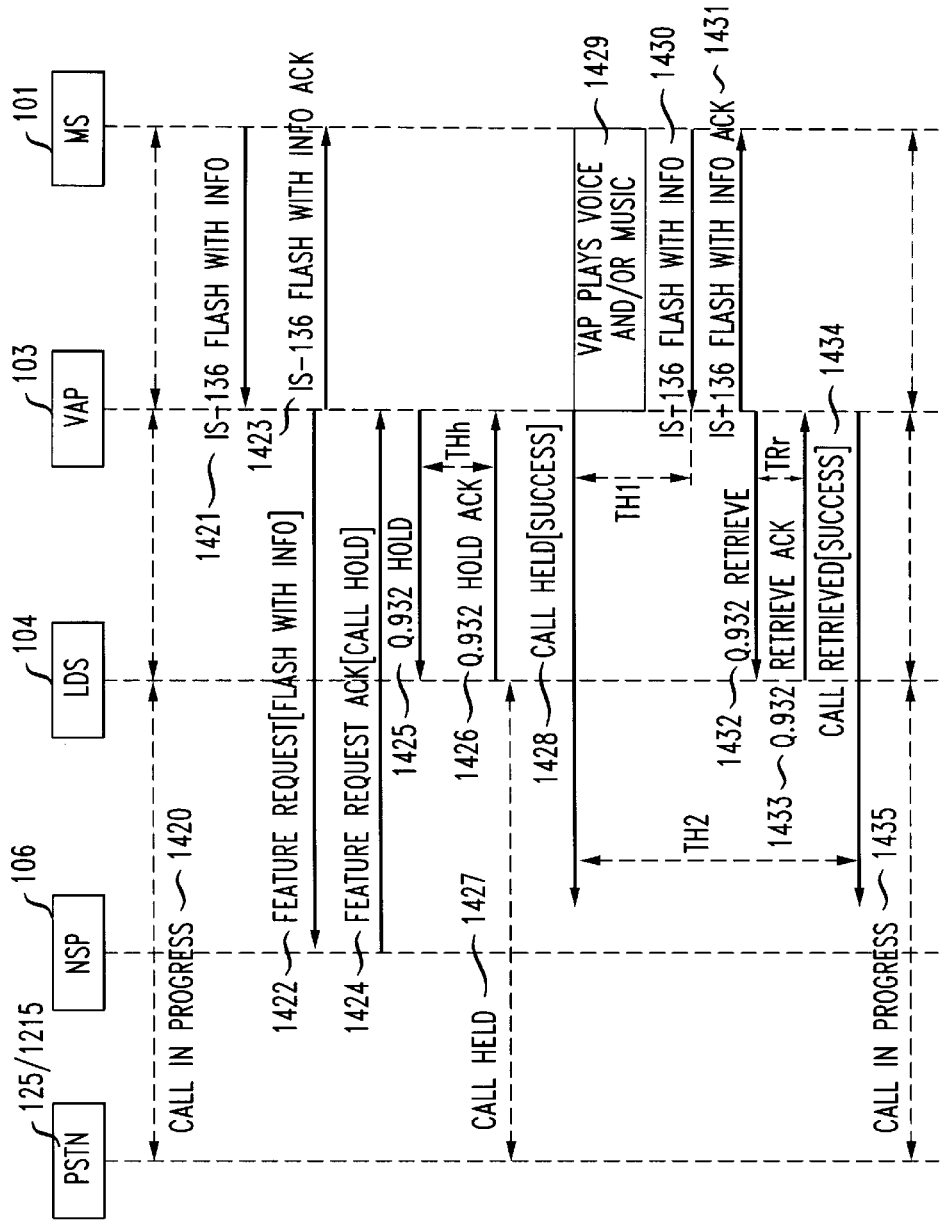
FIG. 14B shows a second exemplary call flow for the feature of call hold/unhold during an active call in accordance with another illustrative embodiment of the present invention.

FIG. 14B shows the call flow for a second preferred embodiment illustrating implementation of the call hold/unhold feature performed on an active call. For simplicity, this signaling flow only discusses how the system reacts to the feature when there is only one call for the MS 101. For interactions with other features, e.g. Three-way Call, refer to that section for more information.

First, the call is in progress, Call in progress 1420, and the MS user presses, for example, the send button on MS 101. An IS-136 Flash With Info 1421 message is sent to the VAP 103. The VAP 103 sends an IS-136 Flash With Info ACK 1423 message to the MS 101 and sends a Feature Request [FlashWithInfo] 1422 message to the NSP 106 which indicates that the MS 101 user is initiating a call hold. When the NSP 106 receives the Feature Request [FlashWithInfo] 1422 message from the VAP 103, it analyses the message and confirms that the mobile is not involved in a 3-way call. If the current call reference indicates that this is a three-way call, the Flash-With-Info message received by the NSP will be examined with different set of rules similar to those described in the section herein elated to conference calling. The NSP 106 then interprets the message as a request for Call old and validates that the MS 101 is authorized to the Call Hold feature. If the validation is successful, the NSP 106 sends a Feature request ACK [Call Hold] 1424 message to the VAP 103, the action field being designated as Call Hold. If the MS 101 is not authorized to use Call Hold feature, the NSP 106 ignores the Feature Request [FlashWithInfo] 1422 message. Further, the NSP 106 may, but not need, send a Feature Request NACK message to the VAP 103 because the VAP 103 has no action to take upon such a message. It may play a voice prompt or send a short message to the user in such a case for future releases of the feature.

Next, the VAP 103 sends Q.932 Hold 1425 message to the LDS 104 and starts a THh timer. In response, the LDS 104 sends a Q.932 Hold ACK 1426 message to the VAP 103 and the VAP 103 stops the THh timer. The call is placed on hold with the LDS 104, Call held 1427. However, if the VAP 103 receives a Q.932 Hold NACK message from the LDS 104 it will send out a Call Held [Fail] message to the NSP 106. Further, if the timer THh expires, the VAP 103 will log an error and send out a Call Held [Fail] message to the NSP 106.

Next, the VAP 103 sends a Call Held [success] 1428 message to the NSP 106, and if provisioned, plays a voice prompt to inform the user that the call is on hold and/or music (VAP plays voice and/or music 1429), and starts TH1 timer. However, if the NSP 106 gets a Call Held [fail] message form the VAP 103, it will modify the call information record (if needed) and the call will remain in a 'talk' state.

When the MS 101 user wants to retrieve the call it presses, for example, the send key or the hold key again on the MS 101 and IS-136 Flash with Info 1430 message is sent to the VAP 103. When the VAP 103 receives the IS-136 Flash with Info 1430 message, the VAP will look at the appropriate record to find that this message has come for a call which is currently on hold. The VAP 103 stops the TH1 timer and sends back an IS-136 Flash With Info Ack 1431 message to the MS 101. Since the VAP 103 has determined that this is a request to retrieve the held call, it sends a Q.932 Retrieve 1432 message to the LDS 104 and starts the TRr timer. However, if the TH1 timer expires, the VAP 103 shall play a voice prompt (optional) to the user informing him that the call is being disconnected. It shall then follow, for example, the VAP 103 OA&M Release procedure and release the call.

When the VAP 103 receives a Q.932 Retrieve ACK 1433 message from the LDS 104, it cancels the TRr timer and sends a proprietary Call Retrieve [success] 1434 message to the NSP 106. However, if the VAP 103 receives a Q.932 Retrieve NACK message from the LDS 104, it will send out a Call Retrieved [Fail] message to the NSP 106. Further, if the timer TRr expires, the VAP 103 will log an error, send out a Call Retrieved [Fail] message to the NSP 106 and initiate, for example, a VAP 103 OA&M Release procedure.

Then, the NSP 106 modifies the call record information to indicate that a call is in progress with MS 101. If the NSP 106 receives a Call Retrieved [fail] message from the VAP 103, it shall stop the TH2 timer and update its call information record. Further, if the timer TH2 expires, the NSP 106 will initiate, for example, an OA&M Release procedure. Finally, the call is retrieved and resumes as Call in progress 1435.

As indicated above, another embodiment of the call hold feature/function may include the use of a personalized message to be used prior to, or in place of, a system default voice prompt and comfort noise (e.g., music) when a call is placed on hold. The MS 101 user may use the VPU 1235 to record personalized messages for the call hold feature/function. If the MS 101 user enters a special feature access code, for example *70, to initiate recording a personalized message recording in the VPU 1235, the NSP 106 validates the MS 101 and assigns call resources to the MS 101. Then the VPU 1235 prompts the user to record their personalized greeting. Once the greeting is completed, the NSP 106 stores it in, for example memory 1240, for the MS 101 user in their subscriber profile. Next, the NSP 106 frees the call resources. If the user wishes to modify or delete their personalized greeting they may enter another feature code, for example *71.

When the user is on an active call and invokes the call hold feature/function, a message is sent by the VAP 103 to the NSP 106 indicating invocation of the feature. In response, the NSP 106 checks against the subscriber DB stored in, for example memory 1240, to determine if there is a personalized greeting available for the MS 101 user that may be used for a call hold. If there is a personalized greeting for the MS 101 user, the NSP 106 sends it to the VAP 103 and may be included as part of a call hold acknowledgement message. When the VAP 103 receives the call hold acknowledgement message, if there is a personalized greeting for MS 101, it will play that to the calling party of PSTN 125/1215. If there is no personalized greeting for the MS 101 user, the NSP 106 may send a call hold acknowledgement message without any personalized message and the VAP 103 will play some other default message, for example, a system default generic message indicating that the call has been placed on hold. In either case, the VAP 103 may subsequently play comfort noise, e.g. music to the calling party placed on hold. Alternatively, the VAP 103 may play the comfort noise to both parties without any prior message. Although this personalized greeting feature is described with respect to call hold, it may also be used in conjunction with call screen and distinctive ringing feature/functions as well.

Figure 15:
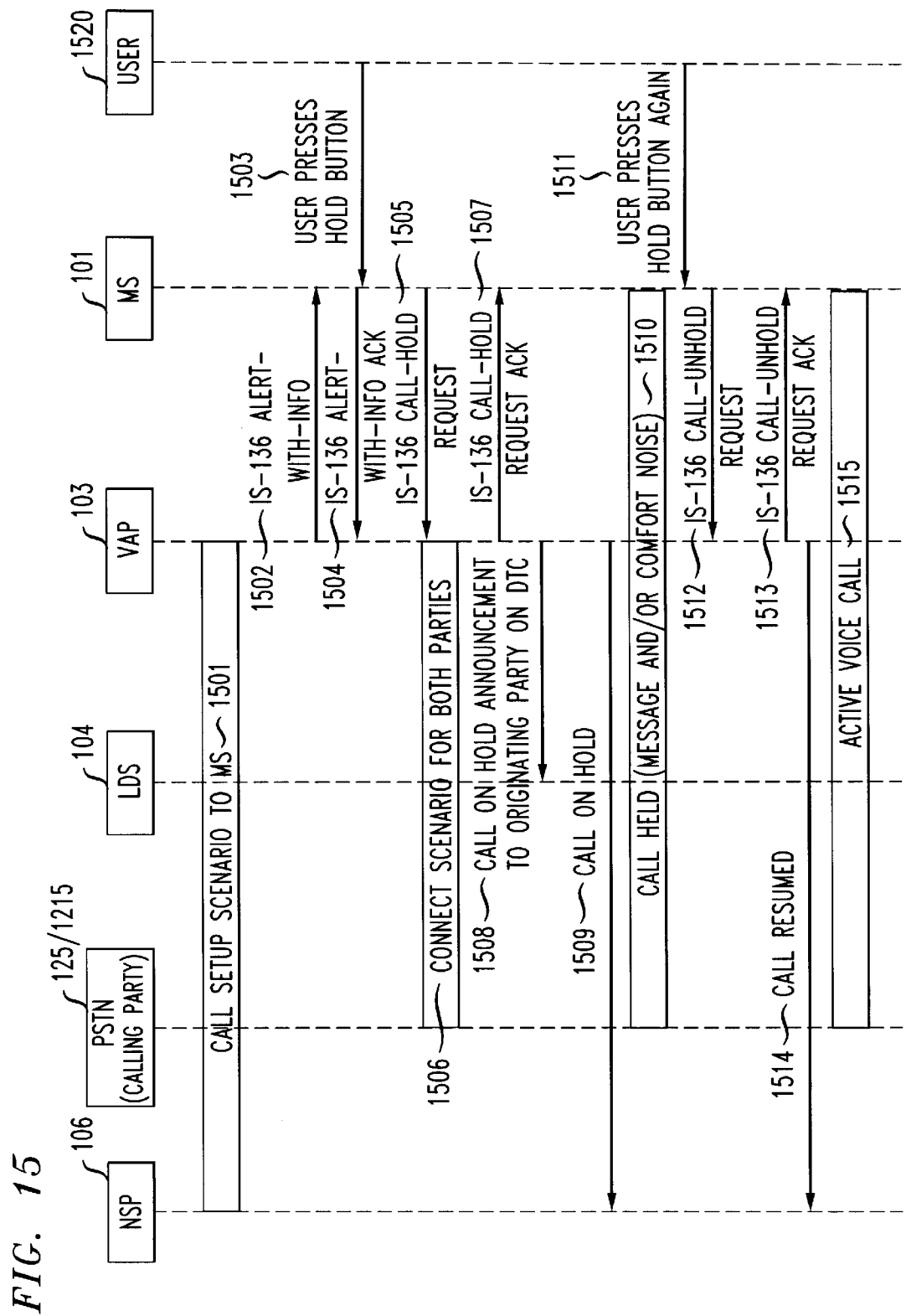
FIG. 15 shows another exemplary signal flow for the feature of call hold/unhold of an unanswered incoming call in accordance with an illustrative embodiment of the present invention.

FIG. 15 shows the call flow for an illustrative implementation of the call hold/unhold feature for an unanswered incoming call. As with FIG. 13, it will be assumed that a calling party (e.g., telephone 1215) coupled to the PSTN 125 (or at the same LDS) dials the phone number (DN) of the mobile unit MS 101 and MS 101 is within the transmission service picocell area of the WCS.

When the mobile unit MS 101 receives an incoming call, the mobile unit MS 101 can alert the user of the incoming call by, for example, ringing or other audible noise or alerting methods. Also, caller ID information can be provided that shows up on a display of the mobile unit MS 101. FIGS. 5 and 13, as discussed above, shows the call flow for delivery of and answering of an incoming call. However, rather than answer the incoming call the mobile station MS 101 user can decide to place the incoming call on hold before answering it (i.e., before pressing, for example, a send key (e.g., talk, on, yes, answer, etc.) on MS 101 and initiating a personal conversation with the caller). Rather than answer the call immediately, the mobile station MS 101 user can accept the call without answering it by first putting the incoming call on hold as described below.

Upon being alerted of the incoming call, a user 1520, not wishing to answer the call immediately, can generate a hold command by, for example, pressing a hold button on the mobile unit MS 101 or entering a feature code (e.g., *95). When the user inputs a hold command, the call is accepted (i.e., connected) and put on hold rather than being answered and a voice path being cut to the mobile station MS 101. However, when the call is accepted, resources including a traffic (e.g., voice) channel are allocated for the call and white noise or an announcement will be provided. Also, the call is connected in the same manner as described above and shown in FIGS. 5 and 14 illustrated as step 1506. The VAP 103 receives a call hold request via an IS-136 Call-Hold Request 1505 message from the mobile unit MS 101 and sends, for example, a personalized message or a default message, e.g., a generic system call on hold announcement to the calling party (Call on hold announcement to originating party on DTC 1508). The VAP 103 also sends an IS-136 Call Hold Request ACK 1507 acknowledge message to the mobile unit MS 101 and notifies the NSP 106 that the mobile unit MS 101 has put the call on hold (call on hold 1510). Thus, the call is placed on hold with the VAP 103 and the VAP notifies the NSP 106 using the Call on hold 1509 message.

A DSP in, for example, the VAP 103 may send a message or comfort noise (i.e., white noise such as music) to the user of the mobile unit MS 101 and to the calling party while the incoming call is on hold. In the alternative, the VPU 1235 may play a short message (announcement) sent to the VAP 103 via a call on hold Ack message indicating the call is on hold prior to the DSP sending a system default message or comfort noise. While the call is on hold, the mobile unit MS 101 can continue to transmit traffic frames, but the VAP 103 will ignore the frames. Further, the VAP 103 may ignore voice traffic transmitted from the calling party (e.g., mute).

When the user of the mobile unit MS 101 desires to retrieve the held call, the user can generate an unhold command by, for example, pressing the hold button (or feature code) again 1511 on the mobile unit MS 101. In response, to a call unhold command, the mobile unit MS 101 sends an IS-136 Call-Unhold Request 1512 message on the FACCH to the VAP 103. The VAP 103 interprets this message and directs the DSP to stop sending white noise, if provided. In response to message, the VAP 103 begins to process traffic frames received from the mobile unit MS 101 and sends the same to the calling party. The VAP 103 sends a notification to the NSP 106 that the call is no longer on hold and has become active (call resumed 1514). Also, the VAP 103 begins processing the voice traffic from the calling party transmitted to the mobile unit MS 101, thus establishing an Active Voice Call 1515.

According to another illustrative embodiment of the present invention, the call hold button can act similar to a call mute button when a call is placed on hold, by for example pressing the hold button twice quickly. In this implementation, the mobile unit MS 101 can receive voice traffic from the calling party, while the calling party is muted from any voice traffic generated by the called party. In this instance, the calling party may receive white comfort noise when on hold. This call muting type functionality creates one way voice traffic transmission. Such an implementation may be beneficial in allowing the calling party to communicate a brief message to the called party at any time after the call has been placed on hold. Thus, if a calling party has an emergency message or an important message that cannot wait, the called party may receive this message in real time.

In one embodiment a call hold announcement may be played by the NSP or the VAP to the called party or an alert is provided to the called party to remind them that the call is on hold. During the announcement to the called party, the one-way communication line can be temporarily shut off or optionally open for voice traffic. As previously noted, a call hold announcement may also be sent to the calling party. The call hold announcement may be repeated to the calling party and/or the called party at predefined intervals (e.g., every 30 seconds) subsequent to initiation of the call hold.

Furthermore, in another embodiment, the call hold feature may allow a calling party to interactively transfer to a voice mail system or send an alphanumeric message to the called party rather than simply wait on hold. For example, when a call is on hold the VPU 1235 can notify the calling party the they may leave a message in the called party voice mail by entering a particular set of key strokes (e.g., *34#) or enter any alphanumeric message using their telephone key pad. The NSP 106 will respond to the input by the calling party and instruct the LDS 104 to route the input accordingly to either the VMS 107 or the MS 101. A more detailed discussion of the announcement features and additional features related to user proactive call handling follows.

XI. User Proactive Call Handling

Another feature of the present invention provides user proactive call handling (UPCH) functionality. This feature allows a mobile telephone user to proactively handle a call in an intelligent wireless communications system. One aspect of this feature allows a user to process and terminate an incoming call in real time. Another aspect of the UPCH feature provides the ability to delay allocation of the voice channel to a called party until when, if at all, the incoming call to the called requires a voice channel.

According to an illustrative embodiment of the present invention, a subscriber is notified of an incoming call via a Short Message Service (SMS) message with caller ID or a user alert, such as a tone or ringing. Upon receipt of the alert, the subscriber may select from a series of options, how to process and terminate the incoming call. For example, if an incoming call is of high priority and requires immediate attention, the subscriber may decide to answer the call immediately. If the subscriber decides that the call does not require immediate attention, he may opt to provide a delayed answer. Such a delayed answer option can involve connecting the call to an announcement prior to answering the call. Still further, if neither of the prior options is suitable, then the subscriber may opt to send the call to a voice mail system, from which a recorded message can later be retrieved. Yet another option of terminating the call is to forward the call to another phone. In the event that the subscriber decides that the incoming call should not be answered, the subscriber may choose to reject the call. If the subscriber decides that none of the aforementioned options should be proactively taken, then a default option can be used to terminate the call. Such a default option may include, but is not limited to, forwarding the call, delaying the answer, sending the call to a voice mailbox, or rejecting the call. A detailed discussion of the systems and methods for implementing UPCH features/functions in a WCS follows.

The UPCH feature, like the call hold feature of the present invention, can be implemented using the illustrative communications system of FIG. 12. A public switched telephone network (PSTN) 125 is connected to plural communication networks, including one having a telephone 1215. The PSTN 125 can be coupled to a plurality of local digital switches, such as local digital switch (LDS) 104. The LDS 104 may be coupled to network server platform (NSP) 106 by an X.25 link 4 and an SS7 link 5. NSP 106 may include, among other elements, a controller 1230, a voice processing unit (VPU) 1235, memory 1240, and communications bus (CB) 1238. The NSP 106 provides voice access ports (VAPs) 103A, 103B of a wireless centrex system with control and related operations, administration, maintenance, and provisioning (OAM&P) functions. Control functions include, but are not restricted to, mobile station and mobility management, call control, and feature applications. The NSP 106 is responsible for, among other functions, network intelligence, validation, registration, mobility management, and serves as a message center.

The X.25 link 4 carries call control messages on the data channel (D-channel) between the NSP 106 and LDS 104 that are destined for the VAPs 103A and 103B. The SS7 link 5 between the NSP 106 and LDS 104 carries the AIN (Advanced Intelligent Network) messages that direct the LDS 104 for proper routing of call to a user who subscribes to wireless centrex system (WCS) services.

The LDS 104 may be connected to a remote digital terminal (RDT) 102 by a Bellcore standard GR-303 interface 1. The GR-303 standard defines digital transmission facility interface such as DS1 and/or SONET, concentration options between the integrated digital terminal (switch) 105 and the RDT 102 signaling options, and call processing and operations data links. Thus, the GR-303 interface 1 can be transported across metallic (e.g., T1, ISDN:PR1 or DS3) or fiber-optic (e.g., SONET OC3 or OC12) links. The GR-303 interface carries the voice traffic and the signal traffic for the LDS 104 and the NSP 106.

The PSTN 125 is also coupled to a mobile switching center (MSC) 1250. The MSC 1250 has functionality similar to the combination of LDS 104 and NSP 106, and operates to control a cellular telephone network. MSC architectures are known in the art, and it will be appreciated that any MSC may be adapted for use with the present invention. Plural base stations (BS), for example like the one BS 1255, are controlled by the MSC 1250. Mobile stations MS 101 can travel throughout the cellular network and into the WCS network. Depending on a number of factors, calls involving a mobile station are handled by a base station BS 1255 that provides cellular coverage for the area in which the mobile station is located. Handoff of calls involving the mobile station MS 101 from one base station BS 1255 to another base station BS 1255 is controlled by the MSC 1250 in a known manner. A mobile station MS 101 may be wirelessly coupled to BS 1255 as shown or alternatively to a VAP 103 for communication connection to other telephones within the entire PSTN, cellular telephone, and WCS configuration. Thus, the WCS can connect to a macro cellular SS7 network to support integrated mobility functions including terminal handoff and personal roaming features.

On the other hand, as illustrated in FIG. 1, a WCS can operate as a wireless system without being connected to a public macro cellular system, and thus not support mobility functions associated with the macro cellular system.

An illustrative implementation of the UPCH service of the present invention will be described in connection with a wireless centrex system. However, it should be understood to those skilled in the art that the UPCH service can also be supported in existing macro cellular systems. In such a system, the MSC 1250 can provide similar functionality to the NSP 106 plus the LDS 104, and a BS 1255 is functionally similar to a VAP 103.

Figure 16:
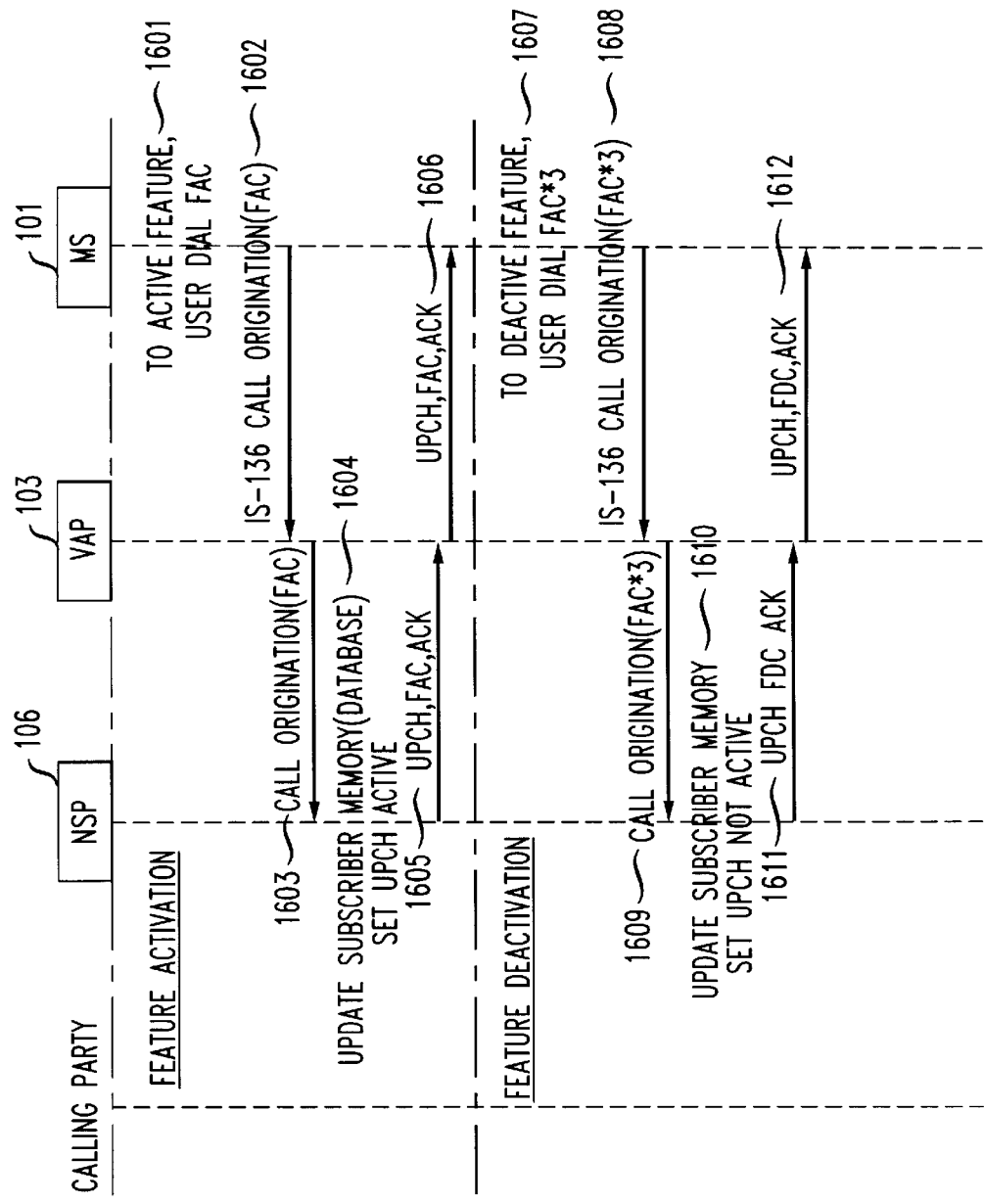
FIG. 16 shows an exemplary user proactive call handling signal flow diagram for the activation and deactivation of the UPCH feature in accordance with an illustrative embodiment of the present invention.

FIG. 16 provides an exemplary call flow diagram for activating the UPCH feature according to an illustrative embodiment of the present invention. To activate the UPCH service, a subscriber enters an Feature Activation Code (FAC) 1601 (e.g., *1) on his mobile station MS 101 and presses, for example, a SEND button or some other designated key stroke. An IS-136: Call Origination <FAC> 1602 message is sent to, for example, VAP 103A which forwards the message upstream through the RDT 102 and LDS 104 (not shown) to the controller 1230 of the NSP 106 as Call Origination <FAC> 1603 message. The controller 1230 updates information for the subscriber in memory 1240 that includes a database, and sets the UPCH service feature active for the subscriber at step 1604.

The controller 1230 of the NSP 106 then sends UPCH FAC ACK 1605 acknowledgment message back to the subscriber's mobile station MS 101A through the LDS 104, RDT 102 (not shown) and VAP 103A (UPCH FAC 1606). After the acknowledgement signal has been received a character on the mobile station MS 101A, for example on a display screen, may be illuminated to indicate that the UPCH service is active.

The database in memory 1240 may contain, among other things, a profile for each subscriber including services available to the subscriber and preferences of the subscribers which can be dynamically changed by a subscriber telephonically, over the Internet, or otherwise.

If a subscriber desires to deactivate the UPCH feature, the subscriber can enter a feature deactivation code FDC (e.g., the AFC code plus *3) and press, for example, the SEND button on his mobile station MS 101 as shown in step 1607. An IS-136 Call Origination <FAC*3> 1608 message having the feature deactivation code is then sent upstream to the controller 1230 of the NSP 106 by way of, for example, the VAP 103, RDT 102, (not shown) and LDS 104 (Call Origination <FAC> 1609). The controller 1230 of the NSP 106 updates the subscriber's profile in memory 1240 by setting a UPCH feature flag inactive. The controller 1230 of the NSP 106 may then send an acknowledgment message, UPCH FDC ACK 1611, back to the subscriber's mobile station MS 101A through, for example, the LDS 104, RDT 102 (not shown) and VAP 103A (UPCH FDC ACK 1612). After the acknowledgement signal has been received by the MS 101, an UPCH indicator on the mobile station MS 101A may be turned off to indicate that the UPCH service is inactive.

Figure 17:
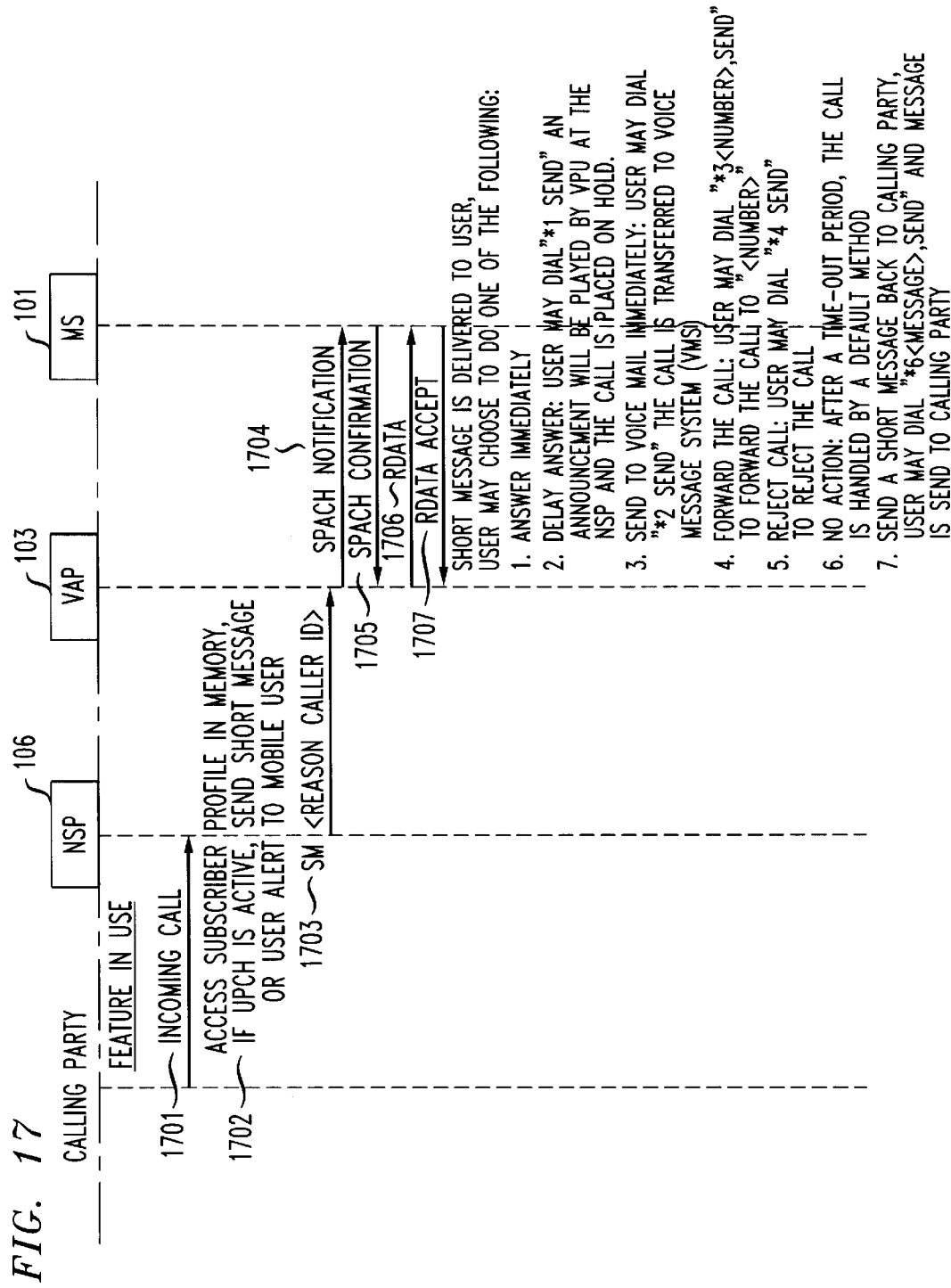
FIG. 17 shows an exemplary user proactive call handling signal flow diagram for handling an incoming call when the UPCH feature is employed in accordance with an illustrative embodiment of the present invention.

Another illustrative implementation of the UPCH service feature will now be described in connection with call flow diagram of FIG. 17. An incoming call 1701 to a mobile station MS 101A is delivered to the controller 1230 of the NSP 106. The incoming call 1701 can originate anywhere in the communications network including from a caller in a cellular system (e.g., MS 101), wireless centrex system (e.g., mobile station MS 101B), the PSTN 125 (e.g., landline phone 1215), or any local and long distance network.

The controller 1230 retrieves profile information 1702 associated with the called party from the memory 1240. If the UPCH active flag is set for the called party, the controller 1230 can send a short message (SM) <Reason, Caller ID> 1703 to the VAP 103A with which the called party mobile station MS 101A has registered. The SM transmitted to the called party indicates that an incoming call exists and may further include caller ID data such as the calling party's name and/or number.

The short message may be transmitted to the called party in a portion of the DCCH known as a short message service channel (SMSCH). An exemplary implementation of the short message is described in the IS-136 EIA/TIA Interim Standard. The SMSCH can carry signal information for set up and delivery of short alphanumeric messages from the NSP 106 to the mobile station 101A of the called party. The SMSCH is a logical sub-channel of the SMS point-to-point messaging, paging, and access response channel (SPACH), which is a logical channel of the DCCH. The DCCH operates on a set of frequencies separate from those used to support cellular conversations, which may be carried on the DTC.

After the SM 1703 is received by the VAP 103A at which the called party's mobile station MS 101A is registered, according to this illustrative embodiment, the VAP 103A follows the IS-136 specification by first sending a SPACH Notification 1704 message to the called party's mobile station MS 101A. The mobile station MS 101A sends a SPACH Confirmation 1705 acknowledgement message to VAP 103A and then the VAP 103A sends RDATA 1706 message including the short message SM to the mobile station. Thereafter, the mobile station MS 101A acknowledges receipt of RDATA by sending RDATA Accept 1707 message back to the VAP 103A.

When the short message is delivered to the called party, it is displayed on the called party's mobile station MS 101A. Thus, the called party knows that an incoming call exists and the identity of the caller through the caller ID information displayed on the called party's mobile station. The called party then can decide how to handle the incoming call. Options available to the subscriber may include: a) answer the call immediately; b) delay answering the call; c) immediately forward the call to voice mail; d) forward the call to another number; e) reject the call; f) send a short message to the calling party; and g) take no action. The calling party can select an option by, for example, pressing one or more keys on the mobile station keypad of pressing a touch screen. A discussion of the operation of some of the possible mobile station MS 101 user UPCH selections follows.

According to a first aspect of the UPCH feature implementation, when the called party desires to answer the incoming call immediately he depresses a button or key (e.g., TALK or SEND) at the mobile station MS 101A. A call origination message is then transmitted upstream in the DCCH to the VAP 103A and up to the LDS 104 and NSP 106. The NSP 106 immediately allocates a voice channel between the LDS 104 and the mobile station 101A that connects with the voice path previously established between the calling party and LDS 104 when the calling party first initiated the call, to thus establish a point-to-point voice channel between the calling and called party. High priority may be given to the called party's request for a voice path e.g., a DTC channel may be quickly allocated.

Figure 18:
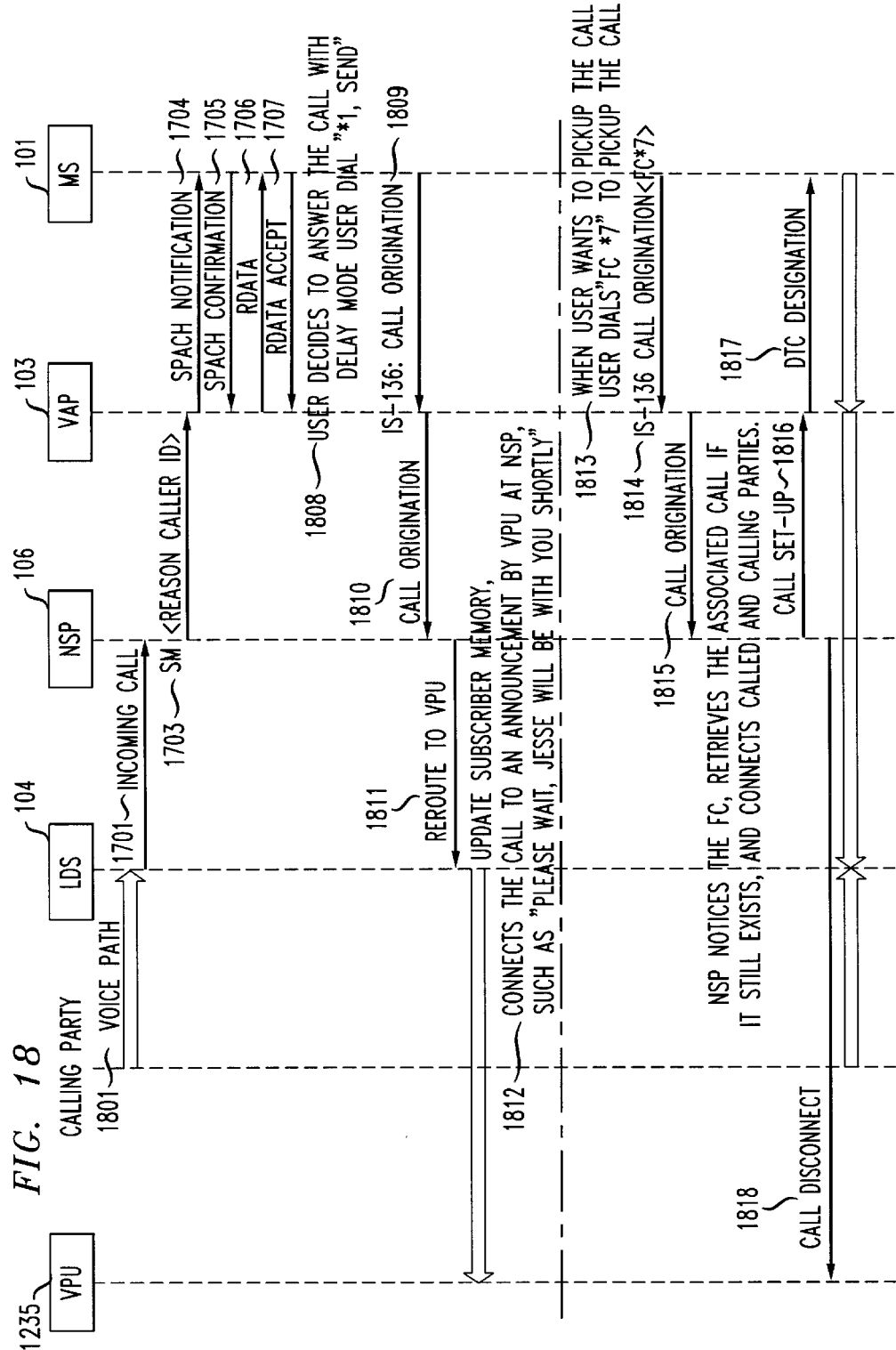
FIG. 18 shows an exemplary proactive call handling signal flow diagram for the delay answer call feature in accordance with an illustrative embodiment of the present invention.

According to a second aspect of the UPCH feature, a MS 101 user may chose to delay answer of a call and would enter a different function code, for example, pressing "*1, Send". This key stroke would forward the incoming call to an announcement stored in the voice processing unit (VPU) 1235 of the NSP 106. FIG. 18 shows an exemplary call flow diagram for the delay answer call option in accordance with an illustrative embodiment of this aspect of the present invention.

First, an incoming call is provided with a voice path 1801 between the calling party and LDS 106. The LDS 106 passes the incoming call 1701 including a route query to the controller 1230 of the NSP 106. The controller 1230 retrieves the profile of the called party from memory 1240. If the UPCH service is active for the called party, a short message SM <Reason, Caller ID> 1703 is sent to the mobile station MS 101. As described above and shown in FIG. 17, steps 1704–1707 follows and the user is provided an opportunity to determine in real time how to handle the incoming call.

The called party receives the message and decides that he wants to answer this call after some delay. So the called party enters a delay answer feature code such as "*1 SEND" 1808 and an IS-136: Call Origination 1809 message, with "*1" as the keyed input, is sent upstream to the NSP 106 by way of VAP 103A (Call Origination 1810). The controller 1230 receives the message, updates the called party's database in memory 1240 with current status information, and instructs the LDS 104 using Reroute to VPU 1811 to connect the calling party's voice path to the VPU 1235. The VPU 1235 plays a brief message, such as "Please wait, [the called party name] will be with you shortly" in step 1812 and places the call on hold (with or without white noise generated by a DSP).

When the called party subsequently becomes available and desires to be connected with the on hold calling party, he enters a key feature code such as "*7 SEND" in step 1813. An IS-136: Call Origination <FC*7> 1814 message, with "*7" as the feature code, is sent to VAP 103A which forwards the Call Origination 1815 message to NSP 106. The controller 1230 of the NSP 106 receives the message, updates the status of the called party in memory 1240, and retrieves the active call information. If the calling party is still holding, the controller 1230 instructs the VAP 103A to barge into the voice path established between the calling party and VPU 1235 (or DSP), establishing a three-way connection. Then, the controller 1230 instructs the VPU 1235 (or DSP) to disconnect from the voice path using Call Disconnect 1818 message, leaving the called party and calling party on the voice path. If the calling party is not on hold, the NSP 106 can instruct the VAP 103A to dial the last incoming call in the called party's record in memory 1240.

According to another aspect of the UPCH feature, a mobile station user can in real time forward an unanswered incoming call to voice mail by entering a function code, for example by pressing "*2, SEND". In this instance, an origination message with "*2" is sent upstream in the DCCH to the LDS 104. The LDS 104 then routs the call to a VMS 107 coupled to the LDS 104, where the calling party can leave a voice message.

Similarly, according to a further aspect of the UPCH feature, a mobile station user can in real time forward an unanswered incoming call to another DN or extension by entering a function code, for example by pressing "*3, and [the number of the forwarding location], SEND". The id number of the forwarding location is transmitted upstream to the LDS 104 and NSP 106 which examines the id number to which the call is to be forwarded. If the id number matches a number in the system associated with LDS 104 or LDS 104A, etc., the call is processed accordingly. Otherwise, the call is routed through, for example, the PSTN 125 to the appropriate end DN to receive the call.

According to another aspect of the UPCH feature, a mobile station user can in real time reject an unanswered incoming call by entering a function code representing a rejection key sequence, for example, "*4 SEND". In response, an origination message with "*4" is sent upstream to the LDS 104 and NSP 106 in the DCCH. A message indicating that the called party is not currently accepting calls may be issued by, for example, VPU 1235, to advise the calling party or by the VAP. Alternatively, a tone may be transmitted from the LDS 104 to the calling party when the LDS 104 and/or NSP 106 detect a call reject flag.

According to still another aspect of the UPCH feature, a mobile station user can in real time create a short message and send it to the calling party of an unanswered incoming call by the called party entering a function code along with a message, for example, "*6, [a brief alphanumeric or voice message], SEND". The short message travels upstream in the DCCH to the LDS 104 and NSP 106, where it is transmitted downstream to the calling party. Voice synthesis in the VPU 1235 or DSP in the VAP 103 may be used to convert the alphanumeric message to a voice message. This feature may be particularly advantageous when the called party is busy and simply wants to communicate a brief real time message such as "Call you back in ten minutes" or "Meet me at home at 6:00".

According to a further aspect of the UPCH feature, the called party can also choose to take no affirmative action so that a default action is implemented after a prescribed time period in the which the called party has failed to respond lapses. Default conditions may include, but are not limited to, forwarding the call to voice mail or letting the call go unanswered. The default condition for a particular subscriber is defined in the subscriber profile stored in memory 1240 of the NSP 106. Thus, if the NSP 106 fails to receive any response from a called party, the NSP 106 will automatically process and terminate the call according to the called party's profile.

The UPCH service of the present invention can be integrated with an automatic call handling service, where based on certain criteria, a call can be handled automatically, and based on other criteria, a call can be handled by the UPCH service. For example, a user may want all calls forwarded to voice mail from 10:00 PM to 8:00 AM and from 8:00 AM to 10:00 PM desire to process and terminate calls proactively. Also, a user may want all calls originating from certain IDs to be handled automatically while the remainder of the calls can be processed and terminated proactively. Further, a called party may desire to process and terminate calls proactively based on the physical location of the called party (e.g., office v. home). All this information can be defined and programmed in the called party's profile in the memory 1240 so that the NSP 106 knows how to route an incoming call properly according to a user's predefined or system default preference settings.

According to another illustrative embodiment of the invention, the NSP 106 can transmit a user alert, such as a tone, over the control channel to the called party to apprise the called party of an incoming call. A user alert can be incorporated with or without the SM application of UPCH described above. In response to the user alert, the called party can process and terminate the incoming call in real time as described above. Different tones can be assigned in the called party's profile in the memory. 1240 so as to uniquely or specifically identify the calling party.

Further, the UPCH feature provides the ability to delay allocation of the voice channel to a called party until when, if at all, the incoming call to the called party requires a voice channel. This is carried out by allowing a called party to receive notification of an incoming call over the control channel and to return the selection of the call handling options upstream over the control channel. Thus, a voice channel need not be allocated until the called party decides to answer the call. This can be beneficial in wireless environments to prevent the unnecessary allocation of voice channels. Once the called party needs a voice channel, the incoming call has priority for available voice channels.

XII. Call Transfers

From time to time a telephone user, particularly a mobile phone MS 101 user, has need to transfer an active call to another telephone DN. Such situation arise when the other party needs to talk with someone else or would like to access a voice mail message in, for example, a VMS. In such instances the mobile station MS 101 user needs a quick, user friendly means to transfer the active call to another DN, i.e., the transfer-to DN (TransferDN).

The call transfer feature/function allows the WCS MS 101 user to transfer an active call to another DN. The transfer-to DN can be either inside or outside the WCS network. The two exemplary embodiments provided below illustrate the call transfer feature/function where an active call is transferred from a WCS mobile station (e.g., MS 10A) to another mobile station (e.g., MS 101B) or to a PSTN telephone (e.g., PSTN 1215), respectively.

Figure 19:
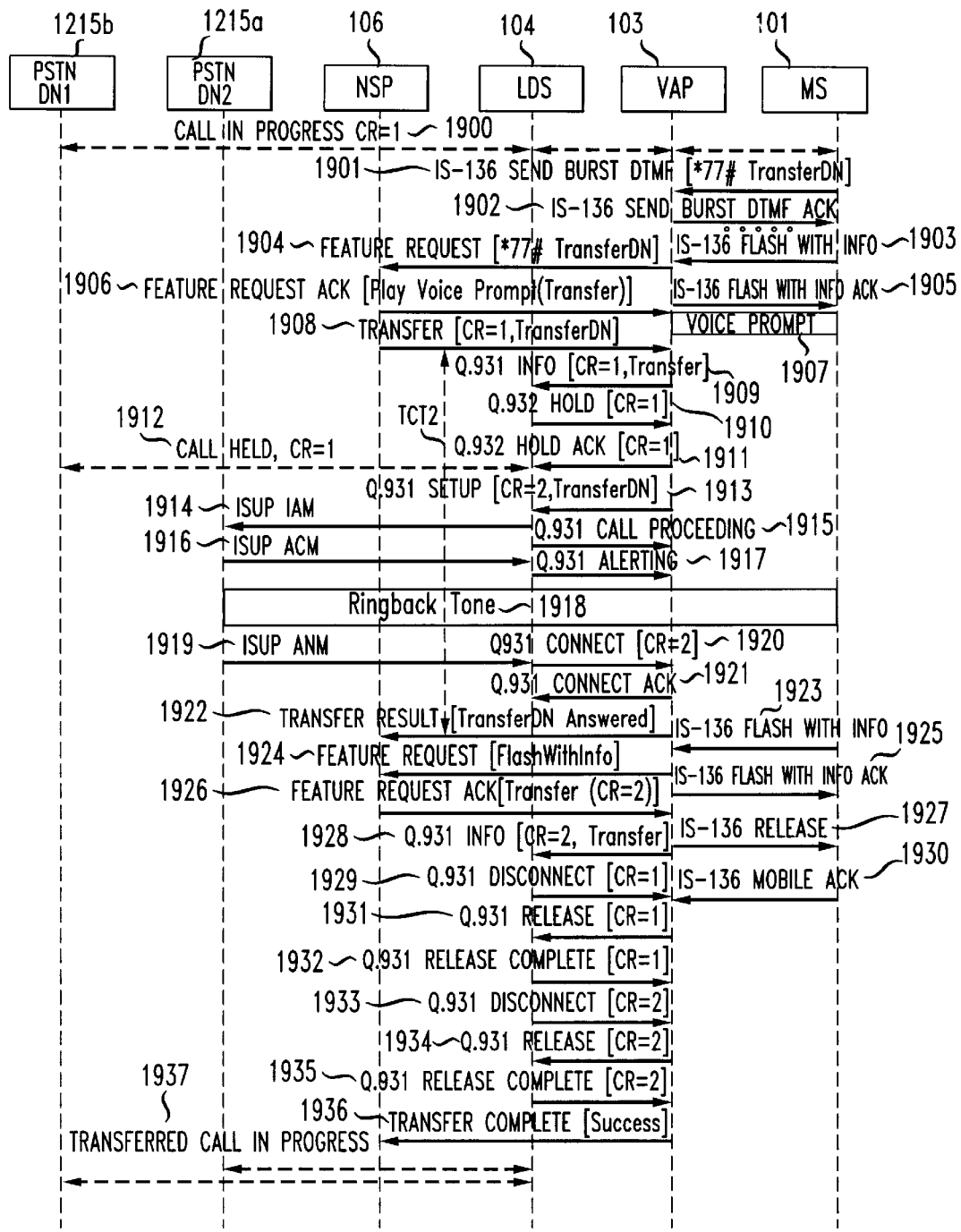
FIG. 19 shows a signal flow diagram for an exemplary call transfer to a PSTN telephone in accordance with an illustrative embodiment of the present invention.

Referring to FIG. 19, a first preferred embodiment for the call transfer feature/function shows a call transferred by a mobile station MS 101 user from mobile station MS 101 to PSTN DN2 (1215b) outside the WCS. Initially, it is assumed that a call between MS 101 and PSTN DN1 is in progress and the LDS 104 and VAP 103 identify this existing call as call reference 1 (Call in progress, CR=1 1900 shown as dashed lines at the top of FIG. 19). The MS 101 user may transfer an active call by entering a feature/function code for call transfer and digits associated with the DN to which the call is to be transferred. For example, the MS 101 user may enter on the MS 101 keypad the digits in the format of, for example, *77#TransferDN (the transfer-to DN is denoted as the TransferDN) and the "send" button. Each time a digit is pressed on the MS 101 a IS-136 Send Burst DTMF message is sent to the VAP 103 which in total is represented by the IS-136 Send Burst DTMF [*77#TransferDN] 1901 message, corresponding to all of the digits pressed. Then, by the MS 101 user pressing the "send" button, the MS 101 sends an IS-136 Flash With Info message to the VAP 103 indicating that the previously sent IS-136 Send Burst DTMF messages are complete and represent the end of the transmission representing a call transfer request.

Upon receiving each DTMF message from MS 101, the VAP 103 sends an IS-136 Send Burst DTMF ACK 1902 message to the MS 101. After receiving the Flash With Info 1903 message from MS 101, VAP 103 sends a unique Feature Request message including the collected digits to the NSP 106, e.g., Feature Request [*77#TransferDN] 1904 message. When the NSP 106 receives the Feature Request [*77#TransferDN] 1904 message it identifies that the digits *77# is the feature code for the Call Transfer feature. Then the NSP 106 analyzes the feature code digits and validates via the WCSD in, for example, memory 1240, whether MS 101 is authorized for the feature requested. If MS 101 is authorized to use the call transfer feature requested, the validation is successful and NSP 106 sends a Feature Request ACK [Play Voice Prompt (Transfer)] 1906 message to VAP 103 with the action as 'Play Voice Prompt' instructing VAP 103 to play an announcement/tone to the MS 101 user (and/or the PSTN DN1 1215b) indicating that a call transfer has been authorized (Voice Prompt 1907). Similar to the Call Hold feature/function procedure, the MS 101 and the PSTN DN1 1215b may be provided comfort noise by a digital signal process (DSP) to maintain continuity. However, if the validation of the Call Transfer feature/function request at NSP 106 is unsuccessful, the NSP 106 sends a Feature Request NACK (Not Acknowledged) message to VAP 103 prompting it to play an appropriate announcement/tone to the MS 101 indicating that the call transfer feature/function is not available and the call will not be transferred to the requested transfer-to DN (e.g., a Feature Request NACK [Play Voice Prompt (Transfer Not Allowed)] message is sent to VAP 103).

Once the call transfer has been authorized and the NSP 106 has sent a Feature Request ACK message to VAP 103, the NSP 106 sends a unique Transfer message, Transfer [CR=1, TransferDN] 1908, to the VAP 103 including the MSID of the requesting mobile station MS 101, the VAP ID to which the message is directed, the call reference number (e.g., CR=1) and the transfer-to DN, TransferDN, to execute the call transfer procedure. The NSP 106 also starts the TCT2 timer to ensure that the active call will not stay on hold indefinitely if for some reason the call is not properly transferred to the transfer-to DN.

In response to the Transfer [CR=1, TransferDN] 1908 message, the VAP 103 sends an information message, Q.931 Info [CR=1, Transfer] 1909, to LDS 104 to request the call transfer for the current call (CR=1). In return, the LDS 104 sends a Q.932 Hold [CR=1] 1910 message to the VAP 103. Then VAP 103 places the call on hold and sends a Q.932 Hold ACK [CR=1] 1911 message back to the LDS 104. VAP 103 also sends a Q.931 Setup [CR=2, TransferDN] 1913 message having the call reference CR=2 and the transfer-to TransferDN to the LDS 104. The LDS 104 initiates the ISUP connection to the TransferDN (PSTN DN2 1215a in the figure), and VAP 103 waits with the call on hold for the Q.931 Connect [CR=2] 1920 message from LDS 104. In establishing the call initiation with PSTN DN2 1215a, PSTN DN2 1215a (i.e., PSTN switch which services DN2) receives an ISUP IAM 1914 message from LDS 104 and VAP 103 receives a Q.931 Call Proceeding 1915 message from LDS 104. In response, PSTN DN2 1215a send an ISUP ACM 1916 message to LDS 104 and LDS 104 provides a Q.931 Alerting 1917 message to VAP 103. A Ringback Tone 1918 is provided to MS 101 so that the MS 101 user understand that the TransferDN is being alarmed as an incoming call. When PSTN DN2 1215a answers the call, an ISUP ANM 1919 message is sent to LDS 104. The LDS 104 recognizes that the incoming call has been answered by the PSTN DN2 and sends the Q.931 Connect [CR=2] 1920 message to VAP 103.

However, the MS 101 user can interrupt the call transfer before the called party at PSTN DN2 1212a answers (i.e., before the call is transferred), by for example pressing the send button on the MS 101 twice. In a situation when the MS 101 user is getting a busy signal or PSTN DN2 1215a is still ringing and the MS user presses the send button once, the message generated from the MS 101 will be ignored by the NSP 106. However, if the MS 101 user presses the send button twice within a short period of time (e.g., a one-second period) and the call has not yet been answered by the PSTN DN2 1215a (the ISUP ANM 1919 message and Q.931 Connect [CR=2] 1920 message have not been generated), the NSP 106 identifies that the MS 101 is requesting to retrieve the held call and terminate the call transfer. Thus, in response the system will retrieve the original call (CR=1) and release the second call (CR=2).

Assuming that the MS 101 user does not interrupt the call transfer and the PSTN DN2 1212a answers, the PSTN DN2 1215a sends the ISUP ANM 1919 message to LDS 104 and the LDS 104 sends the Q.931 Connect [CR=2] 1920 message to the VAP 103. When the VAP receives the Q.931 Connect [CR=2] 1920 message from the LDS 104, it acknowledges connection with the PSTN DN2 and sends a Q.931 Connect ACK 1921 message back to LDS 104 and sends a Transfer Result [TransferDN, Answered] 1922 message to NSP 106 informing the NSP 106 that the TransferDN has answered. The unique Transfer Result message includes the MSID, VAP ID, Call Reference Number (e.g., CR=2), and Cause (e.g., success/fail).

When the NSP 106 receives the unique Transfer Result [Transfer DN Answered] 1922 message from VAP 103 informing that the TransferDN has answered, the NSP 106 updates the call transfer status and cancels the TCT2 timer. If the timer TCT2 expires =s before receiving the Transfer Result 1922 message, the NSP 106 shall deactivate the Call Transfer feature by sending a Feature Request NACK message (not shown) in response to the Feature Request from VAP 103. Then the VAP 103 shall send a Q.932 Retrieve [CR=1] message (not shown) to the LDS 104, which retrieves the held call [CR=1] and sends a Q.932 Retrieve ACK back to the VAP 103.

In the case that the Transfer Result [Transfer DN Answered] 1922 message is received by NSP 106 with the Transfer DN Answered message, if the MS 101 user now presses, for example, the "send" button once, an IS-136 Flash with Info 1923 message is sent to the VAP 103 to initiate completion of the call transfer (connecting call CR=1 from the PSTN DN1 1215b to the LDS 104 to the call CR=2 from the LDS 104 to the PSTN DN2 1215a). In response, the VAP 103 sends a Feature Request [FlashWithInfo] 1924 message to NSP 106 to request completion of the call transfer and send an IS-136 Flash with Info Ack 1925 message to MS 101 to acknowledge the call transfer completion request by the MS 101 user. Then NSP 106 determines that this is a call transfer completion action request, and sends a Feature Request ACK[Transfer (CR=2)] 1926 acknowledgment message back to VAP 103 indicating that the Call Reference to be transferred equals to 2 (CR=2). VAP 103 then requests LDS 104 to complete the call transfer by sending a Q.931 Info [CR=2, Transfer] 1928 message to LDS 104, so that the LDS releases from the VAP 103 both call references (CR=1 and CR=2), the VAP 103 releases the RF to the MS, and the transferred call is left in progress between PSTN DN1 1215*b* and PSTN DN2 1215*a* (Transferred Call in progress 1937).

To release MS 101, VAP 103 sends an IS-136 Release 1927 message to MS 101. In response, MS 101 releases the voice channel air connection with VAP 103 and sends an IS-136 Mobile Ack 1930 acknowledgment message back to VAP 103 indicating that it has been released from the active call. To release VAP 103 from the active calls CR=1 and CR=2, LDS 104 sends a Q.931 Disconnect [CR=1] 1929 message and a Q.931 Disconnect [CR=2] 1933 message to VAP 103. VAP 103 responds by sending a Q.931 Release [CR=1] 1931 message and a Q.931 Release [CR=2] 1934 message to LDS 104. In return, LDS 104 sends a Q.931 Release Complete [CR=1] 1932 message and a Q.931 Release Complete [CR=2] 1935 message to VAP 103 to indicate that the LDS 104 has completed the call release process.

Once VAP 103 completes the Q.931 release procedures with LDS 104, it sends a Transfer Complete [Success] 1936 message to NSP 106 to indicate to the NSP 106 that the call is no longer active with mobile station MS 101 in the WCS. The Transfer Complete message includes the MSID, the VAP ID, the call reference numbers (CR=1, CR=2), and a cause (success/fail) field. At this point the call transfer process has been completed successfully and the active call has been transferred from PSTN DN1 1215*b* and MS 101 to PSTN DN1 1215*b* and PSTN DN2 1215*a*.

Figure 20:
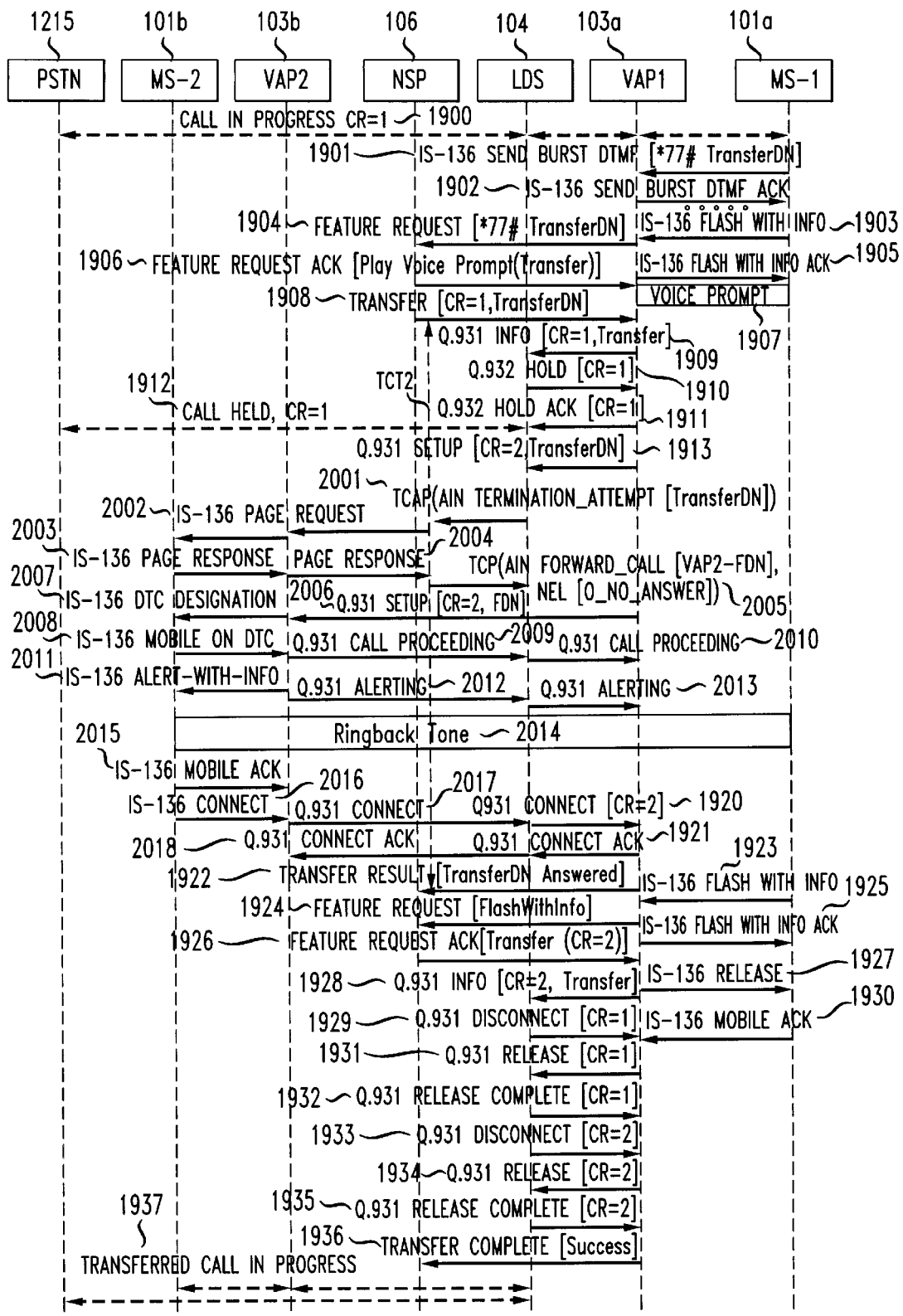
FIG. 20 shows a signal flow diagram for an exemplary call transfer to a mobile station in accordance with an illustrative embodiment of the present invention.

Referring to FIG. 20, a second preferred embodiment for the WCS call transfer feature/function shows a call transferred by a mobile station MS-1 101*a* user from mobile station MS-1 101*a* to another mobile station MS-2 101*b* within the WCS. In this embodiment, many of the signal flows in the call transfer process are the same as those in the first preferred embodiment for the call transfer feature/function and thus have the same number designations. The primary difference is the call setup procedure for setting up an incoming call to the second mobile station MS-2 101*b* and its related VAP, VAP2 103*b*, as described below.

The signal flow to initiate call transfer of an active call in progress from one mobile station MS-1 101*a* to another mobile station MS-2 101*b* in the same WCS is the same as the signal flow to initiate call transfer from a mobile station MS 101 to a telephone, PSTN DN2 1215*a* outside the WCS. As such, from the point at which a mobile station (MS-1 101*a*) user involved in an active call in progress (Call in progress, CR=1, 1900) enters the call transfer feature/function activation code by pressing the digits in the format of *77# with the desired transfer-to DN, TransferDN, followed by the "send" button (results in the MS-1 101*a* sending an IS-136 Send Burst DTMF[77# TransferDN] 1901 message to VAP1 103), up to the point when the active call is placed on hold (Call held, CR=1 1912) and the VAP1 103*a* sends the Q.931 Setup [CR=2, TransferDN] 1913 message is sent to LDS 104, the signal flows (1901–1913) are the same. Thus, in the second embodiment of the call transfer WCS feature/function of the invention, the call transfer is initiated by the MS, authorized by the NSP, and the active call is placed on hold (with appropriate prompt) awaiting further disposition by the WCS, for example, completed transfer of the held call to a second mobile station MS-2 101*b* as described below.

The Q.931 Setup [CR=2, TransferDN] 1913 message instructing LDS 104 to setup a second call with the transfer-to DN triggers an AIN query from LDS 104 to NSP 106 so that a TCAP (AIN Termination_Attempt [TransferDN]) 2001 message is provided to NSP 106. The NSP 106 verifies the location of the TransferDN within the WCS. Next, the MS-2 101*b* is paged with IS-136 Page Request 2002 message and the VAP1 103*a* waits for the Q.931 Connect [CR=2] 1920 message from LDS 104 (after the LDS 104 receives Q.931 Call Proceeding and Alerting messages). While VAP1 103*a* waits a voice channel connection with MS-2 is established as follows.

After MS-2 101*b* receives the IS-136 Page Request 2002 message, MS-2 101*b* send an IS-136 Page Response 2003 message to VAP2 103*b* and VAP2 103*b* sends Page Response 2004 message to NSP 106. This triggers an AIN message, TCAP (AIN Forward Call [VAP2-FDN], NEL [O_No-Answer]) 2005, sent by NSP 106 to LDS 104. As a result, the NSP 106 has provided routing instructions that direct LDS 104 to forward the active call on hold to the Forward Directory Number (FDN) of VAP2 (i.e., VAP2-FDN). NSP 106 has also indicated with this message its interest in event (O_No_Answer for VAP2-FDN) by sending next event list NEL [O_No_Answer]) information to LDS 104 in the Request component that accompanies the Routing component.

LDS 104 then starts a No Answer Timer (T(NoAnswer)) for VAP2-FDN (not shown) and sends an ISDN Q.931 Setup [CR=2, FDN] 2006 message to the VAP2 103*b*. VAP2 103*b* then sends a Digital Traffic Channel (DTC) Designation 2007 message to the MS-2 101*b* designating the traffic channel to be used and an ISDN Q.931 Call Proceeding 2009 message to the LDS 104 that triggers the Q.931 Call Proceeding 2010 message sent to VAP1 103*a*. MS-2 101*b* then tunes to the traffic channel and responds to VAP2 103*b* with an IS-136 Mobile on DTC 2008 message. VAP2 103*b* detects that the MS 101 is on the appropriate traffic channel. VAP2 103*b* then alerts MS-2 101*b* with an Alert-with-info 2011 message and MS-2 101*b* acknowledges with an IS-136 Mobile ACK 2015 message. VAP2 103*b* also sends an ISDN Q.931 Alerting 2012 message to LDS 104 which triggers a Q.931 Alerting 2013 message to VAP1 103*a*. Meanwhile, the LDS 104 is sending a Ringback Tone 2014 to MS-1 101*a* user.

When the MS-2 101*b* answers (before T(NoAnswer) timer expires) the MS-2 101*b* generates an IS-136 Connect 2016 message to the VAP2 103*b* and the VAP2 103*b* sends an ISDN Q.931 Connect message 2017 to the LDS 104 in response to the IS-136 Connect 2016 message from MS-2 101*b*. At this point the call transfer procedure continues the same as in the previous embodiment so that the MS-1 101*a* user can enter the appropriate key sequence to instruct the WCS to complete the call transfer process (steps 1920–1937). As a result, the active call in progress (CR=1) between PSTN 1215 and MS-1 101*a* is transferred so that the active call in progress is between PSTN 1215 and MS-2 101*b*.

It should be appreciated that transferring a call from a mobile station in one WCS to a mobile station in another WCS could also be achieved by the NSP 106 providing the LDS 104 with routing instructions including a FDN indicative of a VAP 103 and MS 101 in the other WCS. Such a case could be achieved using a procedure similar to the procedure illustrated in FIGS. 19 and 20.

XIII. Caller ID

The Caller ID feature of the present invention allows display on the MS 101 of the originating directory number for the calling party's desk top telephone (Calling Party Number, $DN_O$) and identity (e.g., name) for an incoming and/or active call, even if the call originates from another MS 101. Further, the Caller ID information may include location information, e.g., building number, derived from the forward directory number (FDN) of the originating VAP 103 ($VAP_O$). In addition, the Caller ID feature of the present invention may provide the location and identity of the called MS 101 to the calling party and displayed on the calling party's MS 101 during an active call. In either case, a Network Server Platform (NSP) 106 provides a MS 101 user's desk top phone directory number, $DN_O$, as their telephone number for Caller ID rather than the forward directory number (FDN) associated with an originating VAP 103, $VAP_O$ 103, with which the MS 101 is currently associated.

The caller ID or the calling party identification is the number associated with the phone from which the call is originating. The WCS Caller ID feature allows the calling party's phone number, identify, and related information to be displayed on the WCS mobile handset, MS 101.

Caller ID for a call originating from a PSTN 125 to an MS 101 in a WCS will occur much the same way that caller ID occurs entirely within a PSTN 125. The WCS Caller ID feature will present to the MS 101 in the WCS environment all the information that the PSTN 125 passes to the VAP 103, e.g., calling party telephone number and calling party name. However, if the PSTN 125 does not pass this info to the VAP 103, (e.g., caller id blocking), the VAP 103 can not, and does not, present any calling party information to the MS 101.

Caller ID for a call originating from a WCS MS 101 is different than caller ID for a call originating from a PSTN 125 because the MS 101 is wireless and is associated with the forward directory number of a VAP 103, rather than the directory number (DN) of a stationary telephone. Due to the wireless nature of the MS 101 and its association with a VAP 103 (or a number of different VAPs) in a WCS, Caller ID for calls originating from an MS 101 in a WCS requires unique treatment in order to provide a calling party telephone number and name which is recognizable. In the case that the WCS user has both a desk top telephone and a MS 101, the problem may be solved by the NSP 106 providing the users desk top telephone DN for Caller ID purposes, regardless of what VAP 103 the MS 101 is associated with at any point in time. Alternatively, if the MS 101 user does not have a desk top telephone within the WCS the NSP 106 may be programmed to provide any telephone number, for example the MS 101 user's home number, the business main number, or the FDN of the VAP 103 to which the MS 101 is currently associated. Although the Caller ID feature/function of the present invention will be described with respect to a call between one MS 101 and another MS 101 having the same NSP 106, one skilled in the art will recognize that Caller ID for an MS 101 originating a call may similar be provided if the mobile stations 101 have different NSPs 106 which can communicate so as to pass the Caller ID information to one another. The preferred embodiments of the WCS Caller ID feature/function provides calling party information to the called party (e.g., phone number, name, address, building number, etc.) for a call between two WCS users, e.g., an originating mobile station, $MS_O$ 101, and a terminating mobile station, $MS_T$ 101. This intelligence is managed by the NSP 106 and thus also enables called party information to be provided to the calling party, e.g., location of the called party. Three preferred embodiments are provided below: (1) the intelligence of the NSP 106 is used to correlate originating and terminating call legs of a call and sends the appropriate caller ID information; (2) an information element in the call control message, such as the Q.931 Calling Party Subaddress information element of the Setup message, is used to provide caller ID information; and (3) a signaling protocol that supports non-call associated temporary signaling for user to user data transfer, e.g., the Q.931 User Information message, is used to provide caller ID information. These embodiments are merely exemplary.

Providing the Caller ID features/functions for WCS to WCS calls can be simplified into two general tasks. First, the NSP 106 must be updated with the originating party information of every call that originates from a WCS MS 101. This can be done during the call origination and hence we categorize these tasks as being included in the call origination leg. To provide the terminating VAP, $VAP_T$ 103 with this information (the Caller ID information). These tasks can be categorized as the one that must be performed during the call termination leg.

A first preferred embodiment will now be described with reference to FIGS. 21A–21D. This embodiment depends on the intelligence of the NSP 106 to provide the correct Caller ID information. For a WCS (e.g., $MS_O$ 101) to WCS (e.g., $MS_T$ 101) call, the NSP 106 must perform the following two functions. First, the NSP 106 maintains originating party information of every originating call that terminates to a WCS user. Second, for every incoming call, the NSP 106 correlates the terminating leg of the call with the corresponding originating leg so as to retrieve the originating party information and pass this information to the terminating $VAP_T$ 103 to be provided to the terminating $MS_T$ 101. These functions require the NSP 106 to track the originating calls and match them to the correct terminating portion of the call.

As indicated above, providing caller ID information for this preferred embodiment splits the processing in two legs—the origination request (leg) and the termination request (leg). The information regarding the caller of each call originated is recorded at the NSP 106 and during the termination of any call (in this case within the WCS); the caller id related information is extracted based on the calling VAP's 103 FDN.

Figure 21A:
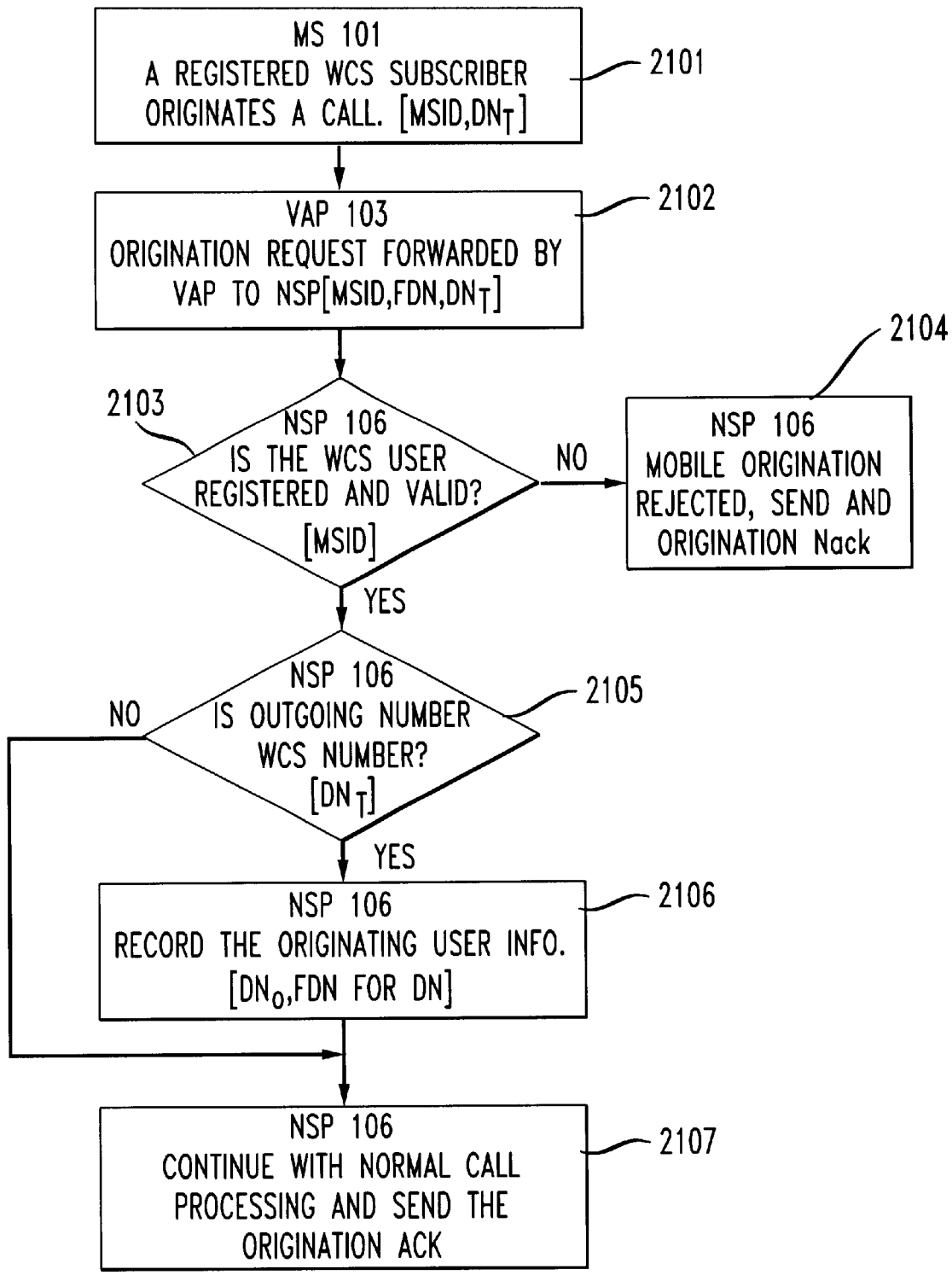
FIG. 21A illustrates a flowchart of an origination leg of a Caller ID information retrieval procedure for one preferred embodiment of the present invention.

Referring now to FIG. 21A, a flowchart for caller ID information retrieval procedure is provided and shows the origination leg of the WCS Caller ID feature/function according to a first preferred embodiment. When a call originates from a WCS subscriber's originating $MS_O$ 101 to another WCS subscriber's terminating $MS_T$ 101 (for simplicity, both $MS_O$ 101 and $MS_T$ 101 are served by the same NSP 106), as a first step in the origination leg, step 2101, the $MS_O$ 101 originates a call to $MS_T$ 101. Next, at step 2102 the VAP 103 will send the WCS origination request, which will contain the FDN associated with the serving VAP 103 to the NSP 106, along with the originating $MS_O$ 101 id, i.e. MSID. Then, at step 2103, the NSP 106 uses the MSID to determine whether the WCS user ($MS_O$ 101) is registered within the WCS. If not, the NSP 106 rejects the MS origination at step 2104. If the $MS_O$ 101 is registered with the WCS the NSP at step 2105 determines if the $MS_O$ 101 has called (requested) a WCS number as the terminating number $DN_T$. If not, the NSP 106 follows the normal call processing at step 2107 and sends an origination ack message. However, if the NSP 106 determines that the called termination number $DN_T$ is within the WCS, the NSP extracts the $DN_O$, i.e. the DN of the desktop associated with the MSID of the originating $MS_O$ 101 and records the originating user information along with the $DN_T$, at step 2106, in a Caller ID table. This mapping between the MSID and the corresponding DN can be found in the subscriber information in the WCS database (WCSD). Thus, the NSP 106 in step 2106 stores the $DN_O$ and the FDN information against the $DN_T$, i.e. the DN of the phone where the call has to terminate, in a record and subsequently continues the normal call processing by, for example, sending an origination acknowledgement message in step 2107.

Figure 21B:
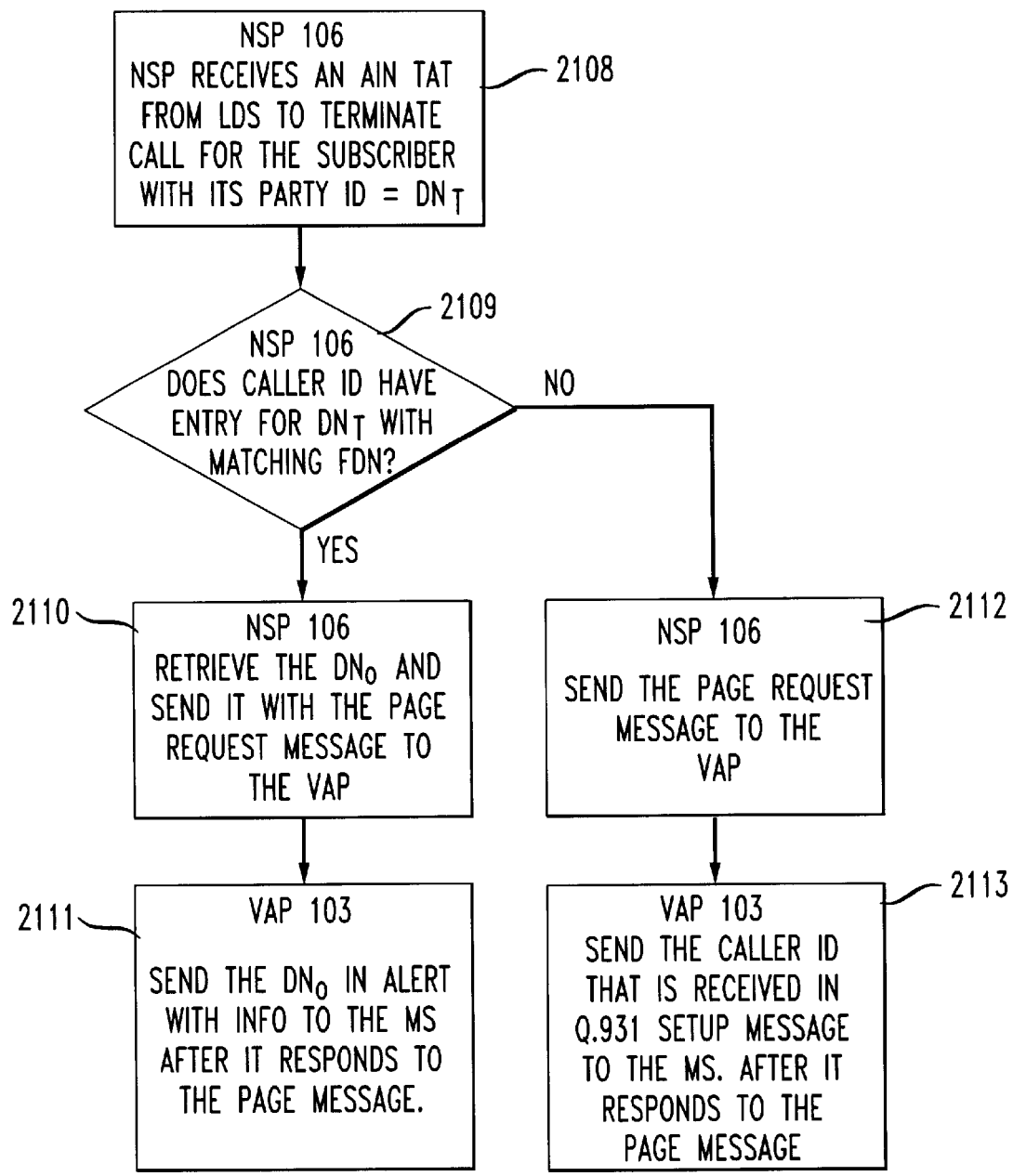
FIG. 21B illustrates a flowchart of a termination leg of a Caller ID information retrieval procedure for one preferred embodiment of the present invention.

Referring now to FIG. 21B, when the call comes to the termination leg the LDS 104 at step 2108 sends, for example, an AIN TAT message to the NSP 106 which includes, for example, the $DN_T$ and the FDN of the originating VAP, $VAP_O$ 103, information in it. Next, in step 2109, the NSP 106 checks to determine that the Caller ID table in the WCSD has an entry for the $DN_T$ which matches the originating FDN. If there is a match of the $DN_T$ and the FDN, the NSP 106 retrieves the caller ID information, for example, the desktop telephone directory number $DN_O$ for the originating mobile station, $MS_O$ 101, and sends it to the termination VAP, $VAP_T$ 103, in, for example, a page request message, as shown at step 2110. Then, the caller ID information, for example, $DN_O$, may be sent by the $VAP_T$ 103 to the $MS_T$ 101 in, for example, an IS-136 Alert with Info message. As a result, the $MS_T$ 101 will display the caller ID information, for example the $DN_O$, on the $MS_T$ 101.

On the other hand, if at step 2109, the NSP 106 does not find a caller ID match for the $DN_T$ with the originating FDN or there is no specified $DN_O$ within the database for $MS_O$101, the NSP 106 sends, for example, a page request message to the terminating $VAP_T$ 103 without a $DN_O$. Then, at step 2113, the $VAP_T$ 103 sends the calling party number contained in, for example, a Q.931 Setup message, which may be the FDN of the originating VAP. It should be noted that the $DN_O$ related information can be stored at the NSP 106, and can be used for the other features like call return, call screen etc for this call.

Clearing of the calling party number related information records from the NSP 106 may be handled as follows. The caller id related records are created during the call origination and may be cleared off during call termination. Certain information may be required to be updated at the NSP 106 before the caller id related record is cleared. For instance, the "last calling party number" is needed for call return feature; hence a field holding this value shall be updated. The caller id record for a call may be cleared from the NSP 106, if any of the following occur: (1) when NSP 106 has paged the MS 101 with the $DN_O$ information, (2) when a call fails during the origination attempt, (3) when the call is delivered to the desktop phone, and (4) when the call is treated as the waiting call in case of the call-waiting feature (that is, when NSP 106 notifies VAP 103 of call waiting. Furthermore, all the records may include a time stamp of the time when they are created, and the WCS may include periodic checking for the time stamps which are older than a certain amount of time, which if found, such records would be automatically and periodically cleared.

Figure 21C:
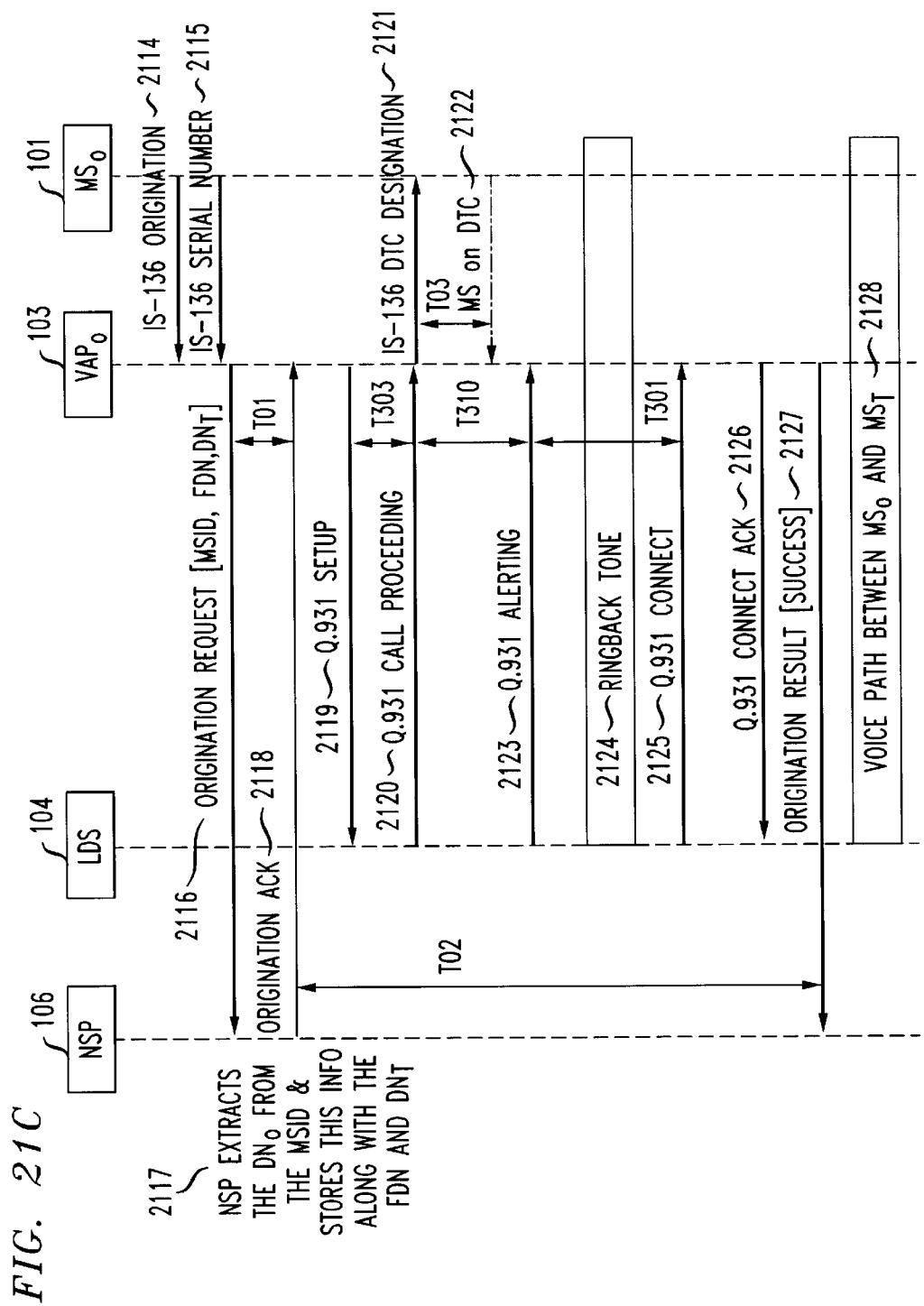
FIG. 21C illustrates a signal flow diagram for Caller ID information during call origination for one preferred embodiment of the present invention.
Figure 21D:
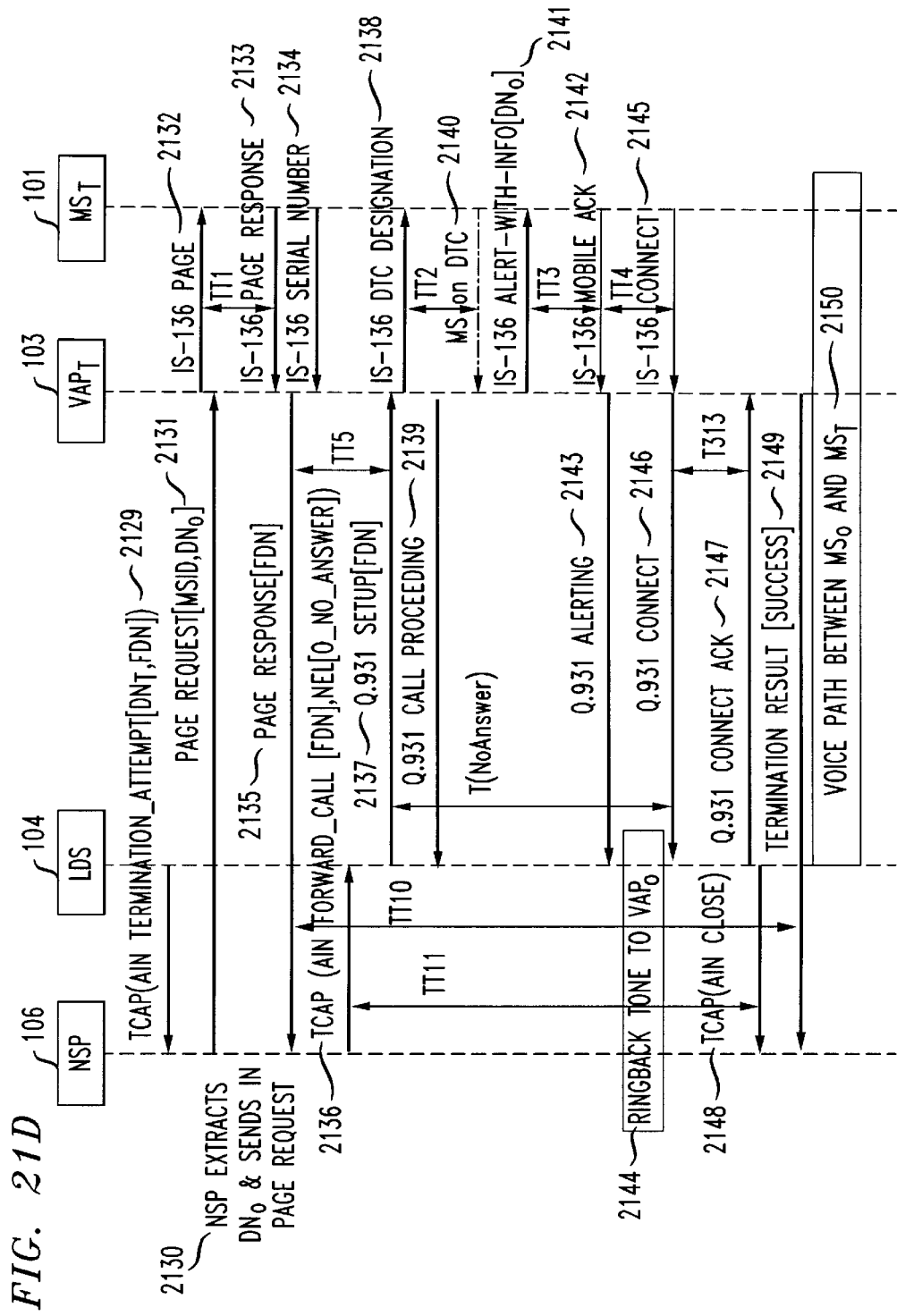
FIG. 21D illustrates a signal flow diagram for Caller ID information during call termination for one preferred embodiment of the present invention.

Referring to FIGS. 21C and 21D, exemplary signal flow diagrams are provided for a call origination and termination within the WCS for the first preferred embodiment of the Caller ID feature/function. As indicated by the flowcharts in FIGS. 21A and 21B, implementation of the Caller ID feature/function in this embodiment requires some additional things be done beyond the normal signal messages exchanges between VAP 103, NSP 106 and LDS 104.

An exemplary signal flow for the call origination leg of the first preferred embodiment for the Caller ID feature/function is illustrated in FIG. 21C. During call origination the originating WCS MS, $MS_O$ 101, requests for the call origination by sending an IS-136 Origination 2114 message including an MSID to the $VAP_O$ 103 followed by optionally an IS-136 Serial Number message 2115 which includes the electronic serial number (ESN) of the $MS_O$ 101. Then $VAP_O$ 103 sends an Origination Request 2116 message to the NSP 106. The Origination Request 2116 message contains the Called party id i.e., $DN_T$, the FDN of the originating $VAP_O$ 103, and the identification of the originating $MS_O$ 101 MSID and/or the ESN. The NSP 106 validates the originating $MS_O$ 101 and checks whether the termination directory number, $DN_T$ is a WCS subscriber. If it is, then NSP 106 searches the WCSD for a $DN_O$ of the $MS_O$ 101 associated with the MSID and, if one exists, extracts and records the $DN_O$ of the MSID as being correlated to the destination (termination) DN, $DN_T$, as indicated in step 2117. In other words, the NSP 106 retrieves the DN associated with the originating MSID, e.g., the $DN_O$, and records the FDN and the $DN_O$ against the called party DN, e.g., $DN_T$. Next, the NSP 106 sends the Origination Ack 2118 message. Subsequently, signaling 2119–2127, illustrate normal Call processing to completion of a voice path between the $MS_O$ and the $MS_T$ (2128). Thus, the signal flow for signaling 2119–2127 is similar to the usual origination call flow as described in the call processing section above (see, for example, FIG. 4 and its related description).

Referring now to FIG. 21D, an exemplary signal flow for the call termination leg of the first preferred embodiment for the Caller ID feature/function is illustrated. First, since in this case the incoming call is from another MS, $MS_O$ 101, within the WCS, a Q.931 setup message (triggered by, for example, Q.931 setup 2119 message) is received by the LDS 104 (not shown in figures). Alternatively, if the incoming call is from PSTN 125 an ISUP IAM message will be received by the LDS 104. In either case, the LDS 104 recognizes the incoming call as being directed to an MS 101 and thus sends an AIN TAT message, TCAP (AIN Termination_Attempt [$DN_T$, FDN]) 2129, to the NSP 106 so that the NSP 106 can provide information to the LDS 104 regarding the present location of the MS 101 associated with the termination directory number, $DN_T$, so as to properly route the call. As illustrated, the AIN TAT message will contain the $DN_T$, i.e., the called party ID, and the calling party number, which is the FDN of the originating $VAP_O$ 104 in the case where the call originates within the WCS.

Next, the NSP 106 attempts to match the originating terminal id, in this case the FDN of the originating $VAP_O$ 103 for this AIN TAT message, against the FDN, $DN_T$ pairs stored within its records (during the call origination leg). If there is a record with a matching FDN for the designated $DN_T$, the NSP 106 will extract the previously stored caller ID information, for example $DN_O$, from the WCSD and send it to the termination VAP, $VAP_T$ 103, in a Page Request [UMSID, $DN_O$] 2131 message. If no match is found, then $DN_O$ shall not be populated and the $VAP_T$ 103 shall receive the calling party number provided in the Q.931 setup message (e.g., a PSTN 125 DN or a VAP 103 FDN). In essence, if there are no records with matching FDN, then there is no special information sent to the $VAP_T$ 103 in the Page Request 2131 message and $VAP_T$ 103 will present the calling party number information it gets from the Q.931 messages to the $MS_T$ 101. In any case, the usual call processing procedures follows at steps 2131–2141.

Then at step 2141, the $VAP_T$ 103 sends the caller ID information to the $MS_T$ 101 to, for example, display the caller ID information to the $MS_T$ 101 user. In the case there is a match, the $VAP_T$ 103 sends an IS-136 Alert with Info [$DN_O$] 2141 message to the $MS_T$ with, for example, the $DN_O$ information and/or other caller ID information (from Page Request 2131 message or the Q.931 setup message) to provide the $MS_T$ 101 user with the caller ID information, which in the case is the caller ID information for the originating $MS_O$ 101 user (e.g., the $DN_O$ of the $MS_O$ 101 user's desk top telephone). If there is no match, the $VAP_T$ 103 sends an IS-136 Alert-with-Info 2141 message to the $MS_T$ 101 with the calling party number value from the Q.931 Setup 2137 message. Subsequently, at steps 2142–2150, the call processing for the Caller ID termination leg for this embodiment is similar or the same as those mentioned for a general call termination in the call processing section above (see, for example, FIGS. 5–7 and their related description).

A second preferred embodiment for the Caller ID feature/function will now be described with reference to FIGS. 21E–21H. This embodiment does not depend on the intelligence of the NSP 106 to provide the correct Caller ID information. Once again, this embodiment also splits the processing in two legs—the origination request (leg) and the termination request (leg). In this case the WCS relies on existing signaling protocol to forward the caller ID information without storing and subsequently matching the data in the WCSD for the originating $VAP_O$ 103 FDN and the termination $MS_T$ 101.

In this preferred embodiment, the caller ID information regarding the caller of each call originated (e.g., the $DN_O$ associated with the originating $MS_O$ 101) is sent by the NSP 106 to the originating $VAP_O$ 103 in, for example, the Origination Ack. The NSP 106 does not set up a record in the WCSD but merely extracts the caller ID information, for example the $DN_O$, from the WCSD and sends it to the originating $VAP_O$ 103. The $VAP_O$ 103 then sends the calling party caller ID information (e.g., $DN_O$) in an available field of an existing message sent to the LDS 104, for example, the subaddress IE of its Q.931 Setup message sent to the LDS 104. Subsequently, during the termination leg, the LDS 104 preserves and forwards this caller ID information to the terminating $VAP_T$ 103 in an existing call setup message, for example, in the subaddress IE of a Q.931 setup message that the LDS 104 sends to the terminating $VAP_T$ 103. This information can now be presented by the terminating $VAP_T$ 103 to the terminating $MS_T$ 101 through an existing call setup message, for example, an Alert with Info message. This general method of the second preferred embodiment is described in more detail below.

Thus, this approach is dependent on the ability of using an information element field of a call control message passed from the originating $VAP_O$ 103 to the destination $VAP_T$ 103. An example of this is the Q.931 Calling Party Subaddress field of the Q.931 Setup message. This field can be use to carry caller ID information regarding the calling party, such as the DN of the desktop phone associated with the originating MS, caller's name, caller's address, caller's location, etc.

Figure 21E:
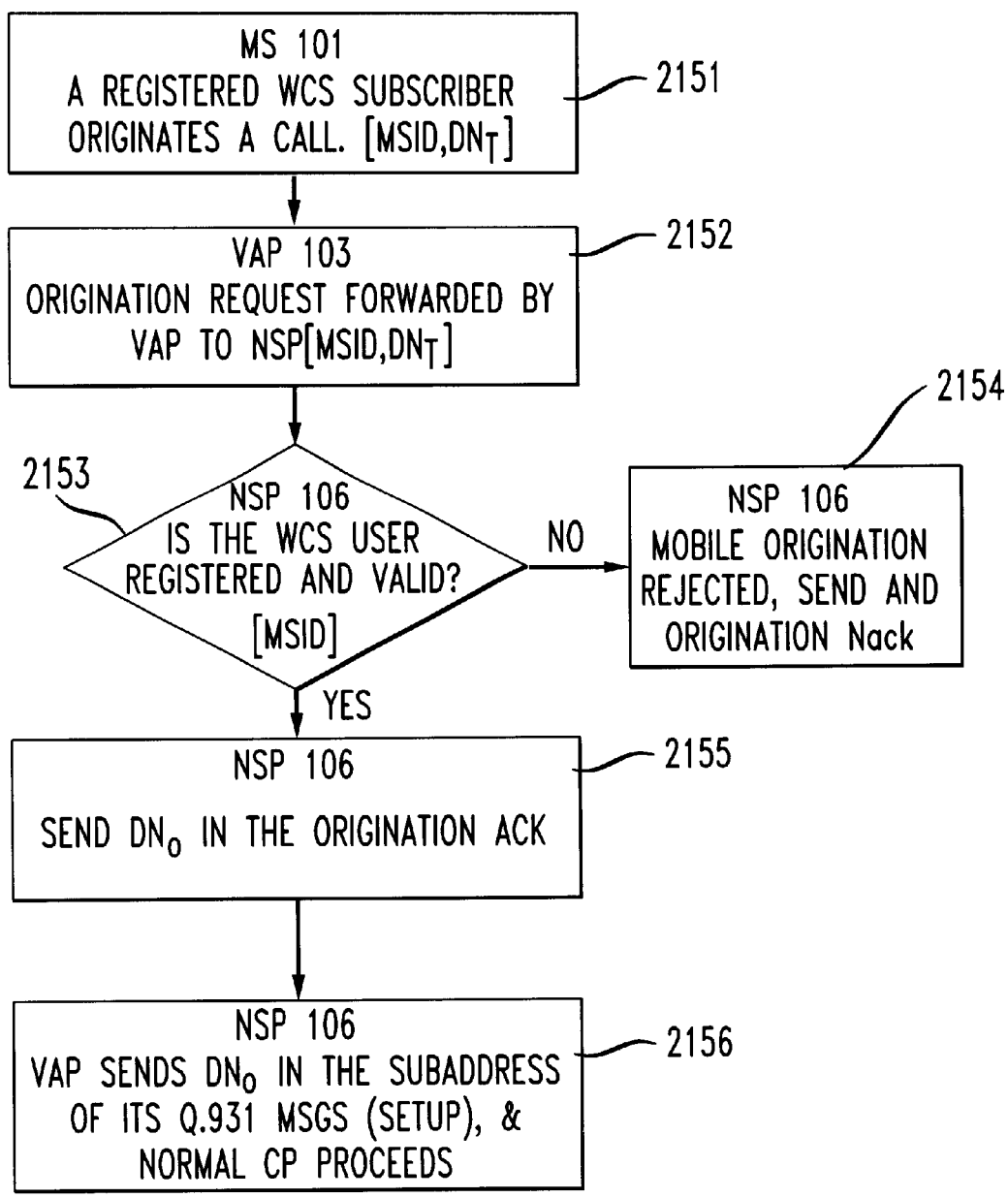
FIG. 21E illustrates a flowchart of an origination leg of a Caller ID information retrieval procedure for another preferred embodiment of the present invention.

Referring to the flowchart in FIG. 21E, the process for the origination leg of the second preferred embodiment of the Caller ID feature/function is illustrated and will now be described. Once again, the embodiment illustrates a scenario for a call originating from a WCS subscriber's MS, the originating $MS_O$ 101, to another WCS subscriber, termination $MS_T$ 101. First, at step 2151, the user of an MS 101 originates a call. Then, at step 2152, the VAP 103 sends a message to the NSP 106, for example, a WCS origination request message, which may contain the originating phone's ID, i.e. MSID, and the called party number, e.g., $DN_T$. Next, at step 2153, the NSP 106 determines whether the MS 101 user is registered with the WCS. If the MS 101 is registered and valid, in step 2155 the NSP 106 retrieves the caller ID information, e.g., $DN_O$ (the DN of the desktop associated with the MSID) by accessing the mapping between the MSID and the corresponding DN which may be stored in, for example, the subscriber information in WCSD. The NSP 106 also forwards the caller ID information (e.g., $DN_O$) to the VAP 103 in a typical call setup message, for example, an origination ack message. Then in step 2156, the originating $VAP_O$ 103 sends the caller ID information (e.g., $DN_O$) to the LDS 104 in an available field of another typical call setup message, for example, the subaddress IE field of a Q.931 Setup message. However, if the $MS_O$ 101 is not a registered user, the NSP 106 will reject the origination message at step 2154.

Figure 21F:
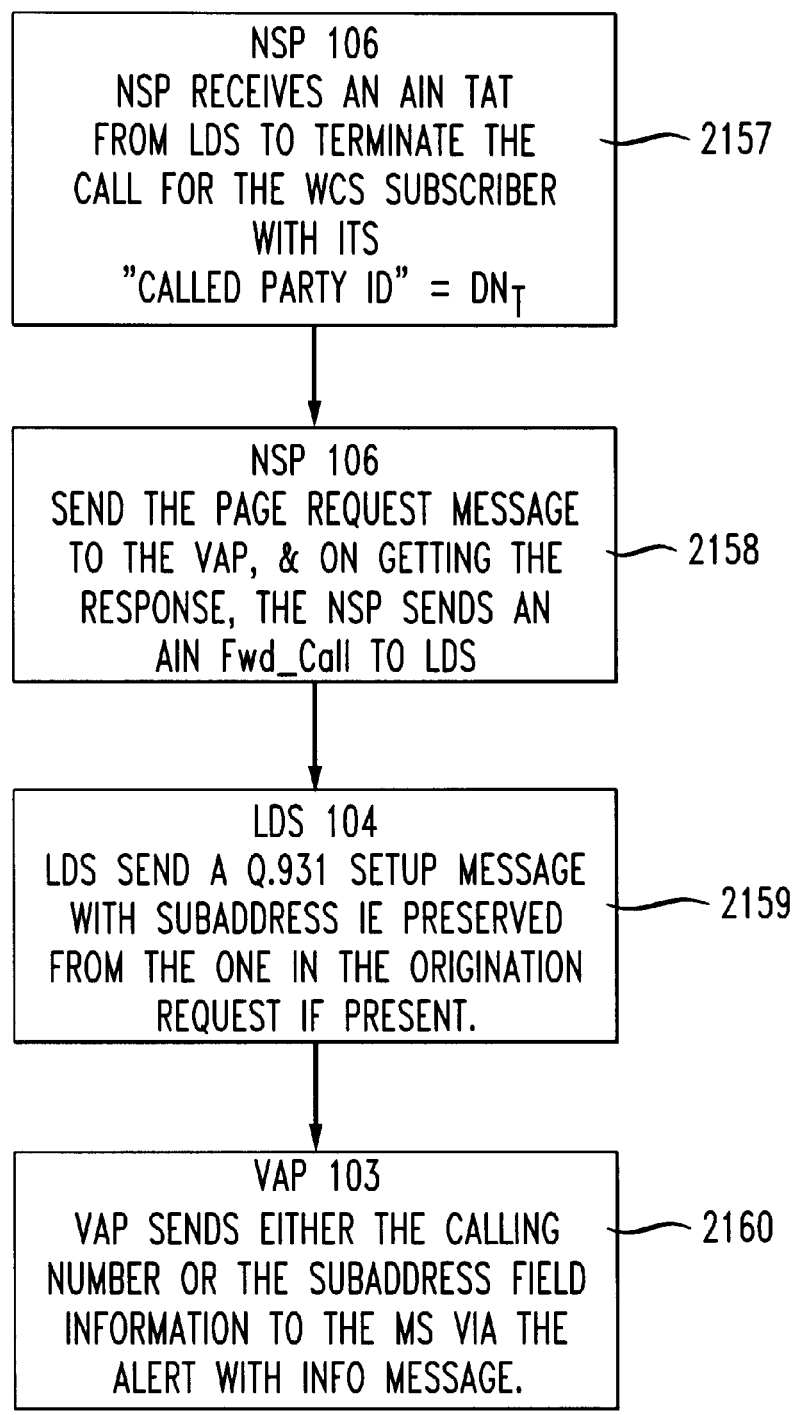
FIG. 21F illustrates a flowchart of a termination leg of a Caller ID information retrieval procedure for another preferred embodiment of the present invention.

Referring now to the flowchart in FIG. 21F, the process for the termination leg of the second preferred embodiment of the Caller ID feature/function is illustrated and will now be described. First, in step 2157 the LDS 104 sends a typical call setup message, for example an AIN TAT message, to the NSP 106 so as to terminate the call at the $DN_T$ originated by the $DN_O$. At step 2158 the NSP 106 responds by sending a typical call setup message to the $VAP_T$ 103 to which the termination $MS_T$ 101 is presently associated, for example a Page Request message. The $VAP_T$ 103 responds by sending a typical call setup message indicating that the desired $MS_T$ 101 is available via a Page Response message The NSP 106 instructs the LDS 104 to forward the incoming call to $VAP_T$ 103 using, for example, an AIN Forward_Call message. At step 2159, the LDS 104 sends a typical call setup message to the terminating $VAP_T$ 103, for example a Q.931 Setup message. Since the originating $VAP_O$ 103 put the caller ID related info (e.g., $DN_O$) in the subaddress IE of the Q.931 SETUP message, this info will be contained in, for example, the subaddress IE of the Q.931 SETUP sent from the LDS 104 to the terminating $VAP_T$ 103. As indicated at step 2160, if the subaddress IE field is populated with caller ID information, for example $DN_O$ for the calling MS 101, the $VAP_T$ 103 will receive the information and provide it to the $MS_T$ 101 via a typical call setup message, for example an IS-136 "Alert with Info" message. Otherwise, the $VAP_T$ 103 shall use the Calling party number information, e.g., the $VAP_O$ 103 FDN or the PSTN 125 DN from the Q.931 SETUP message.

Figure 21G:
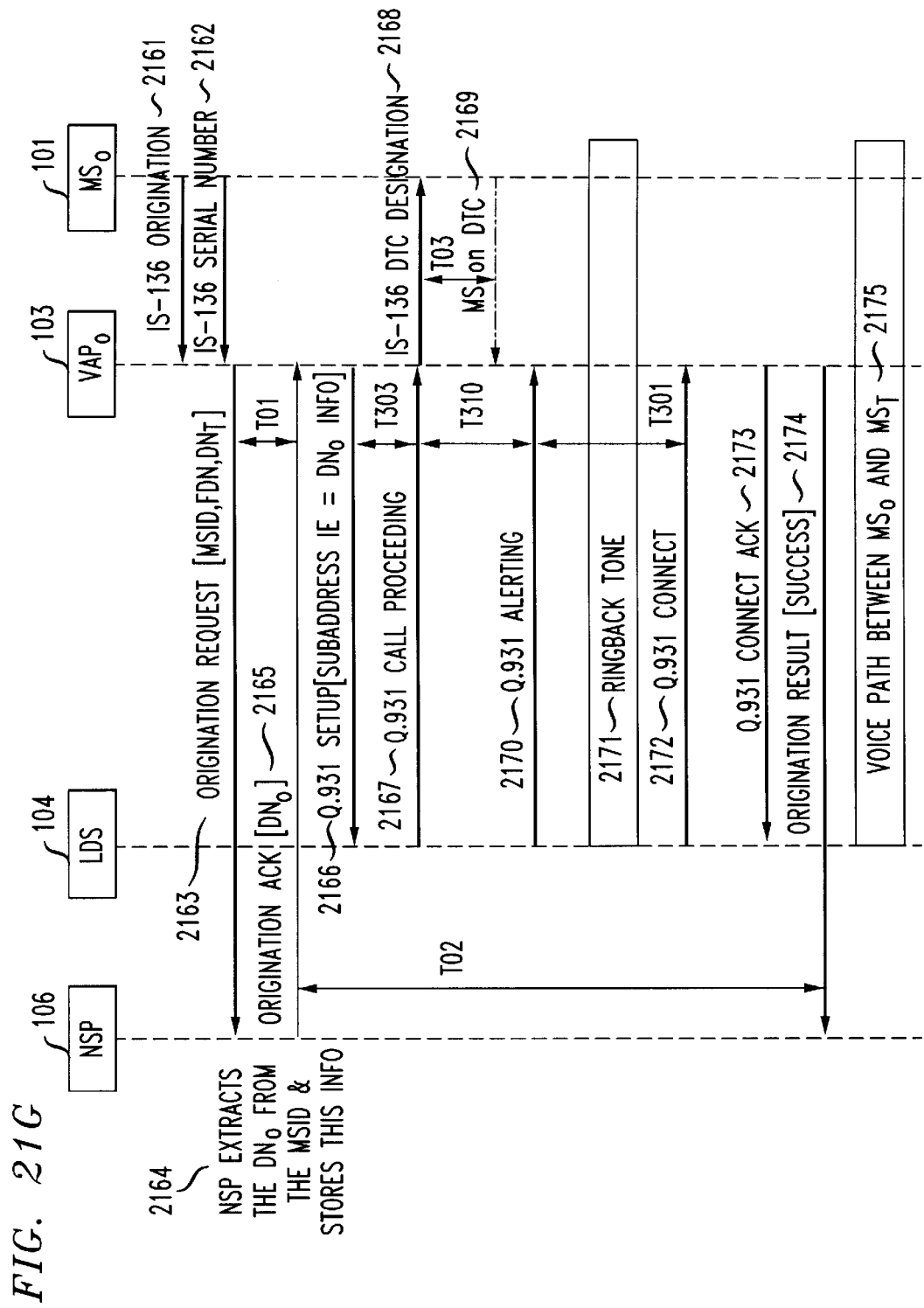
FIG. 21G illustrates a signal flow diagram for Caller ID information during call origination for another preferred embodiment of the present invention.

Referring now to FIG. 21G a detailed signal flow diagram for an origination leg of the second preferred embodiment of the Caller ID feature/function will now be described. First, an originating WCS MS, $MS_O$ 101, requests for call origination by sending an IS-136 Origination 2161 message and an optional IS-136 Serial Number 2162 message containing the ESN to the originating $VAP_O$ 103. Then, the originating $VAP_O$ 103 sends an Origination Request [MSID, $DN_T$] 2163 message to the NSP 106. The Origination Request message contains the Called party ID, $DN_T$, FDN of $VAP_O$ and the identification of the originating $MS_O$ 101, MSID and/or the ESN. Next, the NSP 106 validates the $MS_O$, and retrieves the caller ID information, for example a $DN_O$, associated with the MSID. The NSP 106 sends the caller ID information, e.g., $DN_O$, to $VAP_O$ 103 in an available field of the Origination Ack [$DN_O$] 2165 message.

Then the $VAP_O$ 103 sends the caller ID information, e.g., $DN_O$, that it received from the NSP 106 in the Calling Party Subaddress IE of the Q.931 Setup [Subaddress IE=$DN_O$ info] 2166 message that it sends to the LDS 104. The LDS 104 will setup the call to $DN_T$ (this will trigger an AIN message in the terminating leg signal flow (see FIG. 21H)). Subsequently, signaling 2167–2174, illustrate normal call processing to completion of a voice path between the $MS_O$ and the $MS_T$ (2175). Thus, the signal flow for signaling 2167–2174 is similar to the usual origination call flow as described in the call processing section above (see, for example, FIG. 4 and its related description).

Figure 21H:
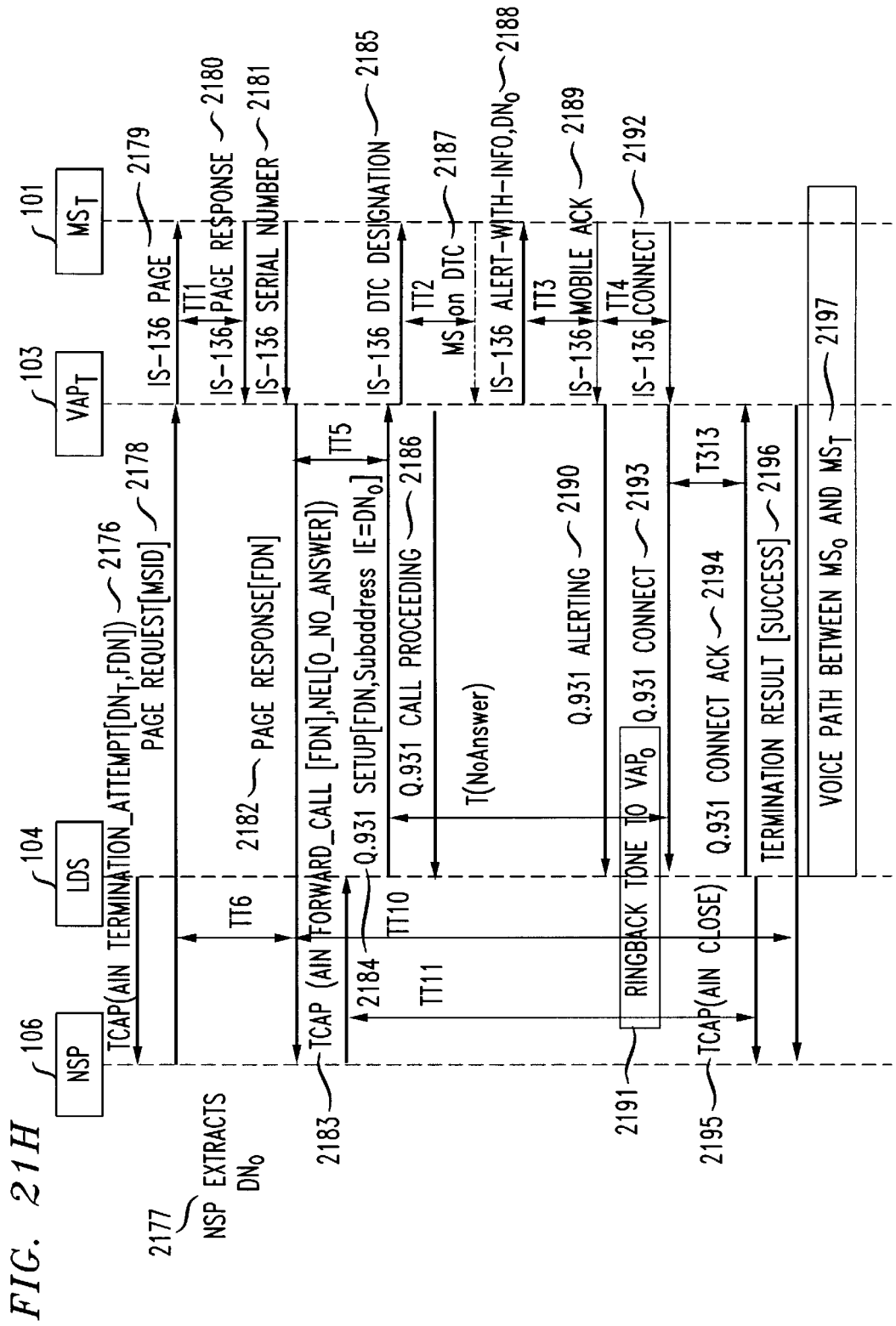
FIG. 21H illustrates a signal flow diagram for Caller ID information during call termination for another preferred embodiment of the present invention.

Referring now to FIG. 21H, the signal flow for the terminating portion of an exemplary second preferred embodiment for a WCS MS to WCS MS call will be described. As indicated above, the originating $MS_O$ 101 user calls another WCS MS 101 subscriber's DN, the terminating $DN_T$, and as a result the LDS 104 receives a Q.931 Setup [subaddress IE=$DN_O$ info] 2166 message. The LDS 104 finds that the $DN_T$ is provisioned for AIN Termination Attempt Trigger (TAT). As a result, the LDS 104 suspends the delivery of the call and sends an AIN query message, TCAP (AIN Termination_Attempt [$DN_T$, FDN]) 2176, to the NSP 106 for appropriate routing instruction based on the last known location of $MS_T$ 101. NSP 106 finds that the subscriber's MS 101 ($MS_T$) associated with $DN_T$ is active and idle in its serving area, associated with $VAP_T$ 103. NSP 106 pages the $MS_T$ 101 through $VAP_T$ 103 with IS-136 established paging procedures, e.g., Page Request [MSID] 2178 and IS-136 Page 2179, and starts TT6 timer. As a part of the Page Request 2178 message, the NSP 106 shall send the Mobile's MSID. $MS_T$ 101 sends an IS-136 Page Response 2180 message followed optionally by IS-136 Serial Number 2181 message. When $MS_T$ 101 responds to the page, $VAP_T$ 103 selects a FDN for the call, and forwards it in a Page Response [FDN] 2182 message to the NSP 106, and starts event timer TT10. Upon reception of Page Response [FDN] 2182, the NSP 106 will cancel TT6 timer and knows that the current $VAP_T$ 103 has the resources to serve the incoming call.

Next, the NSP 106 directs the LDS 104 to forward the call to the FDN (in a TCAP Conversation package) by sending the LDS 104 a TCAP (AIN Forward_Call [FDN], NEL [O_No_Answer]) 2183 message. The NSP 106 indicates its interest in event (O_No_Answer for FDN) by sending next event list (NEL) information to the LDS 104 in a Request component, which accompanies the routing component, in the conversation package. The LDS 104 will start No Answer Timer (T(NoAnswer)) for FDN and send a Q.931 Setup [FDN, Subaddress IE=$DN_O$] 2184 message to $VAP_T$ 103. When $VAP_T$ 103 receives the Q.931 Setup [FDN, Subaddress IE=$DN_O$] 2184 message, it will cancel the TT5 timer, initiate an IS-136 DTC Designation 2185 message to $MS_T$ 101, start the TT2 timer, and send a Q.931 Call Proceeding 2186 message to the LDS 104. $VAP_T$ 103 will retrieve the calling party information first from Q.931 Calling Party Subaddress IE indicating that this call is from a WCS MS (refer to the Q.931 Setup [FDN, Subaddress IE=$DN_O$] 2166 message in the originating call leg signal flow shown in FIG. 21G). If the subaddress is not populated then $VAP_T$ 103 will attempt to retrieve the calling party information from the Q.931 Calling Party IE indicating that this call is from the PSTN 125 or a VAP 103 FDN. If neither fields are populated, the calling party information can not be retrieved and therefore can not be presented to the called party.

Next, the $VAP_T$ 103 sends a DTC Designation 2185 message to the $MS_T$ 101 and the $MS_T$ 101 tunes to the traffic channel, MS on DTC 2187. When $VAP_T$ 103 detects that $MS_T$ is on the traffic channel via DVCC status change, it will initiate the Alerting procedures to both call legs (i.e., the LDS and MS directions). Then $VAP_T$ 103 sends an IS-136 Alert-with-info message to $MS_T$ 101 along with the retrieved calling party caller ID information (if any) for example IS-136 Alert-with-info [$DN_O$] 2188 message, and start the Alert timer (TT3). When $MS_T$ 101 receives the Alert-with-info message, it may notify the user with an alert, e.g., via ringing. $MS_T$ 101 then sends an IS-136 Mobile ACK 2189 message to the $VAP_T$ 103. When $VAP_T$ 103 receives the Mobile ACK 2189 from $MS_T$ 101, it will cancel TT3 timer and start TT4 timer, and enters the wait-for-answer call processing state. Subsequently, at steps 2190–2197, the call processing for the Caller ID termination leg for this embodiment is similar or the same as those mentioned for a general call termination in the call processing section above (see, for example, FIGS. 5–7 and their related description).

A third preferred embodiment for the WCS Caller ID feature/function is similar to the second preferred embodiment and uses existing signaling messages to coordinate the caller ID information. This preferred embodiment is dependent on a signaling protocol that permits exchange of user-to-user data. For example, in addition to the normal call setup procedure described above, the originating $VAP_O$ 103 uses the Q.931 non-call associated signaling procedure to send the calling party information to the destination (termination) $VAP_T$ 103 before the destination $VAP_T$ 103 sends the IS-136 Alert-with-Info message. Thus, in this embodiment it is not necessary to use the Calling Address Subaddress IE field.

The WCS Caller ID feature/function invention may provide caller ID information whether the call is from one MS 101 to another MS 101 associated with the same NSP 106 or different NSPs. In the case of different NSPs, the process must include a means of transferring or sharing of the caller ID information, e.g., $DN_O$ between the various NSPs. Further, the WCS MS 101 caller ID information may also be provided to a call to a PSTN 125 user as long as a means is provided for entering the caller ID information related to the MS 101 $DN_O$ into the signaling between the PSTN 125 and the WCS.

Further, the WCS Caller ID feature/function of the present invention may provide for the calling party to be initially coupled with a voice path to, for example, a voice processing unit (VPU) including voice recognition capabilities, which is located in, for example, the VAP 103. As such, the calling party can provide their name or other information which will be provided to the called party, by for example, display on the MS of the called party. The Caller ID feature/function may also allow display on the MS 101 or audio presentation of additional information about the calling or called party, for example, their address, building number, company affiliation, etc. for an incoming or active call. Thus, the WCS of the present invention provides a MS 101 user with the ability to know the identity of the calling persons before answering a call and the desk top telephone number, identity, location, etc. of a calling party or a party they are speaking with on an active call, even in the case when the calling party is calling from a WCS MS.

XIV. Screening Calls

The advent of any time and any place communications provided by the present invention brings with it certain conveniences and certain inconveniences or annoyances. Ideally, the invention should minimize the inconveniences or annoyances. One inconvenience is that anyone, for example a solicitor, can call a mobile station at anytime, for example in the middle of an important meeting. Therefore, there is a need to provide the mobile station user in a WCS the ability to block out incoming calls from particular phone numbers, for example, directory numbers.

The call screening feature/function of the instant invention provides just such a means for screening calls in a Wireless Centrex Services (WCS) System. More specifically, the invention allows a mobile station user to specify a list of phone numbers (call screen list) from which incoming calls can be blocked when received. When any one of the phone numbers in the list is calling the MS 101, based on the MS 101 user's previous instructions the WCS system will block the call and either send the call to a message answering service (e.g., a VMS 107), send the call to intelligent peripheral (IP) device (e.g., a VPU 1235 or a DSP) which will provide a pre-recorded announcement message, or just simply drop the call without providing the calling party any announcement or recourse.

The call screen list of phone numbers can be added to or modified using a number of different methods. In one exemplary embodiment, a MS user enters the phone number manually from the MS 101 by keying in each digit of the phone number to be blocked. The MS 101 user dials a feature activation code, for example, *60#, followed by the phone number that is to receive the call screening treatment, followed by the send button (e.g., *60#5551212). In response, the WCS system adds the phone number (e.g., 5551212) to the Call Screen list and activates the call screen feature for the phone number entered. This confirms the feature activation.

In another exemplary embodiment of the call screen feature/function of the invention, the call screen list can be added to or modified by pressing a particular key on the MS 101 or by entering the feature code without a phone number, after an active call is disconnected (e.g., after an unwanted incoming call is received). In this case, as an example, the user can key in the feature code, e.g., *60#, on the MS 101 and press the send button after a call is hung up. The WCS will retrieve the last active call's related phone number from its abase and add it to the call screen list for the MS.

In either of the previous embodiments, a MS user can remove a particular phone number from the Call Screen list or turn off the call screen feature by, for example, pressing a button on the MS 101 or keying into the MS 101 a particular feature code, with or without a phone number to be removed from the Call Screen list. For example, a MS user may key into the MS 100 a Call Screen feature deactivation code, for example *600#, and the phone number and press the send button. As a result an incoming call to that particular phone number will no longer receive call screen treatment. Alternatively, if the MS 101 user enters a Call Screen feature deactivation code, for example *600#, without entering along with it a phone number, all call screen treatment will be deactivated for all phone numbers on the Call Screen list.

In yet another embodiment for the call screen feature/function of the invention, the Call Screen list can be added/modified via the internet (World Wide Web) or by calling the WCS CSC representative. A more detailed discussion of the call screen feature/function of the present invention follows.

Figure 22:
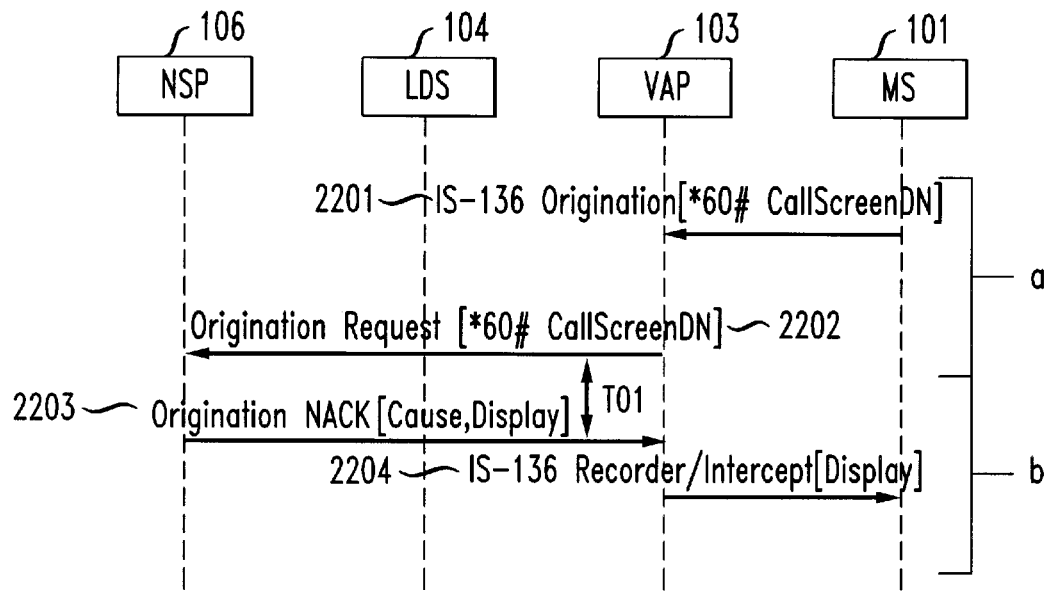
FIG. 22 shows a signal flow diagram for provisioning an exemplary call screen in accordance with an illustrative embodiment of the present invention.

Referring to FIG. 22, a signal flow for provisioning (activating) the call screen feature/function will now be discussed using the embodiment wherein the MS 101 user enters a feature code and phone number via the MS 101 to activate call screening to block an incoming call. In general, the signal flow for provisioning the call screen feature may follow the methods discussed previously for feature activation. First, the MS 101 user enters the feature activation code and number on the keypad of an MS 101, such as, *60# CallScreenDN, where CallScreenDN is the desired directory number (i.e., phone number) to be screened out (i.e., the MS 101 user will not know about the call at the time the incoming call occurs). As a result an IS-136 Origination [*60# CallScreenDN] 2201 message is sent from the MS 101 to the VAP 103 over the Reverse Digital Control Channel (RDCCH) wherein the called party number field is set to CallScreenDN. The VAP 104 receives the IS-136 Origination [*60# CallScreenDN] 2201 message and sends an Origination Request [*60# CallScreenDN] 2202 message to the NSP 106 and starts the origination complete timer TO1. The Origination Request [*60# CallScreenDN] 2202 is unique in that the Dialed Digit IE (field) which normally contains a DN the MS 101 user wishes to connect to, now contains the feature code *60# and the incoming DN to be screened, CallScreenDN.

The NSP 106 receives the Origination Request [*60# CallScreenDN] 2202 message, performs an analysis of the dialed digits and determines that it is actually a feature request, i.e., a Call Screen request, rather than a telephone call. Next the NSP 106 proceeds to check against the service profile in the WCSD (stored in, for example, the memory 1240) via the MIN of the MS 101 to determine whether the MS 101 is authorized for the Call Screen feature. If the validation is successful the NSP 106 updates the feature activation table for the particular MIN and sends a call origination not acknowledged message, Origination NACK [Cause, Display] 2203 to the VAP 103 which includes proper text information pertaining to the feature, e.g., Call Screen active and the number of the DN that is programmed to be screened. Alternatively, the information contained in this message could be provided via a short message format such as an SMDPP message (similar to an IS-41 message). Next, the VAP 103 sends an IS-136 Reorder/Intercept [Display] 2204 message to the MS 101. This message contains status information regarding the MS 101 user's request to block a call with the call screen feature/function. For example, the Display information may contain the statement "Call Screen active for CallScreenDN. Similar to the Origination NACK message, the IS-136 Reorder/Intercept message is generated as a result of a telephone call setup is rejected because the numbers dialed by the MS 101 user to activate the call screen were not a recognizable DN for which a telephone call could be established. Thus, the Display field of this message is modified to carry the information to indicate to the MS 101 user the status of their call screen request.

On the other hand, if the NSP 106 determines that the MS 101 is not authorized to use the Call Screen feature, it will send a message Origination NACK [Cause, Display] 2203 message with proper reject information in the cause (e.g., text) field (Call Screen Not Available) to the MS 101. After receiving the Origination Request message 2203 from the VAP 103 to the NSP 106, an Origination NACK message will be sent to the VAP 103 and the VAP 103 will then cancel the timer TO1, release the MS 101, and clear the origination request record.

As previously indicated, if the MS 101 user does not enter a CallScreenDN at the time of initiating the call screen feature, then the WCS will determine the DN for the last active call to which the MS 101 was a party, and activate a call screen for that particular DN. In the case when the DN is not specified and the last active call was an incoming call, the NSP 106 will use the last incoming Caller ID to activate call screening. If the last caller ID is available, the NSP 106 updates the feature activation table for the particular MIN and sends a n Origination NACK [Cause, CallScreenDN] 2203 message with proper text and the CallScreenDN information to inform the MS that calls from the identified CallScreenDN will be screened. Otherwise, if a Caller ID for the previous active call cannot be determined, the NSP 106 will notify the VAP and MS 101 that the call screen feature has not been activated.

The call screen feature/function also includes a feature that allows the MS 101 user to determine the disposition of an incoming call which is blocked because the incoming call DN is included in the Call Screen phone number list. The MS 101 user can pre-program the WCS by entering a feature programming code associated with a particular manner for the WCS to handle an incoming call after it is blocked by a call screen designation (i.e., call screen treatment). For example, the MS 101 user can provision the DNs that he would like to screen and the manner in which the call coming from a CallScreenDN may be treated by manually entering particular feature/function codes on the MS 101. The provisioning can also be done through the WCS web site or by calling a Customer Service Center (CSC) representative, Below are illustrations of methods by which the MS 101 user can pre-program the CallScreenDN list by himself/herself using the MS 101. The exemplary provisioning mechanism are as follows.

To provision the Call Screening list, the MS 101 user may dial for example *60#n#DN, where n is a number between 1 and 3 and signifies the call screen treatment, and DN is the CallScreenDN telephone number, then press the "send" button (e.g. *60#1#5551212). The correspondence between three possible call screen treatment codes and the treatment to be executed is provided in the table below.

TABLE 3

| Code | Treatment description |
|------|----------------------|
| 1 | Disconnect the call |
| 2 | Forward the call to the specified resource (e.g., VMS) or DN |
| 3 | Play voice announcement that "called party unavailable" |

Alternatively a desired CallScreenDN can be dynamically added to the list of CallScreenDNs after an unwanted call is received. The MS 101 user can press *60#n and the "send" button during or immediately after an active call is released. In response, the WCS will retrieve the calling party number and add it to the call screen list for the MS 101. If no number is specified to indicate the type of call screen treatment desired (e.g., 1, 2, or 3) while provisioning (e.g., *60##DN) a default will be set, for example, the type 1 call screen treatment will be provided for calls coming from the entered CallScreenDN (DN input with the feature code *60). Further, to remove a particular phone number from the list, the MS 101 user may dial for example *600#DN, where DN is the CallScreenDN telephone number, and press the "send" button. To remove all the entries from the table, the user may press, for example, *600#*.

Thus, the user of MS 101 can enter a feature programming code, for example, *601# with a phone number being screened, CallScreenDN, and press, for example, the send button to program the incoming call to be dropped without any announcement to the calling party. This feature programming code would be stored in the WCSD and be associated with the CallScreenDN to which it relates. The signal flow for this added feature programming would be similar to the signal flow for Call Screen feature activation illustrated in FIG. 22. If the MS 101 completes such Call Screen feature programming by entering *601#, when an incoming call originates from the CallScreenDN phone number, the WCS will drop the blocked call without playing any announcement Different feature programming codes, for example, *602#, *603#, etc., could be used to program the WCS to dispose of a call screen blocked call by sending it to a VMS 107 or playing an announcement to the calling party indicating that the call is being blocked, etc. Further, the WCS can be programmed so that any one of these call screen treatments (as well as any other not mentioned herein) is used as the default Call Screen blocked call disposition. A detailed discussion of the signal flow for some of the possible disposition of incoming calls blocked by the Call Screen feature follows.

Figure 23:
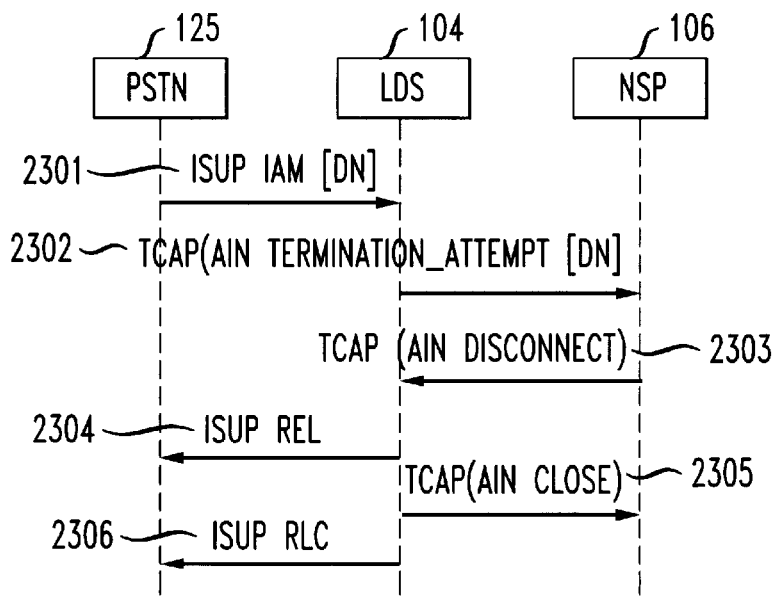
FIG. 23 shows a signal flow diagram for dropping a screened call without an announcement for an exemplary call screen in accordance with an illustrative embodiment of the present invention.

In accordance with one preferred embodiment of the invention, FIG. 23 illustrates an exemplary call screen treatment wherein an incoming call originating from a CallScreenDN is terminated without any announcement to the calling party. Although, this embodiment shows an incoming call originating from a DN in the PSTN 125, a similar signal flow would occur for a call originating from a DN in a WCS.

When, for example, a PSTN 125 user dials a WCS subscriber's DN from a telephone outside the WCS, the LDS receives an ISUP IAM [DN] 2301 message from the PSTN 125 to alert the LDS 104 of an incoming call originating from a particular DN. The LDS 104 determines that the called DN is provisioned for an advanced intelligent network termination attempt (AIN TAT), suspends the delivery of the call, and sends an AIN query, TCAP (AIN Termination_Attempt [DN]) 2302 message, to the NSP 106 for an appropriate routing instruction for contacting the called DN. When the NSP 106 receives the AIN TAT it checks the MS 101 user's service profile feature settings in the WCSD to determine whether the originating telephone number (calling party DN) is a screened telephone number and if so what, if any, Call Screen treatment has been specified by the MS 101 user. In this case, the MS 101 has activated the Call Screen feature/function for the originating DN and programmed the call screen treatment so that the incoming call should be dropped without playing any announcement to the calling party. Therefore, the NSP 106 then determines that the attempted DN is directed to a MS 101, and that the MS 101 has provisioned the calling party's telephone number as a CallScreenDN with a call screen treatment of dropping the call without an announcement.

In response, the NSP 106 sends a TCAP (AIN Disconnect) 2303 message to the LDS 104. In response the LDS 104 sends the PSTN 125 an ISUP REL 2304 message to release the PSTN 125 without any announcement. Then the LDS 104 sends the TCAP (AIN Close) 2305 message to close the TCAP transaction. Finally, the LDS 104 sends the PSTN 125 a ISUP RLC 2306 message to indicate a release has been completed.

Figure 24:
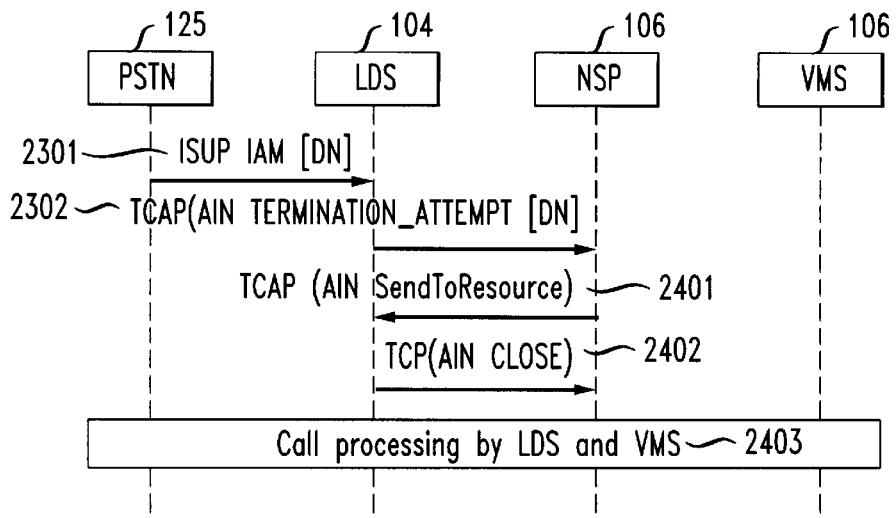
FIG. 24 shows a signal flow diagram for sending a screened call to a voice mail system for an exemplary call screen in accordance with an illustrative embodiment of the present invention.

In accordance with a further embodiment of the invention, FIG. 24 illustrates an exemplary call screen call treatment scenario in which an incoming blocked call is sent to a resource, such as an answering service, for example VMS 107. In this case, the signal flow is similar to the case where the call screen treatment is set to drop the incoming call without providing the calling party an announcement. However, in this case the LDS 104 is instructed to forward the call from the CallScreenDN (calling party number that is provisioned to be screened) to a resource (e.g., VMS 107) for a proper announcement directed to the calling party.

Once again when, for example, the PSTN 125 user dials the WCS subscriber's DN, the LDS 104 receives an ISUP IAM [DN] 2301 message from the PSTN 125. The LDS 104 finds that the DN is provisioned for AIN TAT, suspends the delivery of the call, and sends an AIN query message, TCAP (AIN Termination Attempt [DN]) 2302 to the NSP 106 for an appropriate routing instruction. Then, the NSP 106 checks the WCSD database to determine whether the calling party telephone number (DN) has been designated by the MS 101 user as a screened number and whether the MS 101 user has set a call screen treatment. In this case, the NSP 106 determines that for the called DN (MS 101) the incoming calling party's telephone number is a CallScreenDN and the call treatment requires the call be sent to a resource. So the NSP 106 instruct the LDS 104 that the incoming call is to be sent to a resource, such as the VMS 107 which will allow the calling party to leave a voice message. Thus, the NSP 106 sends a TCAP (AIN SendToResource) 2401 message to the LDS 104. The LDS 104 sends a TCAP (AIN Close) 2402 message to the NSP 106 to close the TCAP transaction. Finally, the LDS 104 and VMS 107 (Intelligent Peripheral) assume the call processing (Call processing by LDS and VMS 2403) enabling the calling party to leave a message for the MS 101 user.

Figure 25:
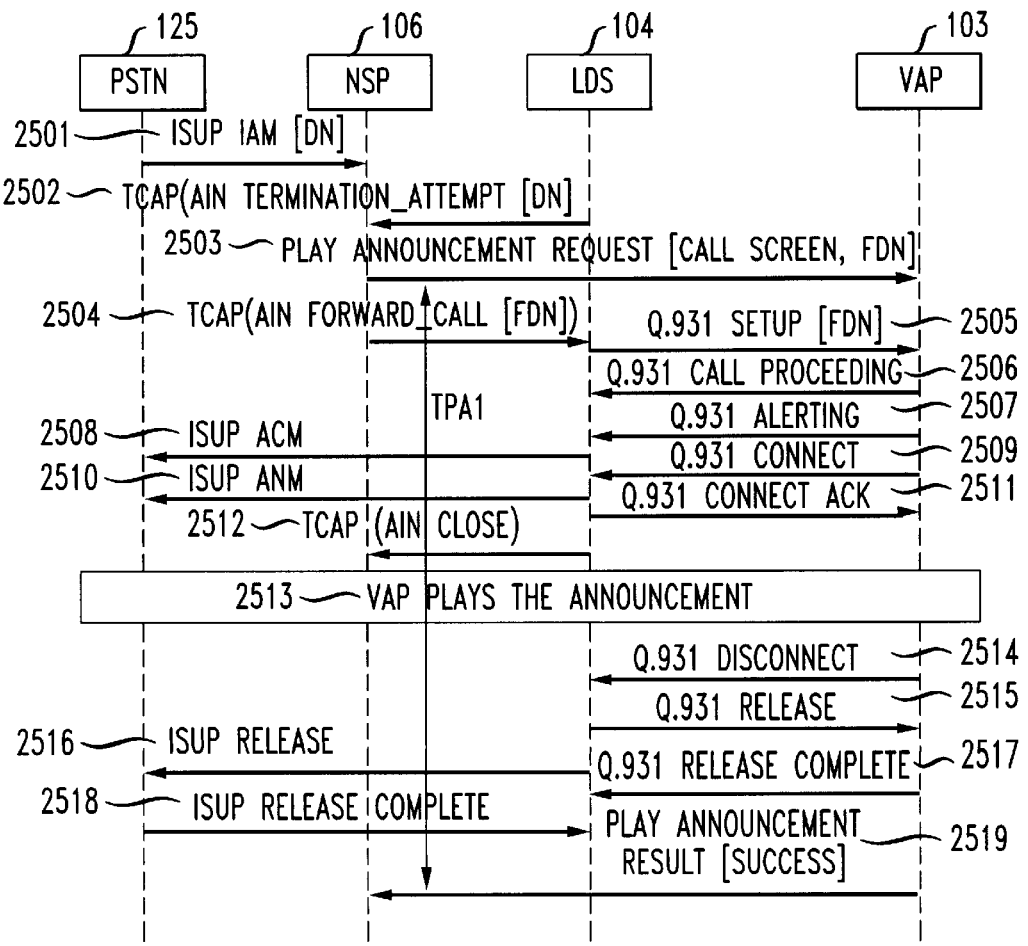
FIG. 25 shows a signal flow diagram for dropping a screened call after providing an announcement for an exemplary call screen in accordance with an illustrative embodiment of the present invention.

In accordance with another preferred embodiment of the invention, FIG. 25 illustrates a call screen treatment scenario in which a screened call is forwarded to a VAP 103 for playing an announcement to the incoming call indicating, for example, that the call has been screened and will be dropped or that the MS 101 user is not interested in the service or product being offered by the calling party. The NSP 106 designates which VAP 103 within the WCS will provide the announcement to the calling party based on, for example, VAP 103 availability. Therefore, the VAP 103 designated to play the announcement is not necessarily the VAP 103 with which the MS 101 is presently resident.

When, for example, the PSTN 125 user dials the WCS subscriber's DN, the LDS 104 receives an ISUP IAM [DN] 2501 message from the PSTN 125. The LDS 104 recognizes that the called DN is set up for an AIN TAT trigger and sends the NSP 106 an AIN TAT query message, TCAP(AIN Termination_Attempt [DN]) 2502, to get routing information for the incoming call. The NSP 106 checks the WCSD database to determine whether the calling party's telephone number is a CallScreenDN for the MS 101 being called and whether the MS 101 user has set a particular call screen treatment Assuming that the NSP 106 determines that the calling party's DN is designated as a CallScreenDN for the MS 101 being called and the MS 101 user has set a call screen treatment for playing an announcement to the calling party, the NSP 106 sends a Play Announcement Request [Call Screen, FDN] 2503 message to one of the available VAPs, specifies the type of announcement to be played (i.e., Call Screen: Do not call again!) and starts the TPA1 timer. The message will contain the FDN and the announcement option, Call Screen in this case, along with the MIN, VAP ID, and call reference number (e.g., CR=1). However, if the NSP 106 does not find any VAP 103 to connect to the calling party incoming call or the TPA1 timer expires before receiving the Play Announcement Result 2519 message from the VAP 103, it will send a TCAP (AIN Disconnect) message to the LDS 104 and the incoming call will be disconnected without any announcement.

Next, the NSP 106 sends a TCAP (AN Forward_Call [FDN]) 2504 message to the LDS 103 directing the LDS 104 to establish a connection between the incoming call from the calling party and the chosen VAP 103 by forwarding the incoming call to the chosen VAP 103. The LDS 104 then performs a call setup between the selected VAP 103 and the incoming call. First, the LDS 104 sends the VAP 103 a Q.931 Setup [FDN] 2505 message. In response the VAP 103 sends a Q.931 Call Proceeding 2506 message, a Q.931 Alerting 2507 message, and a Q.931 Connect 2509 message to the LDS 104. In the meantime, the LDS 104 sends an ISUP ACM 2508 message and an ISUP ANM 2510 message to the PSTN 125. When the incoming call has been properly connected with the selected VAP 103, the LDS sends a Q.931 Connect ACK 2511 acknowledgement message to the VAP 103 and a TCAP (AIN Close) 2512 message to the NSP 106.

Once the incoming call is connected with the VAP 103, the VAP 103 plays the announcement (for example, a default announcement, a user defined announcement using voice synthesis, or a user defined announcement that is a recorded message created by the MS 101 user) at step 2513. The VAP 103 uses, for example, a DSP to provide the announcement or may utilize the VPU 1235 in the NSP 106 to generate the announcement. After the announcement has been played, the VAP 103 initiates a disconnect process with the LDS 104 and the LDS 104 initiates a release process with the PSTN 125, releasing the VAP 103 and PSTN 125 from the active voice traffic channel. This process is initiated by the VAP 103 sending the LDS 104 a Q.931 Disconnect 2514 message instructing the LDS 104 to disconnect the active call between the VAP 103 and the PSTN 125. The LDS 104 releases the active call connection with the VAP 103 by sending a Q.931 Release 2517 message and releases the active call connection with the PSTN 125 by sending a ISUP REL 2516 message. The PSTN 125 notifies the LDS 104 that the call has been disconnected by sending an ISUP RLC Complete 2518 message to the LDS 104. The VAP 103 notifies the LDS 104 that the call has been disconnected by sending a Q.931 Release Complete 2517 message to the LDS 104. Finally, the VAP 103 sends a Play Announcement Result [Success] 2519 message to the NSP 106, indicating that the announcement was played successfully for the incoming call, and cancels timer TPA1. The Play Announcement Result message includes a VAP ID, FDN, Call Reference Number, Result, and Cause fields. As previously indicated, if the TPA1 timer expires before receiving Play Announcement Result 2519 message is received from the VAP 103, it will send a TCAP (AIN Disconnect) message to the LDS 104 if not sent already, and the call will be disconnected without any announcement.

XV. Call Forwarding
A. Unconditional Call Forwarding

A user of the MS 101 may not always have the MS 101 with him or her. It may be useful in such a situation to allow for incoming calls to the MS 101 to be forwarded to another predetermined DN or DNs. This DN to which calls are forwarded is referred to herein as the FwdDN. Various types of call forwarding are available in the WCS 140. For example, calls may be forwarded unconditionally, such that a call to a DN that would otherwise be destined for the MS 101 associated with the DN would be forwarded instead to a predetermined FwdDN. This unconditional call forwarding feature may alert both the MS 101 and the communication device at the FwdDN, or only the communication device at the FwdDN such that the MS 101 is not alerted at all.

To activate this "unconditional call forwarding" feature, the MS 101 user may dial a feature activation code such as *90#[FwdDN], followed by the SEND button on the MS 101. In this example, "*90" indicates the unconditional call forwarding feature. The phrase FwdDN in the brackets "[ ]" represents the intended DN to which a call should be forwarded (the brackets themselves are not actually dialed in this example). To deactivate the unconditional call forwarding feature, the MS 101 user may enter a sequence such as *900 (or other appropriate sequence) followed by the send button.

Figure 26:
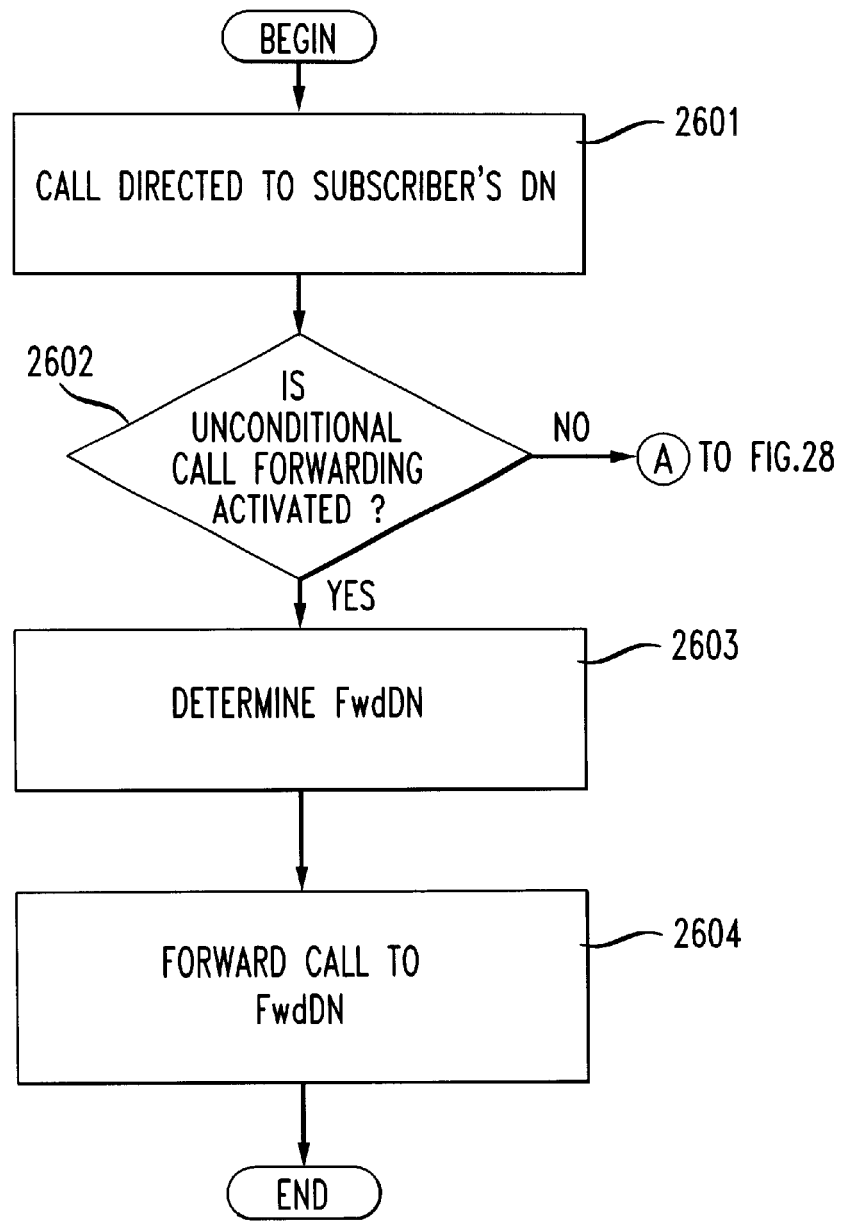
FIG. 26 is an exemplary flow chart of the unconditional call forwarding feature of the present invention.

FIG. 26 is an exemplary flow chart of how the unconditional call forwarding feature may work. A call may be made directed to the MS 101 subscriber's DN (step 2601). A determination is made whether the unconditional call forwarding feature has been activated for the MS 101 (step 2602). If so, then FwdDN is determined (step 2603) and the call is automatically forwarded to FwdDN (step 2604). If the unconditional call forwarding feature has not been activated for the MS 101, then the call is routed to the MS 101 and/or further processing is performed on the call.

Figure 27:
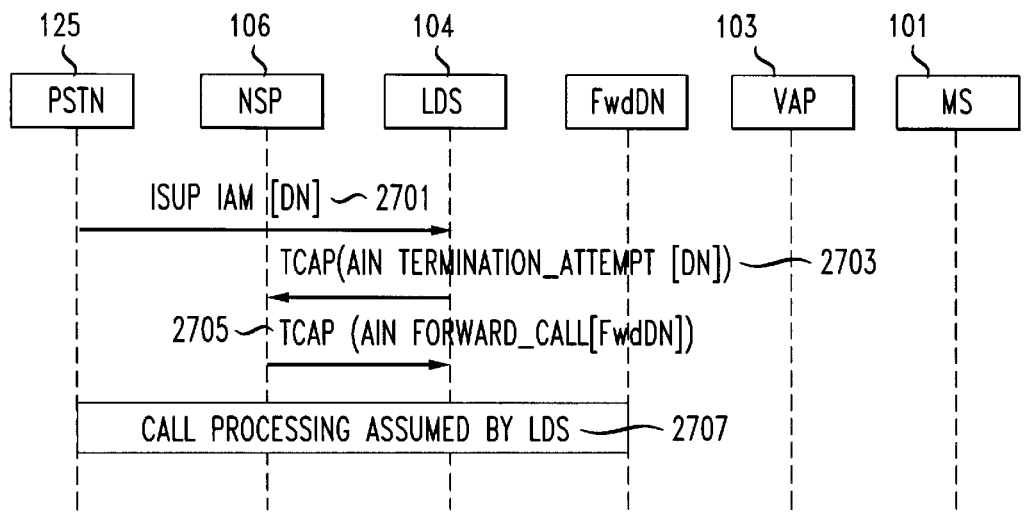
FIG. 27 is an exemplary signal flow diagram for signals generated when a call is successfully forwarded using the unconditional call forwarding feature of the present invention.

An exemplary embodiment of how the above steps for unconditional call forwarding may be performed is now described with reference to FIG. 27. Once the unconditional call forwarding feature has been activated for an MS 101, a PSTN 125 or WCS 140 user may dial the called WCS 140 subscriber's DN. Responsive to the LDS 104 receiving the incoming call for the WCS 140 subscriber at DN (the call is assumed in this example to be initiated from the PSTN 125) (step 2701), a TCAP AIN TAT message may be sent from the LDS 104 to the NSP 106 (step 2703). Upon receipt of the TCAP AIN TAT message, the NSP 106 may check the feature activation table for the MS 101 and may determine that the MS 101 has activated the unconditional call forwarding feature. The NSP 106 may further check the subscriber profile and find that the unconditional call forwarding feature is active for the called MS 101. If the unconditional call forwarding feature is active, the NSP 106 may retrieve the call forwarding number (FwdDN). The NSP 106 may immediately use the FwdDN as the forwarding number and may send a TCAP (AIN Forward_Call) message to the LDS 104 (step 2705). The LDS 104 may then assume the call processing and forward the call to FwdDN (step 2707).

B. Programmable Ring Call Forwarding

Call forwarding may alternatively or additionally be configured to forward a call in response to a selected number of rings occurring at the called MS 101 and/or the passage of a certain amount of time. For example, a call may be forwarded to FwdDN after three seconds have passed (e.g., after three seconds of alerting time at the MS 101). As another example, the call may be forwarded after eight seconds have passed.

To activate this "programmable ring call forwarding" feature, the MS 101 user may dial a feature activation code such as *91*4#[FwdDN], followed by the SEND button on the MS 101. Such a command may indicate that calls should be forwarded to FwdDN after four seconds. In this example, "*91" indicates the programmable ring call forwarding feature, and the "4" after the star sign indicates either the number of seconds or the number of rings after which a call should be forwarded, depending upon how the WCS 140 is configured. This number may be in the range of, e.g., 0 to 30 seconds, or 0 to 10 rings, changeable through the WCS 140 OA&M interface. To deactivate the programmable ring call forwarding feature, the MS 101 user may enter a sequence such as *910 followed by the send button. If no amount of time is specified by the user (e.g., by dialing *91#[FwdDN]) or the amount of time entered is out of range, then a default amount of time, such as four seconds, may be used.

Figure 32:
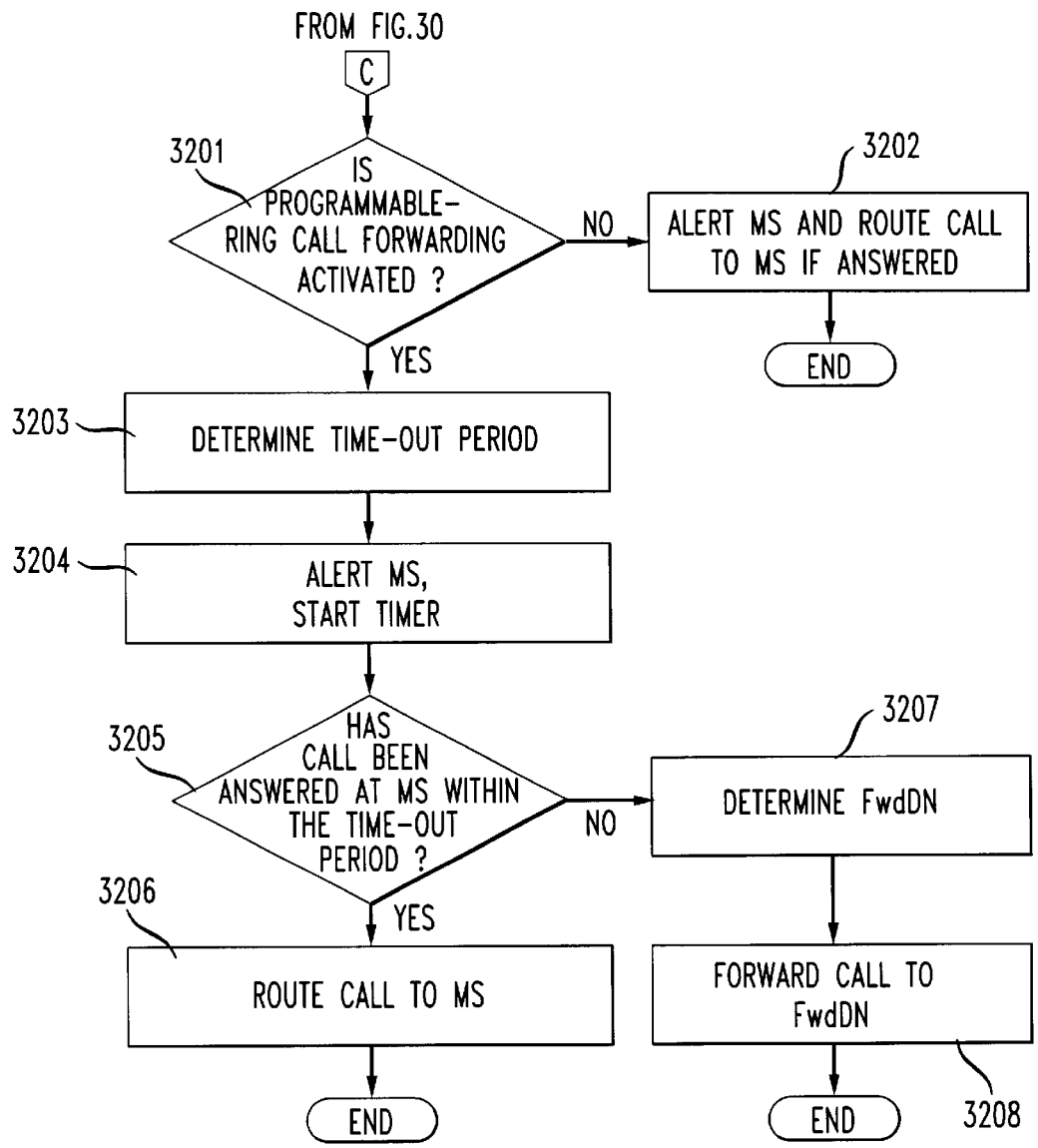
FIG. 32 is an exemplary flow chart of the programmable ring call forwarding feature of the present invention.

FIG. 32 is an exemplary flow chart of how the programmable ring call forwarding feature may work. Referring to the same call as in FIGS. 26, 28, and 30, and if the call has not yet been forwarded to FwdDN, a determination is made whether the programmable ring call forwarding feature has been activated for the MS 101 (step 3201). If this feature has not been activated, then the MS 101 is alerted to the call (e.g. by ringing the MS 101) and the call routed to the MS 101 upon answering (step 3202) and/or further processing is performed on the call. If the programmable ring call forwarding feature has been activated for the MS 101, then a time-out period is determined (step 3203). The time-out period may either be predetermined by the subscriber or set to a default value. The MS 101 is also alerted to the existence of the call, and a timer for timing the time-out period is started (step 3204). It is determined whether the call has been answered at the MS 101 before the timer has finished (step 3205), and if so, then the call is routed to the MS (step 3206). If the call has not been answered within the allotted time, then FwdDN is determined (3207) and the call is forwarded to FwdDN (step 3208).

Figure 33:
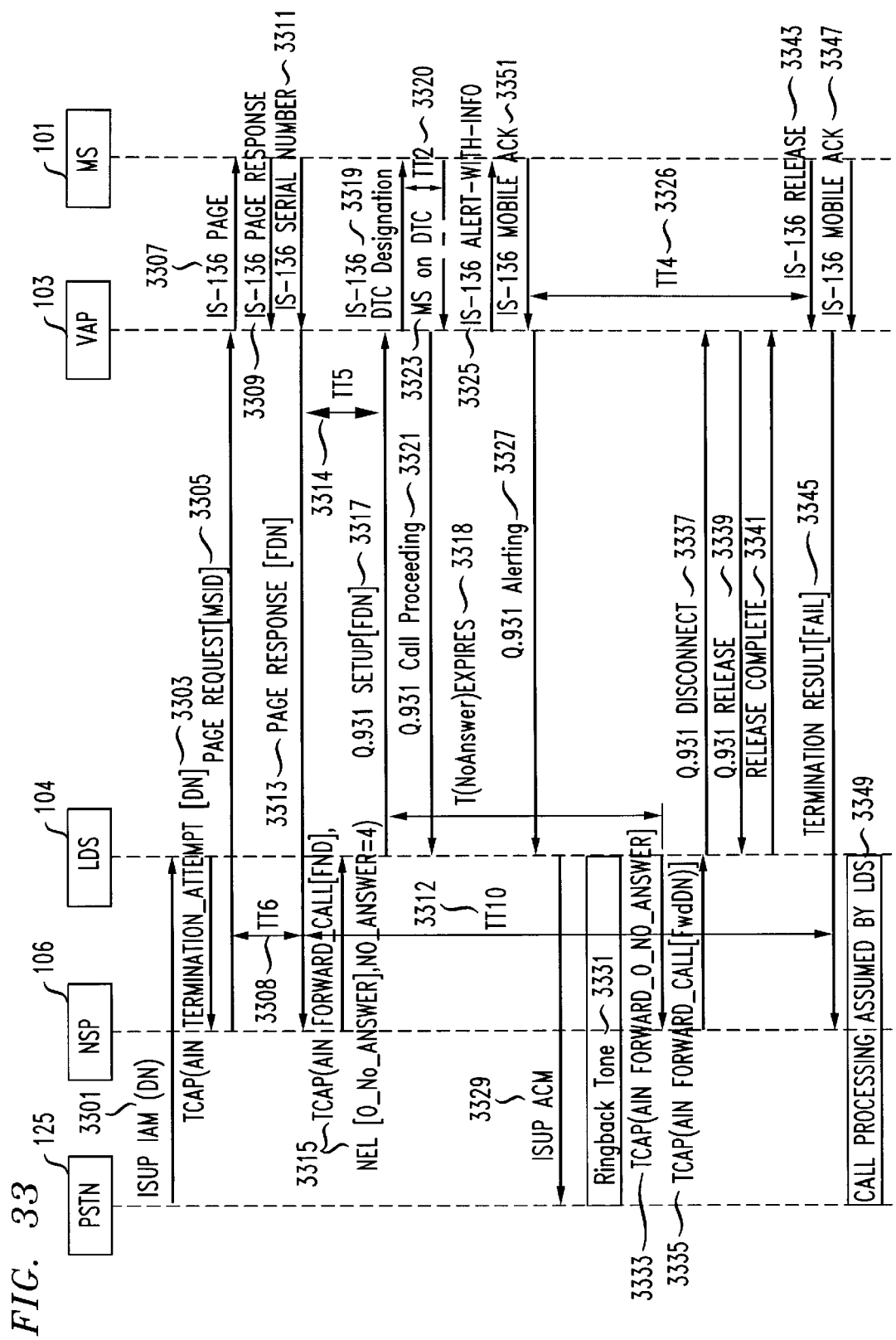
FIG. 33 is an exemplary signal flow diagram for signals generated when a call is successfully forwarded using the programmable ring call forwarding feature of the present invention.

An exemplary embodiment of how the above steps for programmable ring call forwarding may be performed is now described with reference to FIG. 33. Once the programmable ring call forwarding feature has been activated for the MS 101, an incoming call to the subscriber's DN is automatically forwarded to the FwdDN after the selected amount of time or number of rings. A PSTN 125 or WCS 140 user may dial the WCS 140 subscriber's DN (i.e., the subscriber who has activated the programmable ring call forwarding feature). The LDS 104 may receive the ISUP IAM message associated with the call (the call is assumed in this example to be initiated from the PSTN 125) (step 3301). In the present embodiment, the LDS 104 may determine that the dialed DN is provisioned for AIN Termination Attempt Trigger (TAT). Responsive to such a determination, the LDS 104 may suspend delivery of the call and may send an AIN query message to the NSP 106 (step 3303) for an appropriate routing instruction.

When the NSP 106 receives the AIN TAT message, the NSP 106 may find that the subscriber's MS 101 is active and idle in its serving area. The NSP 106 may then page the MS 101 through the VAP 103 (steps 3305, 3307) using IS-136 paging procedures, and may also start a TT6 timer 3308. As part of the page request message in step 3305, the NSP 106 may send the MSID that the VAP 103 will use to complete the incoming call setup procedure. When the MS 101 responds to the page (steps 3309, 3311), the VAP 103 may forward the page response in the form of a Page Response message, which includes the Forward Directory Number (FDN), to the NSP 106 (step 3313). The VAP 103 may also start an event timer TT5 3314 at this time to prevent permanent holding of RF and ISDN B-channel resources.

If the TT6 timer 3308 expires and the NSP 106 has not received the Page Response message in step 3313, the NSP 106 may authorize call termination to the DN. On the other hand, if the NSP 106 receives the Page Response message before the TT6 timer 3308 expires, the NSP 106 may cancel the TT6 timer.3308 and determine that the current VAP 103 has the resources to serve the incoming call. The NSP 106 may also check whether the programmable ring call forwarding feature is active for the particular MS 101. The NSP 106 gets the TFPR value, which signifies the time period for which the MS 101 should ring before the call should be forwarded, from the subscriber profile. At this point, the NSP 106 may direct (using a TCAP Conversation package) the LDS 104 to forward the call to the FDN of the VAP 103 serving the MS 101 (step 3315). The TCAP Conversation package may include the T(NoAnswer) timer value in the TCAP AIN message to indicate the length of the ringing after which the call shall be forwarded. The message may be in the form of TCAP (AIN Forward Call[FDN] , NEL[O__No__Answer], T(NoAnswer)), where T(NoAnswer) is set to be the time after which the call should be forwarded. For example, where the user activated the programmable ring call forwarding feature as *91*5#[FwdDN], then T(NoAnswer) would be set to five seconds.

The LDS 104 may start the T(NoAnswer) timer 3318 for the FDN and send a Q.931 Setup message to the VAP 103 (step 3317). Upon receipt of the Q.931 Setup message, the VAP 103 may cancel the TT5 timer 3314, initiate DTC designation to the MS 101 (step 3319), start a TT2 timer 3320, and send a Q.931 Call Proceeding message to the LDS 104 (step 3321).

At this point, the MS 101 may tune to the traffic channel. When the VAP 103 detects that the MS 101 is on the traffic channel via a DVCC status change (step 3323), the MS 101 may cut through the ISDN/B-Channel and initiate the Alerting procedures to both the call legs (i.e., in both the LDS 104 and MS 101 directions). The VAP 103 may send an IS-136 Alert-With-Info message to the MS 101 (step 3325) and wait for an IS-136 Mobile ACK message from the MS 101 (step 3351). When the VAP 103 receives the Mobile ACK message, the VAP 103 may start a TT4 timer 3326 and send a Q.931 Alerting message to the LDS 104 (step 3327). Upon receipt of the Q.931 Alerting message, the LDS 104 may send an ISUP ACM message to the switch in the PSTN 125 (step 3329) and generate a ring-back tone towards the calling party (step 3331).

When the T(NoAnswer) timer 3318 expires on the LDS 104, the LDS 104 may send an event notification to the NSP 106 (step 3333) in the form of an AIN O__No__Answer trigger. Upon receipt of the AIN O__No__Answer trigger, the NSP 106 may check if the programmable ring call forwarding feature is active for the MS 101. If the feature is active, the NSP 106 may get the call forwarding number from the subscriber profile and direct the LDS 104 to forward the call to the call forwarding number (FwdDN) (step 3335) using a TCAP (AIN Forward__Call[FwdDN]) message. The LDS 104 may then release the ISDN-B channel setup by sending a Q.931 Disconnect message to the VAP 103 (step 3337).

In response to the Q.931 Disconnect Message, the VAP 103 may send a Q.931 Release message to the LDS 104 (step 3339). In response, the LDS 104 may send a Q.931 Release Complete message to the VAP 103 (step 3341). The VAP 103 may release the RF resources by sending an IS-136 Release message to the MS 101 (step 3343), and may send a Termination Result [fail] message to the NSP 106 (step 3345). The MS 101 may send an IS-136 Mobile ACK message to the VAP 103 (step 3347). At this point, call processing may be assumed by the LDS 104 and the call will be forwarded to FwdDN (step 3349).

If the call is answered at the MS 101 before the T(NoAnswer) timer 3318 expires, or if the programmable ring call forwarding feature is not activated for the MS 101, then the call will be processed normally without the call being forwarded (unless another call forwarding feature as described herein is activated for the MS 101).

C. Busy Call Forwarding

Call forwarding may alternatively or additionally be configured to forward a call depending upon whether the subscriber's MS 101 is busy (i.e., currently handling a call). For example, incoming calls to the subscriber's DN may be routed to the subscriber's MS 101 when it is not busy, and forwarded to FwdDN when the MS 101 is busy.

To activate this "busy call forwarding" feature, the MS 101 user may dial a feature activation code such as *93#[FwdDN], followed by the SEND button on the MS 101. In this example, "*93" indicates the busy call forwarding feature. To deactivate the busy call forwarding feature, the MS 101 user may dial, e.g., *930 and then the SEND button.

Figure 28:
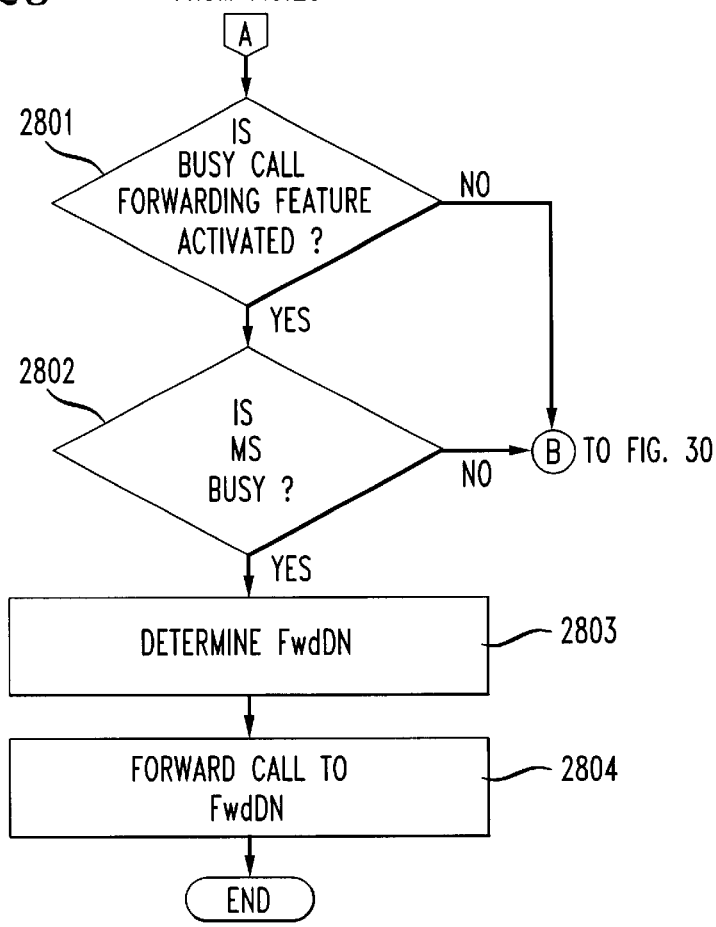
FIG. 28 is an exemplary flow chart of the busy call forwarding feature of the present invention.

FIG. 28 is an exemplary flow chart of how the busy call forwarding feature may work. Referring to the same call as in FIG. 26, and if the call has not yet been forwarded to FwdDN, a determination is made whether the busy call forwarding feature has been activated for the MS 101 (step 2801). If so, it is then determined whether the MS 101 is busy (step 2802). If the busy call forwarding feature is active and the MS 101 is busy, then FwdDN is determined (step 2803) and the call is automatically forwarded to FwdDN (step 2804). If the busy call forwarding feature has not been activated for the MS 101 and/or the MS is not busy, then the call is routed to the MS 101 and/or further processing is performed on the call.

Figure 29:
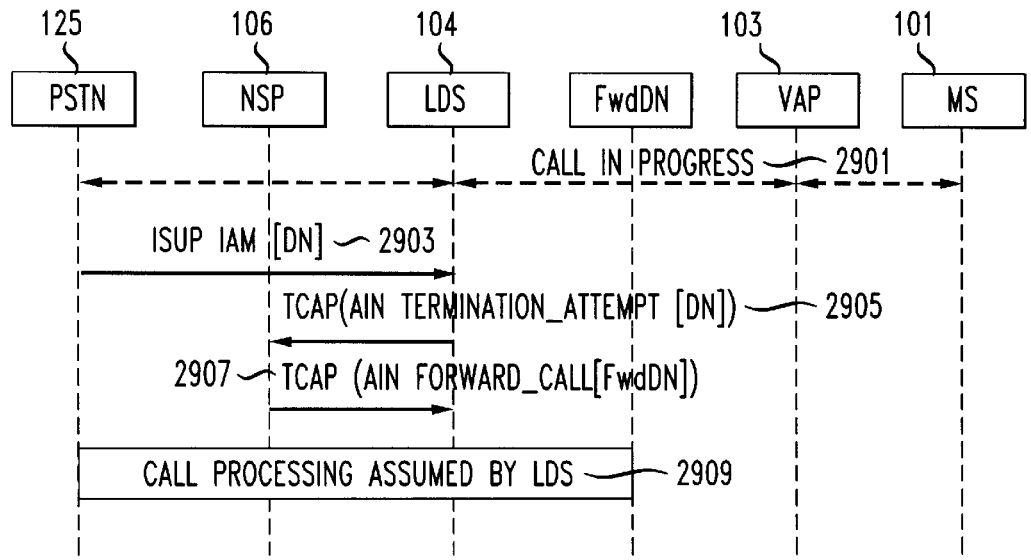
FIG. 29 is an exemplary signal flow diagram for signals generated when a call is successfully forwarded using the busy call forwarding feature of the present invention.

An exemplary embodiment of how the above steps for busy call forwarding may be performed is now described with reference to FIG. 29. Once the busy call forwarding feature has been activated for the MS 101, an incoming call will be automatically forwarded to FwdDN if the MS 101 is busy. When the LDS 104 receives an incoming call for the WCS 140 user (DN) (step 2901), the LDS 104 may send a TCAP AIN TAT message to the NSP 106 (step 2903). Upon receipt of the TCAP AIN TAT message, the NSP 106 may check the feature activation table for the MS 101 and determine whether the MS 101 has activated the busy call forwarding feature. The NSP 106 may also determine whether the MS 101 is currently busy. If the MS 101 is currently busy (e.g., busy due to call 2901) and the busy call forwarding feature is activated for the MS 101, the NSP 106 may use the FwdDN as the forwarding number and send a TCAP (AIN Forward Call) message to the LDS 104 (step 2905). The LDS 104 may then assume call processing and forward the call to FwdDN (step 2907). If the MS 101 is not currently busy, or if the busy call forwarding feature is not activated for the MS 101, then the call will be processed normally without being forwarded (unless another call forwarding feature as described herein is activated for the MS 101).

D. Time-of-Day Call Forwarding

Call forwarding may alternatively or additionally be configured to forward a call depending upon the time of day, day of week, and/or date. For example, a call may be forwarded to FwdDN on weekends but not on weekdays. As another example, incoming calls to a particular subscriber's DN may be forwarded to a first FwdDN between begin time 9:00 a.m. and end time 6:00 p.m., to a second different FwdDN between begin time 6:00 p.m. and end time 8:00 p.m., and not forwarded at all other times (i.e., routed to subscriber's normal MS 101 at all other times).

To activate this "time-of-day call forwarding" feature, the MS 101 user may dial a feature activation code such as *92*[BeginTime]*[EndTime]#[FwdDN], followed by the SEND button on the MS 101. In this example, "*92" indicates the time of day call forwarding feature. "[BeginTime]" indicates the selected begin time, and "[EndTime]" indicates the selected end time. The begin and end times may be entered in any format. For example, the format may be a 24 hour military time format, such that if the chosen begin time is 8:30 a.m., and the chosen end time is 600 p.m., then BeginTime would be entered by the subscriber as 0830 and EndTime would be entered as 1800. To deactivate the time-of-day call forwarding feature, the MS 101 user may dial, e.g., *920 and then the SEND button.

Figure 30:
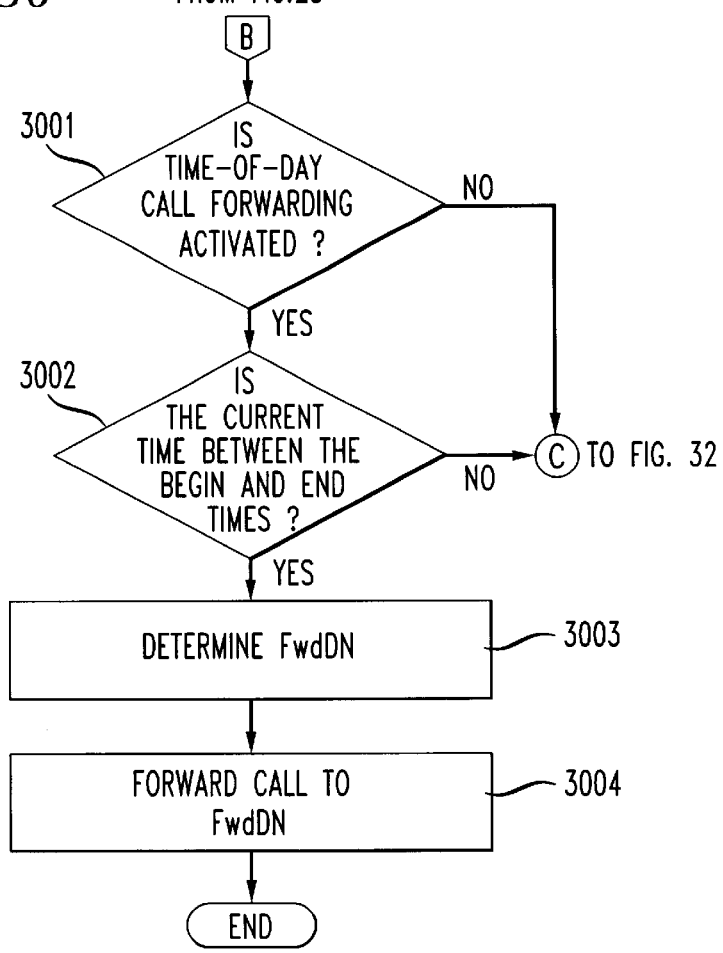
FIG. 30 is an exemplary flow chart of the time-of-day call forwarding feature of the present invention.

FIG. 30 is an exemplary flow chart of how the time-of-day call forwarding feature may work. Referring to the same call as in FIGS. 26 and 28, and if the call has not yet been forwarded to FwdDN, a determination is made whether the time-of-day call forwarding feature has been activated for the MS 101 (step 3001). If so, it is then determined whether the current time is between predetermined begin and end times (step 3002). If the time-of-day call forwarding feature is active and the current time is between the begin and end times, then FwdDN is determined (step 3003) and the call is automatically forwarded to FwdDN (step 3004). If the time-of-day call forwarding feature has not been activated for the MS 101 and/or the current time is not between the begin and end times, then the call is routed to the MS 101 and/or further processing is performed on the call.

Figure 31:
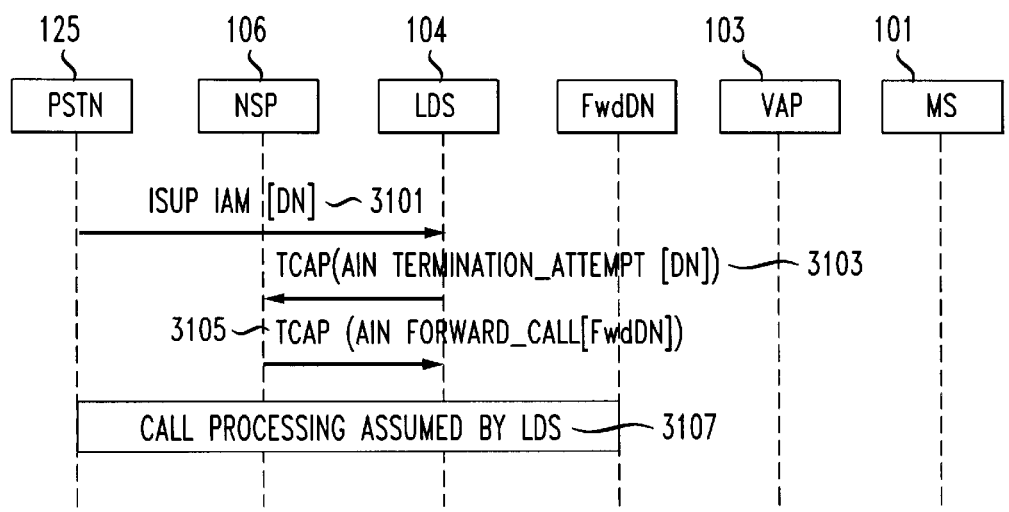
FIG. 31 is an exemplary signal flow diagram for signals generated when a call is successfully forwarded using the time-of-day call forwarding feature of the present invention.

An exemplary embodiment of how the above steps for time-of-day call forwarding may be performed is now described with reference to FIG. 31. Once the time-of-day call forwarding feature has been activated for the MS 101, an incoming call to the subscriber's DN is automatically forwarded to FwdDN depending upon the time, date, and/or day. When the LDS 104 receives an incoming call for the WCS 140 user (DN) (step 3103), the LDS 104 may send a TCAP AIN TAT message to the NSP 106 (step 3105). Upon receipt of the TCAP AIN TAT message, the NSP 106 may check the feature activation table for the MS 101 and determine that the MS 101 has activated the time-of-day call forwarding feature. The NSP 106 may check a clock (such as the internal clock of the NSP 106) and compare the clock with the user-programmed time period(s). For example, the NSP 106 may check whether the current time as indicated by the clock is between the begin time and the end time of each user-programmed time period.

If the clock is within one of the user-programmed time periods, the NSP 106 may use FwdDN as the forwarding number and send a TCAP (AIN Forward Call) message to the LDS 104 (step 3107). The LDS 104 may then assume call processing and the call is forwarded to FwdDN (step 3109). If the current time as indicated by the clock is not within one of the user-programmed time periods, or if the time-of-day feature is not activated for the MS 101, then the NSP 106 may treat the incoming call as a normal incoming call, such that the incoming call will not be forwarded (unless another call forwarding feature as described herein is activated for the MS 101).

Any or all of the above-described features may be activated, deactivated, and/or otherwise configured in any combination or subcombination desired for a particular MS 101. For example, call forwarding for a particular MS 101 may be configured so as to unconditionally forward calls on weekends, and to forward calls only after six seconds on weekdays. Such activation, deactivation, and/or other configuration of the features may be controlled by the user via the MS 101, via a telephone call to the service provider (e.g., a customer service representative), via the Internet, and/or via an intranet or other private or public network coupled to the WCS 140. Alternatively, the WCS 140 may be configured such that only one call forwarding feature at a time may be activated for a particular MS 101. In such an embodiment, if a call forwarding feature is activated while an existing call forwarding feature is already activated for the MS 101, the new call forwarding feature may replace the existing call forwarding feature.

Figure 34:
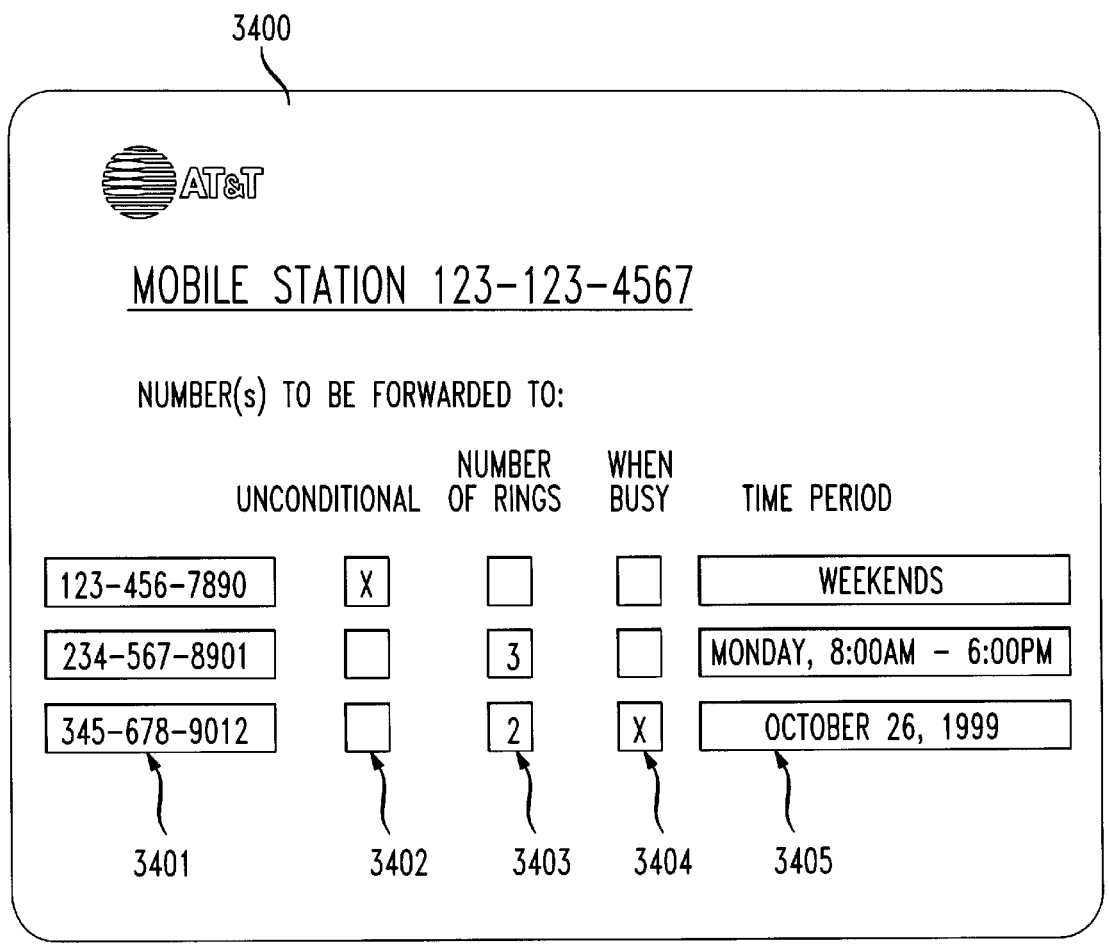
FIG. 34 illustrates an exemplary embodiment of an Internet web page for activating and/or modifying features according to aspects of the present invention.

FIG. 34 illustrates a display of an exemplary interactive Internet web page 3400 for activating, deactivating, and/or configuring features described herein. The web page 3400 may allow a user to define one or more FwdDNs to which calls should be forwarded depending upon one or more conditions. An advantage to using an Internet web page to activate, deactivate, and/or configure features is that the user may see the entire configuration on one display. This may be important if the user has selected a particularly complex feature configuration. When the Internet is used to configure call forwarding features or other features, a server that runs the web page 3400 may be coupled to the WCS 140.

The web page 3400 shown in FIG. 34 includes one or more forwarded number text boxes 3401 within which a user can enter selected FwdDNs, check boxes 3402 for selecting whether a call should be unconditionally forwarded to a particular FwdDN, text boxes 3403 for selecting how many rings should occur at the MS 101 (and/or how much time to wait) before forwarding a call for a particular FwdDN, check boxes 3404 for selecting whether a call should be forwarded to a particular FwdDN when the MS 101 is busy, and text boxes 3405 for selecting time ranges within which a call should be forwarded to a particular FwdDN. Of course, the web page 3400 may include any type of text box, check box, pull-down menu, scroll box, etc., any of which may be used interchangeably as desired with any of the text boxes and/or check boxes 3401–3405. What is important is that the web page 3400 allows the user to configure the call forwarding features and/or other calling features for his/her MS 101.

For example, as shown in FIG. 34, call forwarding for an MS 101 having a DN 123-123-4567 may be configured on the web page 3400 to unconditionally forward all incoming calls, but only on weekends, to FwdDN 123-456-7890. Call forwarding for the same MS 101 may further be configured to forward incoming calls after three rings at the MS 101, but is only on Mondays between 8:00 a.m. and 6:00 p.m., to FwdDN 234-567-8901. Call forwarding for the same MS 101 may further be configured to forward incoming calls after two rings at the MS 101 or when the MS 101 is busy, but only on Oct. 26, 1999, to FwdDN 345-678-9012. Thus, a particular MS 101 may have multiple call forwarding and/or other features simultaneously configured. If there is a conflict in features (e.g., unconditional call forwarding at all times in combination with call forwarding only when busy at all times), then the web page 3400 may indicate to the user that such a conflict exists and that the features should be re-configured accordingly.

XVI. Call Waiting

Figure 35:
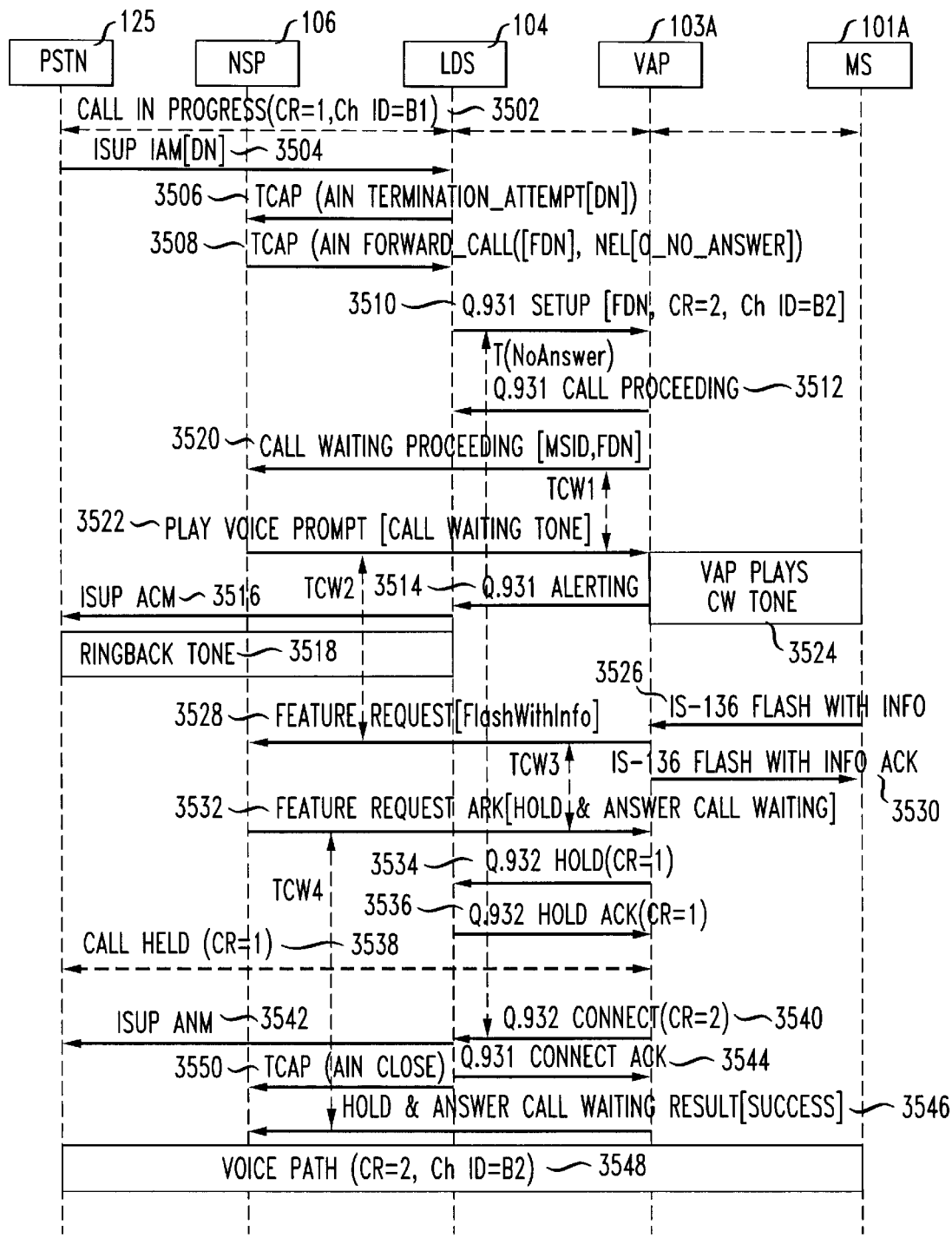
FIG. 35 shows an exemplary call flow diagram for the call waiting functionality according to an illustrative embodiment of the present invention.

FIG. 35 provides an exemplary call flow diagram for implementing the call waiting feature according to an illustrative embodiment of the present invention.

For purposes of this discussion, it will be assumed that there exists an active call 3502 between a mobile station MS 101A and a party coupled to the PSTN 125. The call 3502 in progress is referred to by the VAP 103A and the NSP 106 as having a call reference value, CR=1, and a B Channel ID (Ch ID=B1). When a second call originating from within the PSTN 125 is made to a DN of a party in a WCS system, such as a party using MS 101A, an ISUP IAM [DN] message 3504 is received by the LDS 104. The LDS 104 processes the ISUP IAM message 3504 and discovers that the called party's DN is provisioned for AIN call treatment. Then, the LDS 104 sends an AIN query message, TCAP (AIN Termination Attempt [DN]) message 3506, to the NSP 106 for an appropriate routing instruction. Responsive to the AIN query message and knowing that the MS 101A is involved in an active call 3502, the NSP 106 determines if the MS 101A subscribes to the call waiting feature by checking the WCSD (Wireless Centrex System Database) and determines if the call waiting feature is currently available and has been activated by the subscriber.

If the MS 101A does not subscribe to the call waiting feature or the feature is not presently available such as by being deactivated, the NSP 106 sends a TCAP message (not shown) to the LDS 104 with Authorize Term (authorize termination) message to the original DN. The call waiting feature may not be available due to manual or automatic deactivation. According to one embodiment of the invention, the user may manually deactivate the call waiting feature when they do not want to be interrupted by, for example, pressing a special key code on their handset prior to making a call. Also, the call waiting feature may be automatically deactivated in a number of instances, such as: 1) when the MS is already engaged in a conference call; 2) when the MS is already engaged in another call waiting; 3) when the MS has received an automatic callback call with another call on hold; and 4) as predetermined by the subscriber including based on the physical location of the MS, the time of day, or the other party on the original call. When the LDS 104 receives the Authorize Term message, the incoming call may be connected to the DN (desktop phone) or coupled to the VMS 107 for further handling.

If the MS 101A subscribes to the call waiting feature and it is presently available or active, then the NSP 106 sends an AIN Forward Call message in a TCAP conversation package 3508 to the LDS 104. The TCAP conversation package 3508 directs the LDS 104 to forward the call to the FDN (forward directory number). The FDN is the DN in the VAP 103A that is used to deliver the call to the MS 101A. The LDS 104 then sends a Q.931 Setup message 3510 including the FDN, a call reference value (CR=2) and a second B Channel ID (Ch ID=B2) to the VAP 103A and starts a No Answer Timer (T(NoAnswer)). The VAP 103A responds to the Q.931 Setup message 3510 by sending a Q.931 Call Proceeding message 3512.

Next, the VAP 103A sends the NSP 106 a Call Waiting Proceeding message 3520 including the MSID and FDN and starts the TCW1 timer (first call waiting timer). In response, the NSP 106 sends a Play Voice Prompt message 3522 including a call waiting tone to the VAP 103A and starts the TCW2 timer (second call waiting timer). Upon receipt of the Play Voice Prompt message 3522, the VAP 103A cancels the TCW1 timer and generates and plays the call waiting (CW) tone 3524 to the user of MS 101A. The tone may be generated and played at a preset interval for a preset duration, such as every five seconds for one minute.

While the CW tone 3524 is being generated, the VAP 103A sends a Q.931 alerting message 3514 to the LDS 104. The LDS 104 responsive to the Q.931 alerting message 3514 sends an ISUP ACM message 3516 to the switch in PSTN 125. In the meantime, the LDS 104 sends a ring back tone 3518 to the PSTN 125 caller.

The user of MS 101A may choose to answer the incoming call by sending a message to the VAP 103A before T(NoAnswer) expires. According to an illustrative embodiment of the invention, the user can answer the incoming call and place the existing call on hold by pressing the "send" button, which in turn sends an IS-136 Flash with Info message 3526 to the VAP 103A. In response, the VAP 103A sends a Feature Request [Flash with Info] message 3528 to the NSP 106 and starts the TCW3 (third call waiting timer). Also, the VAP 103A sends an IS-136 Flash with Info ACK message 3530 to the MS 101A acknowledging receipt of the Flash with Info message 3526. When the NSP 106 receives the Feature Request [Flash with Info] message 3528, it cancels the TCW2 timer and sends a Feature Request ACK [Hold and Answer Call Waiting] message 3532 to the VAP 103A and starts the TCW4 timer (fourth call waiting timer). Next, the VAP 103A cancels the TCW3 timer and initiates the Q.932 call hold procedure for the existing call (CR=1) by sending a Q.932 Hold [CR=1] message 3534 to the LDS 104. The LDS then responds by sending a Q.932 Hold ACK [CR=1] message 3536 to the VAP 103A to acknowledge that the current call is held, Call Held (CR=1) 3538.

The VAP 103A sends a Q.931 Connect [CR=2] message 3540 to LDS 104 to cause initiate connection of the incoming call (CR=2). The LDS 104 then cancels the T(NoAnswer) timer and sends an ISUP ANM message 3542 to PSTN 125 switch to cut through the voice path 3548. After the LDS 104 sends an ISDN Q.931 Connect ACK message 3544 to the VAP 103A for the incoming call, it sends a TCAP (AIN Close) message 3550 to the NSP 106. Meanwhile, the VAP 103A sends a Hold & Answer Call Waiting Result [success] message 3546 to the NSP 106 indicating that the call waiting process has been successful. Then, the NSP 106 cancels the TCW4 timer and the voice path 3548 is established for the incoming call while the original call (CR=1) is placed on hold. The voice path 3548 has a call reference value of CR=2 and a B Channel ID, Ch ID=B2.

It should be understood that the MS user could proactively handle the second call as described in other portions of this application in conjunction with the call waiting feature.

Also, the user may switch back and forth between the second call (CR=2) and the original call (CR=1) in a number of ways. For example, the user may press the "send" button and reinitiate the process described in FIG. 35 beginning with sending IS-136 Flash with Info message 3526 as set forth above.

Figure 36:
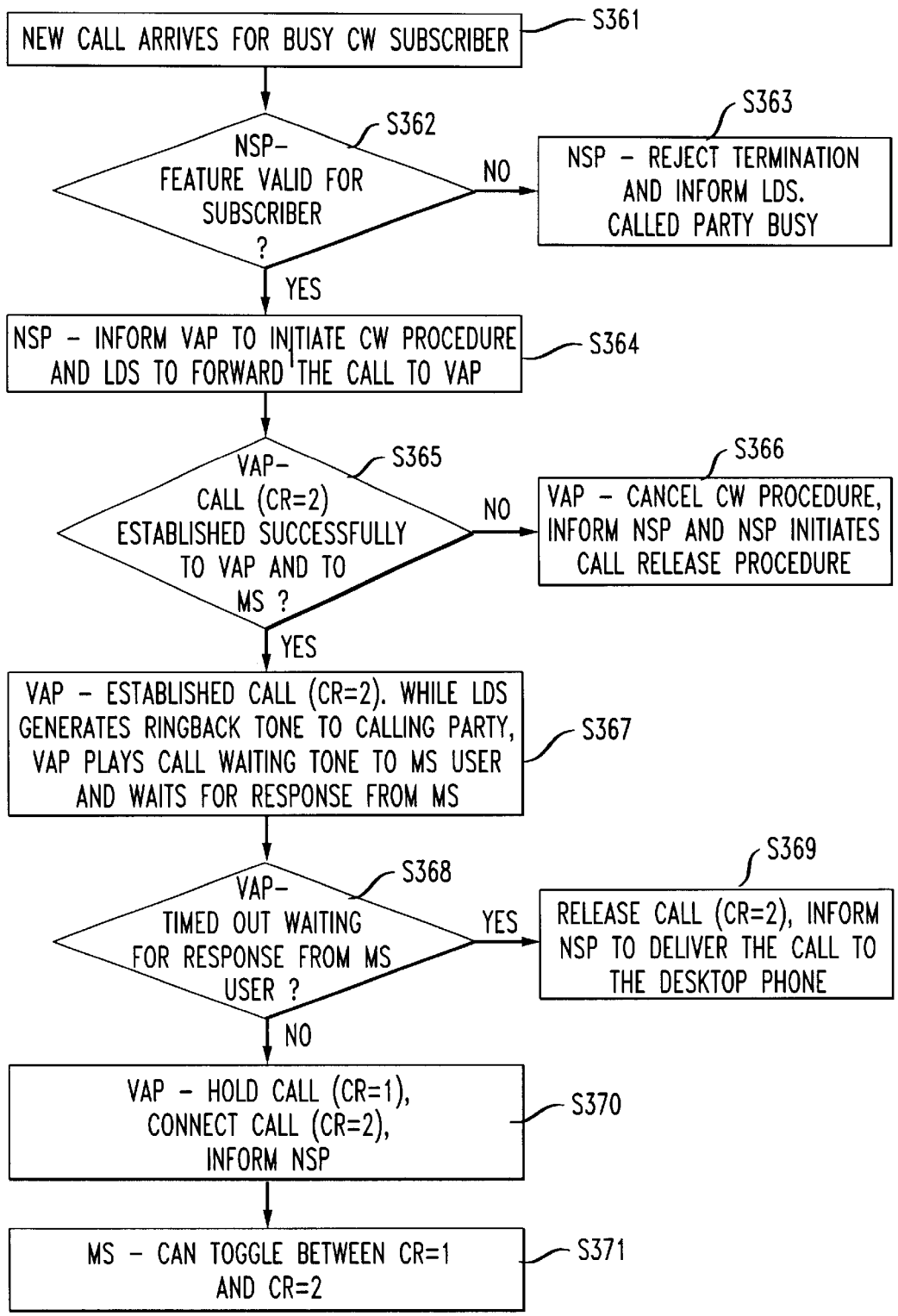
FIG. 36 shows an illustrative flow diagram for the call waiting service feature according to an embodiment of the present invention.

FIG. 36 provides an illustrative flow diagram for implementation of the call waiting feature according another embodiment to the present invention in which much of the intelligence is distributed to the VAP 103A rather than in the NSP 106.

In step S361, an existing call (CR=1) between a PSTN user and MS 101A is in progress and a new call arrives for the MS 101A. Next in step S362, the NSP 106 determines whether the call waiting feature is available for the MS 101A. If the NSP 106 determines that call waiting is not available, then the NSP 106 informs the LDS 104 that the MS 101A is busy in step S363 and a busy signal can be returned to the PSTN user, or another call routing procedure may be implemented such as routing the call for further handling as described elsewhere in the application, such as to the desktop phone associated with the MS 101A or the VMS 107. Alternatively, if the NSP 106 validates that call waiting is available, then, in step S364, the NSP 106 instructs the VAP 103A to initiate the call waiting procedure and the LDS 104 to forward the call to the VAP 103A.

In step S365, it is determined whether the call (CR=2) has been established successfully to the VAP 103A and the MS 101A. If the call has not been established successfully in step S365, then, in step S366, the VAP 103A cancels the call waiting procedure and informs the NSP 106 of the cancellation, which causes the NSP 106 to initiate the call release procedure. If the call has been established successfully, the LDS generates a ringback tone to the calling party and the VAP 103A sends a call waiting signal to the MS 101A and waits for a response thereto in step S367.

The VAP 103A waits a predetermined period of time for a response from the MS 101A user in step S368. If the VAP 103A timer expires in step S368, the VAP 103A informs the NSP 106 to release the call (CR=2) in step S369 similarly to step S366. However, if the MS 101A responds within the time period, the VAP 103A initiates the call hold procedure in which the LDS 104 places the original call (CR=1) on hold and the incoming call (CR=2) is established between the PSTN user and the MS 101A in step S370. Also, in step S360, the VAP 103A informs the NSP 106 of the successful call waiting result. In step S371, the MS 101A user may toggle back and forth between the new call (CR=2) and the original call (CR=1) putting one on hold while communicating in the other.

XVII. Distinctive Ringing

The distinctive ringing feature allows a subscriber to be alerted by a distinctive indication, e.g., a ring, of an incoming call originated from a communications unit assigned specific directory number (DN). A subscriber can provision one or more DNs that cause a distinctive ring to occur when a communications unit assigned a provisioned DN initiates a call to the subscriber.

There are several ways a subscriber can provision the distinctive ringing DN list. For example, the user may access the Internet or a web-based interface such as a WCS web site and input and update the DN list. Also, the subscriber may contact a customer care center representative by phone and verbally communicate the numbers through any type of communications unit (e.g., cell phone, landline phone, wireless palm top computer phone, etc.). Alternatively, a user may be directed through an automated phone menu to input the numbers by use of a communications unit keypad or voice recognition system.

According to one embodiment, the user may provision the distinctive ringing services through the WCS system. In this regard, the subscriber may activate the feature by entering a feature activation code followed by a DN (e.g., *70#5555151) into the keypad of MS 101A and then pressing the "send" button. Actuation of the "send" button sends the feature activation message to the WCS system (e.g., NSP 106). The WCS system then may acknowledge activation of the feature and phone number by, for example, returning a short message to the MS 101A. In addition, a message indicating that a call origination request has been rejected may contain feature activation/deactivation status information to be displayed to the user.

In a further modification, a subscriber can select a specific distinctive ring for each DN from a plurality of available rings (e.g., 5 ring tones). For example, a subscriber may identify personal calls by one distinctive ring type (e.g., ring type 1), business calls by another distinctive ring type (ring type 2), and a very important call by yet another ring type (ring type 3). Also, the subscriber may define a distinctive ring for all calls originating from parties who have blocked their number pursuant to call blocking. Thus, the subscriber might send the feature activation code followed by the ring type and the DN (e.g., *70#2#5555151) to the WCS system. When the subscriber fails to enter a ring type, a default distinctive ring (e.g., ring type 1) can be assigned to the DN.

To remove a phone number from the DN list, the subscriber, in addition to the methods note above, may enter a feature deactivation code followed by the DN (e.g., *700#DN) and press the "send" button. Also, the subscriber may deactivate the distinctive ringing for all numbers by entering a feature deactivation code (e.g., *700#*) and the "send" button on the MS 101A. A more detailed discussion of feature activation and deactivation is provided at other places in the instant description, for example at section IX.

According to an illustrative embodiment of the invention, the DN list may be stored in a memory in the NSP 106 or a memory location accessible to the NSP 106. The DN list may include any amount of numbers depending on the capacity of the memory employed In one embodiment, up to thirty numbers may be preset for distinctive ringing. In this embodiment, if a subscriber attempts to provision a thirty-first number, the system may reject the provision or alternatively overwrite the fast number provisioned (a first-in-first-out (FIFO) scheme). Also, the size of the phone number in the list can be set according to the capacity of the memory. In an illustrative embodiment, the size of the numbers in the list may range from four to fifteen digits. Also, it should be understood that a DN of a calling party outside or inside the WCS environment may be defined to have a distinctive ring.

Figure 37:
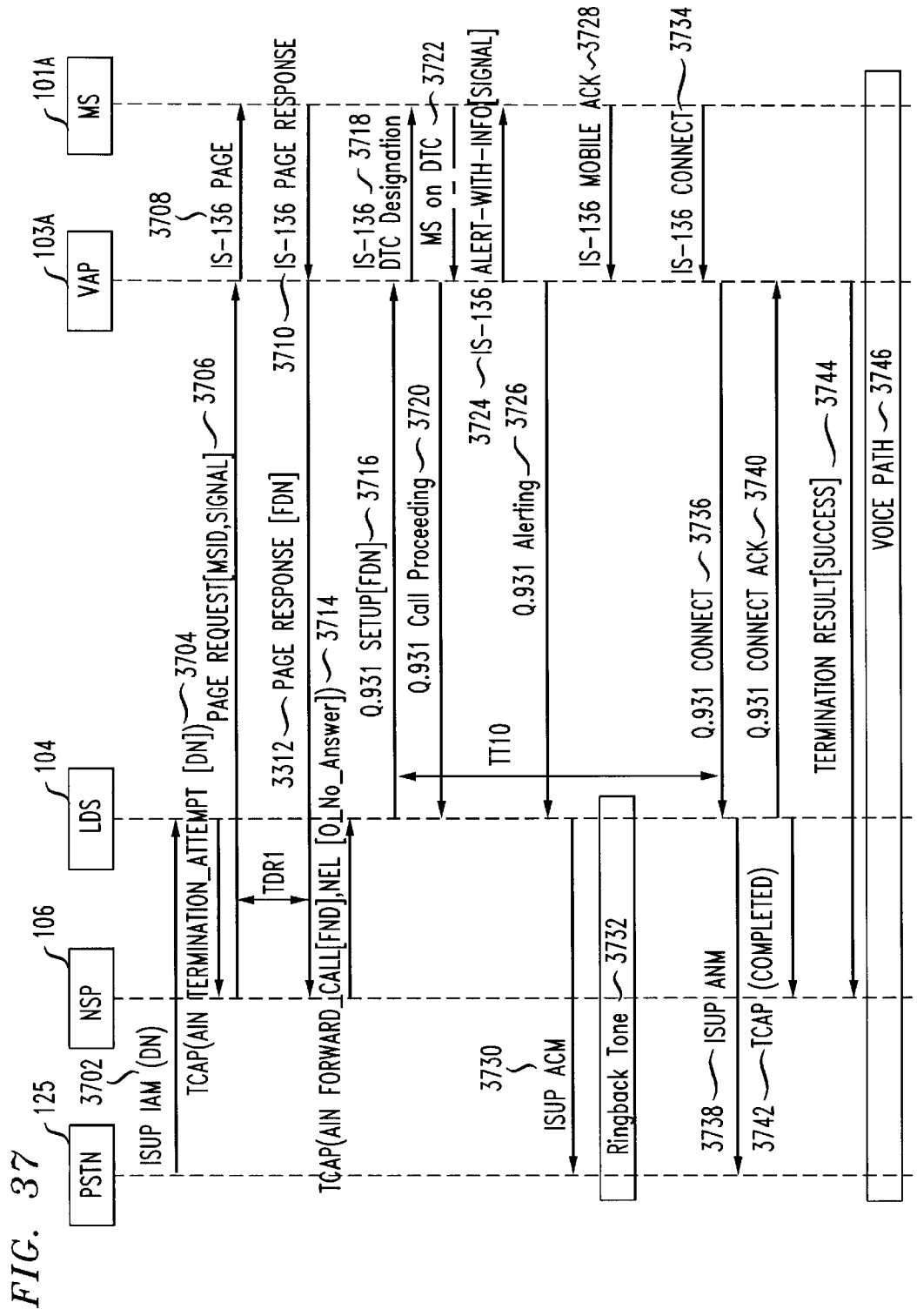
FIG. 37 shows an exemplary call flow diagram for the actual implementation of the distinctive ringing feature according to an illustrative embodiment of the present invention.

FIG. 37 provides an exemplary call flow diagram for implementing the distinctive ringing feature according to an illustrative embodiment of the present invention. While the IS-136 standard is used to illustrate one implementation of the present invention, it should be understood that the present invention is applicable to other cellular or PCS systems.

When a user of the PSTN 125 dials the DN of a WCS subscriber, the LDS 104 receives an ISUP IAM message 3702 from the PSTN 125. If the dialed DN is provisioned for AIN Termination Attempt Trigger (TAT), the LDS 104 suspends the delivery of the call and sends an AIN query message 3704 (i.e., TCAP (AIN Termination_Attempt [DN])) to the NSP 106 for an appropriate routing instruction.

The NSP 106 upon receipt of the AIN query message 3704 determines if the DN of the calling party is a number for which distinctive ringing is desired (i.e., a DR DN). For example, the NSP compares the DN of the calling party with each DR_DN in the distinctive ringing list for the MS 101A (e.g., in the wireless centrex system database (WCSD) entry for the MIN of MS 100A). If the DN of the calling party matches a DR_DN in the distinctive ringing list, the NSP 106 retrieves the information regarding the distinctive ring from its storage location and specifies in the "signal" portion of a page request message 3706 that a distinctive ring should be provided for the MS 101A. Also, if multiple distinctive ring tones are available, the NSP 106 indicates the specific distinctive ring tone for reception by the MS 101A in the "signal" portion of the page request message 3706. Assuming the subscriber's MS 101A is active in the service area of the NSP 106, the NSP 106 sends the page request message 3706 (i.e., Page Request [MSID, signal]) to the VAP 103A serving MS 101A.

When the NSP sends the page request message 3706 to the VAP 103A, a timer TDR1 starts. Responsive to the page request message 3760, the VAP 103A sends an IS-136 Page message 3708 to the MS 101A. If the MS 101A does not respond to the IS-136 page message 3708 before timer TDR1 expires, then the call is terminated in another manner by transfer to the VMS, user's desktop phone or otherwise as described herein. Otherwise, the MS 101A responds to the IS-136 page message 3708 via an IS-136 page response message 3710 sent to the VAP 103A. In turn, the VAP 103A sends a page response message 3712 (i.e., Page Response [FDN]) to the NSP 106.

After receiving the page response message 3712, the NSP 106 directs LDS 104 to forward the call to the Forward Directory Number (FDN) of the VAP 103A serving the MS 101A in a TCAP conversation package 3714, TCAP (AIN Forward_Call [FDN], NEL [O_No_Answer]). The NSP 106 also indicates its interest in event (O_No_Answer for FDN) by sending next event list NEL [O_No_Answer]) information to the LDS 104 in a request component that accompanies the routing component in the TCAP conversation package 3714. The LDS 104 then starts a No Answer Timer TT10 for the FDN. Also, LDS 104 sends a Q.931 setup [FDN] message 3716 to the VAP 103A.

The VAP 103A then sends an IS-136 digital traffic channel (DTC) designation message 3718 to the MS 101A. Also, VAP 103A sends a Q.931 call proceeding message 3720 to the LDS 104. The MS 101A then tunes to the digital traffic channel and responds to the VAP 103A with MS on DTC message 3722. The VAP 103A detects the MS 101A on the appropriate traffic channel. Next, the VAP 103A alerts MS 101A with an alert-with-info [signal] message 3724. The alert-with-info message 3724 includes the appropriate distinctive ringing tone, if any, for play to the subscriber of the MS 101A. The VAP 103A then sends a Q.931 alerting message 3726 to LDS 104. The MS 1101A acknowledges receipt of the alert-with-info message 3724 by sending the VAP 103A an IS-136 mobile acknowledge (Mobile ACK) message 3728. Upon receiving the Q.931 alerting message 3726, the LDS 104 sends an ISUP ACM message 3730 to the switch in PSTN 125. Meanwhile, the LDS 104 sends a ringback tone 3732 to the calling party from the PSTN 125.

When the MS 101A answers (before TT10 expires), it sends an IS-136 connect message 3734 to the VAP 103A. The VAP 103A then sends Q.931 connect message 3736 to the LDS 104 in response to the IS-136 connect message 3734 from MS 101A. The LDS 104 then cancels timer TT10 and sends ISUP ANM message 3738 to the PSTN 125 switch and cuts through the voice path 3746. After the LDS 104 sends a Q.931 connect ACK message 3740 to the VAP 103A, it then sends TCAP (Completed) message 3742 to the NSP 106 to complete the TCAP transaction. Responsive to Q.931 connect ACK message 3740, the VAP 103A sends termination result [Success] message 3744 to the NSP 106 for billing and other OAM&P purposes. At this point, voice path 3746 has been established and the call proceeds between the calling party from the PSTN 125 and the MS 101A subscriber.

XVIII. Returning Calls

Technologies that facilitate wireless communication are emerging at an ever-faster rate. Such technologies are employed in end-user devices such as pagers, communication systems, and mail systems such as voice mail and email systems. In wireless communication systems, a need exists to provide a new service in the wireless environment that is analogous to the call return feature provided on wired telephone handsets. A user may be unable to answer his wireless handset when a call is received. For example, the user may be in a meeting where the call would be perceived as a disruption, may be waiting for another call, may be busy on another call, or may not wish to interrupt whatever he is doing when he receives the incoming call.

In existing wireless handsets, a user may preset his wireless phone to avoid disruption of his activity when the incoming call arrives, but no provision has been made to allow the user to automatically return the call at a later, more convenient time. Thus, a user who is interrupted or busy cannot avoid answering the incoming call without one of: either missing the call entirely or having to manually redial a number saved on the terminal or on a system that indicates the phone number of the caller. Clearly, there is a need for a system, wireless apparatus and method for allowing a user the flexibility of automatically dialing back an incoming call in a wireless communication system.

The present invention provides a system, wireless apparatus and method for allowing a user the flexibility of automatically dialing back an incoming call in a wireless communication system at a time convenient to the user that received the call, a functionality that is analogous to the call return feature provided on wired telephone handsets. For example, a wireless phone may implement the present invention.

In the example below, implementation of the present invention is accomplished using a wireless phone in a Wireless Centrex System 140 (WCS). The WCS 140 provides a private wireless access system that is unconnected to any public macro-cellular system and provides Centrex-type services. FIG. 1B shows a block diagram of an illustrative architecture of a WCS platform wherein the present invention may be utilized. The WCS platform includes a local digital switch 104 (LDS), a remote digital terminal 102 (RDT, e.g., SLC-2000), a network server platform 106 (NSP), voice access ports 103A, 103B (VAP) and a plurality of associated IS-136 digital time division multiple access (TDMA) cellular or personal communications service (PCS) mobile stations 101A, 101B which implement the present invention. The LDS 104 is a TR-08 and GR-303 compatible local digital switch that employs distributed intelligence, process-oriented software, and coordinated autonomous computing elements to provide a flexible, modular, reliable and robust digital switching system. The LDS 104 provides a single platform for advanced services, including Integrated Services Digital Network (ISDN), Centrex, Custom Local Area Signaling Services (CLASS), custom calling, and Advanced Intelligent Network (AIN) capabilities. The LDS 104 also supports X.25 packet switched data communication and circuit switched data, and provides a gateway to local and long distance networks. The switching fabric, administration, message switching, and call switching functions are provided by the LDS 104.

The AIN capabilities of the LDS 104 provide AIN switch software that enables the network provider to create, deploy, and change services to meet user's requests. The AIN software allows the LDS 104 to act as an AIN service switching point to communicate with service control points and intelligent peripherals. For example, the LDS 104 may be a 5ESS manufactured by Lucent Technologies or a DMS-100 manufactured by Nortel. In the WCS configuration illustrated in FIG. 1A, the NSP 106 acts a service control point, directing call processing on the LDS 104.

The RDT 104 is a digital loop carrier terminal that supports the plain old telephone system (POTS), ISDN, high-speed transport, and special services such as private lines and private branch exchange (PBX)'services. For example, the RDT 102 may be implemented by a SLC2000 manufactured by Lucent Technologies or an Access Node manufactured by Nortel. The RDT 102 interfaces, typically at a central office, with the LDS 104. The RDT 102 provides the distribution of service interfaces between the LDS 104 and the user's premises, extending the digital access network.

The NSP 106 provides VAP 103A, 103B control, including mobile station and mobility management, call control, and feature applications. VAPs 103A, 103B are micro-cellular base stations or radio ports that support the IS-136 air interface with IS-136 mobile stations such as digital TDMA cellular/PCS (personal communications services) units 101A, 101B. The VAPs 103A, 103B support plug-and-play operations by connecting to the RDT 102 via standard open interfaces such as the ISDN basic rate interface (BRI) lines, typically using 2B+1D signaling protocol as is known in the art.

The IS-136 air interface standard is the EIA/TIA Interim Standard, also known as the North American or U.S. TDMA standard, that addresses digital cellular and PCS systems employing time division multiple access (TDMA). The IS-136 standard was developed to provide very flexible technical, service and investment options for subscribers and operators. IS-136 specifies a DCCH (Digital Control Channel) to support new features controlled by a digital signaling and control channel between a cell site (e.g., radio base station) and terminal equipment (e.g., mobile station). The IS-136 air interface between the VAPs 103A, 103B and the mobile stations 101A, 101B can support voice and messaging applications. The mobile stations 101A, 101B may be, but are not limited to, a terminal or a typical wireless phone having a keypad, display screen, and an alarm generator for generating a ringing or tone sound.

The present invention is implemented in the above system by cellular or personal communications service (PCS) mobile stations 101A, 101B.

FIG. 1B also includes POTS 108 and ISDN 109, which may be utilized as described above. The WCS offers a wireless access system with Centrex to provide voice access and may either supplement existing wired Centrex service with wireless access or provide wireless-only stand-alone telecommunications services. WCS can connect the NSP 106 to a macro cellular network to support integrated mobility functions including terminal handoff and personal roaming features. The WCS provides location and mobility management for a WCS's subscriber mobile station 101A, 101B inside the WCS service area. Cordless communication may be provided anywhere, anytime in the WCS service area.

Figure 38:
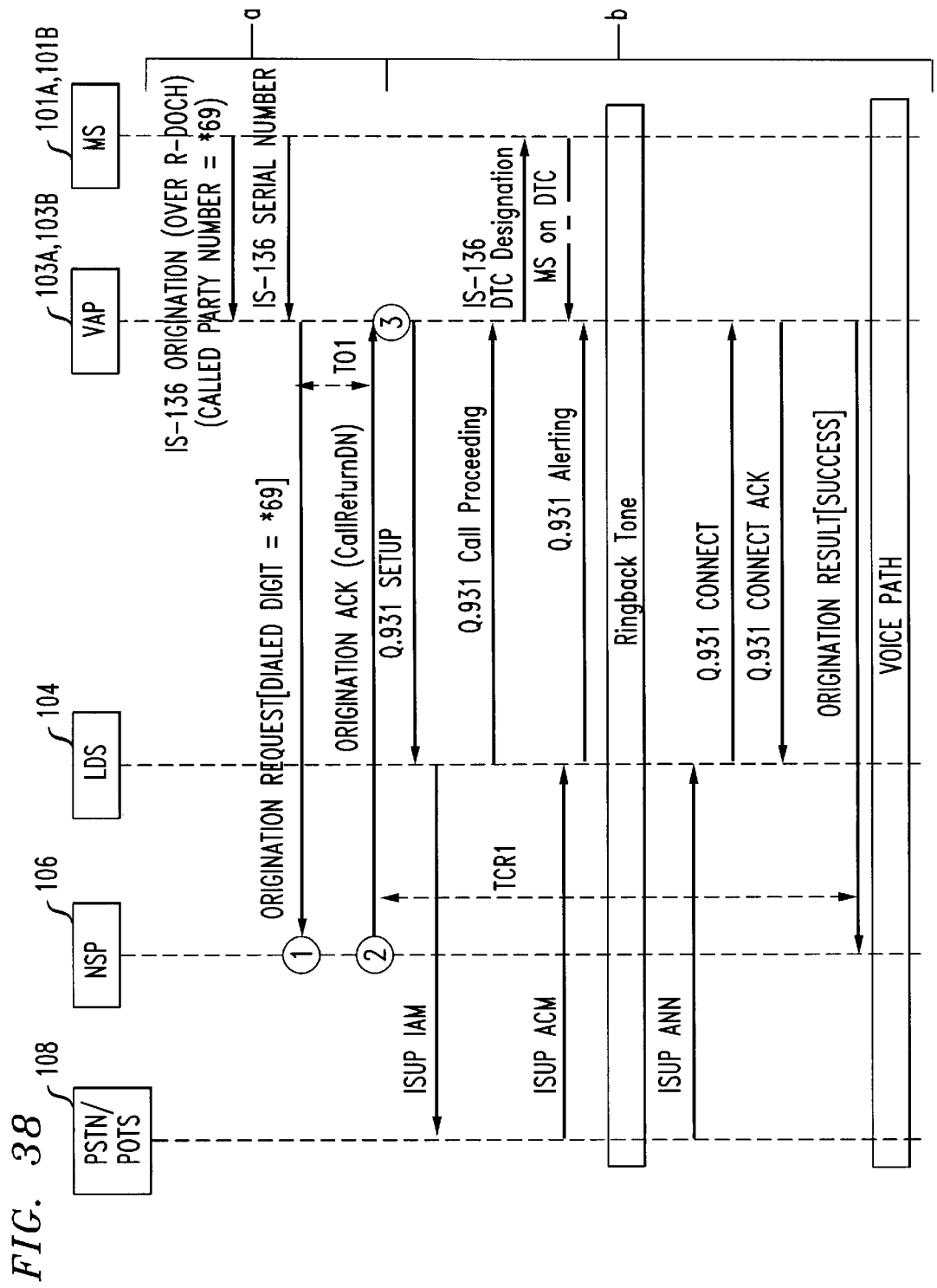
FIG. 38 is a signal flow chart showing signaling flow steps for an illustrative embodiment implementing a call return in accordance with the present invention.

FIG. 38 is a signal flow chart showing signaling flow steps for an illustrative embodiment implementing a call return in accordance with the present invention. FIG. 38 shows the call flow when the user just requests to return the last incoming call. To facilitate understanding, the steps are partitioned into two general areas: a and b.

Section (a) of FIG. 38 shows how to display the called number to the user. The user dials a predetermined feature access code, e.g., *69, and presses the "send" button. An origination message, and optionally a serial number message, is sent by a mobile station MS 101A, 101B on a R-DCCH to a VAP 103A, 103B in accordance with the IS-136 standard. The VAP receives the origination message and sends an origination request, for example, where the dialed digit is *69, to the NSP (point 1) and starts a first timer TO1. The NSP receives the origination request message, identifies that the message is a feature request and utilizes the ID of the MS 101A, 101B to check whether the MS 101A, 101B is a valid, registered subscriber for the call return feature request. If the MS 101A, 101B is authorized for the call return feature, the NSP retrieves the digits of the last calling party number or directory number for returning the call (CallReturnDN) for the MS 101A, 101B and sends an origination ACK message (point 2→point 3) with the display parameter that includes the CallReturnDN to the VAP and starts the timer TCR1. The TCR1 timer is set to a predetermined time that permits Q.931 call processing, i.e., if this time was exceeded, the call would be terminated.

The VAP 103A, 103B stops the TO1 timer and sends a Q.931 call setup signal to the LDS 104. The LDS 104 sends an ISUP IAM signal to the PSTN/POTS 108 and may display the number on the MS's screen in accordance with the display function set forth in the IS-136 standard. However, if the VAP 103A, 103B has not received the origination ACK from the NSP 106 (point 3) before the expiration of the predetermined time that will allow pre-processing of the feature request, the VAP 103A, 103B will stop the TO1 timer and clear the origination request record.

Next, as shown in (b), the VAP 103A, 103B sends a Q.931 Setup signal to the LDS 104. Then the originating switch, the LDS 104, sends an ISDN User Part Initial Address Message (ISUP IAM) to the destination switch of the public switched telephone network (PSTN/POT S108) to reserve an idle trunk circuit from the originating switch to the destination switch. Then, the LDS 104 sends a Q.931 Call Proceeding signal to the VAP 103A, 103B. The VAP 103A, 103B sends an IS-136 digital traffic control (DTC) designation to the MS 101A, 101B. After the VAP 103A, 103B receives a DTC signal from the MS 101A, 101B, the destination switch of the PSTN/POTS 108 sends an ISDN user part Address Complete Message (ISDN ACM) to the originating switch, the LDS 104, to indicate that the remote end of the trunk circuit has been reserved. Next, the LDS 104 sends a Q.931 alerting signal to the VAP 103A, 103B. The ringback tone is initiated by the PSTN/POTS 108 over the trunk to the originating switch, the LDS 104. Then the PSTN/POTS 108 sends a ISDN User Part Answer Message (ISUP ANM) to the originating switch, the LDS 104, which then sends a Q.931 connect signal to the VAP 103A, 103B. The VAP 103A, 103B then sends a Q.931 connect acknowledgement signal to the LDS 104 and a signal indicating success via an origination result message to the NSP 106. The NSP 106 stops timer TCR1,and a voice path is established.

Clearly the phone number for the incoming call must be known, e.g., not security-protected for the feature of the present invention to function. Thus, when the phone number of the incoming call is unknown or security-protected, the present invention may indicate that the phone number is unable to be displayed by a screen display, providing a voice prompt, providing a predetermined tone, or the like.

ISDN User Part (ISUP) call signaling is utilized in the call pre-processing for implementing the feature of the present invention. ISUP defines the protocol and procedures that are used to set-up, manage, and release trunk circuits carrying data and voice calls over the public switched telephone network, PSTN. ISUP is used for ISDN and non-ISDN calls, but calls that originate and terminate at a same switch do not use ISUP signaling. The ISUP message format includes information carried in the Signaling Information Field (SIF) which contains a routing label, a circuit identification code, and message type field. The ISUP Initial Address Message is sent in a "forward" direction by each switch needed to complete the circuit between the LDS and the destination switch of the PSTN until the circuit connects to the destination switch. The ISUP Address Complete Message is sent in the "backward" direction to indicate that the remote end of the truck circuit has been reserved. The originating switch then connects the MS 101A, 101B to the trunk to complete the voice circuit. The destination switch generates a ringing tone. The MS 101A, 101B user hears the ringing tone on the voice trunk. When the called party answers, the destination switch terminates the ringing tone and sends the ISUP Answer Message to the originating switch. The ISUP message format depends on whether the ANSI standard or the ITU-T standard is being implemented.

Figure 39:
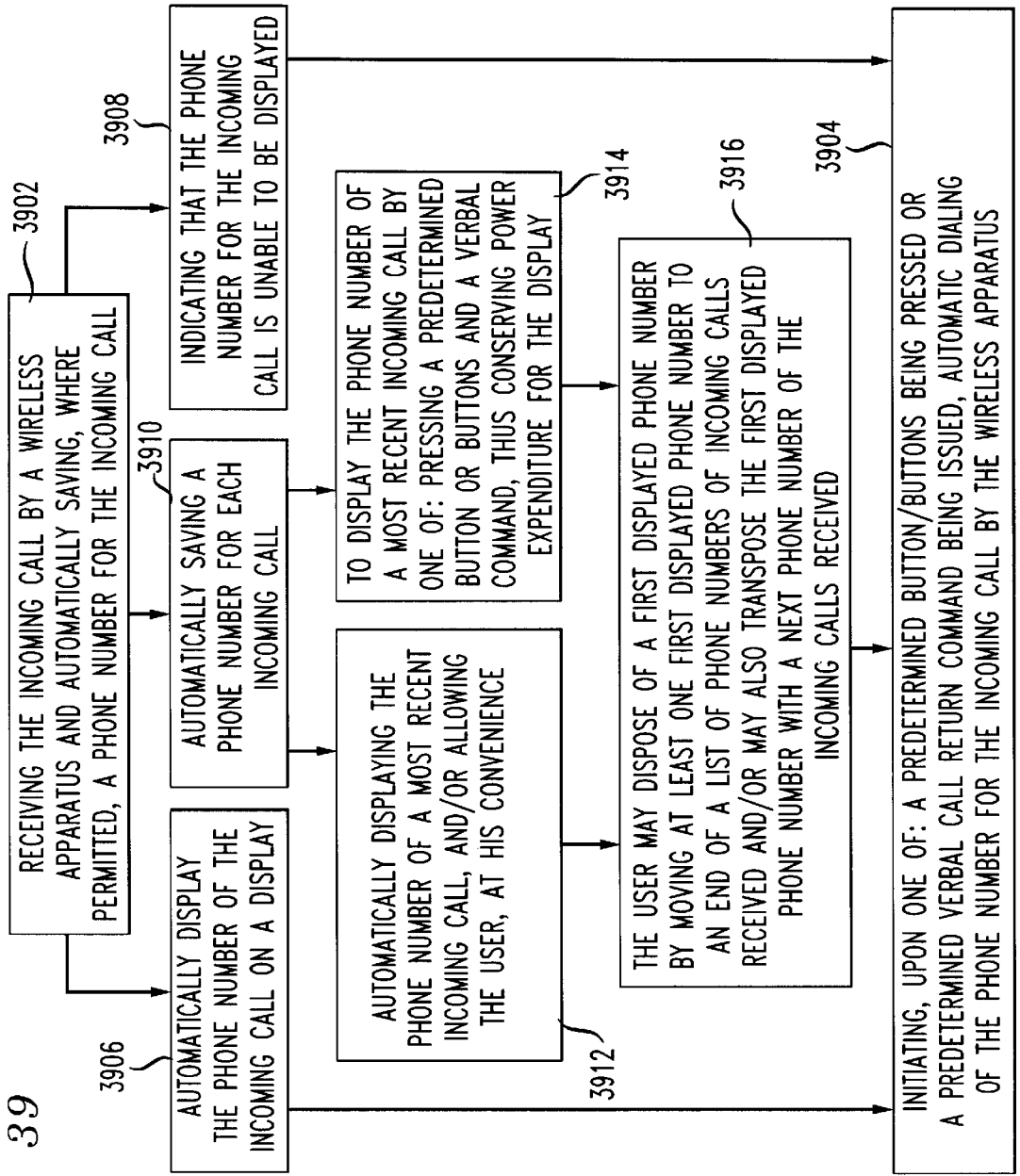
FIG. 39 illustrates one embodiment of steps for implementing a method for automatically returning an incoming call in a wireless communication system in accordance with the present invention.

FIG. 39 illustrates one embodiment of steps for implementing a method for automatically returning an incoming call in a wireless communication system in accordance with the present invention. The steps include: receiving 3902 the incoming call by a wireless apparatus and automatically saving, where permitted, a phone number for the incoming call; and initiating 3904, upon one of: a predetermined button/buttons being pressed or a predetermined verbal call return command being issued, automatic dialing of the phone number for the incoming call by the wireless apparatus. Where desired, the method may further include, between the steps of receiving the incoming call and initiating dialing the phone number for the incoming call, automatically displaying 3906 the phone number of the incoming call on a display. Also, where selected, where the phone number for the incoming call is unknown or security-protected, the method may include indicating 3908 that the phone number for the incoming call is unable to be displayed. Indicating that the phone number for the incoming call is unknown or unavailable, for example, due to security protection, may be implemented by any known method such as, for example, using a display, a voice prompt, or a predetermined tone. Where, after the step of receiving the incoming call, at least one more incoming call is received, the method may include automatically saving 3910 a phone number for each incoming call. Where selected, the method may also implement a step of automatically displaying 3912 the phone number of a most recent incoming call, and/or allowing the user, at his convenience, to display the phone number of a most recent incoming call by manually pressing a predetermined button or buttons 3914 or using a verbal command, thus conserving power expenditure for the display. Where selected, before initiating dialing the phone number of the most recently received call, the user may dispose 3916 of a first displayed phone number by moving at least one first displayed phone number to an end of a list of phone numbers of incoming calls received and/or may also transpose the first displayed phone number with a next phone number of the incoming calls received. Each of these two steps may be repeated as many times as desired.

Figure 40:
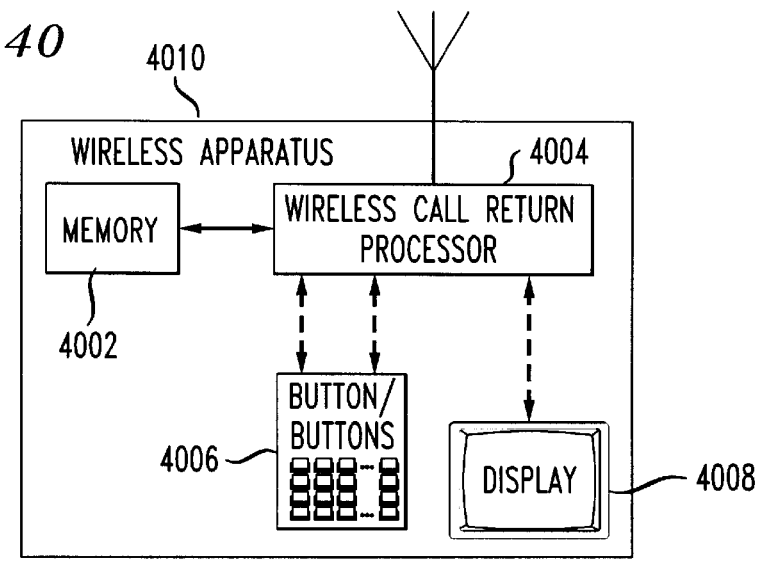
FIG. 40 is a block diagram of a wireless apparatus utilized for implementing the method of the present invention in a wireless communication system.

As shown in FIG. 40, a wireless apparatus 4010 may be utilized for implementing the method of the present invention in a wireless communication system. Typically, the wireless apparatus 4010 is a wireless phone or another handheld wireless communications device such as, for example, a wireless digital assistant. The wireless apparatus includes a memory 4002, for automatically saving, where permitted, a phone number for the incoming call received; and a wireless call return processor 4004, coupled to the memory, for initiating, upon one of: a predetermined button/buttons 4006 being pressed or a predetermined verbal call return command being issued, automatic dialing of the phone number for the incoming call using the wireless apparatus. Where selected, the memory may store other predetermined information. For example, a user profile may be downloaded to the memory to permit authentication of the MS 101A, 101B at the VAP. Also, where a listing of usage or billing record is downloaded from the NSP for updating at the billing office, to avoid error, the billing record may be marked as "in use" by the NSP until the updated billing record has been sent to the NSP. Alternatively, the time for the current usage may be accumulated in the memory for a predetermined period and then forwarded to the NSP for incorporation into the user's billing record. The wireless apparatus may further include a display 4008, coupled to the memory and the wireless call return processor, for automatically displaying, where permitted, the phone number of the incoming call on a display when the incoming call is received. The display 4008 operates as described above.

As shown in FIG. 38, a wireless communication system may include a wireless apparatus for automatically returning an incoming call. The wireless communication system includes a switched communications network (for example, the PSTN 108), a NSP 106, a LDS 104, a VAP 103A, 103B, and at least one MS 101A, 101B. Each of the elements is arranged to communicate as described above.

Figure 41:
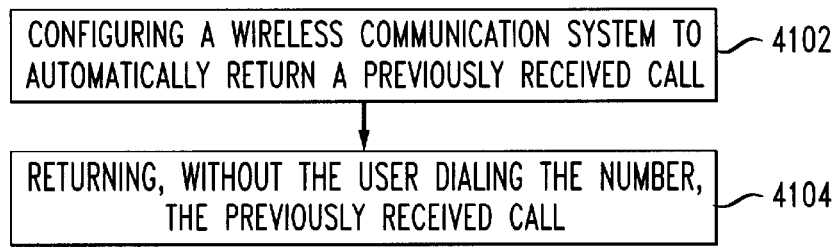
FIG. 41 is a flow chart showing another embodiment of steps in accordance with the method of the present invention.

Alternatively, as shown in FIG. 41, the method of the present invention may be described as utilizing the steps of: configuring 4102 a wireless communication system to automatically return a previously received call; and returning 4104, automatically, the previously received call. The configuration of the wireless communication system and the automatic return of the previously received call are accomplished as described for FIG. 38.

Figure 42:
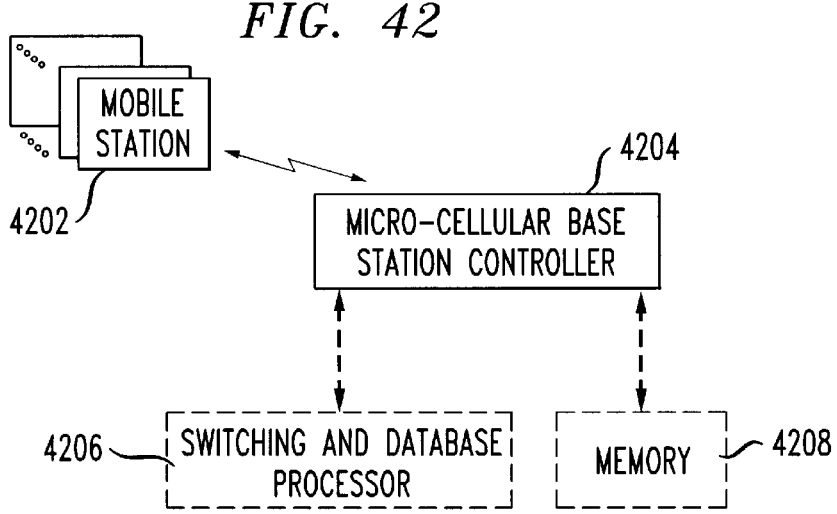
FIG. 42 is a block diagram of one embodiment of a wireless communication platform for providing automatic wireless call return in accordance with the present invention.

FIG. 42 is a block diagram of one embodiment of a wireless communication platform for providing automatic wireless call return in accordance with the present invention. The platform includes: at least one mobile station 4202 and a micro-cellular base station controller 4204. A micro-cellular base station means a base station in which components have been miniaturized to a degree such that the base station is mountable on a pole, shelf, or a wall. The micro-cellular base station controller 4204 is arranged to communicate wirelessly with the at least one mobile station 4202 and to receive an incoming call directed to the at least one mobile station, for, when the at least one mobile station 4202 is processing another call, automatically returning the incoming call in accordance with a predetermined scheme to provide automatic call return for the at least one mobile station. The predetermined scheme is the method described above. Where selected, the platform may further include a switching and database processor 4206 and a memory 4208. The switching and database processor 4206 is coupled to the micro-cellular base station controller 4204 and a memory 4208 and is used for switching the incoming call according to the predetermined scheme to provide an automatic call return for the at least one mobile station, upon one of: a predetermined button/buttons being pressed or a predetermined verbal call return command being issued, by automatically dialing a phone number for the incoming call, wherein the phone number is stored in a database of the memory 4208. The memory 4208 is coupled to the micro-cellular base station controller 4204 and the switching and database processor 4206. Typically, the memory 4208 has a database stored thereon and is used for storing at least the phone number of the incoming call. Where desired, the memory 4208 may further store further information such as authentication information for the at least one mobile station or billing information for the at least one mobile station.

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

XIX. Automatic Callback

Technologies that facilitate wireless communication are emerging at an ever-faster rate. Such technologies are employed in end-user devices such as pagers, communication systems, and mail systems such as voice mail and email systems. In wireless communication systems, a need exists to provide a new service in the wireless environment for automatically calling back a phone number which is unavailable when the wireless user initiates a first call. A phone may be busy when the wireless user first calls, and busy again when the wireless user redials the number. It is clear that the wireless user's efficiency would be increased if the wireless user may be freed from having to redial the same busy number repeatedly in order to complete a call.

Present wireless handsets do not provide for automatic callback to free the user from having to redial, perhaps repeatedly, a number in order to complete a call. Clearly, there is a need for a system, wireless apparatus and method for providing automatic callback for a user in a wireless communication system when a called number is unavailable.

The present invention provides a system, wireless apparatus and method that provide an automatic callback functionality for wireless communication systems. The invention enables a wireless user to choose from a variety of modes for completing a call when the dialed number is busy. Rather than simply redialing the phone number an indeterminate number of times until the connection is made on his wireless device, the caller may press a button or give a verbal command to initiate an automatic callback feature.

An example is set forth below for implementing the present invention in a Wireless Centrex System (WCS). The WCS mobile station MS is not required to redial the same number repeatedly when he receives a busy signal. The dialing and checking procedure is performed by the WCS network, thus freeing the wireless user to perform other tasks. Typically, upon the called number becoming available, the WCS system informs the MS using a distinctive ringing and/or tone or a Short Message Service (SMS) message. Where the called number is available, but the MS already has an active call, the WCS system generates a voice prompt or special tone on the active call to notify the MS that the callback call is available. The MS may proceed as described below.

In one embodiment, the wireless user may activate the automatic callback feature by pressing a feature code, e.g., such as *66, and pressing "send" when a busy signal is received. Alternatively, after receiving the busy signal, the user can disconnect the call and then activate the callback feature. The WCS system sends a feature activation confirmation message to the MS, disconnecting the MS. A default timer is set to a predetermined time that determines the length of time that the feature is activated. Typically, the default is set to 30 minutes. The WCS system will automatically redial the number continuously (e.g., every 30 seconds) until a connection is made and notify the MS that the call is connected. If the predetermined default timer has expired (e.g., 30 minutes), then the WCS deactivates the feature and notifies the MS that the feature is deactivated. There may also be other scenarios wherein the WCS system will automatically be deactivated (e.g., when the mobile powers down). Where the dialed number remains busy after the predetermined time set on the default timer, the WCS system cancels the feature and sends a message to the MS notifying the wireless user that the call was unable to be completed.

Where desired, the wireless user may enter a predetermined deactivation code, e.g., *660, and push "send" to deactivate the feature.

In the example below, implementation of the present invention is accomplished using a wireless phone in a Wireless Centrex System 140(WCS). The WCS 140 provides a private wireless access system that is unconnected to any public macro-cellular system and provides Centrex services. FIG. 1B shows a block diagram of an illustrative architecture of a WCS platform wherein the present invention may be utilized. The WCS platform includes a local digital switch 104 (LDS), a remote digital terminal 102 (RDT, e.g., Lucent Technologies SLC-2000), a network server platform 106 (NSP), voice access ports 103A, 103B (VAP) and a plurality of associated IS-136 digital time division multiple access (TDMA) cellular or personal communications service (PCS) mobile stations 101A, 101B which implement the present invention. The LDS 104 is a TR-08 and GR-303 compatible local digital switch that employs distributed intelligence, process-oriented software, and coordinated autonomous computing elements to provide a flexible, modular, reliable and robust digital switching system. The LDS 104 provides a single platform for advanced services, including Integrated Services Digital Network (ISDN), Centrex, Custom Local Area Signaling Services (CLASS), custom calling, and Advanced Intelligent Network (AIN) capabilities. The LDS 104 also supports X.25 packet switched data communication and circuit switched data, and provides a gateway to local and long distance networks. The switching fabric, administration, message switching, and call switching functions are provided by the LDS 104.

The AIN capabilities of the LDS 104 provide AIN switch software that enables the network provider to create, deploy, and change services to meet user's requests. The AIN software allows the LDS 104 to act as an AIN service switching point to communicate with service control points and intelligent peripherals. For example, the LDS 104 may be a 5ESS manufactured by Lucent Technologies or a DMS-100 manufactured by Nortel. In the WCS configuration illustrated in FIG. 1A, the NSP 106 acts a service control point, directing call processing on the LDS 104.

The RDT 102 is a digital loop carrier terminal that supports the plain old telephone system (POTS), ISDN, high-speed transport, and special services such as private lines and private branch exchange (PBX) services. For example, the RDT 102 may be implemented by a SLC2000 manufactured by Lucent Technologies or an Access Node manufactured by Nortel. The RDT 102 interfaces, typically at a central office, with the LDS 104. The RDT 102 provides the distribution of service interfaces between the LDS 104 and the user's premises, extending the digital access network.

The NSP 106 provides VAP 103A, 103B control, including mobile station and mobility management, call control, and feature applications. VAPs 103A, 103B are microcellular base stations or radio ports that support the IS-136 air interface with IS-136 mobile stations such as digital TDMA cellular/PCS (personal communications services) units 103A, 103B. The VAPs 103A, 103B support plug-and-play operations by connecting to the RDT 102 via standard open interfaces such as the ISDN basic rate interface (BRI) lines, typically using 2B+D signaling protocol as is known in the art.

The IS-136 air interface standard is the EIA/TIA Interim Standard, also known as the North American or U.S. TDMA standard, that addresses digital cellular and PCS systems employing time division multiple access (TDMA). The IS-136 standard was developed to provide very flexible technical, service and investment options for subscribers and operators. IS-136 specifies a DCCH (Digital Control Channel) to support new features controlled by a signaling and control channel between a cell site (e.g., radio base station) and terminal equipment (e.g., mobile station). The IS-136 air interface between the VAPs 103A, 103B and the mobile stations 110 can support voice and messaging applications. The mobile stations 101A, 101B may be, but are not limited to, a terminal or a typical wireless phone having a keypad, display screen, and an alarm generator for generating a ringing or tone sound and translation between text and speech.

The automatic callback functionality of the present invention is implemented in the above system by cellular or personal communications service (PCS) mobile stations 101A, FIG. 1B also includes POTS 108 and ISDN 109 interfaces for connecting analog and ISDN phones, respectively. The WCS offers a wireless access system with Centrex to provide voice access and may either supplement existing wired Centrex service with wireless access or provide wireless-only stand-alone telecommunications services. WCS can connect the NSP 106 to a macro-cellular network to support integrated mobility functions including terminal handoff and personal roaming features. The WCS provides location and mobility management for a WCS's subscriber mobile station 101A, 101B inside the WCS service area. Cordless communication may be provided anywhere, anytime in the WCS service area.

Figure 43:
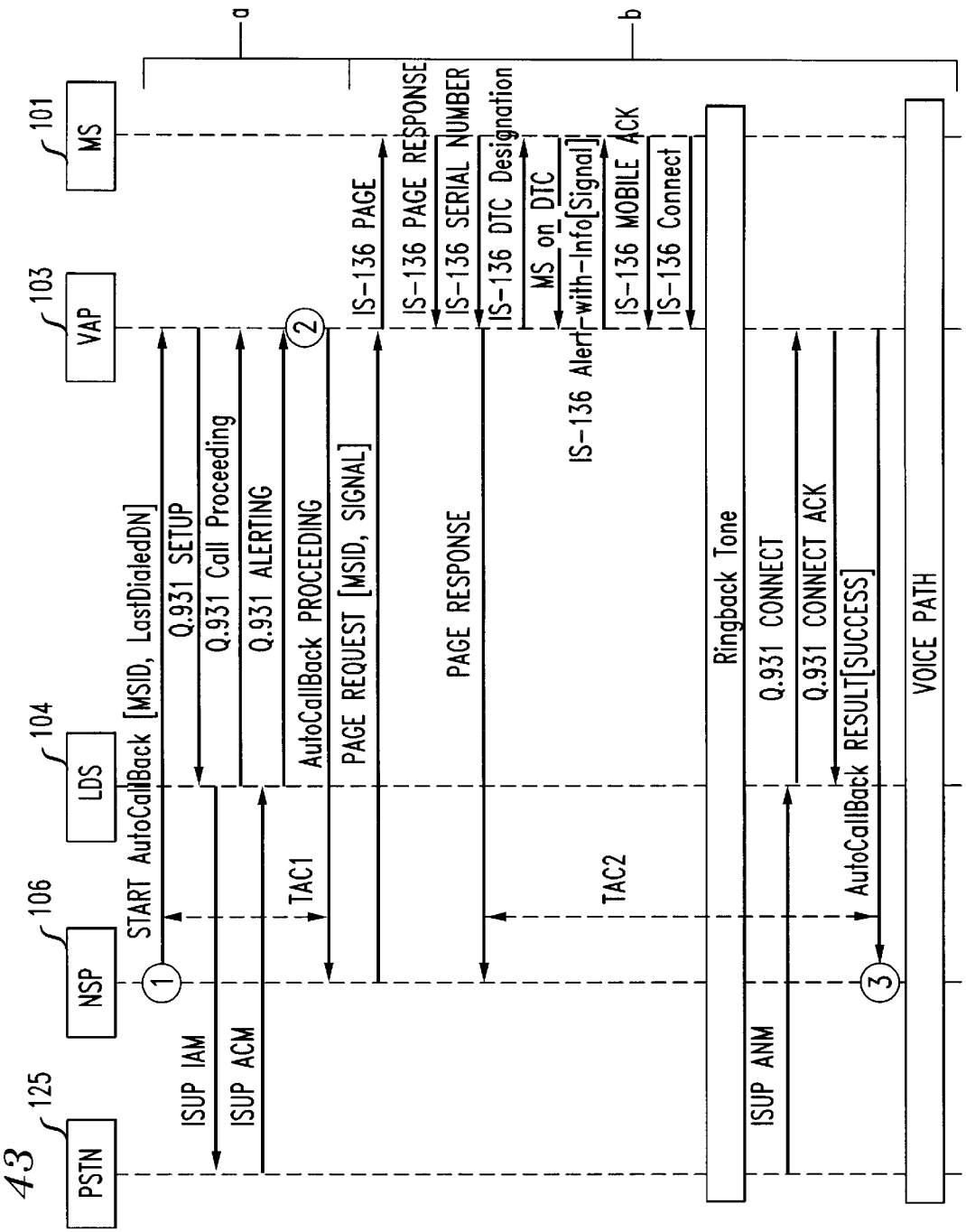
FIG. 43 is a signal flow chart showing signaling flow steps for an illustrative embodiment implementing the automatic callback functionality in accordance with the present invention.

Though not shown in FIG. 43, the WCS system determines whether the user may validly request the automatic callback feature functionality. Upon receiving the origination request message, the NSP 106 analyzes the dialed digits and identifies that the automatic callback feature has been requested. The NSP 106 also checks the Wireless Centrex System Directory (WCSD) via the Mobile Identification Number (MIN) to determine if the MS 101 is authorized for the automatic callback feature requested. If the validation is successful, the NSP 106 uses the MSID to last dialed DN mapping to retrieve the DN that was dialed by the MS 101 previously, sends an origination NACK with the last dialed DN message to the VAP 103.

The VAP 103 sends an IS-136 Reorder/Intercept message to the MS 101 informing the user that the automatic callback feature is activated for the last dialed DN. If the validation is not successful or the last dialed DN is not known, the NSP 106 sends an originating NACK message with reject information to the MS 101. The VAP 103 sends an IS-136 Reorder/Intercept message to the MS 101 informing the user that the automatic callback feature was not activated. Feature Activation/Deactivation is described more fully in Section IX herein.

FIG. 43 shows a preferred embodiment for signaling flow in accordance with the automatic callback functionality of the present invention. As shown in (a), the NSP 106 sets the feature activation timer for a predetermined length of time (e.g., 30 minutes) when the feature is activated. The NSP will continuously initiate calling the Last Dialed DN for every predetermined time (e.g., 30 seconds) by sending a StartAutoCallBack message including the Mobile Station IDentification code (MSID) and the Last Dialed Directory Number (LastDialedDN) to the VAP 103 and starts the TAC1 timer. The VAP 103 initiates the call origination process by sending a Q.931 setup message to the LDS 104 utilizing the LastDialedDN.

As described below, ISDN User Part (ISUP) call signaling is utilized in the call pre-processing for implementing the feature of the present invention. ISUP defines the protocol and procedures that are used to set-up, manage, and release trunk circuits carrying data and voice calls over the public switched telephone network, PSTN. ISUP is used for ISDN and non-ISDN calls, but calls that originate and terminate at a same switch do not use ISUP signaling. The ISUP message format includes information carried in the Signaling Information Field (SIF) which contains a routing label, a circuit identification code, and message type field. The ISUP Initial Address Message is sent in a "forward" direction by each switch needed to complete the circuit between the LDS and the destination switch of the PSTN until the circuit connects to the destination switch. The ISUP Address Complete Message is sent in the "backward" direction to indicate that the remote end of the trunk circuit has been reserved. The originating switch then connects the MS to the trunk to complete the voice circuit. The destination switch generates a ringing tone. The MS user hears the ringing tone on the voice trunk. When the called party answers, the destination switch terminates the ringing tone and sends the ISUP Answer Message to the originating switch. The ISUP message format depends on whether the ANSI standard or the ITU-T standard is being implemented.

Thus, as shown in FIG. 43, portion (a), upon initiation of the automatic callback feature, the originating switch, the LDS 104, sends an ISDN User Part Initial Address Message (ISUP IAM) to the destination switch of the public switched telephone network (PSTN) 125 to reserve an idle trunk circuit from the originating switch to the destination switch. Then, the LDS 104 sends a Q.931 call proceeding signal to the VAP 103. The destination switch of the PSTN 125 then sends an ISDN user part Address Complete Message (ISDN ACM) to the originating switch, the LDS 104, to indicate that the remote end of the trunk circuit has been reserved. Next, the LDS 104 sends a Q.931 alerting signal to the VAP 103, and the VAP 103 sends a StartAutoCallBack Proceeding message to the NSP 106 to notify the NSP 106 that an alerting message have been received from the LDS 104 indicating that the dialed DN is now alerted and waiting for an answer. If the destination user is still busy when the call is attempted, the destination switch 125 returns an ISUP REL (release) message to LDS 104, indicating that the called user is busy. The LDS 104 initiates Q931 call clearing to the VAP. The VAP notifies the NSP of the failure. The NSP resets its timer and waits for a predetermined time (e.g., 30 seconds) before initiating the callback procedure again.

Continuing the description of FIG. 43, in portion (b), upon receiving the StartAutoCallBack Proceeding message from the VAP 103, the NSP 106 cancels timer TAC1 and sends a Page Request message (MSID, Signal) to the VAP 103. The VAP will then send an IS-136 Page to the MS 101. The MS 101 sends an IS-136 Page Response to the VAP 103. Then, the VAP 103 sends the page response to the NSP 106. The NSP 106 sets timer TAC2 to wait for completion of the call. The VAP 103 also sends an IS-136 Digital Traffic Channel (DTC) designation to the MS 101. The MS 101 then tunes to the designated DTC. The VAP 103 sends an IS-136 Alert with information (Signal) to the MS 101. Note the signal can be a special tone indicating to the MS user that the call is their automatic callback call. The MS 101 sends an IS-136 Mobile ACK, then an IS-136 Connect signal, to the VAP 101. The ringback tone is initiated by the PSTN 125 over the trunk to the MS 101. Then the PSTN 125 sends a ISDN User Part Answer Message (ISUP ANM) to the originating switch, the LDS 104, which then sends a Q.931 connect signal to the VAP 103. The VAP 103 then sends a Q.931 connect acknowledgement signal to the LDS 104 and a signal indicating success via an origination result message (Auto Callback Result (Successful)) to the NSP 106. The NSP 106 stops timer TAC2, and a voice path is established.

Figure 44:
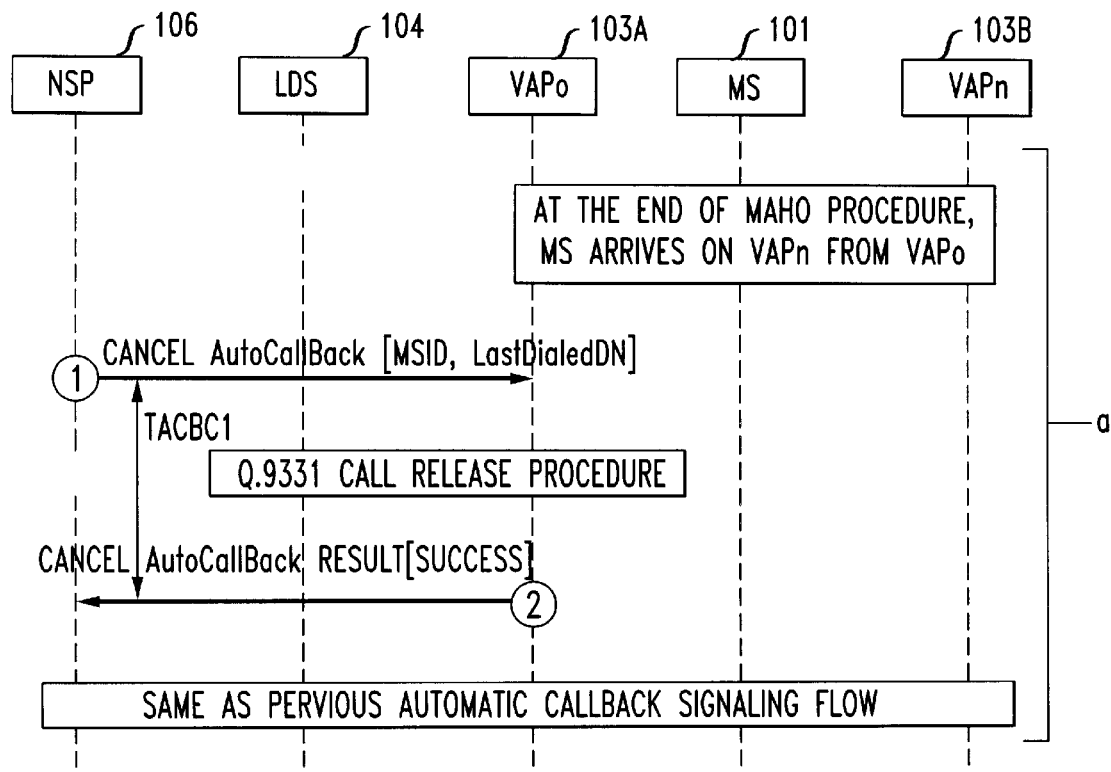
FIG. 44 is a signal flow chart showing one embodiment of signaling flow when a mobile station MS moves from an original serving voice access port VAPo to a new voice access port VAPn before a call is connected.

A predetermined time is set on timer TAC1 and timer TAC2 such that Q.931 and IS-136 call processing may take place. If the predetermined time is exceeded, the NSP 106 will initiate procedures to clear the call. Where the predetermined time set on the timer TAC1 or TAC2 has expired, or the StartCallBack Result signal indicates failure, the NSP 106 sends a Cancel AutoCallBack message to the VAP 103 and deactivates the automatic callback feature for the MS 101. In addition, the NSP 106 can send a short message to the MS 101 to indicate that the automatic callback feature has been cancelled or the time for the automatic callback has expired. Where desired, the MS 101 may re-request that the automatic callback feature be activated either by redialing the feature code or by a voice command. FIG. 44 is a signal flow chart showing a preferred embodiment of signaling flow when the MS moves from an original serving VAPo to a new VAPn before a call is connected. The MS 101 activates the Automatic Callback feature and moves from the original VAPo 103A to another VAPn 103B. The VAPn 103B sends a Handoff Result message to the NSP 106 to indicate that handoff has occurred. The NSP 106 sends Cancel AutoCallBack message containing the MSID and the LastDialedDN to the VAPo 103A and starts a TACBC1 timer. If the VAPo has already initiated a Q.931 call setup process to Last Dialed DN, then the VAPo initiates a Q.931 call release procedure to clear the call attempt. The VAPo 103A sends a Cancel AutoCallBack Ack message to the NSP 106. The NSP 106 stops the TACBC1 timer and assumes Automatic Callback procedures and signaling exchange with VAPn. If the NSP 106 timer TACBC1 expires before receiving tie Cancel AutoCallBack Result message from the VAPo or the cause for cancellation is not indicated as successful, the NSP 106 continues the new Automatic Callback feature with the VAPn 103B.

The WCS may be configured to offer service within a local access environment. While the IS-136 standard is used to illustrate the best mode for carrying out the invention, the invention is not limited to use in the IS-136 standard. The invention is also applicable to other cellular and/or PCS systems.

Figure 45:
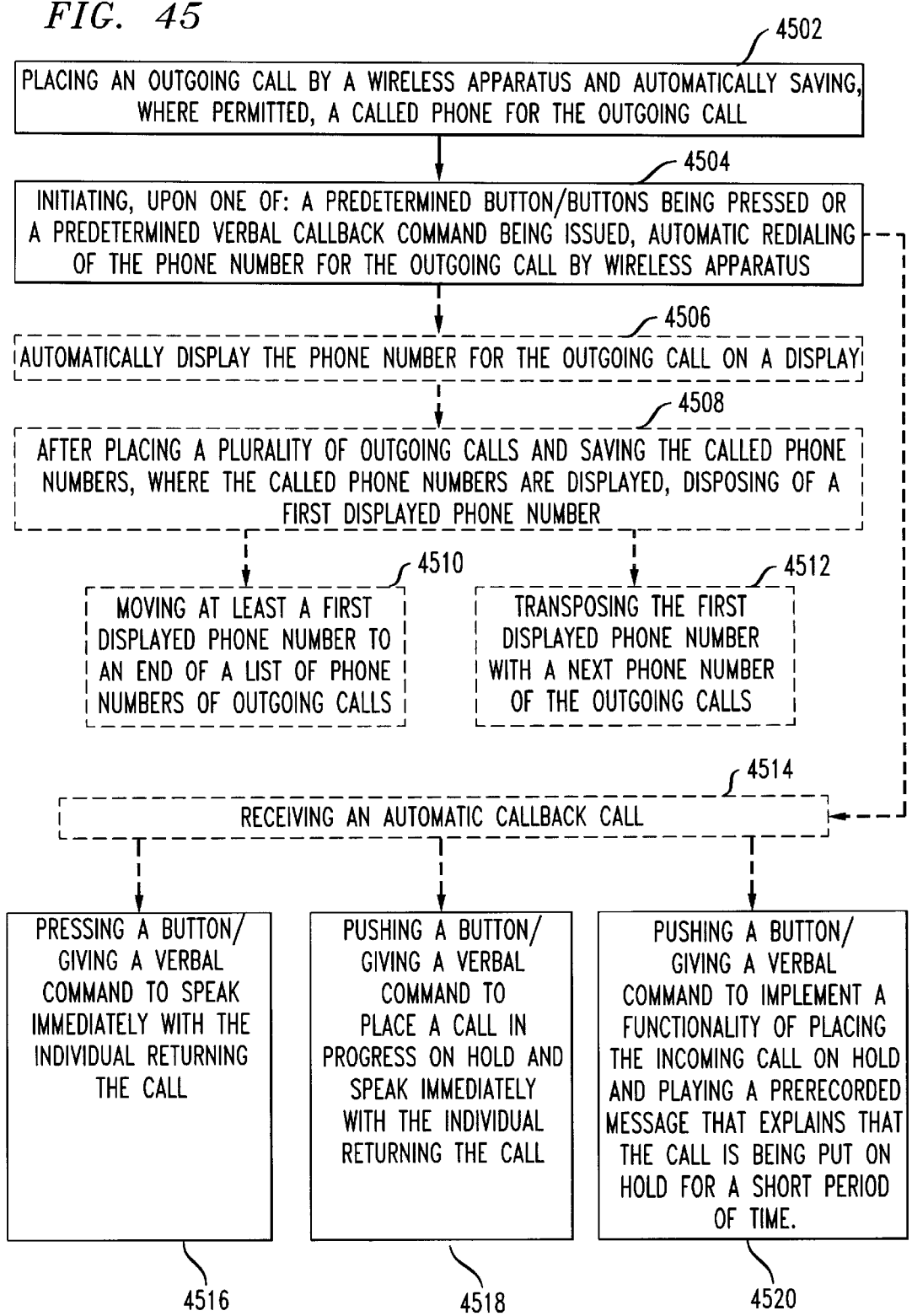
FIG. 45 is a flow chart showing one embodiment of steps of a method in accordance with a preferred embodiment of the present invention.

FIG. 45 is a flow chart showing one embodiment of steps of a method in accordance with a preferred embodiment of the present invention. The method provides for, where a number called by a wireless user is busy, automatically redialing the call in a wireless communication system, and includes the steps of: A) placing 4502 an outgoing call by a wireless apparatus and automatically saving, where permitted, a called phone number for the outgoing call; and B) initiating 4504, upon one of: a predetermined button/buttons being pressed or a predetermined verbal callback command being issued, automatic redialing of the phone number for the outgoing call by the wireless apparatus. Where desired, the method may further include, upon being connected after redialing, automatically displaying 4506 the phone number for the outgoing call on a display.

Where selected, the method may further include, after placing a plurality of outgoing calls and saving the called phone numbers, where the called phone numbers are displayed, disposing 4508 of a first displayed phone number. A displayed phone number may be disposed of by one of: moving 4510 at least a first displayed phone number to an end of a list of phone numbers of outgoing calls or transposing 4512 the first displayed phone number with a next phone number of the outgoing calls.

Where an automatic callback call is received 4514, the method may include one of: pressing a button/giving a verbal command 4516 to speak immediately with the individual returning the call; pushing a button/giving a verbal command 4518 to place a call in progress on hold and speak immediately with the individual returning the call; and pushing a button/giving a verbal command 4520 to implement a functionality of placing the incoming call on hold and playing a prerecorded message that explains that the call is being put on hold for a short period of time. The callback call may be terminated when the wireless user does not answer within a predetermined time.

Figure 46:
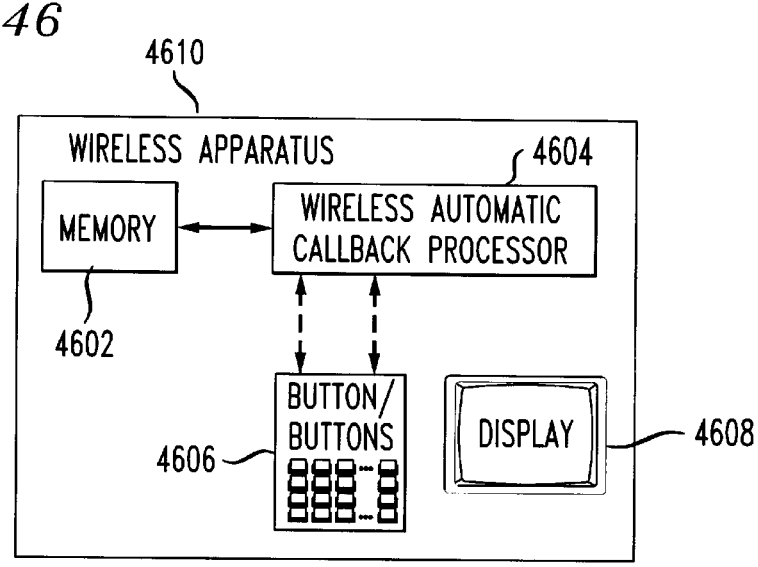
FIG. 46 is a block diagram of a wireless apparatus utilized for implementing the method of the present invention in a wireless communication system.

FIG. 46 is a block diagram of a preferred embodiment of a wireless apparatus that may be utilized for implementing the method of the present invention in a wireless communication system. The wireless apparatus 4610 may include: a memory 4602, for automatically saving a phone number that was busy when called and, if selected, phone numbers of incoming calls; and a wireless automatic callback processor 4604, coupled to the memory, for initiating a wireless callback communication, upon one of: a predetermined button/buttons 4606 being pressed or a predetermined verbal callback command being issued, by automatically redialing the phone number for the call. The wireless apparatus may also include a display 4608, coupled to the memory 4602 and the wireless automatic callback processor 4604, for automatically displaying the phone number of the redialed call, and/or a phone number of an incoming call, where permitted, on a display when the incoming call is received. Where the phone number for the incoming call is one of: unknown or security-protected, the display may indicate that the phone number for the incoming call is unable to be displayed. Alternatively, a voice prompt or predetermined tone may indicate that the phone number for the incoming call is unable to be displayed.

Where selected, the memory may automatically save a phone number, where permitted, for a plurality of incoming calls and the display may provide for automatic display, where permitted, of a phone number of a most recent incoming call. Alternatively, the wireless automatic callback processor may dispose of a first displayed phone number by moving at least one first displayed phone number to an end of a list of phone numbers of incoming calls received or transposing the first displayed phone number with a next phone number of the incoming calls received. The two preceding procedures may be repeated as desired.

Typically, the wireless apparatus is a wireless phone or another handheld wireless communications device such as, for example, a personal digital assistant.

A wireless communication system may include a wireless apparatus described above for automatically redialing a call where a phone number for the call is busy when the wireless user places the call. The system may operate as described above or in an equivalent fashion. For example, the system may include: a switched communications network, coupled to at least a first remote digital terminal RDT 102; at least a first network server platform NSP 106, coupled to at least a first local digital switch LDS 104; the at least first LDS 104, coupled to the at least first RDT 102 and the at least first NSP 106, and, where selected, to a voice message system VMS 107; the at least first RDT 102, coupled to the at least first LDS 104, at least a first voice access port VAP 103A, 103B; the at least first VAP 103A, 103B, coupled to the at least first RDT 102 and arranged to communicate with at least a first mobile station MS 101A, 101B; the at least first mobile station MS 101A, 101B, arranged to communicate with the at least first VAP 103A, 103B, wherein the at least first MS 101A, 101B includes the wireless apparatus for automatically redialing the number, and wherein the switched communications network, the at least first NSP 106, the at least first LDS 104, the at least first RDT 102, the at least first VAP 103A, 103B and the at least first MS 101A, 101B utilize a predetermined scheme to provide automatic callback for the wireless apparatus.

Figure 47A:
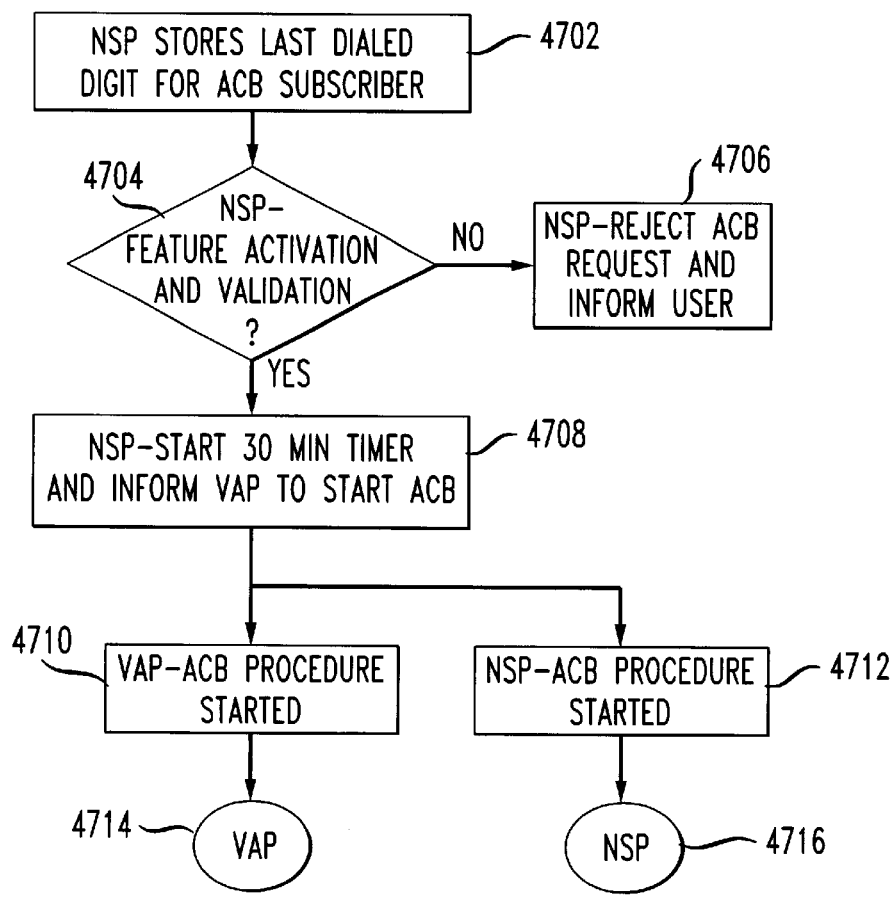
FIGS. 47A–47C represent a flow chart showing another embodiment of steps for implementing the automatic callback feature of the present invention wherein the wireless user is permitted to automatically re-dial the last number dialed via a queuing process that sets up the call when the called line is idle.
Figure 47B:
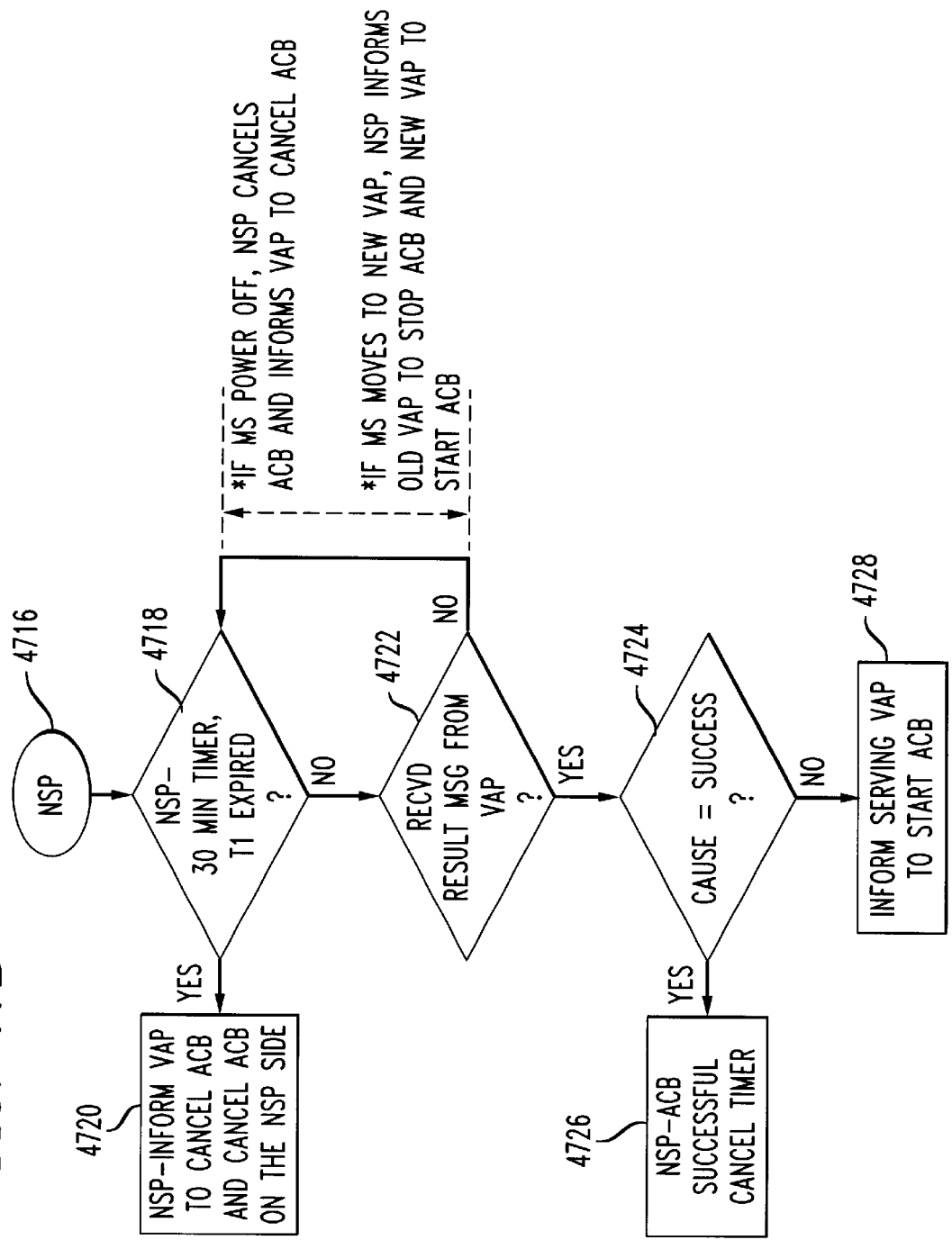
Figure 47C:
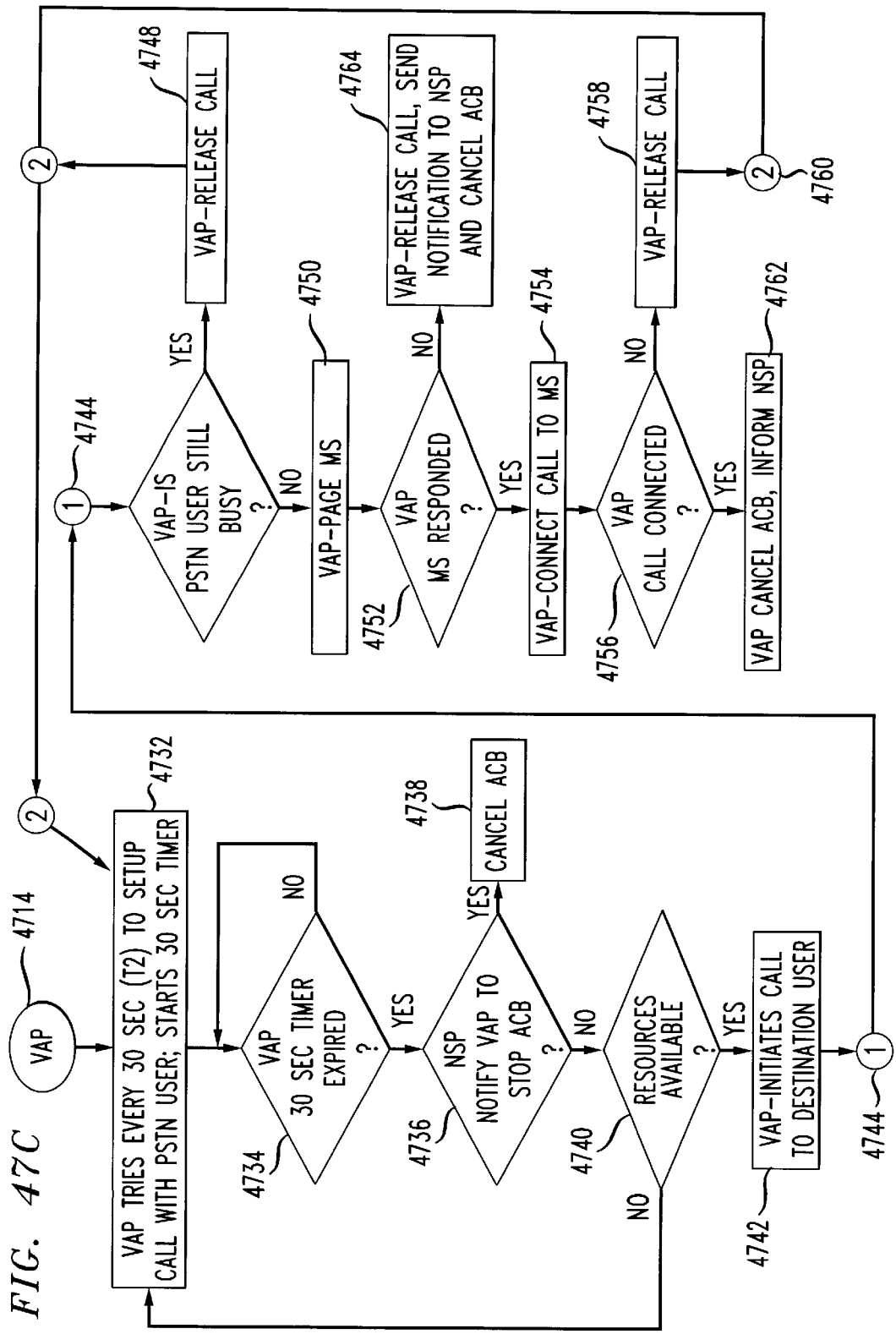

FIGS. 47A–47C represent a flow chart showing another embodiment of steps for implementing the automatic callback feature of the present invention wherein the intelligence of the automatic callback feature is in the VAP rather than in the NSP as previously shown in FIG. 43. FIG. 43 illustrates network centric intelligence (i.e., NSP) whereas FIGS. 47A–47C illustrate a distributed intelligence embodiment. FIG. 47A illustrates steps during call establishment/activation; FIG. 47B illustrates steps for the NSP procedure. FIG. 47C illustrates steps for the VAP procedure. The automatic callback (ACB) feature frees the user from re-dialing the same busy number repeatedly. The wireless user is typically alerted by a special ringing tone when the called party becomes available when the NSP 106 stores 4702 a last dialed digit for an automatic callback subscriber, the NSP 106 determines 4704 whether the automatic callback feature can be activated by the wireless user. When the automatic callback feature cannot be activated and validated, the NSP 106 rejects 4706 the automatic callback request and informs the user. Where the automatic callback feature can be activated and validated, the NSP 106 does so and starts a timer (in one embodiment the timer is set for 30 minutes) and informs the VAP 103A, 103B to start the automatic callback process. Then, the VAP 103A, 103B start 4710 the automatic callback process, and the NSP 106 starts 4712 the automatic callback process. While the VAP 103A, 103B is processing the automatic callback procedure, the following can occur:

1. The MS moves to another VAP (either via handoff or location registration), and the NSP informs the former VAP to cancel the automatic callback and the new VAP to start automatic callback.
2. The MS powers down, and power down registration is sent to the NSP. The NSP cancels the automatic callback for the VAP and for itself.
3. The MS becomes busy while the VAP is completing the call to the MS and the wireless user does not answer the call. The VAP releases the call, cancels the automatic callback and informs the NSP. The NSP determines that the procedure failed because the MS is busy and informs the VAP to restart the automatic callback procedure.

The above scenarios are valid only during the time period when the NSP has instructed the serving VAP to initiate the automatic callback procedure and the VAP fails when it attempts to page the MS.

There are typically two controlling timers. Clearly, more timers may be utilized, and various times for the timers may be predetermined by the user. In the embodiment shown, a 30 minute (T1) timer is used in the NSP and a 30 second (T2) timer is used on the VAP side. FIG. 47B illustrates steps for one embodiment implementing the NSP 4712 procedure. T1 is the master timer. The NSP determines 4718 whether T1 has expired. When the master timer has expired 4720, the NSP informs the VAP to cancel the ACB and cancels ACB on the NSP side. Where Ti has not expired, the NSP determines 4722 whether it has received a result message (msg) from the VAP. Where no result message has been received, the NSP returns to checking whether T1 has expired 4718. Where a result message has been received, the NSP determines 4724 whether the cause for receiving the result message is a successful call. Where the automatic callback has been successful, the NSP cancels the timer (T1) 4726. Where the automatic callback has been unsuccessful, the NSP informs 4728 the serving VAP to start the automatic callback procedure.

FIG. 47C illustrates one embodiment of steps for the VAP 4710 procedure. T2 on the VAP side will only control the call establishment time for the VAP. The VAP will try every 30 seconds to establish a call with the remote user until the call is successfully connected or the procedure is cancelled. Typically, for example, the VAP may notify the NSP that the VAP plans to utilize the B channel for call establishment by sending a BchnlStatus message. The VAP will start T2 (the 30 second timer) 4732. The VAP determines 4734 whether 30 seconds has expired. If 30 seconds has not yet expired, the VAP continues to check whether the 30 seconds has expired 4734. If the 30 seconds has expired, the VAP determines whether the NSP has notified the VAP to stop/cancel 4736 the automatic callback procedure. If the NSP has notified the VAP to stop or cancel the automatic callback procedure, the VAP cancels/stops 4738 the automatic callback procedure. If the NSP has not notified the VAP to stop or cancel the automatic callback procedure, the VAP determines 4740 whether there are resources available to complete the call. If resources are not available, the VAP returns to the step of starting T2 4732. If resources are available, the VAP initiates 4742 the call to the destination user. In the diagram and similarly for FIGS. 47A and 47B, a circle 4744 simply serves to show the connection between the top portion of FIG. 47C with the bottom portion of FIG. 47C. The call setup procedure will indicate to the VAP whether the PSTN user is still busy. If the PSTN user is still busy, the VAP releases 4748 the call, which in this example, releases the B channel and the VAP resets the T2 timer 4732. If the PSTN user is no longer busy, the VAP pages 4750 the MS. Then, the VAP determines 4752 whether the MS has responded. If the MS has not responded, the VAP releases the call, sends notification to the NSP and cancels 4764 the automatic callback procedure. If the MS has responded, the VAP connects 4754 the call to the MS. Then, the VAP determines 4756 whether the call is connected. If the call is connected, the VAP cancels 4762 the automatic callback procedure and informs the NSP. If the call is not connected, the VAP releases 4758 the call, which in this example, releases 4760 the B channel and the VAP resets the T2 timer 4732.

Thus, when the T2 timer expires, the VAP first checks whether the MS is idle and then retries to establish the call if the remote user is busy, VAP will reset the timer. If the remote user is idle VAP will attempt to terminate the call to the MS. If the VAP fails to establish a call with the MS (i.e., the MS is busy, powered down, moved out of coverage area) VAP will immediately cancel ACB on the VAP and inform NSP. The NSP then determines the status of the ACB procedure (explained in detail above).

Figure 48:
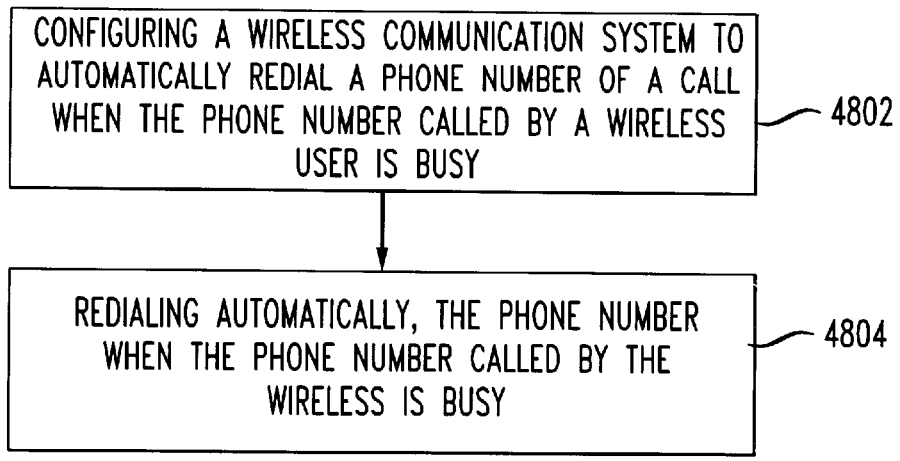
FIG. 48 is a flow chart showing another embodiment of steps in accordance with the method of the present invention.

FIG. 48 is a flow chart showing another embodiment of steps in accordance with the method of the present invention. The method includes the steps of: configuring 4802 a wireless communication system to automatically redial a phone number of a call when the phone number called by a wireless user is busy; and redialing 4804, automatically, the phone number when the phone number called by the wireless user is busy.

Figure 49:
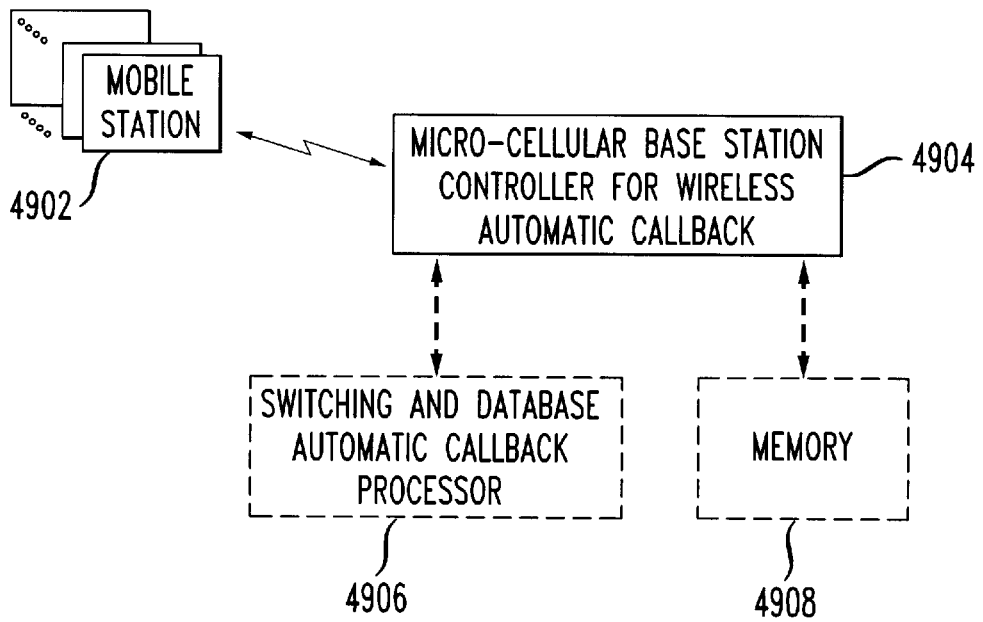
FIG. 49 is a block diagram of one embodiment of a wireless communication platform for providing wireless automatic callback in accordance with the present invention.

FIG. 49 is a block diagram of one embodiment of a wireless communication platform for providing wireless automatic callback in accordance with the present invention. The wireless communication platform includes at least one mobile station 4902 and a micro-cellular base station controller 4904 for wireless automatic callback that is arranged to communicate wirelessly with the at least one mobile station. When a number called by the at least one mobile station 4902 is busy, the micro-cellular base station controller 4904 for wireless automatic callback automatically redials the number to provide automatic callback for the at least one mobile station. The wireless communication platform may further include a switching and database automatic callback processor 4906 for wireless automatic callback that is coupled to the micro-cellular base station controller 4904 for wireless automatic callback and a memory 4908. The switching and database automatic callback processor 4906 provides processing for wireless automatic callback for the at least one mobile station upon one of: a predetermined button/buttons being pressed or a predetermined verbal callback command being issued, by automatically redialing the number. The memory 4908 is coupled to the microcellular base station controller 4904 for wireless automatic callback and to the switching and database automatic callback processor 4906. The memory 4908 has a database for storing at least the number redialed. Where selected, the memory 4908 may further store information for authentication and/or billing information for the at least one mobile station.

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

XX. Speed Calling

The speed calling feature allows a subscriber to compile a list of phone numbers in which each phone number is associated with a unique speed calling code. A subscriber can provision a unique speed calling code for one or more telephone numbers. When an MS user enters a valid speed calling code, the WCS system will complete the call using the telephone number in the speed calling list corresponding to the speed calling code entered.

There are several ways a subscriber can provision a telephone number for speed calling. For example, the user may access the Internet or a web-based interface such as a WCS web site and input and update a list of phone numbers having speed calling. Also, the subscriber may contact a customer care center representative by phone and verbally communicate the numbers through any type of communications unit (e.g., cell phone, landline phone, wireless palm top computer phone, etc.). Alternatively, a user may be directed through an automated phone menu to input the numbers by use of a communications unit keypad or voice recognition system.

According to one embodiment, the user may provision the speed calling telephone numbers through the WCS system. In this regard, the subscriber may activate the feature by entering a feature activation code, a speed calling code (e.g., 1–30) followed by a phone number (e.g., *75*1#5555151) into the keypad of MS 101A and then pressing the "send" button. Actuation of the "send" button sends the feature activation message to the WCS system (e.g., NSP 106). The WCS system then may acknowledge activation of the feature, by returning a short message to the MS 101A, or alternatively an aural communication, including identity of the feature activated, the speed calling code and phone number, for example. In addition, a message indication that a call origination request has been rejected can be used to provide feature activation/deactivation status information.

In a further modification, the speed calling code may be automatically assigned such as with the first available speed calling code. Thus, the subscriber might send the feature activation code followed by the telephone number (e.g., *75*#5555151) to the WCS system. In this instance, when the subscriber fails to enter a speed calling code, a speed calling code may be automatically assigned to the telephone number. Illustratively, if thirty codes are available (code numbers 1–30) and code numbers 1, 2, 4 and 7 have been assigned, the system can assign the next available code, which would be code number 3 to the telephone number input by the subscriber. If all available speed calling codes are assigned, the system can send a short message or aural message indicating the same, or can send status information with a message indicating that a call origination request has been rejected. Also, the subscriber may enter a code requesting the system to identify the telephone number associated with a speed calling code.

To delete a phone number from the speed call list, the subscriber may overwrite the existing phone number assigned to a speed call code with another number. Alternatively, the subscriber may enter a feature deactivation code followed by the telephone number and press the "send" button. Also, the subscriber may deactivate the speed calling codes for all numbers by entering a global feature deactivation code and the "send" button on the MS 101A. A more detailed discussion of feature activation and deactivation is provided at other places in the instant description, for example at section IX, above.

To implement the speed call feature, the subscriber dials the speed calling code (e.g., *1) for the desired telephone number and presses the "send" button on MS 101A. If the speed call code entered is unassigned, an error message will be returned to the subscriber by a short message or otherwise.

According to an illustrative embodiment of the invention, the speed call list may be stored in a memory in the NSP 106 or a memory location accessible to the NSP 106. The list may include any amount of numbers depending on the capacity of the memory employed. In one embodiment, up to thirty numbers may be defined to have a unique speed call code and the size of the telephone numbers can range from 1–17 digits.

Figure 50:
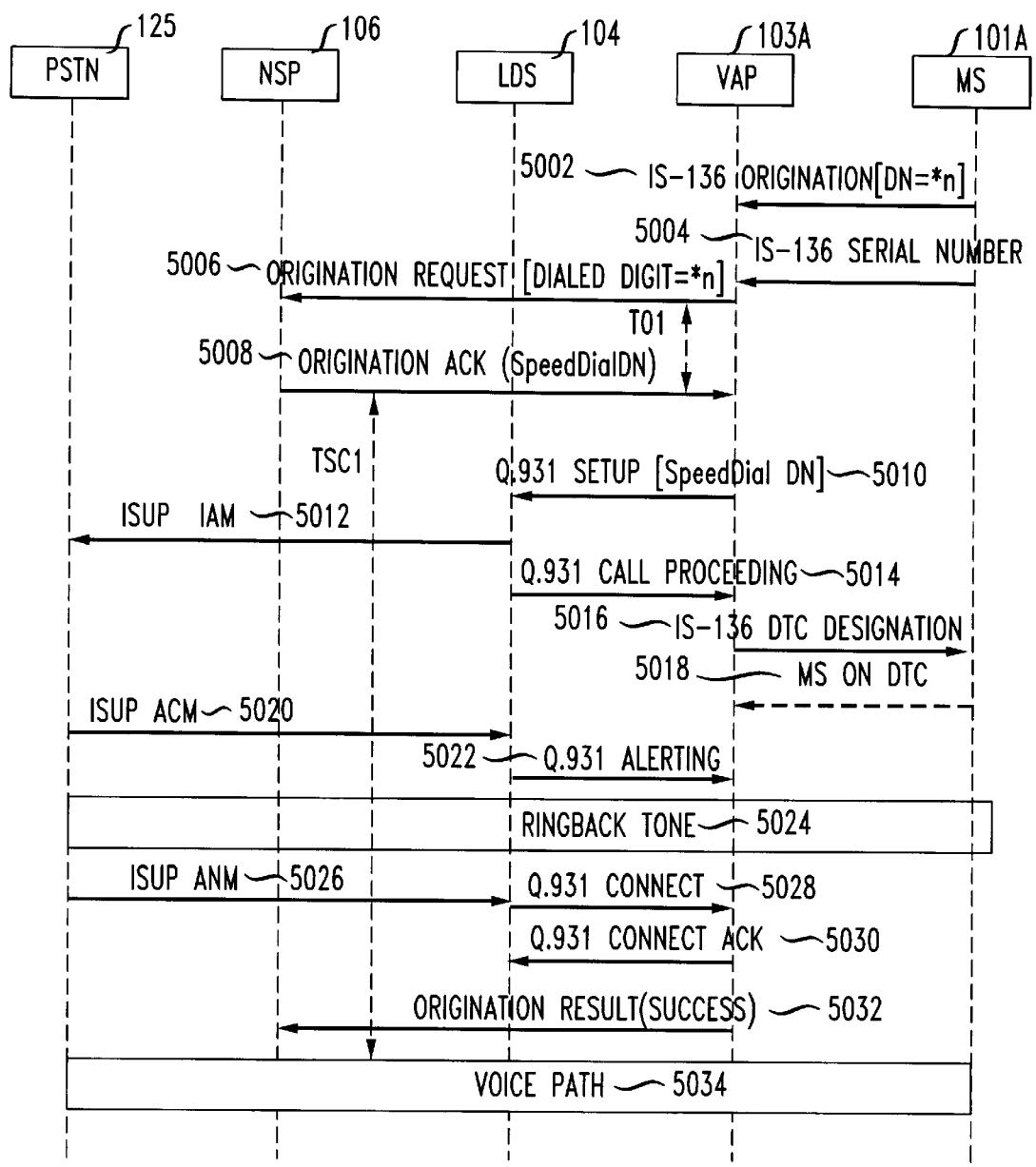
FIG. 50 shows an exemplary call flow diagram for the actual implementation of the speed calling feature according to an illustrative embodiment of the present invention.

FIG. 50 provides an exemplary call flow diagram for implementing the speed call feature according to an illustrative embodiment of the present invention. While the IS-136 standard is used to illustrate one implementation of the present invention, it should be understood that the present invention is applicable to other cellular or PCS systems.

When a WCS subscriber wants to place a call utilizing speed calling, the subscriber inputs the speed calling code *n, where n is the code and actuates the "send" button. In response, MS 101A sends an IS-136 origination [DN=*n] message 5002 to a VAP 103A at which the MS 101A is registered. Also, the MS 101A sends an IS-136 serial number message 5004 to the VAP 103A. In response, the VAP 103A sends a proprietary origination request message (Origination Request [dialed digit=*N]) 5006 to the NSP 106 and starts timer TO1. The NSP 106 receives the origination request message 5006 and identifies that a speed call attempt is being made.

The NSP 106 then determines whether MS 101A subscribes to the speed call feature by comparing the MIN of MS 101A with an authorized subscriber list maintained in the WCSD. If the MS 101A is not authorized for the speed call feature, then the NSP 106 sends the VAP 103A an origination non-acknowledgment (NACK) message (not shown) and indicates that the MS 101A does not subscribe to the speed call feature. The timer TO1 is canceled and the VAP 103A then notifies the MS 101A subscriber through a short message or aural message that it does not subscribe to the speed call feature.

If the MS 101A is authorized for the speed call feature, then the NSP 106 determines whether the speed call code input by the subscriber corresponds to a telephone number. If no number corresponds to the entered speed call code, a NACK message is sent to the VAP 103A including a DN unavailable message and the timer TO1 is canceled. The DN unavailable message is then delivered by the VAP 103A to the MS 101A.

If the MS 101A is authorized for the speed call feature and a phone number corresponds to the speed call code entered, the NSP retrieves the telephone number associated with the speed dialing code from the speed dial list. Then, the NSP 106 sends an origination acknowledgement message 5008 (origination ACK (SpeedDial DN) including the telephone number to the VAP 103A and starts the timer TSC1. Responsive to the origination acknowledgement message 5008, the VAP 103A cancels timer TO1 and initiates a Q.931 call set up procedure using the telephone number corresponding to the speed dial code, i.e., speed dial DN. If the TO1 timer expires before the VAP 103A receives the origination acknowledgment message 5008, the VAP 103A sends an IS-136 reorder/intercept message (not shown) to MS 101A including information about what went wrong similar to when the VAP 103A receives an origination NACK message.

The call set up procedure is similar to call set up procedure described elsewhere in this application, but will be described here for completeness. To set up the call, the VAP 103A reserves an RF DTC channel and sends a Q.931 setup [speed dial DN] message 5010 to the LDS 104. The LDS 104 then examines the speed dial DN in the Q.931 setup message 5010 and sends an ISUP IAM message 5012 to a far end switch in the PSTN 125 for end-to-end connectivity. Also, the LDS 104 sends a Q.931 call proceeding message 5014 to the VAP 103A. The VAP 103A then sends an IS-136 Digital Traffic Channel (DTC) Designation 5016 message to the MS 101A so that MS 101A may tune to the designated traffic channel. MS 101A informs VAP 103A that it is using the designated DTC by responding with an MS on DTC message 5018. The VAP 103A then detects that the MS 101A is tuned to designated traffic channel, and cuts through the voice path 5034 between the RF DTC channel and an ISDN B channel.

The destination switch in the PSTN 125 sends an ISUP ACM message 5020 to the LDS 104. In response, the LDS 104 sends a Q.931 alerting message 5022 to VAP 103A. Next, a ringback tone 5024 is delivered to the MS 101A from the destination switch. Also, the PSTN 125 sends an ISUP ANM message 5026 to the LDS 104. Following receipt of the ISUP ANM message 5026, the LDS 104 sends a Q.931 connect message 5028 to the VAP 103A, removes the ringback tone 5024, and cuts through the voice path 5034. The VAP 103A then sends a Q.931 connect ACK message 5030 back to the LDS 104 to acknowledge the connection. Responsive to the Q.931 connect ACK message 5030, the VAP 103A sends origination result [success] message 5032 to the NSP 106 for billing and other OAM&P purposes. At this point, voice path 5034 has been established and the call proceeds between the MS 101A and the party called using the speed call code.

While the above description relates to an example of speed calling for a party coupled to a PSTN, it should be understood that a speed calling code may be set up for any party which a subscriber may call including, but not limited to, a WCS subscriber, a landline subscriber, and a cellular subscriber. Also, multiple phone numbers can be assigned to a single unique speed calling code such that entry of the speed calling code will initiate a call involving parties at each of the multiple phone numbers in a conference call. Reference is made herein to the description of conference calling in Section XXI below, which can be modified to provide for a speed call code to originate a three-way call, for example.

XXI. Conference Calling

A. Adding a Party to an Existing Call

The conference call feature/function allows a MS 101 user to talk with two or more parties at the same time. Once the MS 101 user is on a first active call, he can enter a feature code, for example by keying in *33# on the MS 101 keypad followed by a third party's DN (conference with DN) and then pressing a transmit key, for example, the "send" button, to initiate a conference call. Once validated by the WCS network determining that the MS 101 user is authorized to use the conference calling feature/function, an announcement is provided, for example, a voice prompt or a special tone will be heard by the MS 101 user (and optionally to the second party to an active call) indicating that a conference call connection (e.g., Three-Way Calling) has been requested. After the third party answers, the MS 101 user may then enter another code, for example by pressing the "send" button on the MS 101, to begin the multi-party conference call conversation.

The following detailed description of the conference call feature/function is described in terms of a three way call for ease of explanation and because one typical local digital switch has three way switches for each wireline. However, one skilled in the art will recognize that a switch having greater than three possible line connections (i.e., more than a three-way switch) may be provided in the local digital switch, e.g., a six way switch. Therefore, the conference call feature/function, although described in specific embodiments below illustrating three-way calling, is also applicable to conference calls having more than three parties by repeating portions of the conference call initiation and setup procedures.

Further, the signal flows used for Three-Way calls in this document are directed to comply with the Lucent 5ESS local digital switches and may apply to other local digital switches, such is the Nortel DMS-100 local digital switches, with or without modifications. Since the interface between LDS 104 and the VAP 103 is based on standard Q.931 messages it is supported by all LDSs. So, with minimum changes (if needed), the exemplary call flow described with reference to the Lucent 5ESS would work with other LDSs such as the Nortel DMS-100.

The conference call feature/function provides an MS 101 user with a convenient and user friendly method of creating a multi-party call. Once the MS 101 user has established an active call, for example a two-way call, with one or more other parties the MS 101 user is free to initiate adding a person for a conference call. First, while on an active call, the MS 101 user may indicate to the other party that a Three-Way call will be requested. After entering the conference call feature code, e.g., pressing the *33#, followed by the third party's DN, the MS 101 user will transmit this information to the WCS by, for example, pressing the "send" button. The existing second party is then put on hold and the MS 101 user initiating the conference call feature/function will be provided an announcement, for example, a voice prompt or a special tone on the MS 101 indicating the Three-Way call activation is now proceeding provided via NSP or, in distributed messaging, via VAP. The voice prompt or special tone may also be provided to the other party, or alternatively other audible sounds may be provided to the other party such as music.

If the MS 101 user initiates the conference call feature/function during an already active three-way call they initiated, and the LDS 104 is equipped with a switch that is capable of handling connection of another party (i.e., more than a three-way switch), the request for another conference call initiation will be honored and a similar connection procedure will ensue. However, if the LDS 104 is equipped with only a three-way switch, the request for another conference call initiation to add an additional party will be rejected and an appropriate notification (e.g., an announcement) of the limitation to a three-way call will be provided to the MS 101 user. Furthermore, if the MS 101 user transmits an empty message by, for example, pressing the "send" button before the original call is put on hold, the NSP 106 will ignore it.

When the call goes through to the third party, the MS 101 user who initiated the conference call will hear the ringing tone. If the third party answers, the MS 101 user can press a key on the MS 101, for example, the "send" button, (within a certain time period) to retrieve the held call(s) and complete the conference call (e.g., Three-Way) connection. In one alternative embodiment, the MS 101 cannot disconnect a third party who answers without first establishing a three-way connection. If the third party answers and the initiator presses a transmit key, for example, the "send" button once, to set up a three-way call but the original two-way call could not be retrieved for some reason (e.g., the party to the original two-way call on hold has hung up), the two-way call with the second called party will continue. An indicator, for example a voice prompt, indicating that the party on hold can not be connected may be provided to the MS 101 user who initiated the conference call feature/function.

If the third party answers and disconnects before the MS 101 user can establish a conference call (e.g., a three-way call), the MS 101 user can again transmit a message, by for example pressing a the "send" button once, and retrieve the original call. Further, if the connection to third party fails as a result of the switch being unable to connect to the third party (rather than the third party is busy or is not answering the phone), the MS 101 user can enter a code message, for example, press the "send" button once, to retrieve the original call placed on hold. On the other hand, if the third party's line is busy or the third party does not answer the phone, the MS 101 can enter another code message, for example the MS 101 can press the "send" button twice, to disconnect the second leg of the call and retrieve the original call on hold. Once again, if the original called party has already disconnected, an indication that the original called party is disconnected may be provided, e.g., an announcement such as a voice prompt may be played to the MS 101 user via VAP or NSP.

Furthermore, if the third party's voice mail answers, the three-way call is assumed to be complete. The MS 101 user may enter a code message, for example they can press the "send" button once, within a certain amount of time and establish a three-way conference. In one alternative embodiment the initiator can disconnect from the third party voice mail and end the conference call by pressing the "send" button twice only after the three-way call has been established. Thus, in this embodiment the MS 101 conference call initiator must establish the conference call connection by retrieving the original call in order to disconnect from the third party's voice mail.

At any time during an established conference call, the MS 101 user can enter a feature code message, for example by pressing the "send" button twice quickly (within a certain amount of time, e.g., within a few seconds) and disconnect the last added call. To end all calls the MS 101 user can enter another code, for example the initiator may just press the "End" button.

Figure 51:
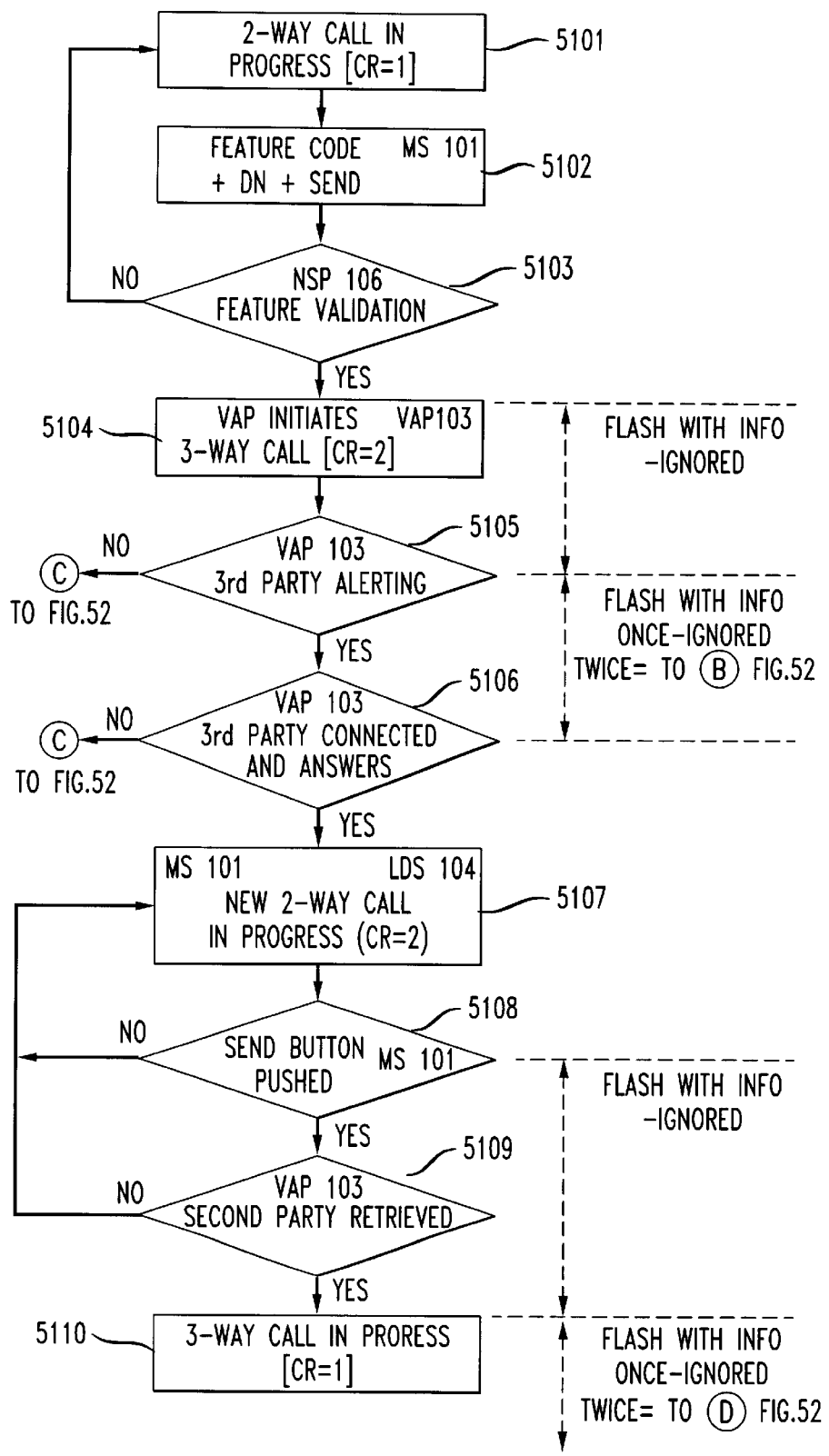
FIG. 51 is a first partial process flow diagram for a conference call procedure in accordance with an illustrative embodiment of the present invention.
Figure 52:
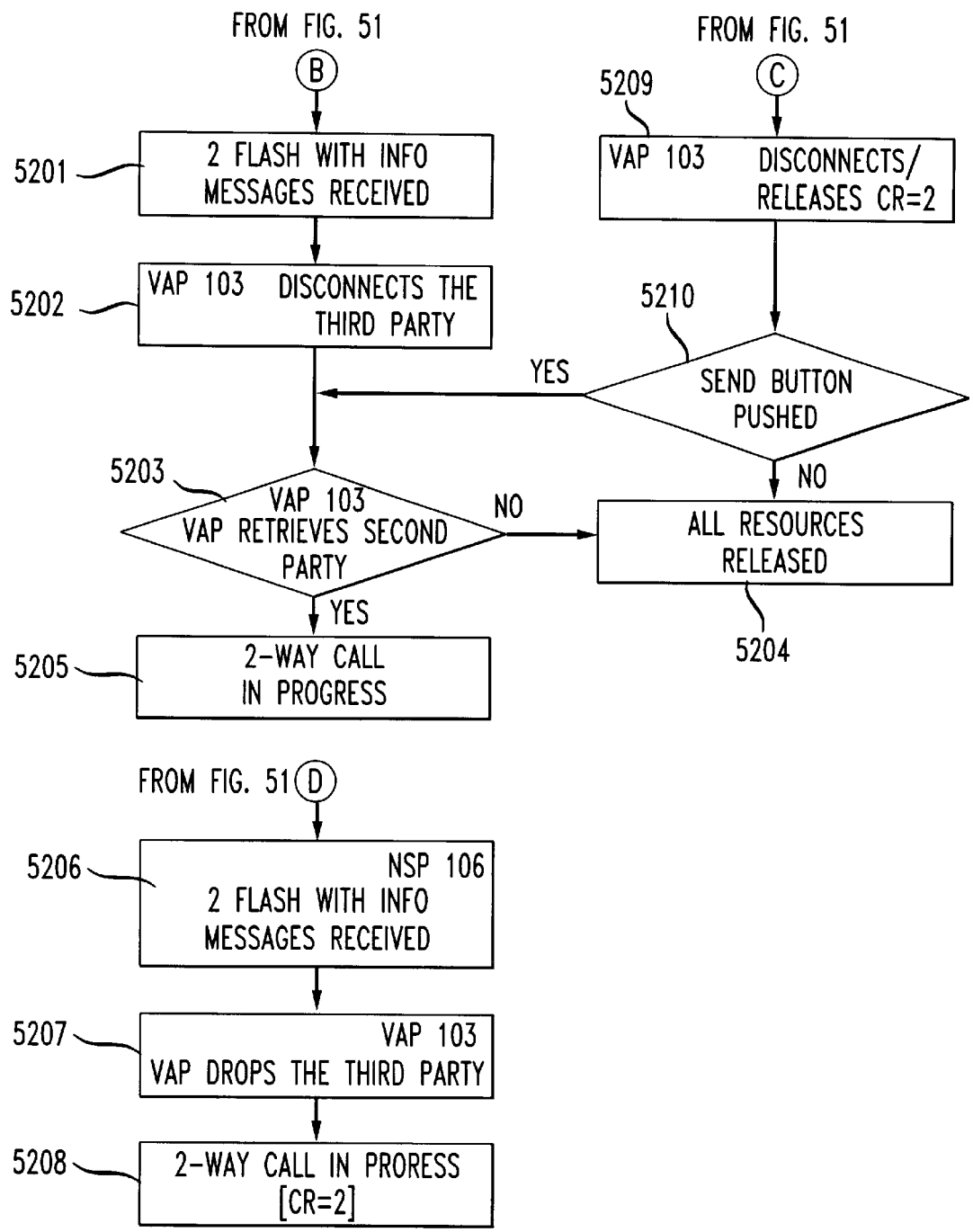
FIG. 52 is a second partial process flow diagram, related to the first partial diagram of FIG. 51, for a conference call procedure in accordance with an illustrative embodiment of the present invention.

Referring now to FIGS. 51 and 52, a discussion of various scenarios for a preferred embodiment having a thee-way conference call is illustrated using a process flow chart. In a first instance, an MS 101 user calls another party, either another MS 101 user or a PSTN user, and establishes an active two-way call in progress at step 5101. During the active two way call the MS 101 initiates a three-way conference call by entering a feature code and a conference to directory number (DN) of the party to be added (e.g., third party), and then press a process initiation key by pressing, for example, the "send" key on the MS 101 as shown in step 5102. In the next step, feature validation decision step 5103, the NSP 106 determines whether the MS 101 user is authorized to use the conference call feature/function (i.e., the MS 101 user subscribes for the feature), and if so, notifies the VAP 103 to go forward with the conference call set up. However, if the MS 101 user is not authorized to use the conference call feature/function, the NSP 106 will return the MS 101 user to the two-way call in progress state at step 5101. Upon returning to step 5101 an announcement may be played to MS 101 user indicating that the conference call feature/function is not available and information on how to subscribe for the service.

After the VAP 103 is instructed by the NSP 106 to proceed with the conference call setup, the VAP 103 initiates, for example, a three-way call by first instituting a second call reference (CR=2) at step 5104 and places the first call, first call reference (CR=1), on hold. Next, at decision step 5105, the VAP 103 determines if the third party is being alerted. If so, the VAP 103 then waits to see if the third party answers. If not, VAP 103 disconnects/releases call reference 2 in step 5209 (See FIG. 52) and awaits the MS 101 user input, by pressing for example the "send" key, to determine if the original call is retrieved (steps 5203 and 5205) or if the original call is also dropped (step 5204). If the MS 101 user presses the process initiation key again between initiating the three-way call at step 5104 and providing the third party an alert at step 5105, the input is ignored.

At decision step 5106 the VAP 103 determines if the third party has been connected to the MS 101 user and has answered. If so, the MS 101 and the third party are connected by the LDS 104 with a voice path for the second call reference (CR=2) at step 5107. If not, the VAP 103 disconnects/releases the third party (CR=2) at step 5209 and awaits MS 101 user input by, for example the MS 101 user pressing the "send" button, to attempt to retrieve the second party from hold to re-establish the original two-way call at step 5205 (See FIG. 52) or release all resources at step 5204. If possible, the VAP 103 reconnects the MS 101 user with the second party that was placed on hold and thus re-establishes the two-way call in progress at step 5205. If the VAP can not retrieve the second party it releases all resources at step 5204.

If the MS 101 user presses the conference call initiation key, for example the "send" key, twice between steps 5105 and 5106 before the third party answers, the VAP 104 will disconnect the third party, attempt to retrieve the second party, and re-establish a two-way call in progress, as indicated at steps 5201–5205. However, if the MS 101 user presses the conference call initiation key, for example the "send" key, once between step 5105 and 5106 the input will be ignored.

Once the MS 101 user is connected in a two-way voice path with the third party the MS 101 user may enter a code message, by pressing at any time, for example the "send" button to enter the process initiate button, as indicated at step 5108. This will retrieve the second party and connect them to the existing voice path between the MS 101 and the third party so that a three-way call is in progress as indicated at steps 5109 and 5110. If the MS 101 user does not enter a code message by, for example, pressing the "send" button or the second party can not be retrieved, the LDS 104 will leave the MS 101 user connected with he third party at step 5107. Further, if the MS 101 user enters a code message by pressing, or example, the "send" button again before the three-way call is established, the input will be ignored. On the other hand, if the MS 101 user enters a different code message by, for example, pressing the conference call initiation key, e.g., the "send" key twice after the three-way call has been established, as indicated at step 5206, the NSP 106 will instruct the VAP 103 to drop the third party as indicated in step 5207. Next, the VAP 103 will retain the MS 101 user and the second party in a two-way call as indicated in step 5208. If the MS 101 user enters a code message by pressing, e.g., the conference call initiation key, for example the "send" key, only once after the three-way call has been established, it will be ignored.

Figure 53:
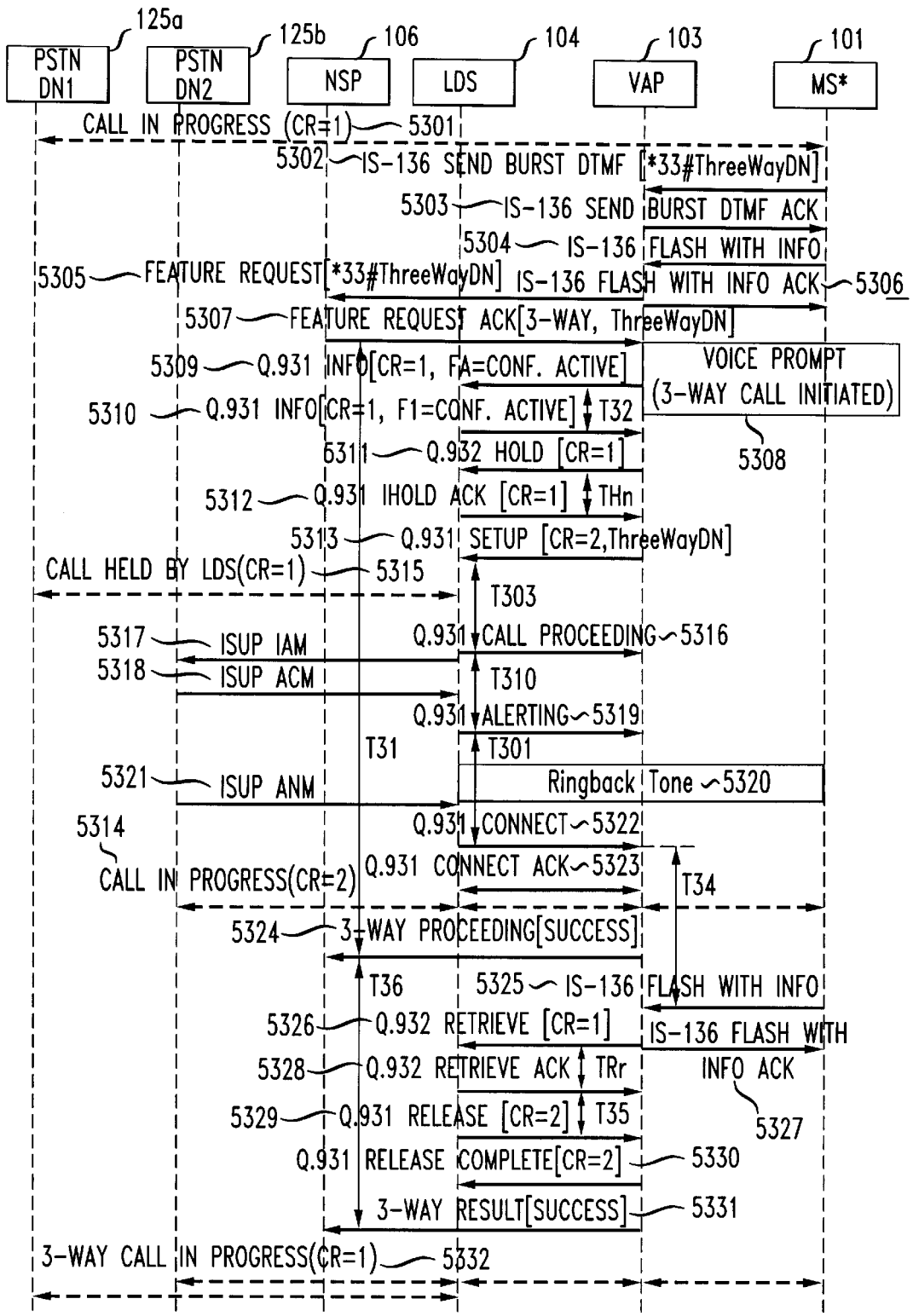
FIG. 53 shows a signal flow diagram for an exemplary three-way conference call for adding a PSTN telephone to an existing PSTN-MS call in accordance with an illustrative embodiment of the present invention.

An embodiment of the conference call feature/function of the present invention illustrating an exemplary three-way call signal flow is shown in FIG. 53. A successful conference call setup procedure has in general four basic steps. These general steps are: (1) establishing a first active call between an MS 101 user and a second party (or parties); (2) placing the active call between the MS 101 user and the second party (or parties) on hold; (3) establishing a second active call between the MS 101 user and a party to be added, e.g., a third party; and (4) re-connecting the second party on hold to the second active call. A detailed discussion of the signal flow for achieving each of these steps and more specific steps of a successful conference call process follows for an exemplary embodiment using a three party conference call as an example. First, the MS 101 user is a party to an active call with a party having a PSTN DN1 125a indicated as Call in progress (CR=1) 5301. When the MS 101 user wants to set up a three-way conference call with another PSTN user, PSTN DN2 125b (whose DN is herein referred to as ThreeWayDN), the MS 101 user enters the conference call feature code, for example "*33#" and the party to be added DN digits in the format of *33#ThreeWayDN and presses, for example, the "send" button on MS 101. The MS 101 sends to VAP 103 an IS-136 Send Burst DTMF message for each digit pressed. In the conference call procedure, the VAP 103 is responsible for receiving and buffering the digits, i.e. *33#ThreeWayDN, generated by the MS 101 in the form of IS-136 Send Burst DTMF messages. By pressing the "send" button, the MS 101 generates an IS-136 Flash With Info message which initiates packing of the previously depressed digits, so that the VAP 103 construes as one message the string of digits sequentially input earlier, i.e., the IS-136 Send Burst DTMF [*33#ThreeWayDN] 5302 message. Upon receiving each IS-136 Send Burst DTMF message from the MS 101, the VAP 103 sends an IS-136 Send Burst DTMF ACK 5303 message to the MS 101.

The IS-136 Send Burst DTMF 5302 messages include data fields such as: Protocol Discriminator, Message Type, Request number (DN), and Digit. The IS-136 Send Burst DTMF ACK 5303 message includes data fields such as Protocol Discriminator, Message Type, Request number (DN), Remaining Length, and Last Decoded Parameter.

The MS 101 user initiates a conference call feature/function by entering a command, for example, by pressing the "send" key on the MS 101, which results in a IS-136 Flash with Info 5304 message being sent from the MS 101 to the VAP 103. After receiving the Flash With Info 5304 message, the VAP 103 acknowledges receipt by sending Flash With Info Ack 5306 message to the MS 101 and requests initiation of a conference call feature/function setup procedure by sending a novel Feature Request [*33#ThreeWayDN 5305 message including the buffered digits *33#ThreeWayDN, to the NSP 106.

Upon receiving the Feature Request message from the VAP 103, the NSP 106 searches the WCSD in, for example memory 1240, and verifies that the MS 101 user has subscribed to the conference call feature, that the three-way call feature (assuming an LDS 104 has a three-way switch), and that the MS 101 user is not active on another three-way call initiated by him. The NSP 106 then sends a unique Feature Request ACK message, Feature Request ACK [3-Way, ThreeWayDN] 5307 message, containing the 3-Way as the action and the ThreeWayDN as the CalledDN. It also starts the T31 timer that will wait for the 3-Way Proceeding [success] 5324 message. In the situation where the MS 101 is authorized for the conference call capability and the LDS 104 has sufficient switch capacity to add another party to the conference call, the VAP 103 will play an announcement (or tone) to the MS 101 informing the MS 101 user (and optionally all parties to the conference call) that the conference call setup has been initiated, for example, Voice Prompt (3-way call initiated) 5308. On the other hand, if the MS 101 user who initiates the conference call is not authorized to make a three-way call, the NSP 106 sends a Feature Request ACK message with the action as Invalid 3-Way, so as to trigger an indication to the MS 101 user that the conference call feature/function is not available to them and the normal 2-way call will remain in progress. In either case, the VAP 103 may play the appropriate taped or voice synthesis generated announcement using, for example, the VPU 1235, or alternatively generates a tone to the MS 101 user and optionally to the PSTN DN1 125a or the MS 101 may display a text message, as the indication of status.

Then the VAP 103 sends a Q.931 Info [CR=1,FA=Conf] 5309 message with the Feature Activation set to conference call to the LDS 104 to initiate a three-way conference call, updates a record to identify that this is a three-way call, and starts the T32 timer awaiting a response from the LDS 104. The LDS 104 acknowledges by sending a Q.931 Info [CR=1,FI=Conf,Active] 5310 message with the Feature Indication set to an active conference call and the VAP 103 cancels the T32 time.

At this point, the WCS begins a procedure to place the first call between the MS 101 user and the 2nd party at PSTN DN1 125a on hold to allow connection between the MS 101 user and a 3rd party on another line. Once the VAP 104 gets a Q.931 Info message from the LDS 104 it cancels the T32 timer, sends a Q.932 Hold [CR=1] 5311 message to the LDS 104 instructing the LDS 104 to place the existing call with PSTN DN1 125a on hold, and starts a THh timer. However, if the T32 expires, the VAP 103 will log an error and send a 3-Way Proceeding message as fail to the NSP 106 with the cause value indicating that 3-way call could not be initiated. The NSP 106 and VAP 103 will update the call record information to indicate that the normal 2-way call is now in progress.

If the T32 time does not expire, the LDS 104 puts the first leg of the call on hold, i.e., proceeds to place the voice path with PSTN DN1 125a on hold, and sends a Q.931 Hold Ack [CR=1] 5312 message to the VAP 103 indicating that the first active call has been placed on hold. The VAP 103 cancels timer THh and sends a Q.931 Setup [CR=2, ThreeWayDN] 5313 message to the LDS 104, including the second call reference number (CR=2) and the ThreeWayDN, to setup the conference call to the third party [CR=2] on the same B-channel. However, if the timer THh expires, the VAP 103 will log an error and send a 3-Way Proceeding 5316 message as fail to the NSP 106 with the cause value indicating that 3-way call could not be held. The VAP 103 and NSP 106 will update the call record information to indicate that the normal 2-way call is now in progress.

If timer THh does not expire, the VAP 103 updates the information about this call in the appropriate record to identify that a 3-Way call is being established and starts the T303 timer awaiting a Q.931 Call Proceeding 5316 message from the LDS 104. Thus, the first referenced call (CR=1) is now held by the LDS 104 awaiting the connection of MS 101 with other parties (Call Held by LDS (CR=1) 5315. The NSP 106 updates the information about this call in the appropriate record in the WCSD of, for example, in the memory 1240.

When the first call between the MS 101 user and the second party, PSTN DN1 125*a* has been put on hold the WCS then continues with the conference call setup procedure by performing a call setup between the MS 101 and a party to be added to the conference call, for example, a third party at PSTN DN2 125*b*. First, the LDS 104 processes the Q.931 Setup [CR=2, ThreeWayDN] 5313 message and sends a Q.931 Call Proceeding 5316 message to the VAP 103 indicating to the VAP 103 that the call to PSTN DN1 125*b* is being initiated. Once the VAP 103 receives a Q.931 Call Proceeding 5316 message from the LDS 104, it cancels the T303 timer and starts T310 timer waiting for Q.931 Alerting 5319 message from the LDS 104. The VAP 103 does not have to do anything on the RF side because the MS 101 is already on the DTC. However, if the timer T303 expires, the VAP 103 will send a novel 3-Way Proceeding 5324 message as "fail" to the NSP 106 with a proper cause value. It will also send a Q.931 Release Complete [CR=2] 5330 message to the LDS 104. After this the VAP 103 will start a timer T34 waiting for a Flash with Info message from the MS 101 (this would indicate that the mobile wants to retrieve the original call).

Next, the LDS 104 sends an initial address message, ISUP IAM 5317, to the ThreeWayDN, in this example another PSTN LDS, PSTN DN2 125*b*. In response, the PSTN DN2 125*b* sends an address complete message, ISUP ACM 5318, to indicate that a communication link has been made with PSTN DN2 125*b*. Next, the LDS 104 sends a Q.931 Alerting 5319 message to the VAP 103 so that the VAP 103 and LDS 104 can provide MS 101 Ringback Tone 5320 indicating that PSTN DN2 125*b* is being alerted of an incoming call. When the VAP 103 receives a Q.931 Alerting 5319 message from the LDS 104, it cancels the timer T310 and starts T301 timer waiting for Q.931 Connect 5322 message from the LDS 104. However, if the timer T310 expires, the VAP 103 will follow disconnect procedure by sending Q.931 Disconnect (CR=2) message to the LDS 104. The LDS 104 will respond with Release (CR=2) 5329 message. The VAP 103 will continue to follow the same procedure as above; the VAP 103 will also send a Q.931 Release Complete [CR=2] 5330 message to the LDS 104. After this the VAP 103 will start a timer T34 waiting for a Flash with Info message from the MS 101 (this would indicate that the mobile wants to retrieve the original call).

When the third party at PSTN DN2 125*b* answers the call an answer message, ISUP ANM 5321, is sent from PSTN DN2 125*b* to LDS 104. In response, the LDS 104 sends a Q.931 Connect 5322 message to the VAP 103. When the VAP 103 gets the Q.931 Connect 5322 message from the LDS 104, it recognizes that this message corresponds to a three-way call and cancels the T301 timer. If the timer T310 expires, the VAP 103 will follow disconnect procedure by sending Q.931 Disconnect (CR=2) message to the LDS 104. The LDS 104 will respond with Release (CR=2) 5329 message. The VAP 103 will continue to follow the same procedure as above; the VAP 103 will also send a Q.931 Release Complete [CR=2] 5330 message to the LDS 104. After this the VAP 103 will start a timer T34 waiting for a Flash with Info message from the MS 101. Otherwise, the VAP 103 then sends a Q.931 Connect ACK 5323 message to the LDS 104 acknowledging the second call connection has been made between the MS 101 and PSTN DN2 125*b* and starts a T34 timer. (The voice path of the second call is illustrated in FIG. 53 as dashed arrow lines labeled Call in progress (CR=2) 5414 from the PSTN DN2 125*b* to MS 101.)

Once the voice path has been established the VAP 103 sends a novel 3-Way Proceeding [success] 5324 message to the NSP 106 indicating that the third party has been successfully added to the conference call by completing the second call between MS 101 and PSTN DN2 125*b*. This message includes the MSID, the Call Reference Number (CR=2), and the Cause (Success/Fail) fields. (The cause field in the 3-Way Proceeding message may contain the comments, for example: 3rd party answered (success), 3-way call hold fail, 3-way call initiate fail, or 3rd party did not answer.) At this point, establishing a second call between the party to be added, in this case a third party, has been completed and thus the MS 101 for the conference call setup procedure is complete with the exception of a few administrative details to be performed by the NSP 106.

When the NSP 106 gets a 3-Way Proceeding [success] 5324 message it updates the information about this call in the appropriate record in the WCSD to, among other things, capture the call usage time for the new leg of the call. The NSP 106 cancels the T31 timer, updates the call record information and starts the T36 timer that waits for the 3-way Result [success] 5433 message from the VAP 103 indicating that the conference call setup has been completed successfully. However, if the second call to the third party is not connected for whatever reason, for example, the T31 timer expires and/or the NSP 106 receives 3rd Party Answered message as a "fail", the NSP 106 will send a 3-Way Disconnect message to the VAP 103 to disconnect the attempted connection with the third party, retrieve the original call with PSTN DN1 which was placed on hold (as discussed in more detail below), and update the call information record to indicate that a normal 2-way call is now in progress.

If the MS 101 user had requested to set up a conference call by adding another MS 101 rather than the PSTN DN2 125*b*, the call setup procedure would have followed the sequence described in other areas of the invention for call setup from one MS 101 to another MS 101 in the WCS.

Next, the conference call setup procedure connects the original call with the second party at PSTN DN1 125*a* on hold with the active call between MS 101 and the third party at PSTTN DN2 125*b*. If the MS 101 user once again inputs the initiation code, for example by pressing the "send" button once, an IS-136 Flash with Info 5325 message is sent to the VAP 103 requesting that the second party on hold be added to the two-way call between the MS 101 user and the third party. The VAP 103 cancels the T34 timer, sends a Q.932 Retrieve [CR=1] 5326 message to the LDS 104 indicating that the MS 101 user has requested that the call on hold be retrieve so that it and the active call be combined to form, in this case, a three way conference call, starts the TRr timer, and sends an IS-136 Flash with Info Ack 5327 message to the MS 101. However, if the timer T34 expires, the VAP 103 will follow the Release procedure to release CR=1 and send 3-Way Result as fail to the NSP 106. A 2-Way call with third party would continue.

When the LDS 104 receives the Q.932 Retrieve [CR=1] 5326 message from the VAP 103 (after the third party has answered), it verifies that the original called party, in this case the second party, is still present on hold, and sends a Retrieve Ack 5328 message to the VAP 103 indicating that the original call on hold has been retrieved. The LDS 104 then mergers the calls, CR=2 with CR=1. When the VAP 103 receives Q.932 Retrieve Ack [CR=1] message from the LDS 106, it will stop the TRr timer and start T35 timer. However, if the timer TRr expires as a result of the VAP 103 not receiving the Q.932 Retrieve Ack 5327 message because, for example, the second party hangs up or is some way disconnected, the VAP 103 will log an error and send a 3-way Result message as fail to the NSP 106 and the 2-way call [CR=2] with the third party will continue. In the case of such a failure to retrieve the first call placed on hold, the VAP 103 may also play a voice prompt to the MS 101 user indicating that the 3-way call could not be completed.

After merging the two legs of the call, CR=1 and CR=2, the LDS 104 sends a Q.931 Release [CR=2] 5329 message to the VAP 103 to release the second call reference (CR=2) while retaining the three (or more) parties on the conference call. Then VAP 103 cancels timer T35 and releases (clears) the second call reference CR=2 and sends a Q.931 Release Complete [CR=2] 5330 to the LDS 104. However, if the timer T35 expires, the VAP 103 will log an error. The 3-way call is in progress so the VAP 103 will send a Q.931 Release [CR=2] 5329 message to the LDS 104 to release the second call reference. Once the VAP 103 gets a Q.931 Release Complete [CR=2] 5330 message from the LDS, it will send a 3-way Result [success] 5331 message to the NSP 106.

In any case, the VAP 103 sends a novel 3-Way Result [success] 5331 message to the NSP 106 indicating that the release of CR=2 is successful. The 3-Way Result message includes MSID, Call Reference Number, and Cause fields. Then the NSP 106 cancels the timer T36 and updates the call record information to indicate successful setup of a conference call, in this case a three-way call, and that the conference call is now in progress (indicated as the dashed arrows labeled (3-Way Call In-Progress (CR=1) 5332).

However, if the NSP 106 receives a 3-Way Result message from the VAP 103 indicating a "fail", the NSP 106 will cancel the T36 timer and update the call record information to indicate that the normal 2-way call [CR=2] is in progress. If the T36 timer expires, the NSP 106 will initiate a Release procedure on CR=2. In either case, the NSP 106 may send a Play Voice Prompt message to the VAP 103 to inform the user that the conference call could not be completed and a two-way call will continue. Further, if any party disconnects during the establishment of a three-way call, the NSP 106 will get a WCS specific Release message. Then the NSP 106 will update its call record information and resource table accordingly.

Figure 54:
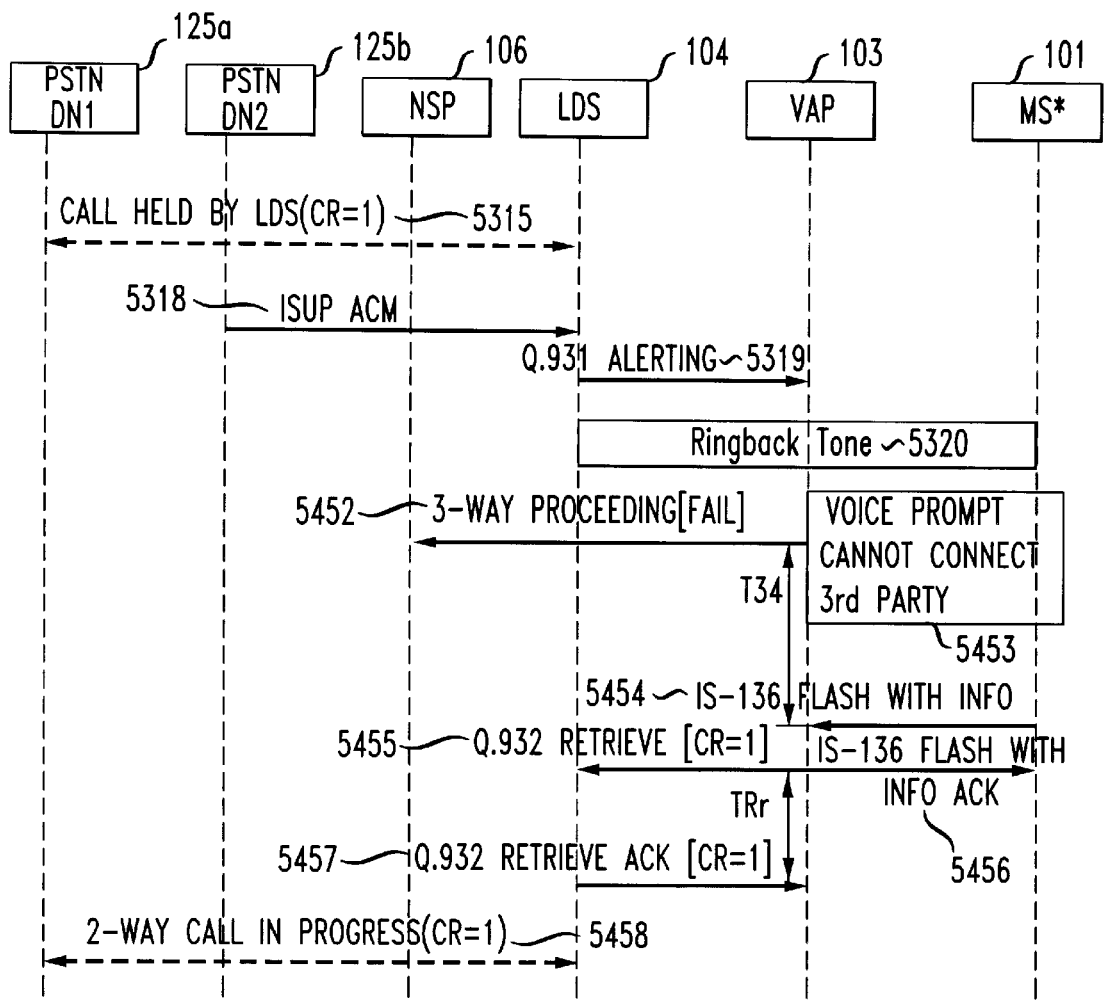
FIG. 54 shows a signal flow diagram for an exemplary three-way conference call for retrieving an original call when a third party could not be connected to an existing PSTN-MS call for a conference call in accordance with an illustrative embodiment of the present invention.

In some circumstances, although the third party may answer, the equipment may fail to be able to connect the third party to the original call. In such a case, the WCS will need to notify the MS 101 user and the MS 101 user may wish to retrieve the original call. FIG. 54 below gives the signal flow for one exemplary embodiment when the third party could not be connected.

The signal flow in the case where the third party could not be connected to the conference call is essentially the same as described for FIG. 53 up to the point where the VAP 103 sends 3-Way Proceeding [success] 5324 message. In general, the original call, call reference 1, is placed on hold by the LDS, Call Held by LDS (CR=1) 5315 message. Subsequently, the third party line PSTN DN2 125b sends an ISUP ACM 5318 message to the LDS 104. In response the LDS provides a Q.931 Alerting 5319 message to the VAP 103 and a Ringback Tone-5320 to the MS 101. However, in the case where the third party could not be connected to the conference call, the 3-Way Proceeding message from the VAP 103 results in a "fail" message being sent to the NSP 106, i.e., 3-Way Proceeding [fail] 5452.

After sending 3-Way Proceeding [fail] 5452 message, the VAP will start a timer T34 waiting for Flash with Info message from the mobile and provide an indication to the MS 101 user that the third party can not be connected. For example, the MS 101 use may receive a Voice Prompt: Can not connect 3rd Party 5453 or a similar text message, which prompts the MS 101 user to respond accordingly. If the MS 101 user enters the initiation code, for example, by pressing the "send" key, the VAP 103 will be sent a IS-136 Flash with Info 5454 message from the MS 101. The VAP 103 will cancel timer T34, send a Q.931 Retrieve [CR=1] 5455 message to the LDS 104 to re-connect with the original call, send and IS-136 Flash with Info Ack (CR=1] 5456 message to the MS 101, and start timer TRr. However, if the timer T34 expires, the VAP 103 will follow a disconnect procedure and send a WCS Release message to the NSP 106 so that all calls are disconnected and all resources released. If the time T34 does not expire, the LDS responds with Q.931 Retrieve ACK [CR=1] 5457 message and the VAP 103 will cancel the TRr timer and update its call record to reflect that the original call has been received and the conference call latest attempt to add a party has been cancelled. The WCS will establish the original call, for example, 2-Way Call in Progress (CR=1) 5458. On the other hand, if the timer TRr expires, the VAP 103 will release RF resources, clear the call reference on its side, send a Q.931 Release [CR=1] message to the LDS 104. Once the VAP 103 receives Q.931 Release Complete message from the LDS 104, it will send a WCS Release message to the NSP 106 with a proper cause value.

Figure 55:
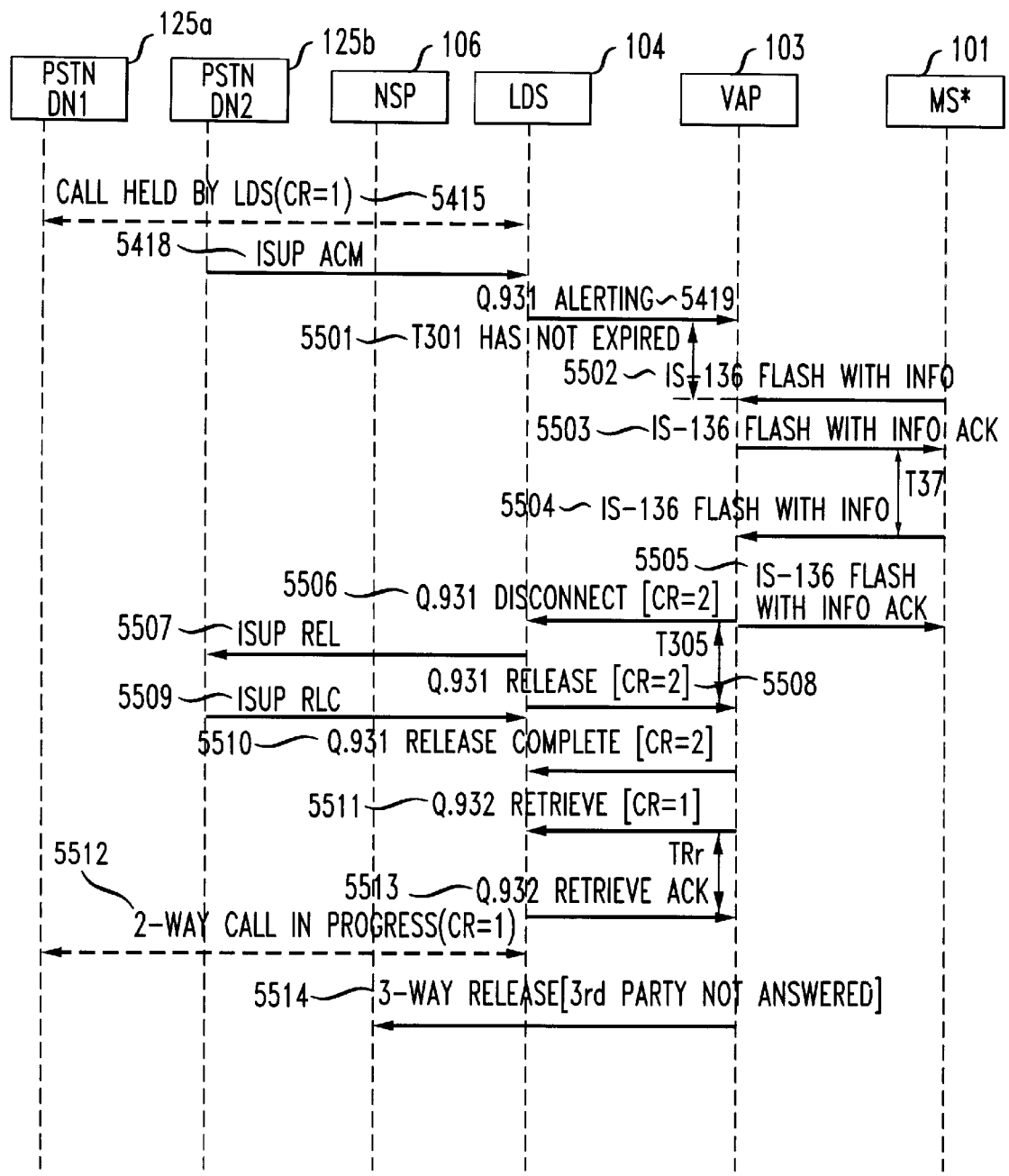
FIG. 55 shows a signal flow diagram for a three-way conference call for enabling an MS 101 user to initiate retrieval of an original call with a PSTN telephone of an existing PSTN-MS call without WCS prompting before a conference call is established in accordance with an illustrative embodiment of the present invention.

In some instances the MS 101 user may wish to retrieve the original call with the 2nd party before a conference call, e.g., a three way call, is established. FIG. 55 depicts the signal flow for the scenario when the MS 101 user wants to retrieve the original call with the second party before the third party answers. To do so, the MS 101 user can enter the feature initiation code twice, for example, he may press the "send" button twice in certain scenarios. In particular, if the original call with the second party is on hold and the third party has not yet answered the incoming call, the conference call setup procedure can be easily cancelled by, for example, the MS 101 user entering the feature initiation code twice within a short period of time, e.g., pressing the "send" button twice within for example, approximately one–two seconds. Upon canceling the conference call the ongoing connection to the party to be added, e.g., the third party, will be disconnected and the party(ies) of the original call, e.g., the second party, will be retrieved. A detailed discussion of the signal flow for retrieving an original call on hold before a conference call is established follows, using a three-way conference call as an example.

Assuming that the conference call has been initiated and the third party is being alerted, in essence, the conference call setup procedure has progressed successfully in the normal manner to the point where the original call to the second party is on hold (signals Call Held by LDS (CR=1) 5315, and Q.931 Call Proceeding 5316 already complete) and the party to be added to the conference call is being alerted of an incoming call (ISUP IAM 5317 already complete), if the MS 101 user enters a feature initiation code twice within a short period of time, e.g., within a 1 to 2 seconds, e.g., presses the "send" button twice, the MS 101 will send the VAP 103 two IS-136 Flash With Info 5502 and 5504 messages sequentially. In response, VAP 103 send two IS-136 Flash with Info ACK 5503 and 5505 messages sequentially to the MS 101.

When the VAP 103 gets the first IS-136 Flash with Info 5502 message from the mobile, the VAP 103 checks the call information record to determines that this is a three-way call, that the third party has not answered, that the original call with the second party is in a held state, and starts the T37 timer, awaiting another IS-136 Flash with Info message, IS-136 Flash with Info 5504 message. If the timer T37 expires, the VAP 103 will ignore the first Flash with Info message. Otherwise, the VAP 103 gets the second IS-136 Flash with Info message, IS-136 Flash with Info 5504 message from the MS 101, cancels the T37 timer, and sends an IS-136 Flash with Info Ack 5505 message to the MS 101. The VAP 103 also determines that this is a request to disconnect the ongoing conference call connection and retrieve the original call. So the VAP 103 then sends a Q.931 Disconnect [CR=2] 5506 message to the LDS 104 and starts a T305 timer.

The VAP 103 sends a Q.931 Disconnect [CR=2] 5506 message to the LDS 104 instructing it to disconnect the call setup to the party to be added, e.g., the third party. The LDS 104 then sends release messages, ISUP REL 5507 message to PSTN DN2 125*b* and Q.931 Release [CR=2] 5508 message to the VAP 103, to terminate the call setup in mid-process. PSTN DN2 125*b* responds by releasing the call setup and sending a confirmation to the LDS 104, the ISUP RLC 5509 message. Once the VAP 103 gets a Q.931 Release [CR=2] 5508 message from the LDS 104, it cancels the T305 timer, sends a Q.931 Release Complete[CR=2] 5510 message to the LDS 104 followed by Q.932 Retrieve [CR=1] 5511 message to the LDS 104 and waits for Q.932 Retrieve Ack 5513 message from the LDS 104. However, if the T305 timer expires, the VAP 103 logs an error, releases CR=2 at its end, sends a Q.931 Release Complete 5510 message to the LDS 104 and continues.

When the call to the party to be added is released, the VAP 103 proceeds to retrieve the original call to the second party from hold and reconnect the call between the MS 101 user and the second party on the PSTN DN1 125*a*. To do so, the VAP 103 sends the Q.932 Retrieve [CR=1] 5511 message to the LDS 104 so that the LDS will retrieve the call on hold and starts the TRr timer. The LDS 104 responds to the VAP 103 with a Q.932 Retrieve Ack 5513 message and re-establishes the original call between the original parties to the conference call, e.g., the second party and the MS 101 user as illustrated by the dotted line with arrows labeled 2-Way Call in Progress(CR=1) 5512. However, if the timer TRr expires and the VAP 103 does not get Q.932 Retrieve Ack 5513 message from the LDS 104, it will release all the resources. The VAP 103 will also clear the call reference (CR=1) on its side and send a Q.931 Release message to the LDS 104. Once the VAP 103 gets Q.931 Release ACK message from LDS 104, it will then send a WCS Release message to the NSP 106 with a proper cause value ($2^{nd}$ party could not be retrieved) and the air interface usage for the call.

When the VAP 103 gets the Q.931 Retrieve Ack 5513 message from the LDS 104, it sends a novel 3-Way Release [3rd Party not Answered] 5514 message to the NSP 106. This novel WCS 3-Way Release message includes fields for MSID, Call Reference Number, and Cause (3rd Party not Answered/3rd party dropped). When the NSP 106 receives 3-Way Release [$3^{rd}$ party not answered] 5514 message from the VAP 103, it updates it call record information in the WCSD to say that only 2-way call is now in progress. If the NSP 106 receives a WCS Release message from the VAP 103, the NSP 106 will update its call record to capture call usage information.

B. Deleting a Party from an Existing Call

The WCS provides the feature/function to allow an MS 101 user to delete (drop) a party from an active conference call. Once a conference call has been established, an MS 101 user may enter delete a party feature/function code in the MS 101 which will trigger a party to be dropped from the conference call.

For ease of explanation and convenience, an exemplary embodiment is provided below for a situation in which an MS 101 user drops the last added party from a three way conference call between an MS 101 user and two parties using PSTN telephones. However, one skilled in the art would recognize that the present invention also similarly covers scenarios where the conference call includes more than three people and the MS 101 user desires to delete (drop) a party other than the last added party. In such a case the delete a party feature/function message may also include, for example, a deactivation code and a directory number indicating the party to be deleted.

Figure 56:
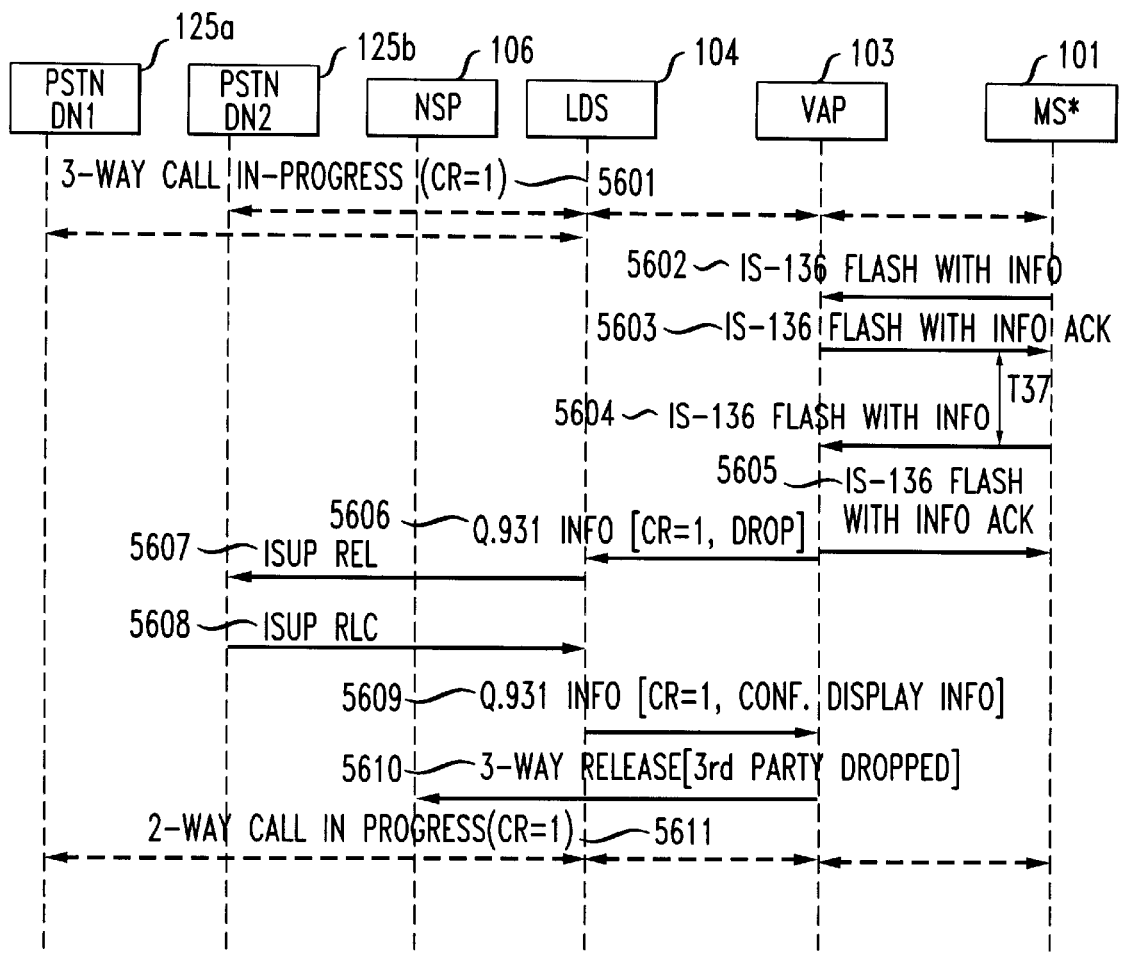
FIG. 56 shows a signal flow diagram for an exemplary deleting (dropping) of a last added party from an active conference call for a PSTN telephone connection leaving an PSTN-MS two-way call, in accordance with an illustrative embodiment of the present invention.

Referring now to FIG. 56, a preferred embodiment is illustrated having signal flow for a situation when an MS 101 user drops the last added party from a three party conference call initiated by the MS 101 user, i.e., deleting (dropping) the third party during and active three-way call. In this case, the MS user enters a delete last party message, for example entering a conference call feature/function message by pressing the "send" button twice, to thereby drop the last added call during a three-way call.

While a three-way call is in progress, 3-Way Call In-Progress (CR=1) 5601, the MS 101 user decides to delete (drop) the last party added, PSTN DN2 125*b*, from the active conference call. To achieve this, the MS 101 user may, for example, enter the conference call feature/function message by pressing the "send" button twice within a certain period of time (e.g., a few seconds). This sequence will indicate to the VAP 103 that the MS 101 user wishes to delete (drop) a party from a conference call, e.g., PSTN DN2 125*b*.

In one example, the VAP 103 receives the first of two feature/function initiation codes, IS-136 Flash with Info 5602 message, from the MS 101. The VAP 103 checks the call information record to determine that a three-way active conference call is in progress. The VAP 103 starts a T37 timer awaiting another IS-136 Flash With Info message and sends an IS-136 Flash With Info Ack 5603 message back to the MS 101, indicating receipt of the earlier sent IS-136 Flash With Info 5602 message. If the VAP 103 gets another IS-136 Flash With Info message before the T37 timer times out (e.g., within a few seconds), IS-136 Flash With Info 5604 message from the MS 101, the VAP 103 determines that this is a request to drop the last added party. In another embodiment the Flash With Info Message could be proceeded by the conference call feature function deactivation code and the DN to be dropped. This process would include a query of the NSP 106 for instructions as to which line to drop. In any case, if the timer T37 expires, the VAP will ignore the first Flash with Info message.

Assuming the MS 101 has entered two Flash With Info messages before the T37 timer times out, the VAP 103 determines that a three-way call is in progress and that this is a request to drop the last added party. Thus, the VAP 103 sends a Q.931 Info [CR=1, Drop] 5606 message to the LDS 104 requesting it to disconnect, for example, the last added party of the three-way call (CR=1).

The LDS 104 then initiates the Release process with PSTN DN2 125*b* by sending an ISUP REL 5607 message to the PSTN DN2 125*b*. After sending a Q.931 Info [CR=1, Drop] message to the LDS 104, the VAP 103 sends a 3-Way Release [3rd party dropped] 5610 message with cause value as 3$^{rd}$ party dropped to the NSP 106. The LDS 104 may send back a Q.931 Info [CR=1, Conf. Display Info] 5609 message to the VAP 103 informing the VAP 103 that the last added call has been dropped. However, the VAP 103 does not have to wait for the Q.931 Info [CR=1, Conf Display Info] 5609 message and will ignore it when it gets this message if the VAP 103 has already sent the 3-Way Release [3rd party dropped] 5610 message. In any case, the VAP 103 will send a 3-Way Release [3rd party dropped] 5610 message to the NSP 106 and releases the last added party to the conference call. When the NSP 106 receives 3-Way Release message from the VAP 103, it will update the call record information to say that 2-Way call is now in progress, 2-Way Call In Progress 5611, between PSTN DN1 125*a* and MS 101.

In another embodiment the VAP 103 may play an announcement to one or more party (ies) of the conference call indicating that a party is being dropped from the active conference call.

Although particular embodiments of the present invention have been shown and described, it will be understood that it is not intended to limit the invention to the preferred embodiments and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims.

For example, while the IS-136 standard is used to illustrate the invention in various embodiments described herein, the invention is not limited to use in the IS-136 standard. The invention is also applicable to other cellular and/or PCS systems. Furthermore, while the access methodology employed by the various embodiments of the instant invention involves the use of a Time Division Multiplexing Access (TDMA) scheme, the general concepts disclosed herein are not limited to the TDMA IS-136 standard. The concepts are applicable to other access methodologies such as, Frequency Division Multiple Access (FDMA), Code Division Multiple Access (CDMA), or other multiple access techniques. As a result, the use of TDMA IS-136 standard is used to enable the invention and is in no way intended to be a limitation of the invention.

The following applications are hereby incorporated by reference for all purposes:

1. U.S. patent application Ser. No. 09/223,316 by Chow et al. filed on Dec. 30, 1998 entitled Neighborhood Cordless Service Call Handoff;
2. U.S. patent application Ser. No. 09/223,321 by Chow et al. filed on Dec. 30, 1998 entitled Automatic Service Selection Feature for Neighborhood Cordless Service;
3. U.S. patent application Ser. No. 09/223,317 by Chow et al. filed on Dec. 30, 1998 entitled Method and Apparatus for Billing a Neighborhood Cordless Service;
4. U.S. patent application Ser. No. 09/223,318 by Chow et al. filed on Dec. 30, 1998 entitled Method and Apparatus for Over-the-Air Activation of Neighborhood Cordless Service;
5. U.S. patent application Ser. No. 09/223,322 by Chow et al. filed on Dec. 30, 1998 entitled Method and Apparatus for Providing Neighborhood Residential Cordless Service;
6. U.S. patent application Ser. No. 09/223,320 by Chow et al. filed on Dec. 30, 1998 entitled Automatic Status Indicators For Neighborhood Cordless Service; and
7. U.S. patent application Ser. No. 09/224,724 by Chow et al. filed on Dec. 31, 1998 entitled Instantaneous Conference Initiation.

We claim:

1. Network apparatus including a wireless centrex system for providing telecommunication informational messages responsive to an incoming communication directed to a mobile station in the wireless centrex system, comprising:
   an intelligent radio transceiver in communication with the mobile station;
   a network server platform for monitoring a status of the incoming communication in order to identify which incoming communication requires any informational messages associated with the mobile station, said network server platform having a communication interface with said intelligent radio transceiver for forwarding a message request for a particular class of informational message; and;
   wherein said intelligent radio transceiver comprises
      a memory for storing said informational messages including message configuration features for the mobile station's user; and
      a controller unit for interfacing with the memory and selectively finding and generating for the communications sender and/or the mobile station a predetermined informational message upon receiving said message request from said network server platform.

2. The network apparatus according to claim 1, said intelligent radio transceiver further comprising:
   a digital signal processor, responsive to said controller unit, for outputting said predetermined informational message.

3. The network apparatus according to claim 2, wherein said intelligent radio transceiver further comprises first and second digital signal processors, a first digital signal processor to control data and a second digital signal processor for traffic (voice) data to be used with an echo canceller.

4. The network apparatus according to claim 2, further comprising an ISDN transceiver coupled to said controller and digital signal processor.

5. The network apparatus according to claim 1, wherein said memory stores said telecommunications messages as compressed digital files.

6. The network apparatus according to claim 5, wherein said telecommunications message is received for storage in said memory in one of Linear PCM, ACELP and VSELP coding and is converted accordingly before being activated.

7. The network apparatus according to claim 1, wherein the particular class of requested message comprises "on hold" and the telecommunications informational message is generated to an incoming communication sender and an alert is provided to the mobile station.

8. The network apparatus according to claim 1, wherein the particular class of requested message comprises "screening" and the telecommunications informational message is generated to an incoming communication sender.

9. The network apparatus according to claim 1, wherein the particular class of message comprises "mobile station party not available" and the telecommunications informational message is generated an incoming communication sender.

10. The network apparatus according to claim 1, further comprising:
a time-of-day clock for determining the particular class of requested message.

11. The network apparatus according to claim 10, wherein the telecommunications message is a personal greeting and the time-of day and the identity of one of the mobile station and the incoming communication sender determine the particular class of requested message and the personal greeting.

12. The network apparatus according to claim 1 wherein said incoming communication comprises a voice communication, and said intelligent radio transceiver comprises a voice access port.

13. The network apparatus according to claim 1 wherein said incoming communication comprises a data and/or text communication.

14. The network apparatus according to claim 1 wherein said informational messages comprise one or more of the following: prompt, announcement, time of day, personal greeting, text, numbers, music, visual indicator, audio indicator, forwarding number, forwarding destination.

15. The network apparatus according to claim 1 wherein said network server platform further comprises ISDN channels.

16. The network apparatus according to claim 1 which further includes interactive means for activating, deactivating and/or configuring any of the particular class of informational messages associated with the mobile station.

17. The network apparatus of claim 16 wherein said interactive means comprises an Internet web page.

18. A method for use with a wireless centrex system for generating telecommunications messages in a network comprising a network server platform and an intelligent radio transceiver in communication with a mobile station in the wireless centrex system, the method comprising the steps of:
determining a need for a telecommunications message in response to a communication directed to the mobile station;
requesting from the intelligent radio transceiver an informational telecommunications message stored in a memory on the intelligent radio transceiver;
wherein the requesting step comprises requesting a class of particular messages associated with the mobile station and
generating, responsive to the message requesting step, from the memory on the intelligent radio transceiver one or more of the informational telecommunications messages for the communications sender and/or for the mobile station, said informational messages comprising one or more of the following: prompt, announcement, time of day, personal greeting, text, numbers, music, visual indicator, audio indicator, forwarding number, forwarding destination.

19. The method according to claim 18, further including the step of storing different telecommunications messages for multiple mobile stations in memory of said intelligent radio transceiver.

20. The method according to claim 19, wherein said different message storing step comprises storing said messages as compressed digital files.

21. The method of claim 20, wherein said different telecommunications messages are received for storage in the memory in one of Linear PCM, ACELP and VSELP coding and are converted accordingly before being activated.

22. The method according to claim 18, wherein the communication directed to the mobile station is on hold and the telecommunications messages is generated to a communications sender and an alert is provided to the mobile station.

23. The method of claim 22, further comprising the step of said intelligent radio receiver notifying said network server platform that an incoming call is on hold.

24. The method according claim 18, wherein the communication is directed to a mobile station that is not available and the telecommunications message is generated to a communications sender.

25. The method according to claim 18, wherein the communication is directed to a mobile station that is screening and the telecommunications message is generated to a communications sender.

26. The method according to claim 18, wherein the communication is directed to a mobile station that is participating in a conference call and the telecommunications message is generated to a communications sender and an alert is provided to the mobile station.

27. The method according to claim 18, wherein the generating step further comprises generating said class of particular messages in response to a time-of-day determination.

28. The method of claim 27, wherein the telecommunications message is a personal greeting and the time-of-day and the identity of one of the mobile station and the communications sender determine the class of particular messages and the personal greeting.

* * * * *